US005424849A

United States Patent [19]

Yamashita et al.

[11] Patent Number: 5,424,849

[45] Date of Patent: Jun. 13, 1995

[54] VIDEO SIGNAL REPRODUCTION APPARATUS AND TIME BASE CORRECTING DEVICE

[75] Inventors: Koichi Yamashita; Tomonori Oohashi; Masateru Nakano; Kazuhiro Kurisaki; Tomoki Yoshimura, all of Nagaokakyo, Japan

[73] Assignee: Mitsubishiki Denki Kabushiki Kaisha, Tokyo, Japan

[21] Appl. No.: 785,320

[22] Filed: Oct. 30, 1991

[30] Foreign Application Priority Data

Nov. 5, 1990 [JP] Japan .................................. 2-299195
Oct. 9, 1991 [JP] Japan .................................. 3-262107

[51] Int. Cl.$^{6}$ .................................................. H04N 5/76

[52] U.S. Cl. ..................................... 358/337; 358/320; 358/330; 360/28; 360/30; 360/36.1

[58] Field of Search ............... 358/337, 335, 310, 315, 358/318, 319, 320, 323, 330; 360/33.1, 27-30, 36.1, 65; H04N 5/76, 5/93, 9/79

[56] References Cited

U.S. PATENT DOCUMENTS 4,979,046 12/1990 Aki et al. ............................ 358/330

FOREIGN PATENT DOCUMENTS 0311117 4/1989 European Pat. Off. .
0369756 5/1990 European Pat. Off. .
0471551 2/1992 European Pat. Off. .
3201451 11/1982 Germany .
63-133357 6/1988 Japan .
1113640 5/1968 United Kingdom .
2092809 8/1982 United Kingdom .

OTHER PUBLICATIONS

Fernseh-und Kino—Technik, 30th year, No. 4, 1976, pp. 109-112.

*Primary Examiner*—Tommy P. Chin
*Assistant Examiner*—Khoi Truong

[57] ABSTRACT

The video signal reproduction apparatus having two kinds of equalizing circuits to correct the level of a frequency-modulated luminance signal, that is, a first equalizing circuit which raises the level of the upper sideband range of the frequency-modulated luminance signal and a second equalizing circuit which raises the level of the lower sideband range of the frequency-modulated luminance signal, so that the part of the frequency-modulated luminance signal where a horizontal synchronizing signal is not modulated is processed by the first equalizing circuit, while the part of the frequency-modulated luminance signal where a horizontal synchronizing signal is modulated is processed by the second equalizing circuit.

20 Claims, 100 Drawing Sheets

F i g. 7
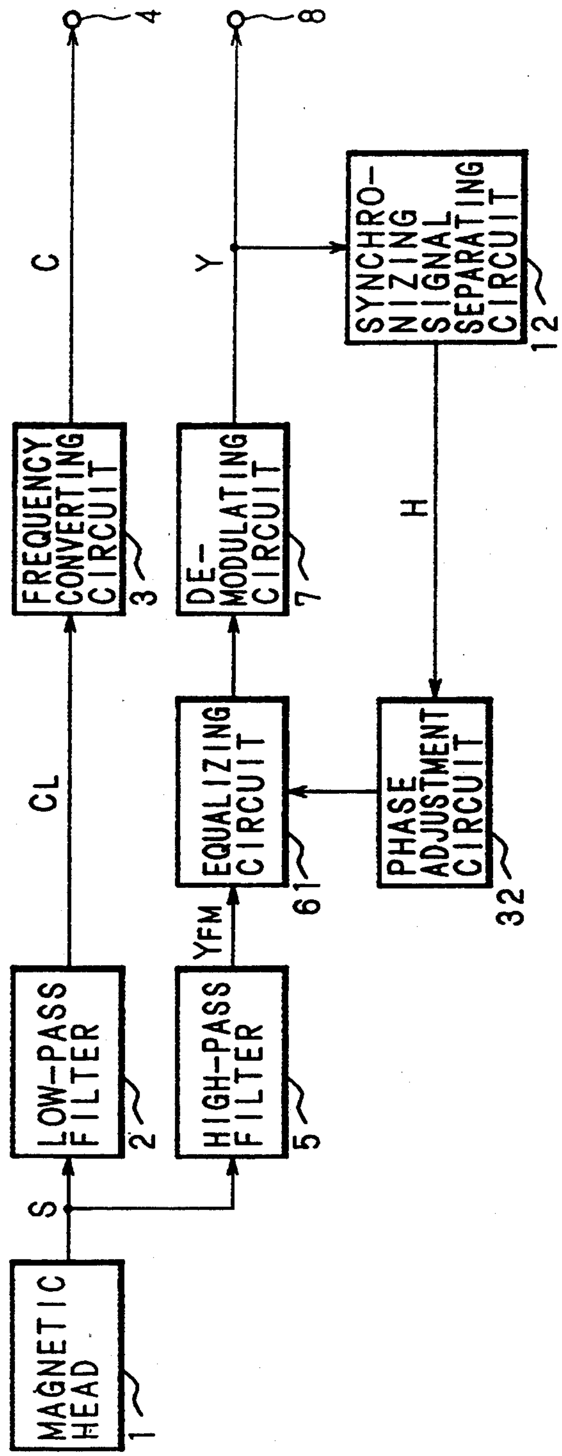

Fig. 9(a) OUTPUT OF CIRCUIT 7

Fig. 9(b) OUTPUT OF CIRCUIT 12

Fig. 9(c) OUTPUT OF CIRCUIT 322

Fig. 9(d) OUTPUT OF CIRCUIT 323

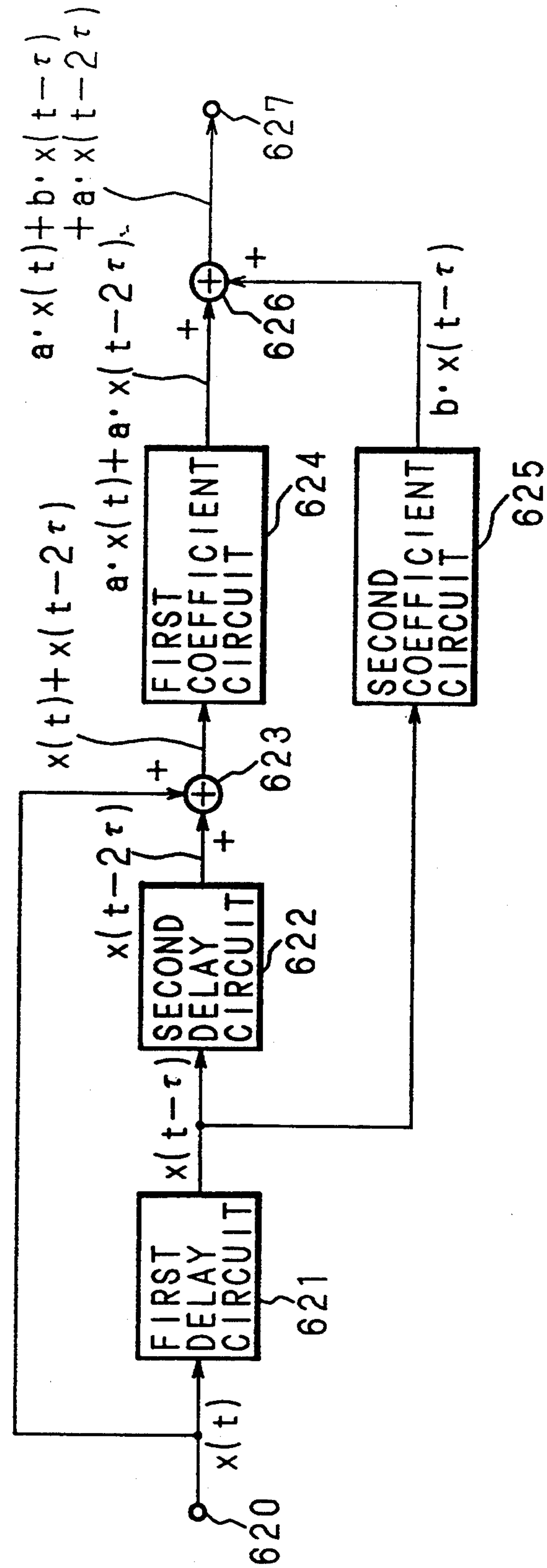
F i g. 1 4

F i g. 24
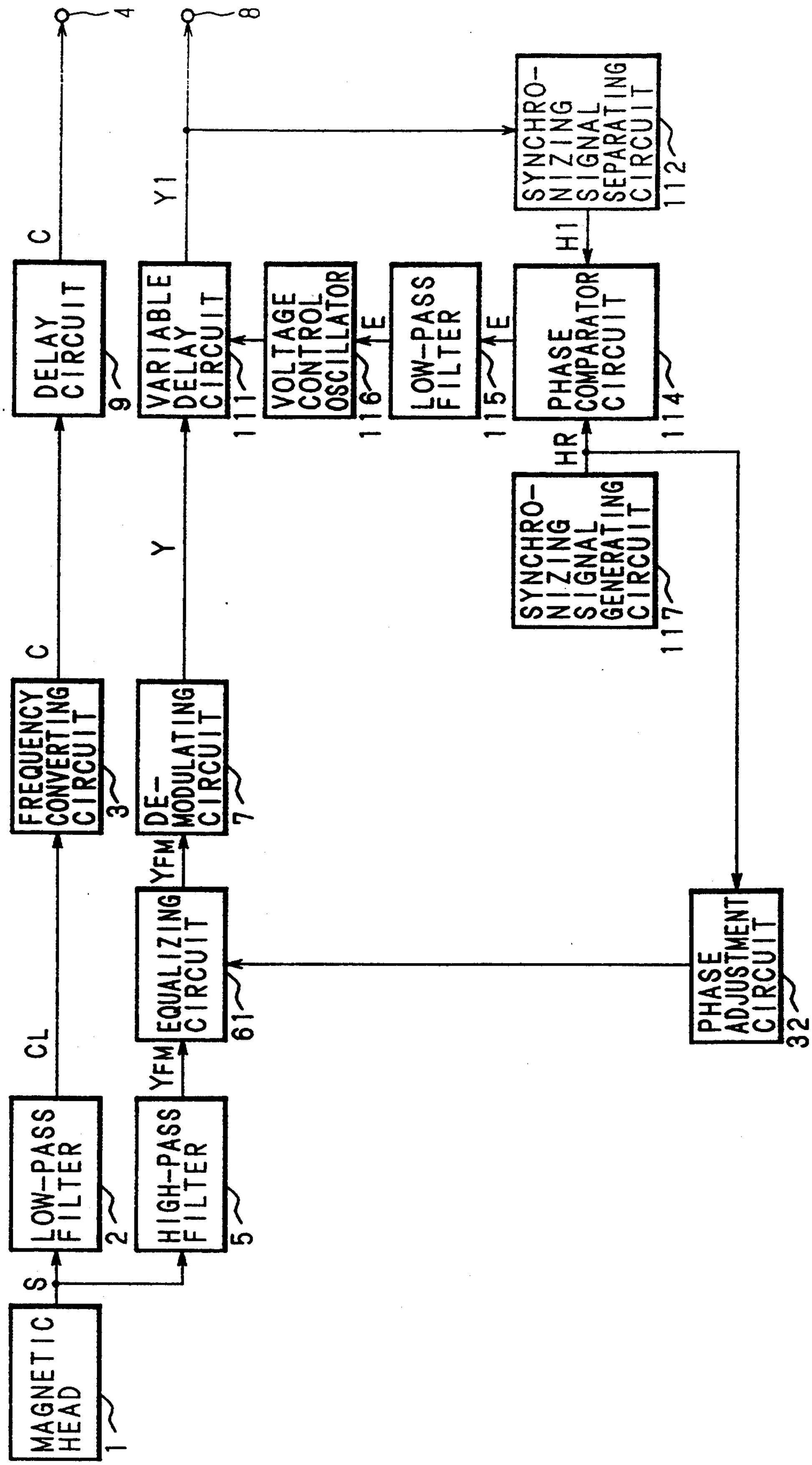

F I G. 25
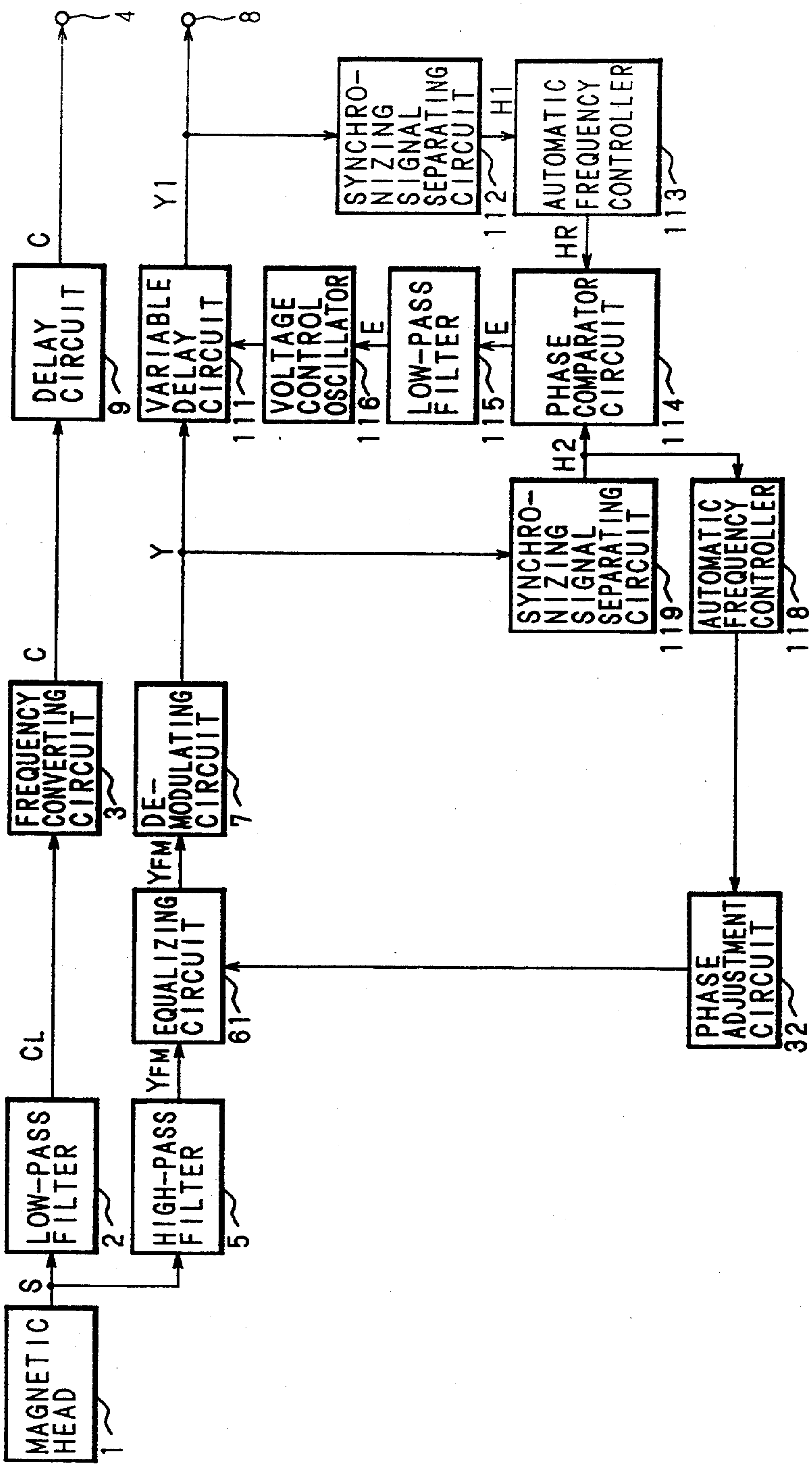

F i g. 30
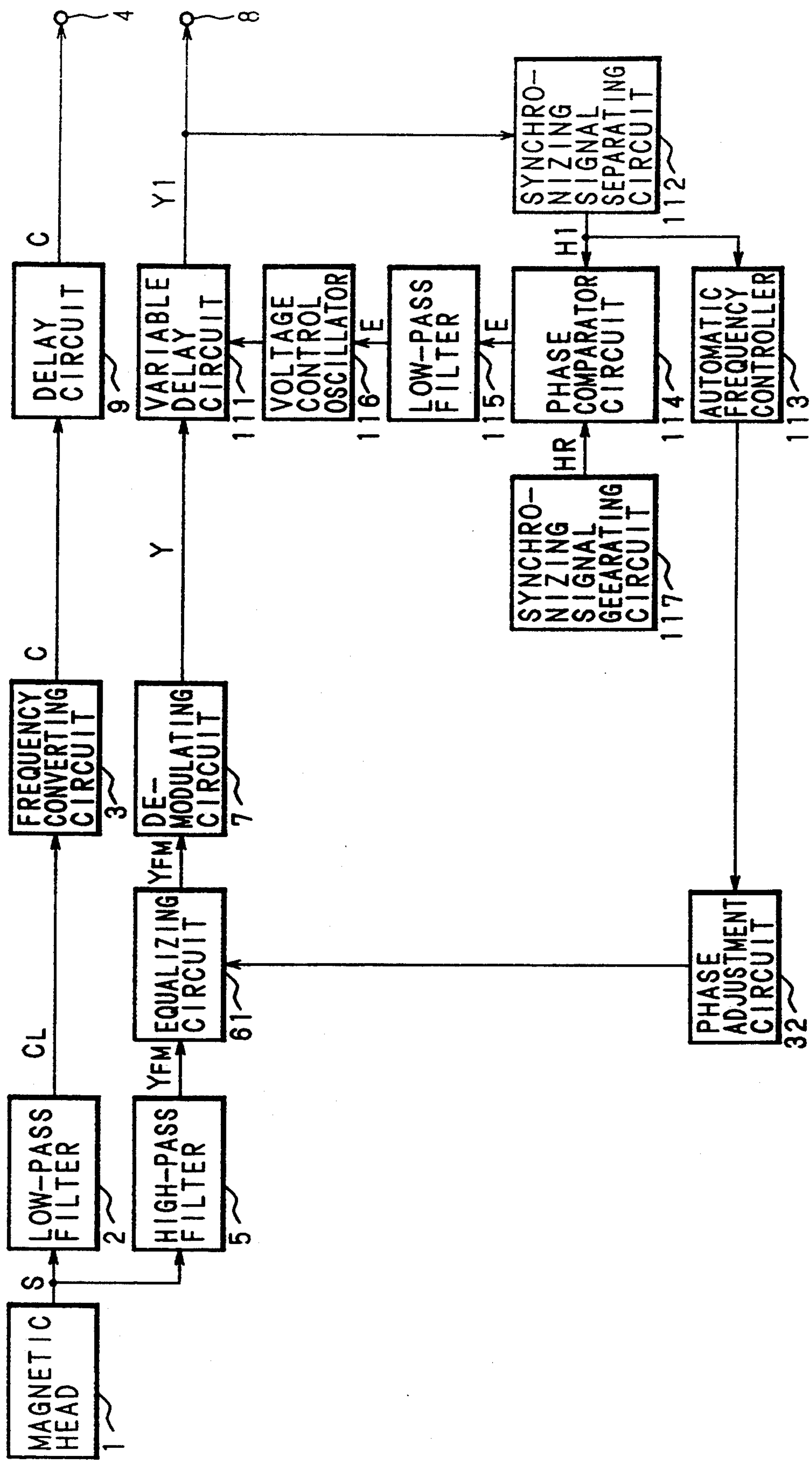

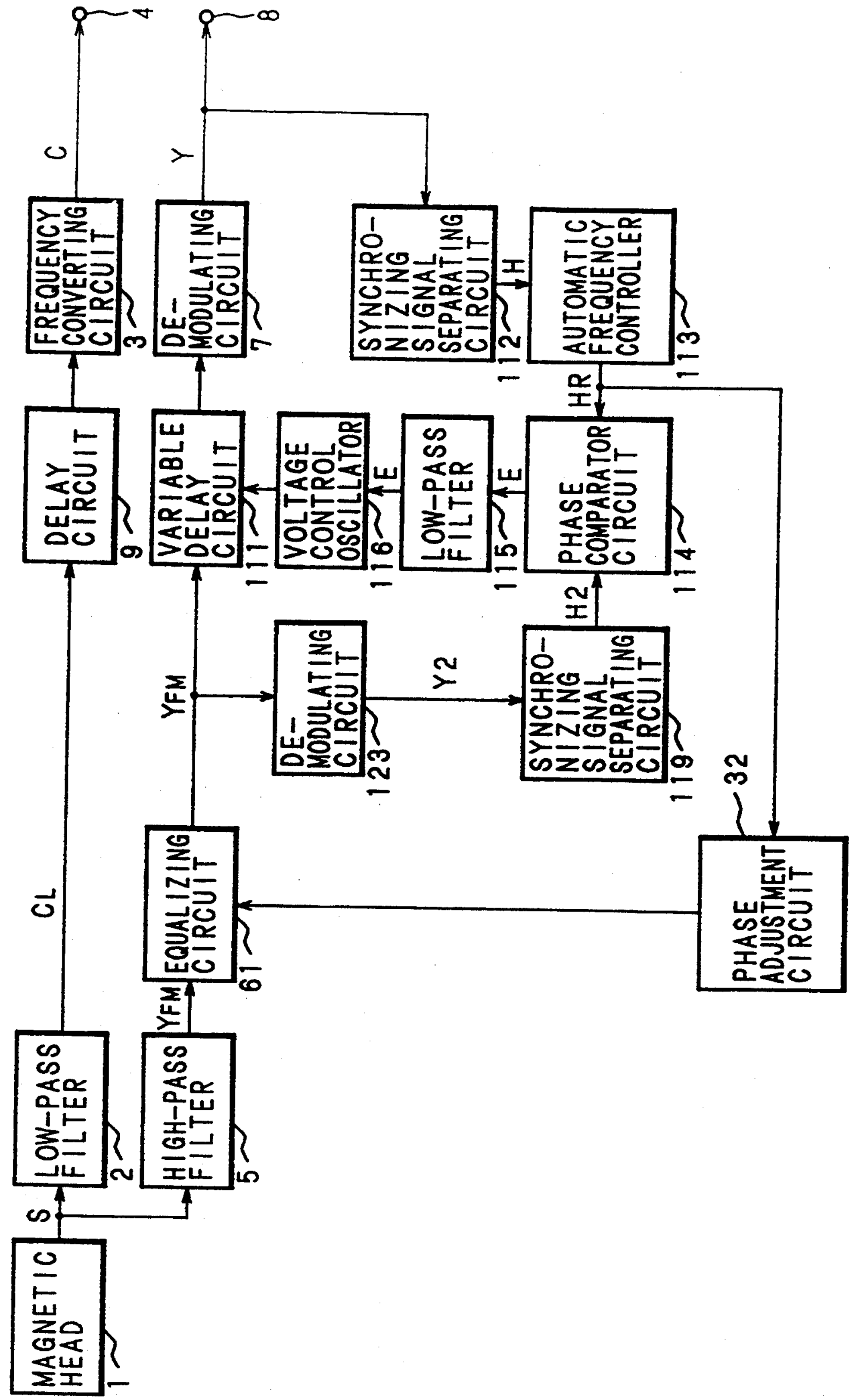
F i g. 44

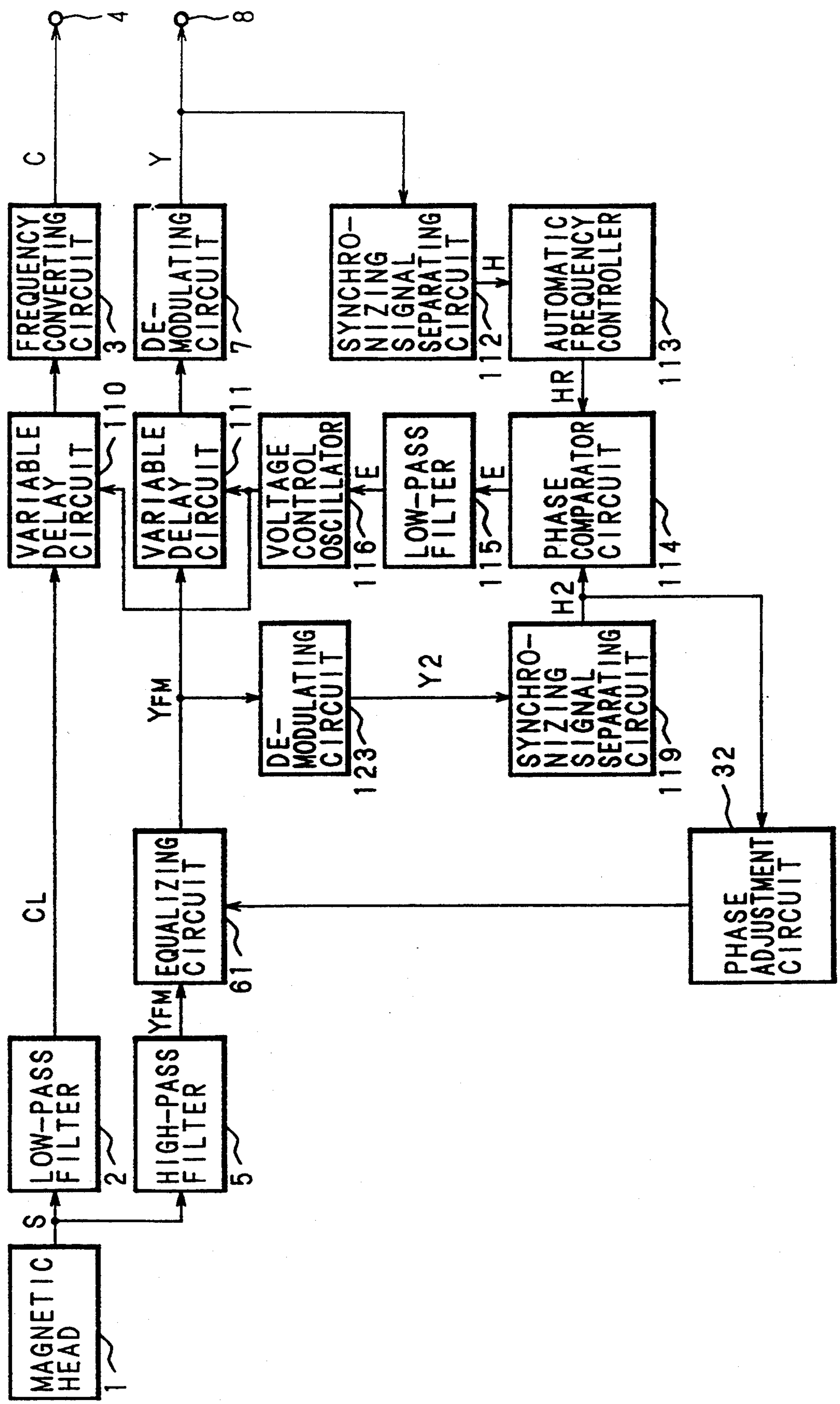
F i g. 45

F I g. 4 6
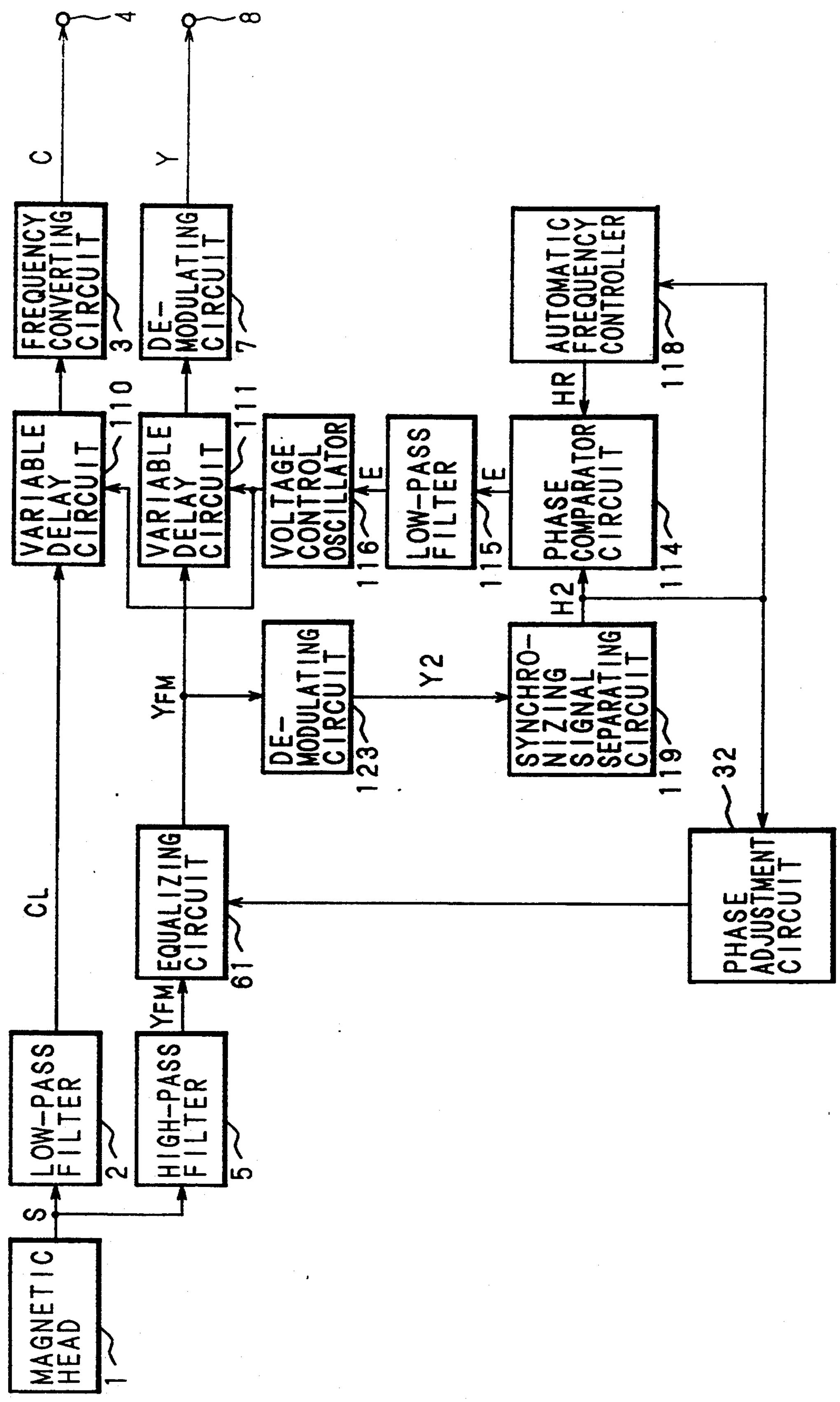

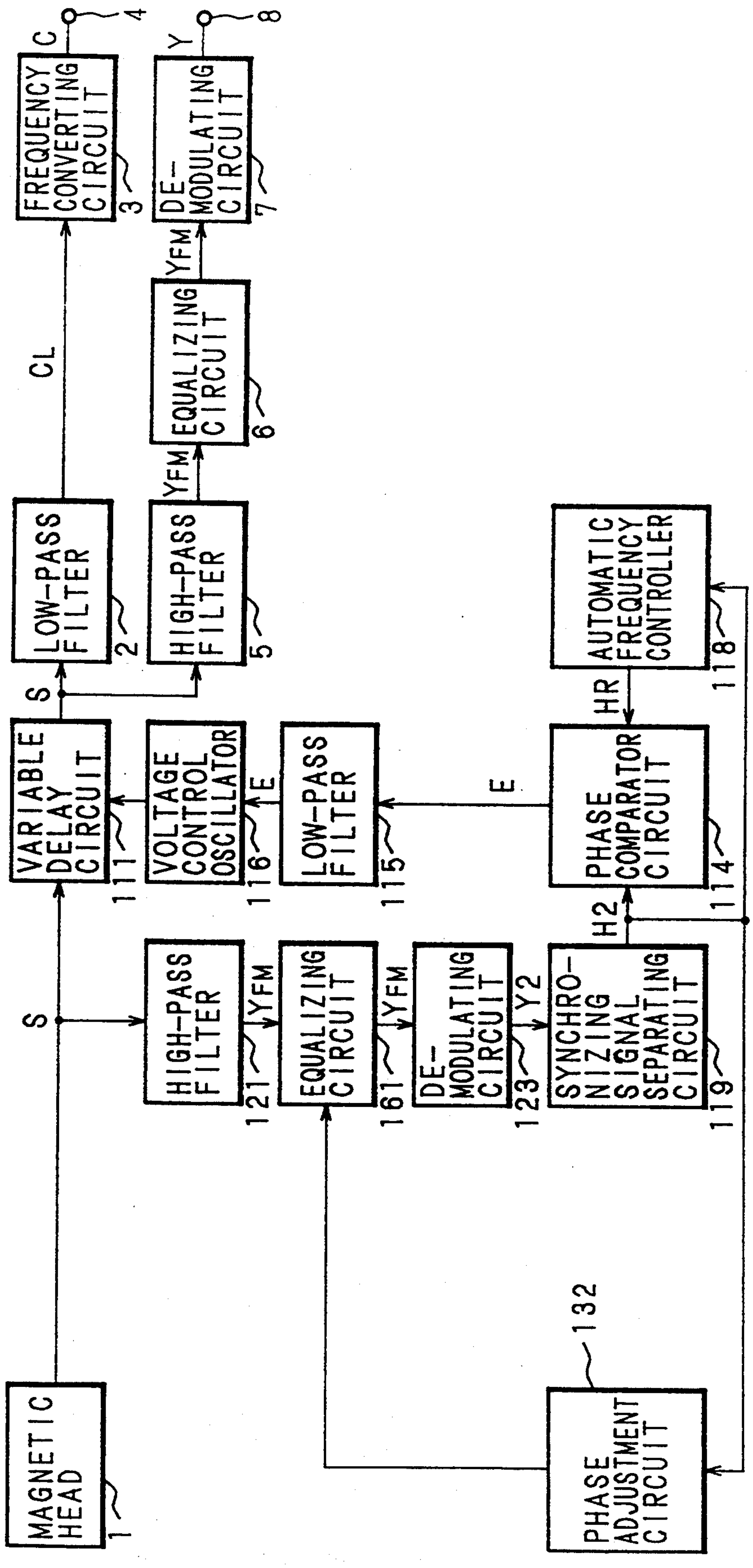
F i g. 55

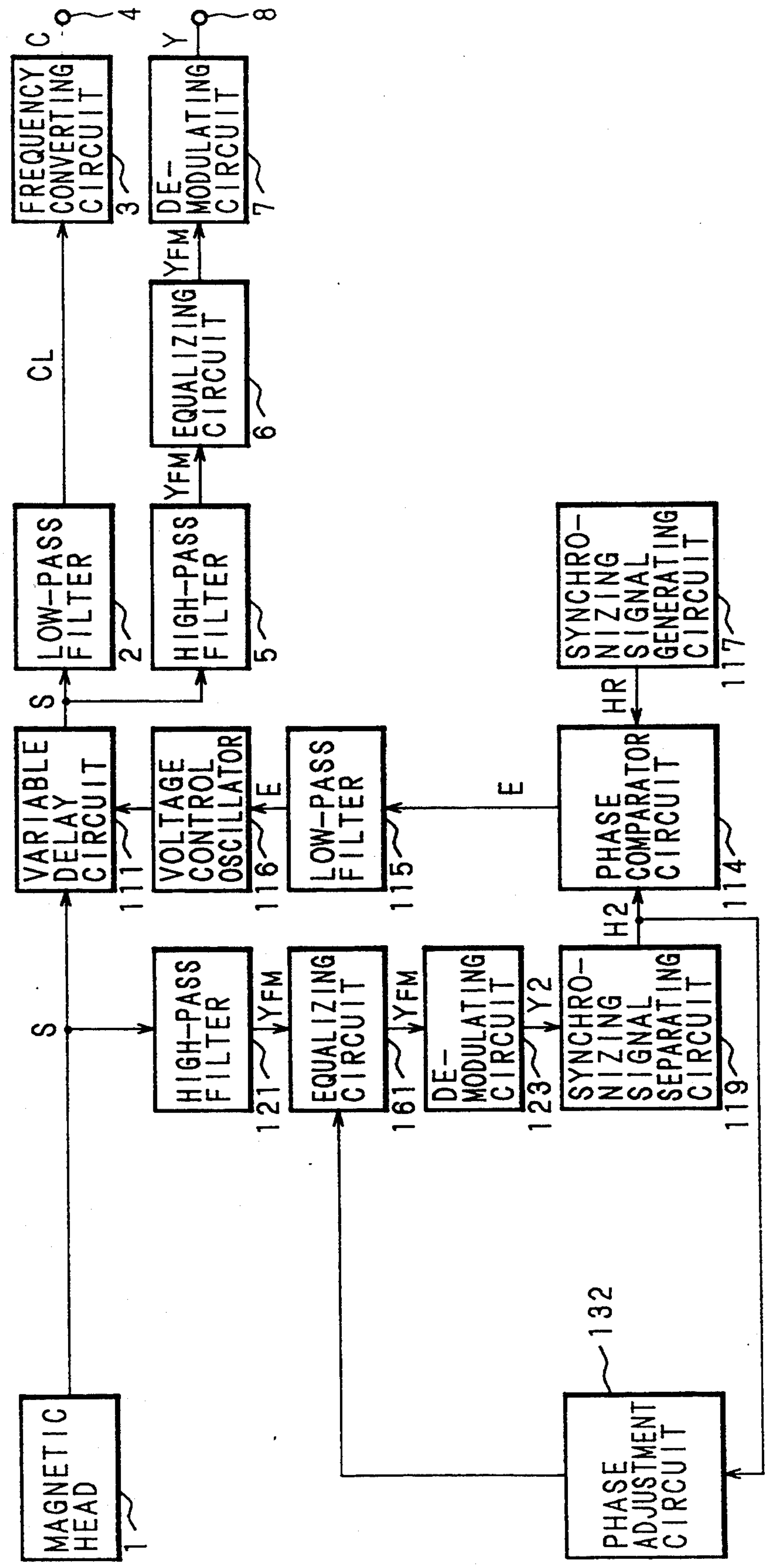
F I g. 56

F I g. 67
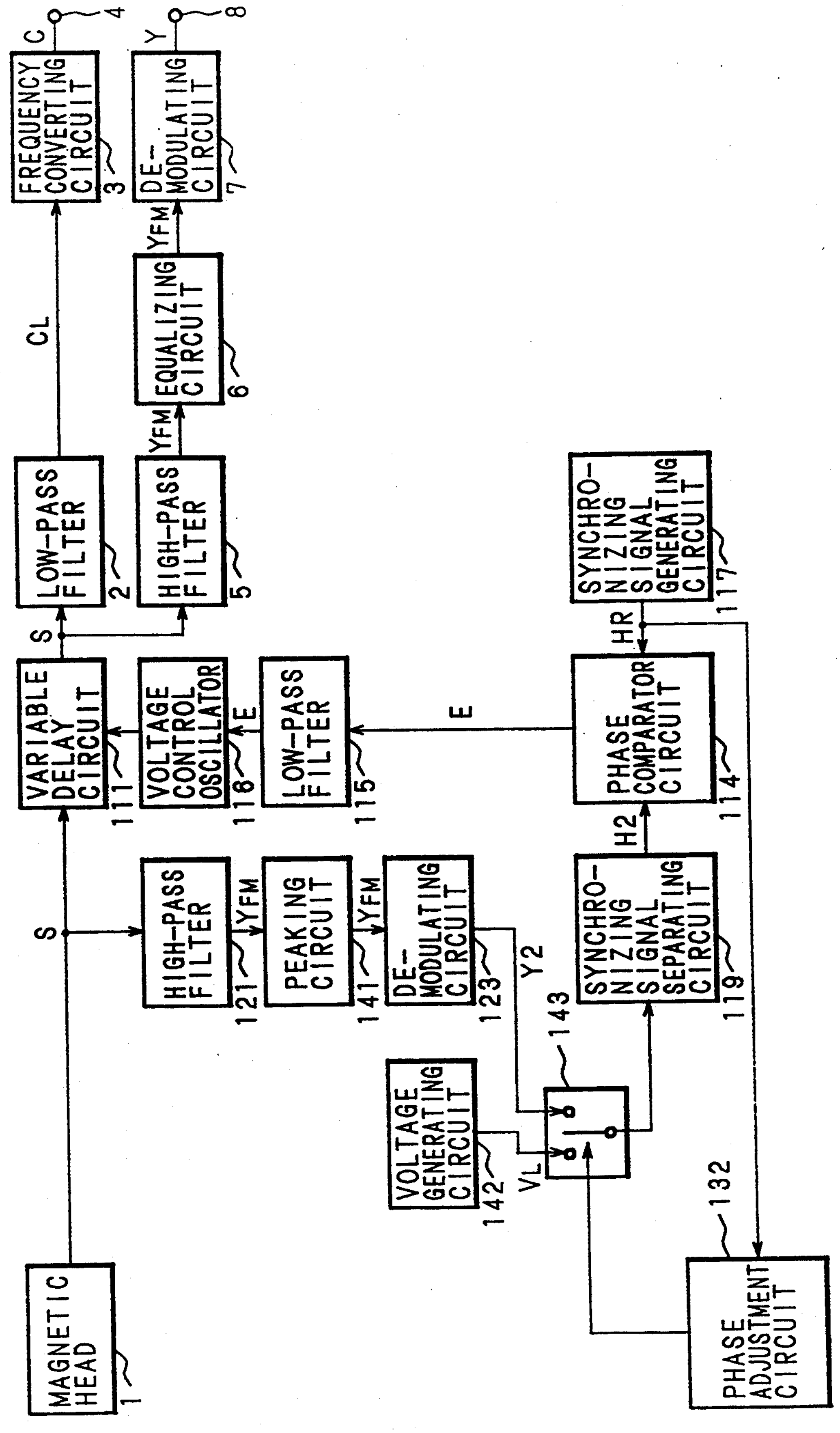

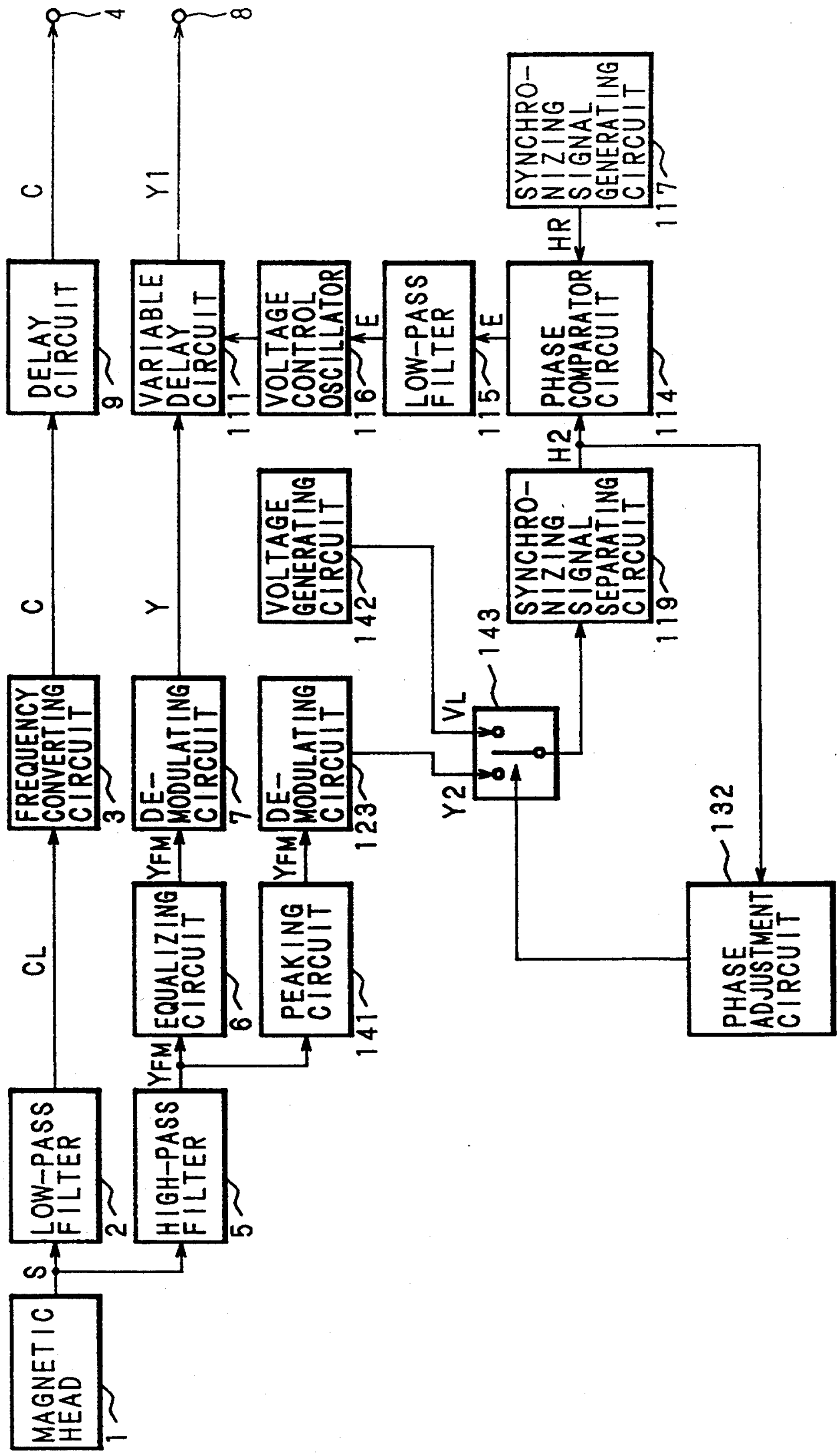
F I g. 79

F I g. 8 4
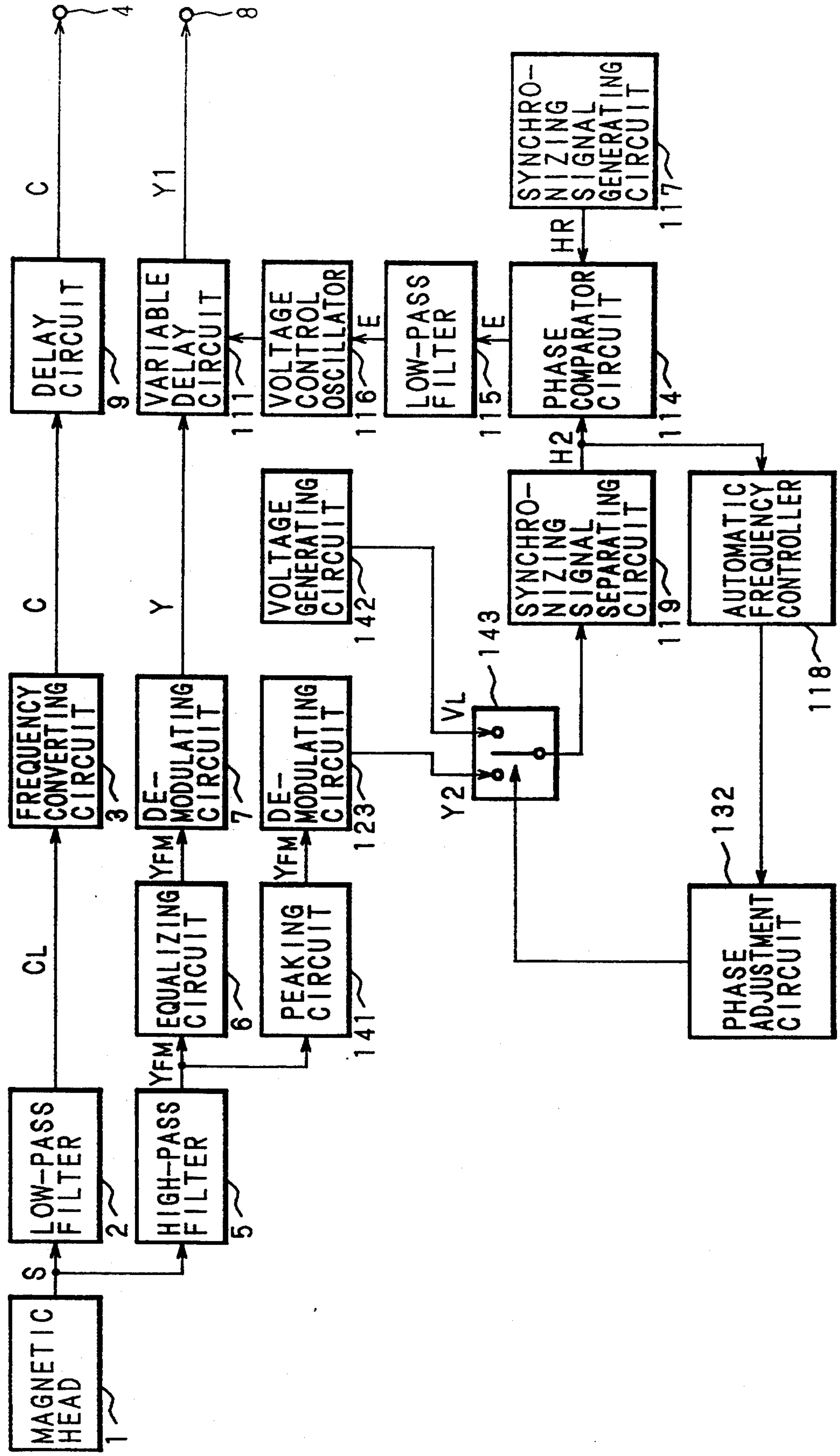

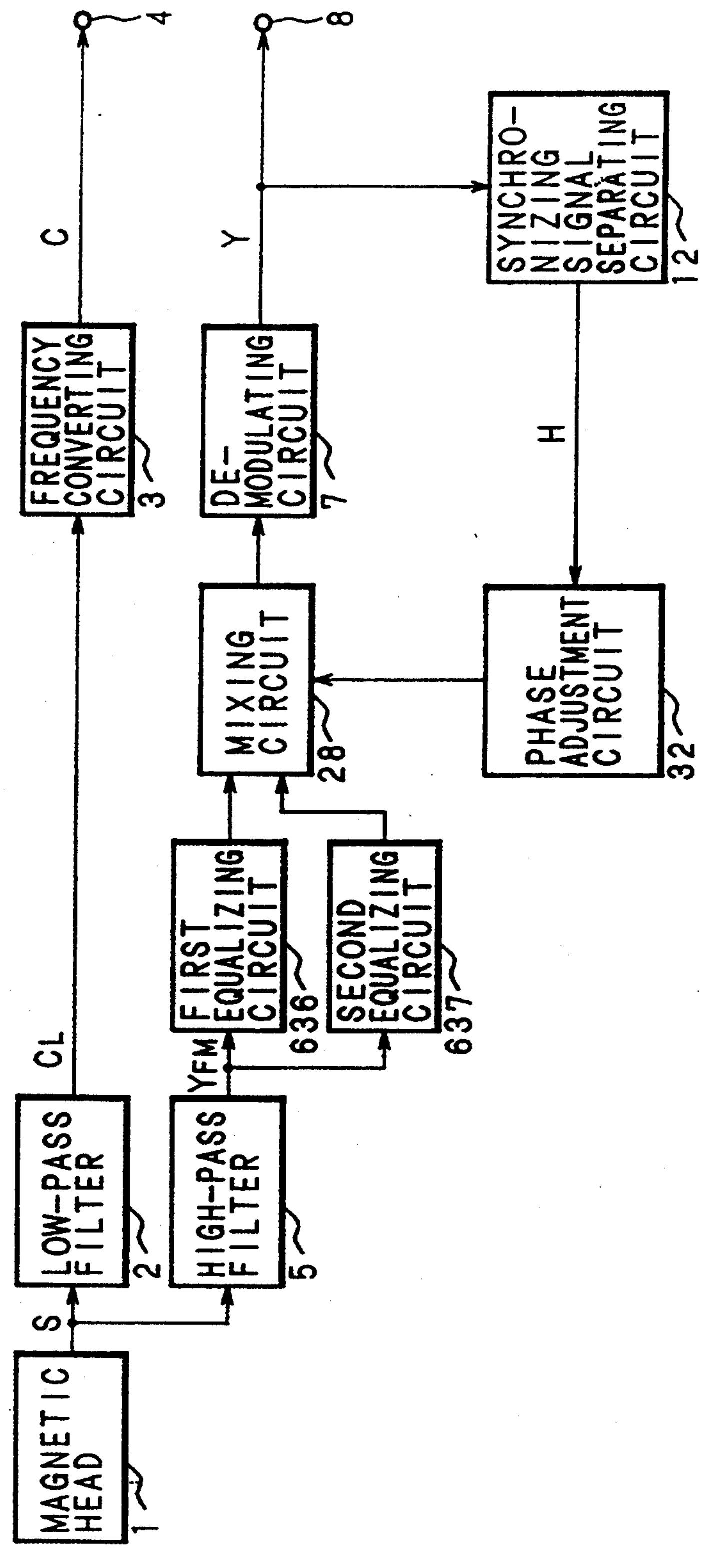
F I g. 93

Fig. 95(a) OUTPUT OF CIRCUIT 7

Fig. 95(b) OUTPUT OF CIRCUIT 12

Fig. 95(c) OUTPUT OF CIRCUIT 322

Fig. 95(d) OUTPUT OF CIRCUIT 323

VIDEO SIGNAL REPRODUCTION APPARATUS AND TIME BASE CORRECTING DEVICE

BACKGROUND OF THE INVENTION

1. Field of the Invention

This invention relates to a video signal reproduction apparatus for reproducing a video signal from a frequency multiplexed signal recorded on a video tape or other recording medium, and a time base correcting device for correcting an error in time base occurring in the video signal reproduction apparatus.

2. Description of the Related Art

FIG. 1 is a block diagram showing a conventional video signal reproduction apparatus. In FIG. 1, indicated at 1 is a magnetic head, at 2 a low-pass filter, at 3 a frequency converting circuit, at 5 a high-pass filter (hereinafter referred to as an HPF), at 6 an equalizing circuit, and at 7 a demodulating circuit. The magnetic head 1 is adapted for reading out, a frequency multiplexed signal S recorded on a magnetic video tape. The low-pass filter 2 is adapted for extracting a low-band converted carrier chrominance signal CL from the frequency multiplexed signal S outputted from the magnetic head 1. The frequency converting circuit 3 is adapted for converting the frequency of the low-band converted carrier chrominance signal CL so as to output an original high-band carrier chrominance signal C to a carrier chrominance signal output terminal 4. The HPF 5 is adapted for extracting a frequency-modulated luminance signal (hereinafter referred to as an FM luminance signal) YFM from the frequency multiplexed signal S outputted from the magnetic head 1. The equalizing circuit 6 is adapted for correcting a frequency-amplitude characteristic of the FM luminance signal YFM. The demodulating circuit 7 is adapted for demodulating the FM luminance signal YFM whose freuqnecy-amplitude characteristic is corrected, and feeding a reproduced luminance signal (hereinafter referred to merely as a luminance signal) Y to a luminance signal output terminal 8.

Next, there will be described an operation of the conventional video signal reproduction apparatus. The magnetic head 1 reads out the frequency multiplexed signal S recorded on the magnetic tape, in which signal the FM luminance signal YFM and the low-band converted carrier chrominance signal CL are multiplexed, and feeds the frequency multiplexed signal S to the low-pass filter 2 and the HPF 5. The low-pass filter 2 has a filter characteristic which attenuates a high frequency band in which the FH luminance signal YFM lies while passing a low frequency band in which the low-band converted carrier chrominance signal CL lies. Accordingly, the low-pass filter 2 extracts the low-band converted carrier chrominance signal CL from the frequency multiplexed signal S and feeds the same to the frequency converting circuit 3, The frequency converting circuit 3 converts the frequency of the low-band converted carrier chrominance signal CL so that the low-band converted carrier chrominance signal CL lies in a frequency band centering a chrominance sub-carrier, and outputs the original carrier chrominance signal C. On the other hand, the HPF 5 has a filter characteristic which attenuates the low frequency band in which the low-band converted carrier chrominance signal CL lies while passing the high frequency band in which the FM luminance signal YFM lies. Accordingly, the HPF 5 extracts the FM luminance signal YFM from the frequency multiplexed signal S and feeds the same to the equalizing circuit 6.

The frequency of the FM luminance signal YFM consists of innumerable wave components in an upper sideband (hereinafter referred to as upper wave components) and those in a lower sideband (hereinafter referred to as lower wave components) centering carrier waves (for example, 5.4 MHz to 7.0 MHz in the case of an S-VHS system). Here, it is assumed for the sake of simplicity that a frequency comprises a single carrier wave, and respectively one upper wave component and one lower wave component centering the single carrier wave as shown in FIG. 2. In the recording operation, both the upper wave component and the lower wave component are at the same level, which is lower than the level of the carrier wave. In a reproduction operation, there is obtained the FM luminance signal YFM having a frequency spectrum in which the level of the upper wave component is reduced under the influence of a characteristic of an electromagnetic conversion system as shown in FIG. 2(*a*). The equalizing circuit 6 corrects the FM luminance signal YFM having the frequency spectrum shown in FIG. 2(*a*) with an equalizer characteristic as shown in FIG. 2(*b*) to obtain an FM luminance signal YFM having a frequency spectrum shown in FIG. 2(*c*), and feeds the resultant FM luminance signal YFM to the demodulating circuit 7. The demodulating circuit 7 demodulates the corrected FM luminance signal YFM so as to reproduce the luminance signal Y, and outputs the reproduced luminance signal Y to the luminance signal output terminal 8.

Incidentally, when the video signal is reproduced directly from the frequency multiplexed signal S outputted from the magnetic head 1, the luminance signal Y includes the base variation. The time base variation can be removed by a servo circuit provided in a drive system for driving the magnetic tape. Alternatively, the time base variation can be removed by incorporating a time base correcting device into the video signal reproduction apparatus.

FIG. 3 is a block diagram showing a video signal reproduction apparatus provided with a conventional time base correcting device. In FIG. 3, indicated at 9 is a delay circuit, at 111 a variable delay circuit, at 112 a synchronizing signal separating circuit, at 113 an automatic frequency controller (hereinafter referred to as an AFC), at 114 a phase comparator circuit, at 115 a low pass filter (hereinafter referred to as an LPF), at 116 a voltage control oscillator (hereinafter referred to as a VCO), and at 119 a synchronizing signal separating circuit. The delay circuit 9 is adapted for delaying the carrier chrominance signal C by a period which is equal to a mean delay period in the variable delay circuit 111. The variable delay circuit 111 is adapted for delaying the luminance signal Y outputted from the demodulating circuit 7 by a period corresponding to an oscillating frequency of the VCO 116. The synchronizing signal separating circuit 112 is adapted for separating a horizontal synchronizing signal H1 from the delayed luminance signal Y1. The AFC 113 is adapted for generating a reference horizontal synchronizing signal HR having a fixed frequency from the horizontal synchronizing signal H1 outputted from the synchronizing signal separating circuit 112. The phase comparator circuit 114 is adapted for comparing the phase of the horizontal synchronizing signal H2 sent from the synchronizing signal separating circuit 119 and that of the reference horizontal synchronizing signal HR sent from the AFC 113, and outputting a time base error signal E. The LPF 115 is adapted for removing a noise component from the time base error signal E. The VCO 116 is adapted for oscillating at a frequency corresponding to an error amount indicated by the time base error signal E having its noise component removed therefrom. The synchronizing signal separating circuit 119 is adapted for separating the horizontal synchronizing signal H2 from the luminance signal Y outputted from the demodulating circuit 7. Other elements identical to those shown in FIG. 1 are indicated by the same reference numerals. Elements indicated by reference numerals in their hundreds constitute the time base correcting device.

Next, there will be described an operation of the video signal reproduction apparatus provided with the time base correcting device. An operation of reproducing the carrier chrominance signal C and the luminance signal Y from the frequency multiplexed signal S outputted from the magnetic head 1 is the same as the one described with reference to FIG. 1. In this case, the luminance signal Y outputted from the demodulating circuit 7 is fed to the variable delay circuit 111 and the synchronizing signal separating circuit 119 respectively.

The synchronizing signal separating circuit 112 extracts only the horizontal synchronizing signal H1 from the luminance signal Y1 outputted from the variable delay circuit 111 by removing a video signal portion therefrom, and feeds the extracted synchronizing signal H1 to the AFC 113. The AFC 113 controls the horizontal synchronizing signal H1 so as to have a substantially fixed frequency by removing the frequency variation of the horizontal synchronizing signal H1. More specifically, the AFC 113 controls the horizontal synchronizing signal H1 so as to obtain the reference horizontal synchronizing signal HR having a stable frequency close to a horizontal scanning frequency, and feeds the reference horizontal synchronizing signal HR to the phase comparator circuit 114. On the other hand, the synchronizing signal separating circuit 119 extracts only the horizontal synchronizing signal H2 from the luminance signal Y outputted from the demodulating circuit 7 by removing the video signal portion therefrom, and feeds the extracted horizontal synchronizing signal H2 to the phase comparator circuit 114. The phase comparator circuit 114 compares the phase of the horizontal synchronizing signal H2 outputted from the synchronizing signal separating circuit 119 with that of the reference horizontal synchronizing signal HR outputted from the AFC 113, detects a time base error included in the horizontal synchronizing signal H2, and feeds the time base error signal E to the LPF 115. The LPF 115 has a filter characteristic which removes the noise component in the high frequency band and passes the low frequency band where the time base error component lies. Accordingly, the LPF 115 feeds the time base error signal E having the noise component removed therefrom. The VCO 116 oscillates at a frequency according to the level of the time base error signal E, and its oscillating frequency serves to correct the tithe base error included in the luminance signal Y inputted to the variable delay circuit 111. The variable delay circuit 111, the phase comparator circuit 114, and the VCO 116 operate to extend the delay period of the variable delay circuit 111 when the phase of the horizontal synchronizing signal H2 is ahead of that of the reference horizontal synchronizing signal HR, and to shorten the delay period thereof when the phase of the horizontal synchronizing signal H2 is behind that of the reference horizontal synchronizing signal HR. The delay circuit 9 delays the carrier chrominance signal C by a period which is equal to a mean delay period in the variable delay circuit 111. It will be noted that the delay circuit 9 may be provided before the frequency converting circuit 3.

FIG. 4 is a block diagram showing a video signal reproduction apparatus provided with a time base correcting device of another prior art. In this prior art, a phase comparator circuit, 114 compares the phase of a horizontal synchronizing signal H outputted from a synchronizing signal separating circuit 112 and that of a reference horizontal synchronizing signal HR outputted from the AFC 113.

In this case, a time base error is corrected in a manner as described below. Firstly, a demodulating circuit 7 demodulates an FM luminance signal YFM to reproduce a luminance signal Y, and outputs the reproduced luminance signal. Y to a luminance signal output terminal 8. Simultaneously, the demodulating circuit 7 feeds the luminance signal Y to a synchronizing signal separating circuit 112. The synchronizing signal separating circuit. 112 extracts only the horizontal synchronizing signal H from the luminance signal Y by removing a video signal portion therefrom, and feeds the extracted horizontal synchronizing signal H to an AFC 113 and the phase comparator circuit. 114. The AFC 113 controls the horizontal synchronizing signal H so as to have substantially fixed frequency by removing frequency variation of the horizontal synchronizing signal H. That is to say, the AFC 113 controls the horizontal synchronizing signal H to obtain a reference horizontal synchronizing signal HR having a stable frequency close to a horizontal scanning frequency, and feeds the obtained reference horizontal synchronizing signal HR to the phase comparator circuit 114. The phase comparator circuit 114 compares the phase of the horizontal synchronizing signal H outputted from the synchronizing signal separating circuit 112 and that, of the reference horizontal synchronizing signal HR outputted from the AFC 113, detects a time base error included in the horizontal synchronizing signal H, and feeds a time base error signal E to an LPF 115. The LPF 115 has a filter characteristic which removes a noise component in the high frequency band and passes the low frequency band where the time base error component lies. Accordingly, the LPF 115 feeds the time base error signal E having a noise component removed therefrom to a VCO 116. The VCO 116 oscillates at a frequency according to the level of the time base error signal E, and its oscillating frequency serves to correct the time base error included it, the frequency multiplexed signal S inputted to a variable delay circuit 111. The variable delay circuit 111, the phase comparator circuit 114, and the VCO 116 operate to extend the delay period of the variable delay circuit 111 when the phase of the horizontal synchronizing signal H is ahead of that of the reference horizontal synchronizing signal HR, and to shorten the delay period thereof when the phase of the horizontal synchronizing signal H is behind that of the reference horizontal synchronizing signal HR. In this way, the time base variation included in the frequency multiplexed signal S outputted from the magnetic head 1 is removed. As a result, the time base error of the luminance signal Y can be corrected.

FIG. 5 is a block diagram showing a video signal reproduction apparatus provided with a time base correcting device of still another prior art. In this prior art, a variable delay circuit 111 is provided between an equalizing circuit 6 and a demodulating circuit 7. A synchronizing signal separating circuit 119 separates a horizontal synchronizing signal H2 from a luminance signal Y2 outputted from a demodulating circuit 123 provided after the equalizing circuit 6.

In this case, a time base error is corrected in a manner as described below. Firstly, a demodulating circuit 7 demodulates an FM luminance signal YFM to reproduced a luminance signal Y, and outputs the reproduced luminance signal Y to a luminance signal output terminal 8. Simultaneously, the demodulating circuit 7 feeds the luminance signal Y to a synchronizing signal separating circuit 112. The synchronizing signal separating circuit 112 extracts only the horizontal synchronizing signal H from the luminance signal Y by removing the video signal portion therefrom, and feeds the extracted horizontal synchronizing signal H to an AFC 113. The AFC 113 controls the horizontal synchronizing signal H so as to have substantially fixed frequency by removing frequency variation of the horizontal synchronizing signal H. That is to say, the AFC 113 controls the horizontal synchronizing signal H to obtain a reference horizontal synchronizing signal HR having a stable frequency close to a horizontal scanning frequency, and feeds the obtained reference horizontal synchronizing signal HR to the phase comparator circuit 114. On the other hand, the demodulating circuit 123 demodulates the FM luminance signal YFM outputted from the equalizing circuit 6, and feeds the luminance signal Y2 to the synchronizing signal separating circuit 119. The synchronizing signal separating circuit 119 extracts only the horizontal synchronizing signal H2 from the luminance signal Y2 by removing the signal portion therefrom, and feeds the extracted horizontal synchronizing signal H2 to the phase comparator circuit 114. The phase comparator circuit 114 compares the phase of horizontal synchronizing signal H2 outputted from the synchronizing signal separating circuit 119 and that of reference horizontal synchronizing signal HR outputted the AFC 113, detects a time base error included in the horizontal synchronizing signal H2, and feeds a time base error signal E to an LPF 1115. The LPF 115 has a filter characteristic which removes the noise component in the frequency band and passes the low frequency band where the time base error component, lies. Accordingly, the LPF 115 feeds the time base error signal E having the noise component removed therefrom to a VCO 116. The VCO 116 oscillates at a frequency according to the level of the time base error signal E, and its oscillating frequency serves to compensate for the time base variation included in the luminance signal YFM inputted to the variable delay circuit 111. In this way, the time base variation of the FM luminance signal YFM is removed. As a result, the time base error of the luminance signal Y can be coerce, ted. The delay circuit 9 delays the carrier chrominance signal C by a period which is equal to a mean delay period in the variable delay circuit 111. It will be noted that the delay circuit 9 may be provided before the frequency converting circuit 3.

FIG. 6 is a block diagram showing a video signal reproduction apparatus provided with a time base correcting device of further another prior art, In FIG. 6, indicated at 121 is a HPF for extracting an FM luminance signal YFM from a frequency multiplexed signal S output, ted from a magnetic head 1, at 122 a equalizing circuit for correcting a frequency-amplitude characteristic of the FM luminance signal YFM outputted from the HPF 121, and at 123 a demodulating circuit for demodulating the corrected FM luminance signal YFM to reproduce a luminance signal Y2 and outputting the reproduced luminance signal Y2 to a synchronizing signal separating circuit 119. Other elements identical to those shown in FIG. 5 are indicated by the same reference numerals. However, in this case, a variable delay circuit 111 is provided between the magnetic head 1 and, an LPF 2 and an HPF 5. A synchronizing signal separating circuit 112 is provided after a demodulating circuit 7, and the synchronizing signal circuit 119 is provided after the second demodulating circuit 123.

Next, there will be described an operation of the above video signal reproduction apparatus. The magnetic head 1 reads out a frequency multiplexed signal S recorded on a magnetic tape, and feeds the read out signal S to the variable delay circuit 111. The variable delay circuit 111 corrects a time base error of the frequency multiplexed signal S as described below, and feeds the corrected frequency multiplexed signal S to the LPF 2 and the HPF 5. An operating of reproducing a carrier chrominance signal C and a luminance signal Y from the frequency multiplexed signal S is similar to the operation of reproducing those signals from the frequency multiplexed signal S outputted from the magnetic head 1 described with reference to FIG. 1.

In this case, a time base error is corrected in a manner as described below. Firstly, the demodulating circuit 7 demodulates the FM luminance signal YFM to reproduce a luminance signal Y, and outputs the reproduced luminance signal Y to a luminance signal output terminal 8. Simultaneously, the demodulating circuit 7 feeds the luminance signal Y to a synchronizing signal separating circuit 112. The synchronizing signal separating circuit 112 extracts only the horizontal synchronizing signal H from the luminance signal Y by removing the video signal portion therefrom, and feeds the extracted horizontal synchronizing signal H to an AFC 113. The AFC 113 controls the horizontal synchronizing signal H so as to have substantially fixed frequency by removing frequency variation of the horizontal synchronizing signal H. That is to say, the AFC 113 controls the horizontal synchronizing signal H to obtain a reference horizontal synchronizing signal HR having a stable frequency close to a horizontal scanning frequency, and feeds the obtained reference horizontal synchronizing signal HR to the phase comparator circuit 114. The HPF 121 has a filter characteristic which attenuates the low frequency band where the low band converted carrier chrominance signal CL lies and passes the high frequency band where the FM luminance signal YFM lies. The HPF 121 extracts the FM luminance signal YFM from the frequency multiplexed single S outputted from the magnetic head 1, and feeds the extracted FM luminance signal YFM to the equalizing circuit 122. The equalizing circuit 122 corrects the FM luminance signal YFM having a frequency spectrum shown in FIG. 2(*a*) with an equalizer characteristic shown in FIG. 2(*b*), and feeds the FM luminance signal YFM having a frequency spectrum shown in FIG. 2(*c*) to the demodulating circuit 123. The demodulating circuit 123 demodulates the FM luminance signal YFM fed thereto to reproduce a luminance signal Y2, and feeds the reproduced luminance signal Y2 to the synchronizing signal separating circuit 119. The synchronizing signal separating circuit 119 extracts only the horizontal synchronizing signal H2 from the luminance signal Y2 by removing a video signal portion therefrom, and feeds the extracted horizontal synchronizing signal H2 to the phase comparator circuit 114. The phase comparator circuit 114 compares the phase of the horizontal synchronizing signal H2 fed from the synchronizing signal separating circuit 119 and that of the reference horizontal synchronizing signal HR fed from the AFC 113, and feeds the time base error signal E to the LPF 115. The LPF 115 has a filter characteristic which removes the noise component in the high frequency band and passes the low frequency band where the time base error component lies. Accordingly, the LPF 115 feeds the time base error signal E having the noise component removed therefrom to the VCO 116. The VCO 116 oscillates at a frequency according to the level of the time base error signal E, and its oscillating frequency serves to correct the time base error included in the frequency multiplexed signal S inputted to the variable delay circuit 111. The variable delay circuit 111, the phase comparator circuit. 114, and the VCO 116 operate to extend the delay period of the variable delay circuit 111 when the phase of the horizontal synchronizing signal H is ahead of that of the reference horizontal synchronizing signal HR, and to shorten the delay period thereof when the phase of the horizontal synchronizing signal H is behind that of the reference horizontal synchronizing signal HR. In this way, the time base variation included in the frequency multiplexed signal S outputted from the magnetic head 1 can be removed. As a result, a time base error of the luminance signal Y can be corrected.

Since the conventional video signal reproduction apparatus is constructed as described above, the equalizing circuit 6 provided before the demodulating circuit 7 for demodulating the FM luminance signal YFM operates to raise the level of the upper wave components of the FM luminance signal YFM. Accordingly, a signal-to-noise ratio (S/N) of a horizontal synchronizing signal portion of the luminance signal Y becomes degraded particularly fin a long-time recording mode. This has caused the following problems: The frequency converting circuit 3 in a chrominance signal processing system using a horizontal synchronizing signal of the luminance signal Y operates in an unstable manner. A synchronous processing system operates in an unstable manner in an image receiver or the like to which an output signal of this apparatus is inputted.

Further, since the video signal reproduction apparatus provided with a conventional time base correcting device is constructed as described above, an S/N of the horizontal synchronizing signal portion of the luminance signal Y becomes degraded. Accordingly, it, has been a problem that the degree of the time base error is rather increased on the ground that accurate time base error information cannot be extracted, or wrong time base error information is extracted in the phase comparator circuit 114 of the time base correcting device.

SUMMARY OF THE INVENTION

A video signal reproduction apparatus according to this invention is provided with a synchronizing signal separating circuit which separates a horizontal synchronizing signal from the output of a demodulating circuit, and a phase adjustment circuit which generates a specific signal on the basis of the horizontal synchronizing signal to specify the part where a horizontal synchronizing signal is modulated in a frequency-modulated luminance signal. An equalizing circuit of the video signal reproduction apparatus is constituted of a first equalizing circuit of the characteristic to raise the level of the upper sideband range of the frequency-modulated luminance signal and a second equalizing circuit of the characteristic to raise the level of the lower sideband ravage of the frequency-modulated luminance signal, so that an outputted signal from the first equalizing circuit is selected when the specific signal is not significant, whereas an output signal from the second equalizing circuit is selected when the specific signal is significant. The lower sideband range the level of which is raised by the second equalizing circuit is a frequency band corresponding to the sync chip to the pedestal level of the frequency-modulated luminance signal. The horizontal synchronizing signal to be user as a reference when the specific signal is generated may be extracted from the frequency-modulated luminance signal inputted to the equalizing circuit. Accordingly, the characteristic of the equalizing circuit is switched so that the lower sideband range of the frequency-modulated luminance signal is raised only for the part where a horizontal synchronizing signal is modulated, whereby a luminance signal with good S/N in the part of the horizontal synchronizing signal is outputted to the demodulating circuit.

A time base correcting device according to this invention has an equalizing circuit capable of switching the characteristic thereof, similar to the above video signal reproduction apparatus. In the time base correcting device, a horizontal synchronizing signal separated from the output of a demodulating circuit is compared with a reference horizontal synchronizing signal thereby to detect the time base error, according to which a frequency-modulated luminance signal or frequency multiplexed signals delayed to compensate the time base error.

An essential object of this invention is to provide a video signal reproduction apparatus whereby the S/N in the horizontal synchronizing part of a reproduced luminance signal is not deteriorated even in a long-time mode.

A further object of this invention is to provide a time base correcting device wherein the time base error is not increased even in a long-time mode.

A yet further object of this invention is to provide a video signal reproduction apparatus so designed that a specific signal is not beyond the part where a horizontal synchronizing signal is actually modulated through stabilization of the horizontal synchronizing signal separated from the output of the demodulating circuit.

A still object of this invention is to provide a video signal reproduction apparatus capable of reducing the switching noise by providing a low-pass filter in the front stage of the demodulating circuit or making the mixing ratio of outputs of the first and second equalizing circuits variable.

A different object of this invention is to provide a video signal reproduction apparatus which does not influence a color burst signal superposed on the back porch by generating the specific signal to specify a leading edge portion of the horizontal synchronizing signal.

A still further object of this invention is to provide a video signal reproduction apparatus capable of switching the equalizer characteristic without disturbing the phase relation of frequency-modulated luminance signals by demodulating particularly the frequency-modulated luminance signal passing through the first and second equalizing circuits and changing the frequency-modulated luminance signal with a baseband signal.

A further object of this invent:ion is to provide a time base correcting device capable of extracting a correct horizontal synchronizing signal thereby to extract correct time base For information, whereby the time base of a frequency-modulated luminance signal is correctly corrected.

The above and further objects and features of the invention will more fully be apparent from the following detailed description with accompanying drawings.

BRIEF DESCRIPTION OF THE DRAWINGS

FIG. 7 is a block diagram showing a video signal reproduction apparatus of an embodiment according to the invention;

FIG. 14 is a block diagram showing an exemplary construction of a first equalizing circuit shown in FIG. 12;

FIGS. 16 to 53 are block diagrams respectively showing video signal reproduction apparatus of other embodiments according to the invention;

FIGS. 55 to 85 are block diagrams showing respectively time base correcting devices of other embodiments according to the invention, together with video signal reproduction apparatus into which the time base correcting devices are incorporated;

FIGS. 91 to 94 are block diagrams showing video signal reproduction apparatus of further or, her embodiments according to the invention;

DESCRIPTION OF THE PREFERRED EMBODIMENTS

Hereinafter, the present invention will be described with reference to the drawings showing embodiments of the invention.

Figure 1:
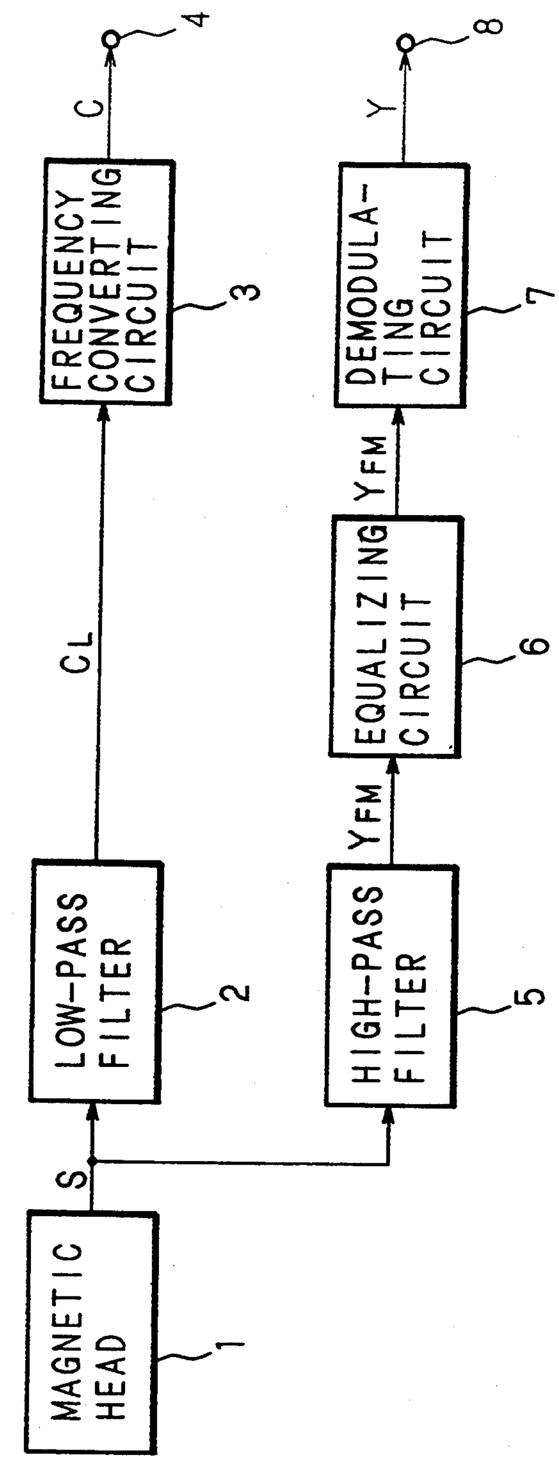
FIG. 1 is a block diagram showing a conventional video signal reproduction apparatus.

FIG. 7 is a block diagram showing a video signal reproduction apparatus of an embodiment according to the invention. In FIG. 7, indicated at 12 a synchronizing signal separating circuit, at 32 a phase adjustment circuit, and at 61 an equalizing circuit. The synchronizing signal separating circuit 12 is constructed similarly to, for example, the synchronizing signal separating circuit 112 shown in FIG. 3 for separating the horizontal synchronizing signal H from the luminance signal Y outputted from the demodulating circuit 7. The phase adjustment circuit 32 is adapted for adjusting the phase and a pulse duration of the horizontal synchronizing signal H outputted from the synchronizing signal separating circuit 12. The equalizing circuit 61 is adapted for switching an equalizer characteristic. Other elements identical to those shown in FIG. 1 are indicated by the same reference numerals.

Next, there will be described an operation of this video signal reproduction apparatus. An operation of reproducing a carrier chrominance signal C and a luminance signal Y is same as the operation in the conventional video signal reproduction apparatus shown in FIG. 1. Accordingly, description of this operation is left out here.

Figure 8:
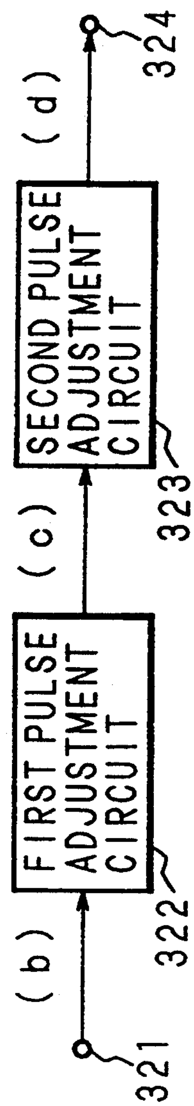
FIG. 8 is a block diagram showing an exemplary construction of a phase comparator circuit.

In this case, a demodulating circuit 7 demodulates an FM luminance signal YFM to reproduce a luminance signal Y, and outputs the reproduced luminance signal Y to a luminance signal output terminal 8. Simultaneously, the demodulating circuit 7 feeds the luminance signal Y to the synchronizing signal separating circuit 12. The synchronizing signal separating circuit 12 extracts only a horizontal synchronizing signal H from the luminance signal Y by removing a video signal portion therefrom, and feeds the extracted horizontal synchronizing signal H to the phase adjustment circuit 32. The phase adjustment circuit, 32 adjusts the phase and a pulse duration of a control signal on the basis of the horizontal synchronizing signal H, and feeds the adjusted control signal to the equalizing circuit 61. The control signal is indicative of a command to switch an equalizer characteristic of the equalizing circuit 61 with demodulated portions of the synchronizing signal and the video signal of the FM luminance signal YFM inputted to the equalizing circuit 61. The phase adjustment circuit 32, for example, has a construction as shown in FIG. 8. In FIG. 8, indicated at 321 is an input terminal to which the horizontal synchronizing signal H outputted from the synchronizing signal separating circuit 12 is inputted, at 322 a first, pulse adjustment circuit, at 323 a second pulse adjustment circuit, and at 324 an output terminal for outputting the control signal for switching the equalizer characteristic of the equalizing circuit 61. The first pulse adjustment circuit 322 is adapted for adjusting the phase of the control signal to be fed to the equalizing circuit 61. The second pulse adjustment circuit 323 is adapted for adjusting the pulse duration of the control signal to be fed to the equalizing circuit 61. The first and the second pulse adjustment circuit 322, 323 are circuits which operate to generate pulses having a desired pulse duration from a leading edge and a trailing edge of the pulses such as a monostable multivibrator.

Figure 9:
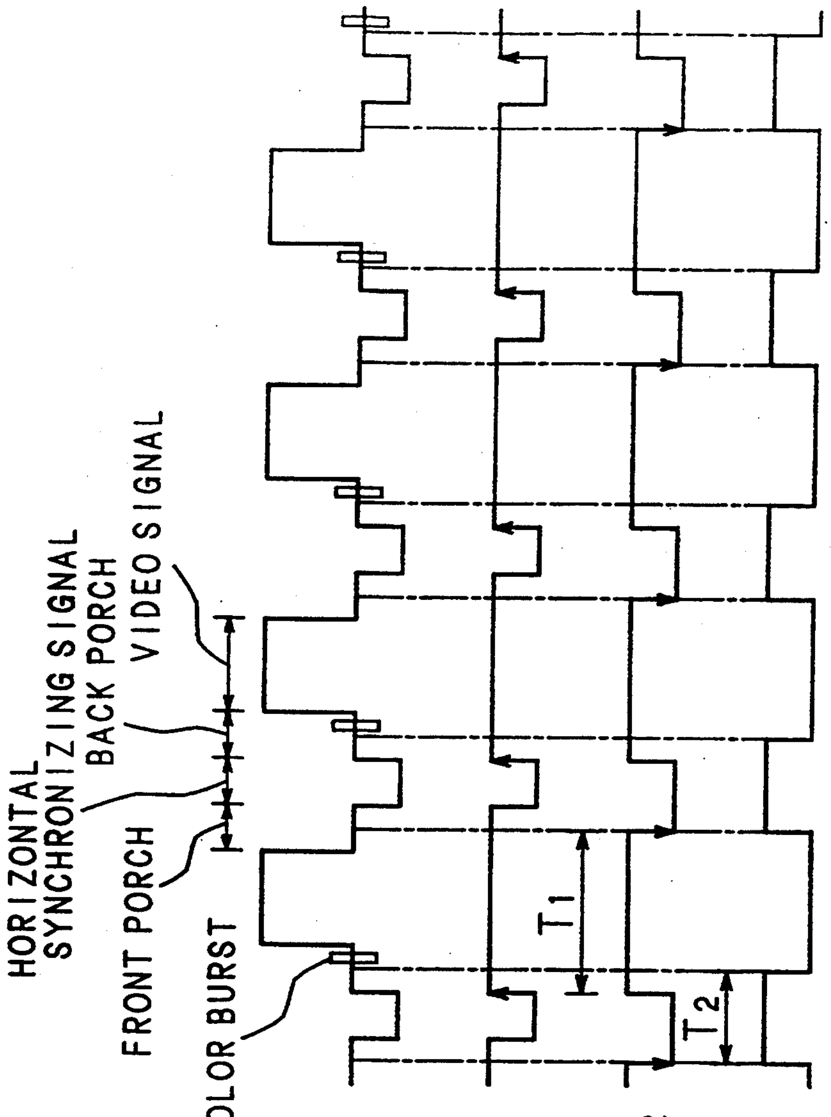
FIGS. 9(*a*) to 9(*d*) are timing charts showing waveforms in respective specified positions in the phase comparator circuit.

A detailed operation of the phase comparator circuit 32 will be described with reference to FIG. 9. To the input terminal 321 is fed the horizontal synchronizing signal H represented by a waveform shown in FIG. 9(*b*) separated in the synchronizing signal separating circuit 12 from the luminance signal, Y represented by a waveform shown in FIG. 9(*a*) outputted from the demodulating circuit 7. The first, pulse adjustment circuit 322 generates pulses having the pulse duration T1 from the leading edge shown in FIG. 9(*b*), and feeds a signal represented by a waveform shown in FIG. 9(*c*) to the second pulse adjustment circuit 323. The second pulse adjustment circuit 323 generates pulses having the pulse duration T2 from the trailing edge of the pulses shogun in FIG. 9(*c*), and feeds a signal represented by a waveform shown in FIG. 9(*d*) to the equalizing circuit 61 through the output, terminal 324. Accordingly, the control signal fed to the equalizing circuit 61 is pulses including a portion corresponding to the horizontal synchronizing signal as shown in FIG. 9(*d*). In this way, there can be generated a control signal assuredly including a horizontal synchronizing signal interval as a high level (H-level) interval.

Figure 2A:
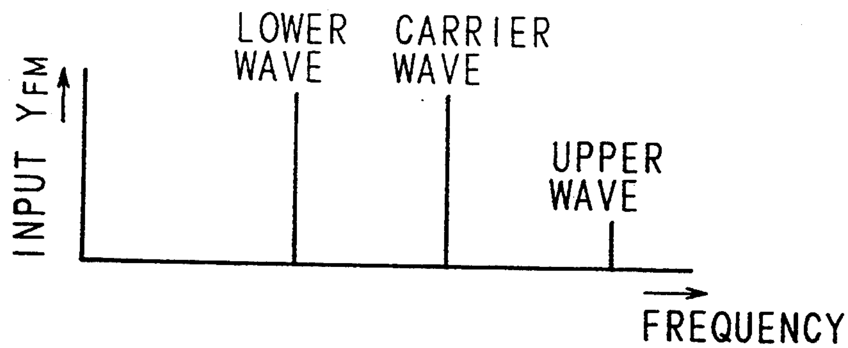
FIGS. 2(*a*) to 2(*c*) are graphs respectively for explaining an equalizer characteristic.
Figure 2B:
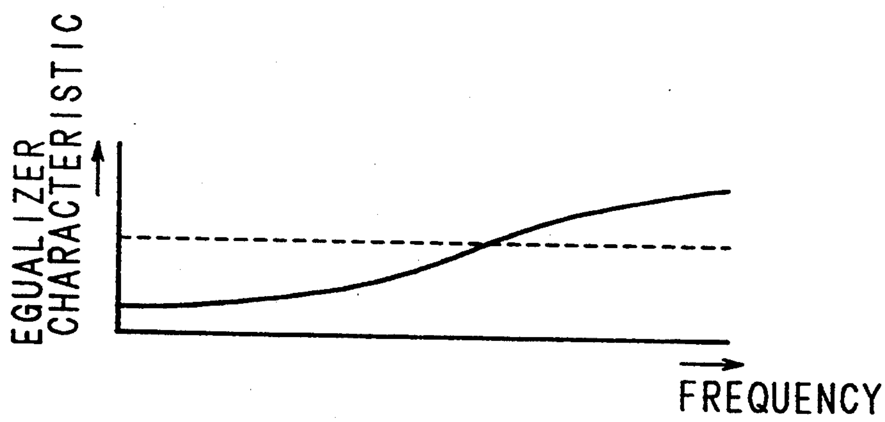
Figure 2C:
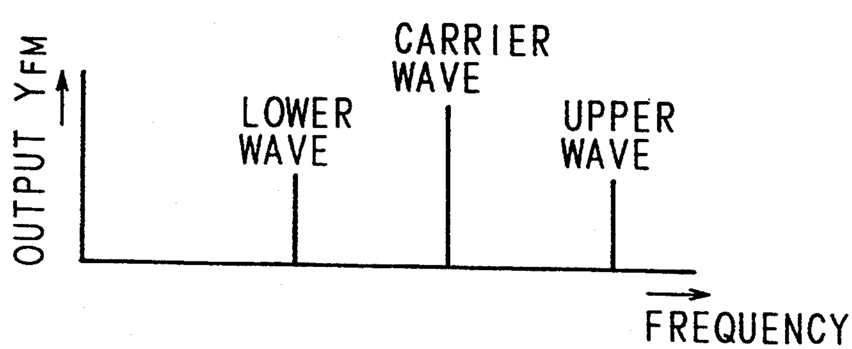
Figure 10:
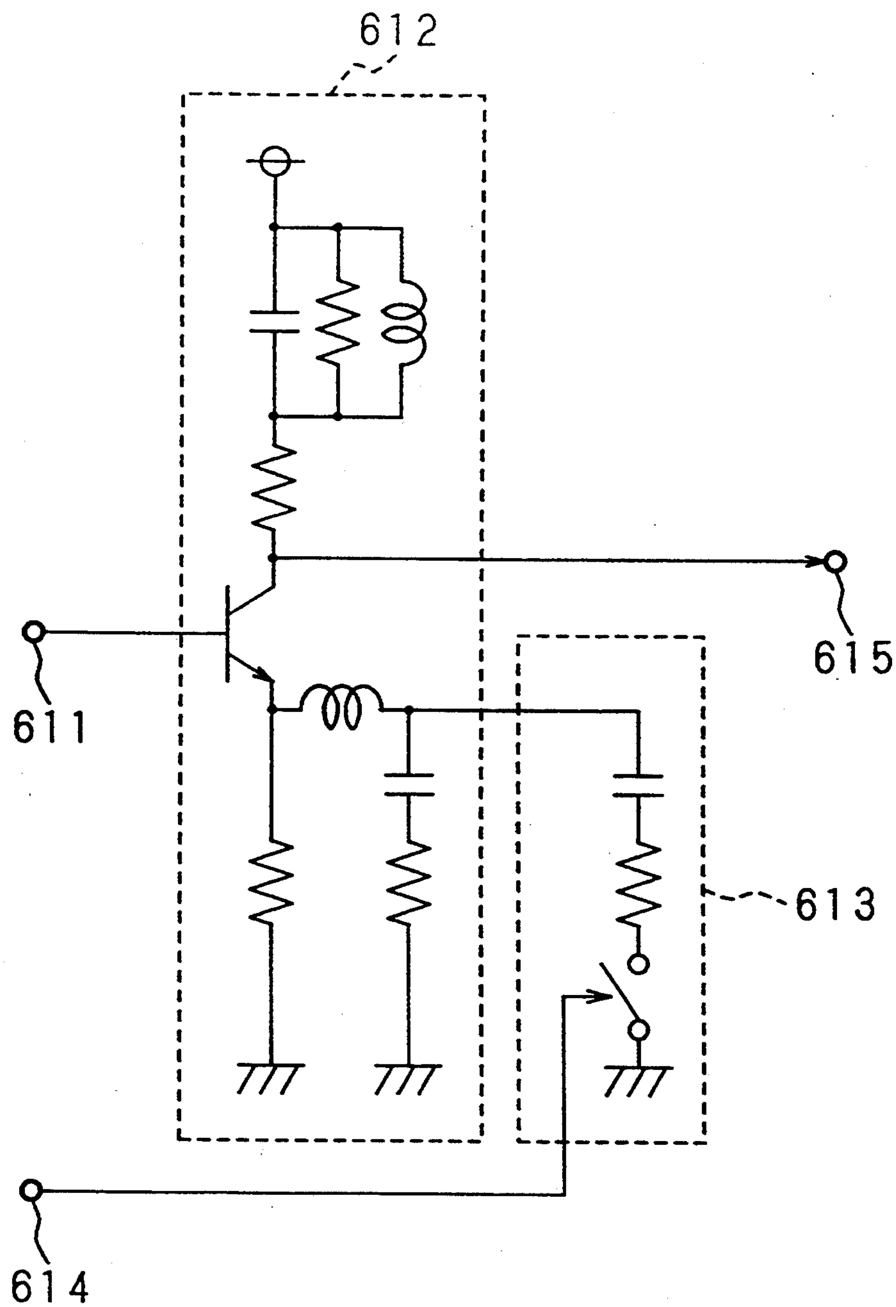
FIG. 10 is a circuit diagram showing an exemplary construction of an equalizing circuit.
Figure 11:
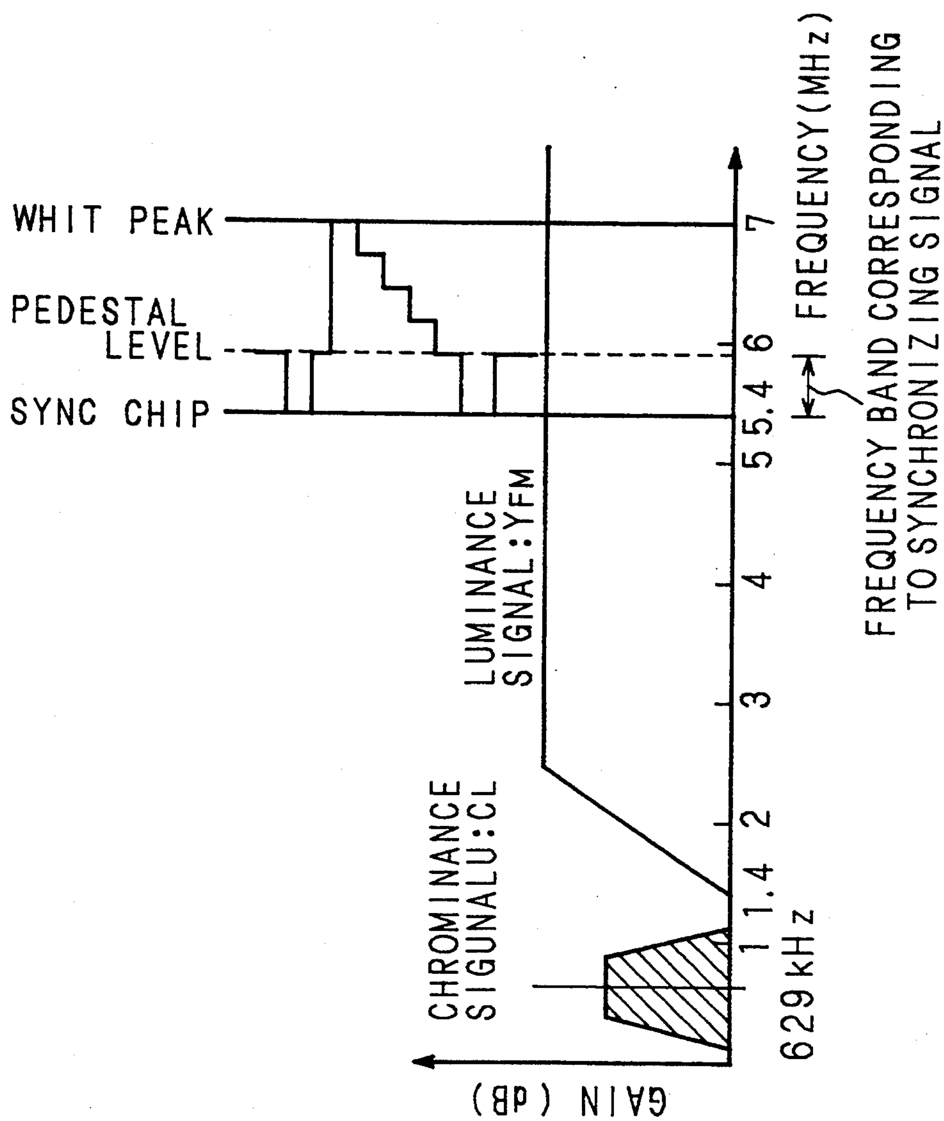
FIG. 11 is a graph showing a frequency band corresponding to a synchronizing signal.

The equalizing circuit 61, for example, has a circuit construction as shown in FIG. 10. In FIG. 10, indicated at 611 is an input terminal to which the FM luminance signal YFM outputted from the HPF 5 is inputted, at 612 an equalizing circuit having a conventional equalizer characteristic shown in FIG. 2(*b*), at 613 an additional equalizing circuit for providing a characteristic of the equalizing circuit this embodiment, at 614 a terminal to which the control signal outputted from the phase adjustment circuit 32 is inputted, and at 615 an output terminal through which an output signal of the equalizing circuit 61 is outputted to the demodulating circuit 7. When a signal portion corresponding to the video signal is being outputted from the phase adjustment circuit 32, i.e., when the signal shown in FIG. 9(*d*) is in a low level (L-level), a switch provided in the additional equalizing circuit 613 and connected to the terminal 614 is caused to open. Consequently, the equalizing circuit 61 has a characteristic similar to the conventional equalizing circuit 6. When the signal portion centering the horizontal synchronizing signal is being outputted, i.e., when the signal is in the H-level, the switch connected to the terminal 614 is short-circuited. Consequently, the equalizing circuit 61 has such a characteristic that raises a frequency band corresponding to a synchronizing signal from a sync chip to a pedestal level of the FM luminance signal (For example, a frequency band shown in FIG. 11 in the S-VHS system).

The demodulating circuit 7 demodulates the FM luminance signal YFM whose frequency band corresponding to the synchronizing signal from the sync chip to the pedestal level is raised to reproduce a luminance signal Y, and feeds the reproduced luminance signal Y whose synchronizing signal portion has a good S/N to the synchronizing signal separating circuit 12. Simultaneously, the demodulating circuit 7 outputs the luminance signal Y through the luminance signal output terminal 8.

In the foregoing embodiment, the equalizing circuit 61 has the circuit construction shown in FIG. 10. However, any equalizing circuit may be appropriate, provided that it has such a construction capable of controllably switching an equalizer characteristic with demodulated portions of the synchronizing signal and the video signal of the FM luminance signal YFM.

Figure 12:
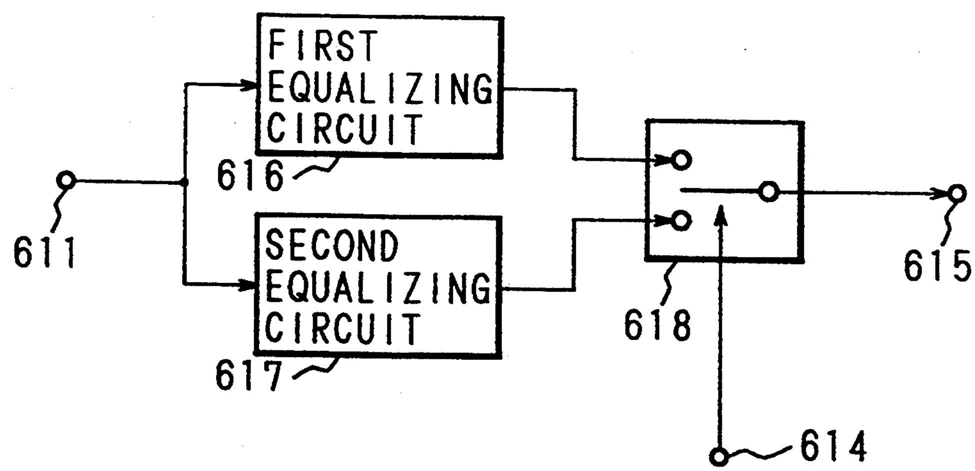
FIG. 12 is a block diagram showing another construction of the equalizing circuit.
Figure 13:
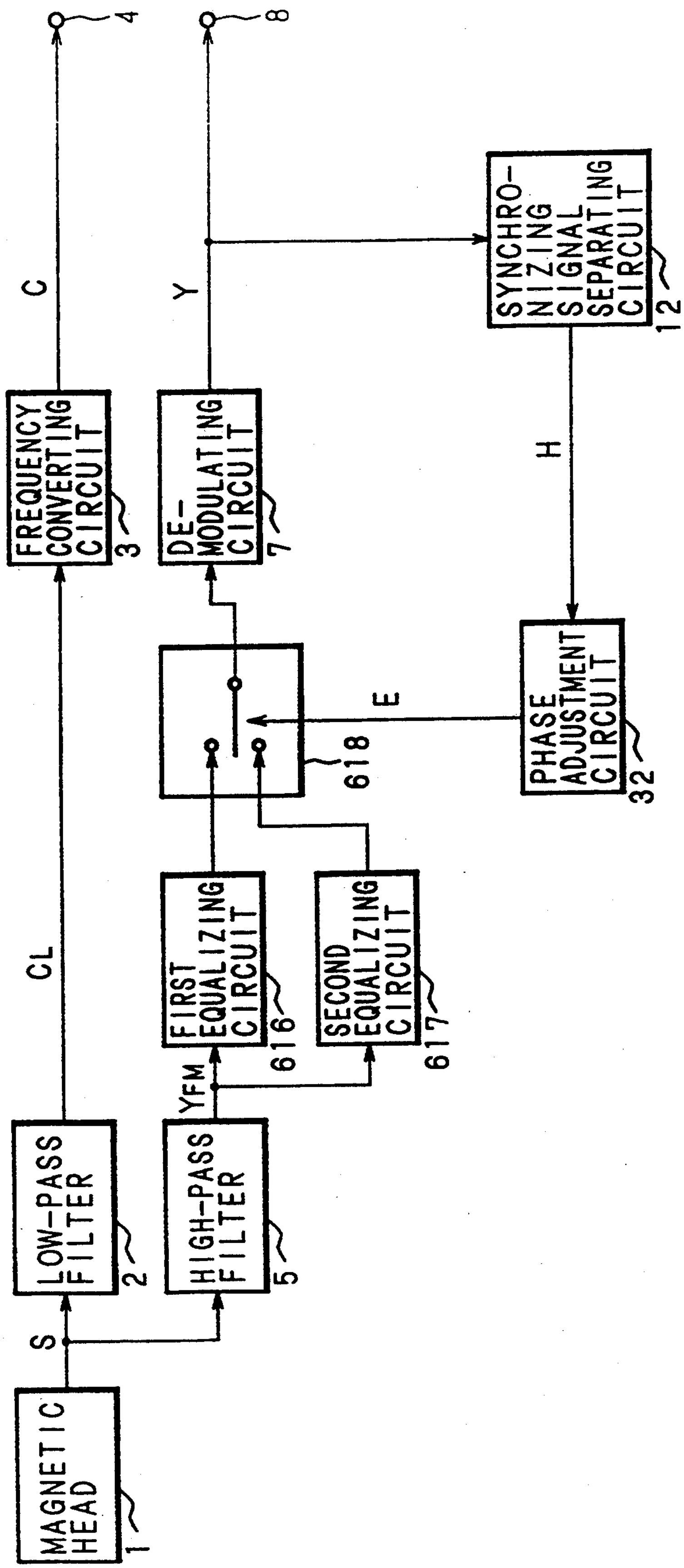
FIG. 13 is a block diagram showing a video signal reproduction apparatus including the equalizing circuit shown in FIG. 12.

For example, FIG. 12 is a block diagram showing another construction of the equalizing circuit capable of switching the equalizer characteristic. To an input terminal 611 is inputted the FM luminance signal YFM outputted from the HPF 5, and the inputted FM luminance signal YFM is fed to a first equalizing circuit 616 and a second equalizing circuit 617 respectively. The first equalizing circuit 616 applies peaking to the FM luminance signal YFM similarly to the conventional equalizing circuit 6, and feeds the same to one of input terminals provided in the switching circuit 618. The second equalizing circuit 617 raises the frequency band corresponding to the synchronizing signal from a sync chip to a pedestal level of the FM luminance signal (For example, the frequency band shown in FIG. 11 in the S-VHS system), and feeds the FM luminance signal YFM to the other input terminal provided in the switching circuit 618. To a terminal 614 is inputted a control signal outputted from the phase adjustment circuit 32, and the control signal is outputted to a control signal input terminal of the switching circuit 618. The switching circuit 618 switchingly selects the signals fed from the first and the second equalizing circuits 616, 617 in accordance with the control signal outputted from the phase adjustment circuit 32, and outputs the selected signals through an output terminal 615 to the demodulating circuit 7. FIG. 13 is a block diagram showing a video signal reproduction apparatus of an embodiment of the invent, ion in which an equalizing circuit having a construction shown in FIG. 12 is incorporated. This video signal reproduction apparatus operates similarly to the one shown in FIG. 7, and demonstrates the same effects.

A first and a second equalizing circuits 616, 617, which are elements in the embodiment shown in FIG. 13, may comprise an emitter-peaking circuit or a collector-peaking circuit such as equalizing circuit 612 shown in FIG. 10. However, any equalizing circuit may be appropriate, provided that it is allowed to have a peaking characteristic as shown in the foregoing embodiment, such as a cosign equalizing circuit which is a filter of the linear phase type.

FIG. 14 is a block diagram showing a cosign equalizing circuit. Hereafter, an operation of the cosign equalizing circuit will be described with reference to FIG. 14. A signal x(t) applied to an input terminal 620 is fed to a first delay circuit 621 at the same time being fed to an adding circuit 623. The first, delay circuit 621 delays the signal x(t) by a delay period $\tau$ to obtain a signal $x(t-\tau)$, and feeds the signal $x(t-\tau)$ to a second delay circuit 622 and a second coefficient circuit 625 simultaneously. The second delay circuit 622 delays the signal $x(t-\tau)$ by the delay period $\tau$ same as the first delay circuit 621 to obtain a signal $x(t-2\tau)$, and feeds the signal $x(t-2\tau)$ to the first adding circuit 623. The first adding circuit 623 adds the signal x(t) applied to the input terminal 620 and signal $x(t-2\tau)$ outputted from the second delay circuit 622 to obtain a signal $x(t)+x(t-2\tau)$, and feeds the signal $x(t)+x(t-2\tau)$ to the first coefficient circuit 624. The first coefficient circuit 624 multiplies the signal x(t)+x(t−2τ) by a coefficient a to obtain a signal a×x(t)+a×x(t−2τ), and feeds the signal a×x(t)+a×x(t−2τ) to a second adding circuit 626. The second coefficient circuit 625 multiples the signal x(t−τ) fed from the first delay circuit 621 by a coefficient b to obtain a signal b×x(t−τ), and feeds the signal b×x(t−τ) to the second adding circuit 626. The second adding circuit 626 adds the signal a×x(t-)+a×x(t−2τ) fed from the first coefficient circuit 624 and the signal b×x(t−τ) fed from the second coefficient circuit 625 to obtain a signal a×x(t)+b×x(t−τ)+a×x(t−2τ), and feeds the signal a×x(t)+b×x(t−τ)+a×x(t−2τ) to an output terminal 627. By setting the delay period τ of the first and the second delay circuits 621, 622 appropriately, the first and the second equalizing circuits 616, 617 are respectively allowed to have a peaking characteristic shown in the foregoing embodiment.

Figure 15:
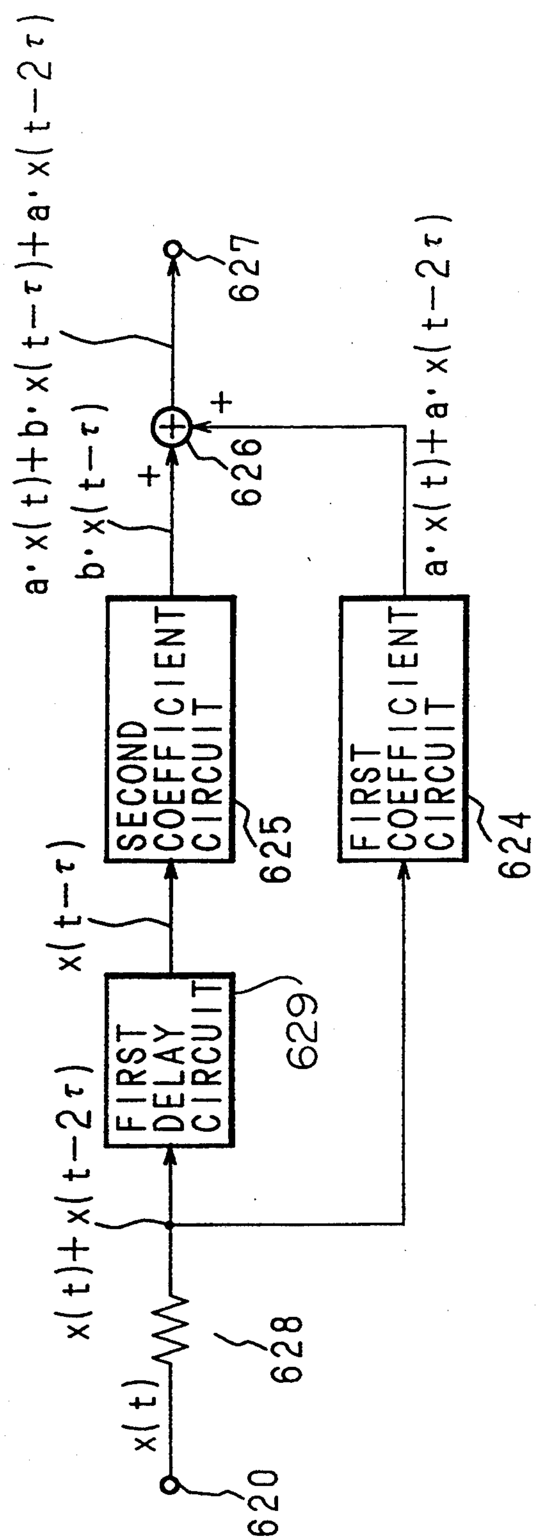
FIG. 15 is a block diagram showing an exemplary construction of a second equalizing circuit shown in FIG. 12.

The foregoing cosign equalizing circuit has a construction in which two delay circuits are provided as shown in FIG. 14. However, a cosign equalizing circuit including only one delay circuit as shown in FIG. 15 Call operate in a similar manner, and thus can obtain similar effects. There will be described portions of the cosign equalizing circuit shown in FIG. 15 different from the cosign equalizing circuit shown in FIG. 14.

In FIG. 15, indicated at 628 is a matching resistor of a delay circuit 629. An output side of the delay circuit 629 is not terminated by a resistor having a resistance same as the matching resistor, and an input side of a second coefficient circuit 625 has a higher impedance. Accordingly, the signal is reflected by an output of the delay circuit 629. Therefore, to the First coefficient circuit 624 is inputted a signal x(t)+x(t−2τ) obtained by adding the reflected signal x(t−2τ) to the input signal x(t). To the second coefficient circuit 625 is inputted a signal x(t−τ) passed through the delay circuit 628. The operation hereafter is the same as the one shown in FIG. 14.

Figure 16:
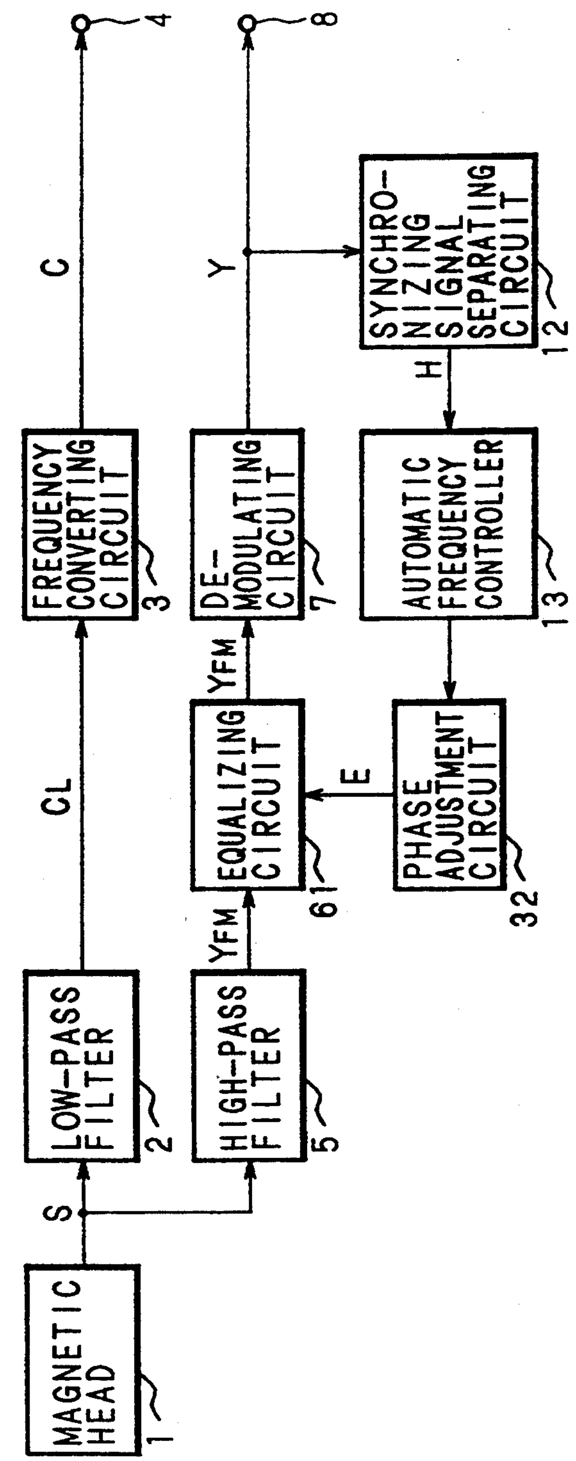

In the foregoing embodiment, the horizontal synchronizing signal H outputted from the synchronizing signal separating circuit 12 is inputted to the phase adjustment circuit 32. However, it may also be appropriate that the horizontal synchronizing signal H outputted from the synchronizing signal separating circuit 12 be inputted to an AFC so as to control the horizontal synchronizing signal H to have a substantially fixed frequency, whereby the stable horizontal synchronizing signal is inputted to the phase adjustment circuit 32. For example, a video signal reproduction apparatus shown in FIG. 16 has an AFC 13 in addition to the elements in the video signal reproduction apparatus shown in FIG. 7 in which the horizontal synchronizing signal H outputted from the synchronizing signal separating circuit 12 is inputted directly to the phase adjustment circuit 32. In the video signal reproduction apparatus shown in FIG. 16, the horizontal synchronizing signal H outputted from the synchronizing signal separating circuit 12 is inputted to the phase adjustment circuit 32 through the AFC 13. This apparatus demonstrates similar effects to the apparatus shown in FIG. 7.

Figure 3:
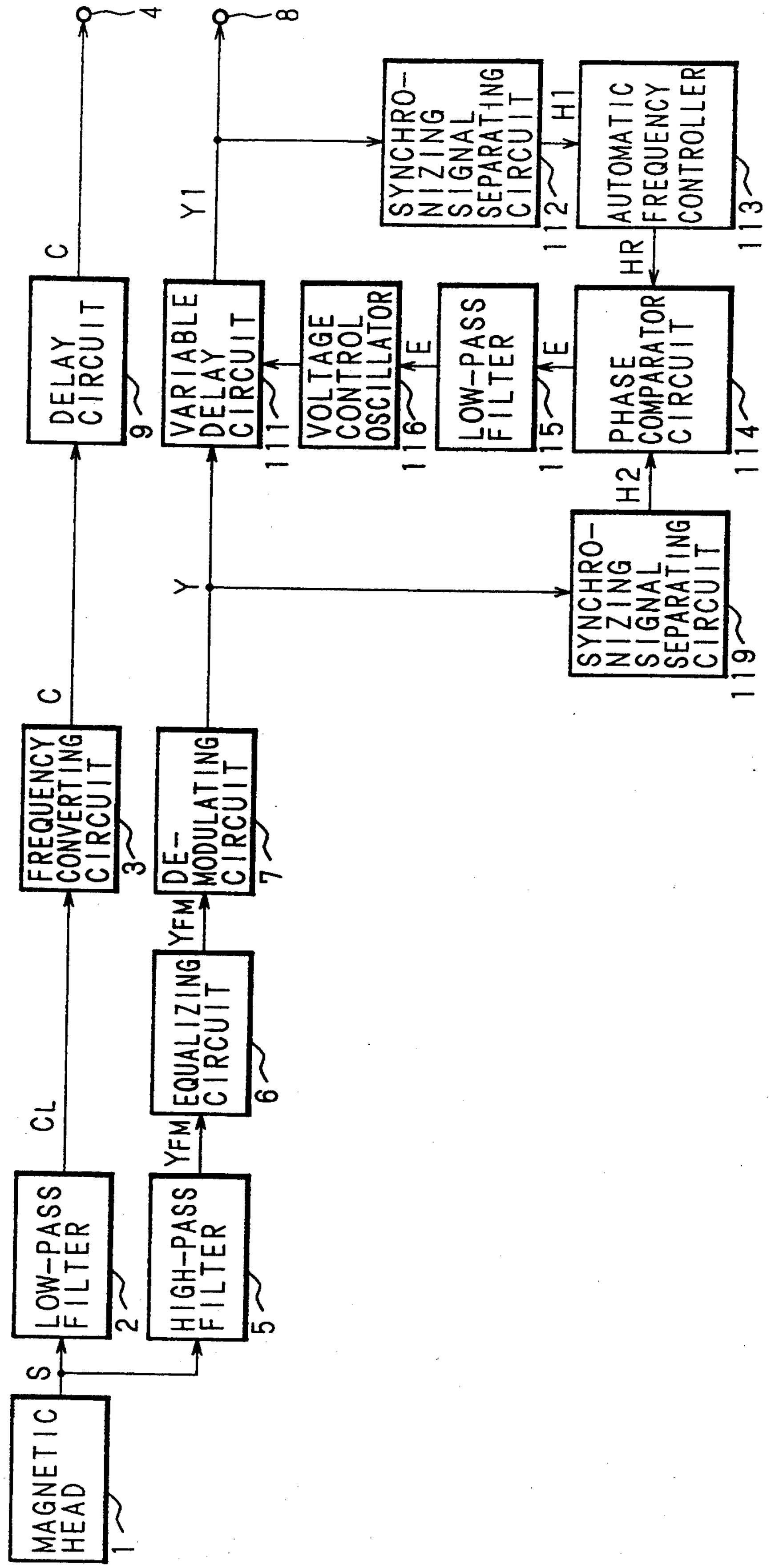
FIGS. 3 to 6 are block diagrams respectively showing video signal reproduction apparatus provided integrally with time base correcting devices of prior arts.
Figure 17:
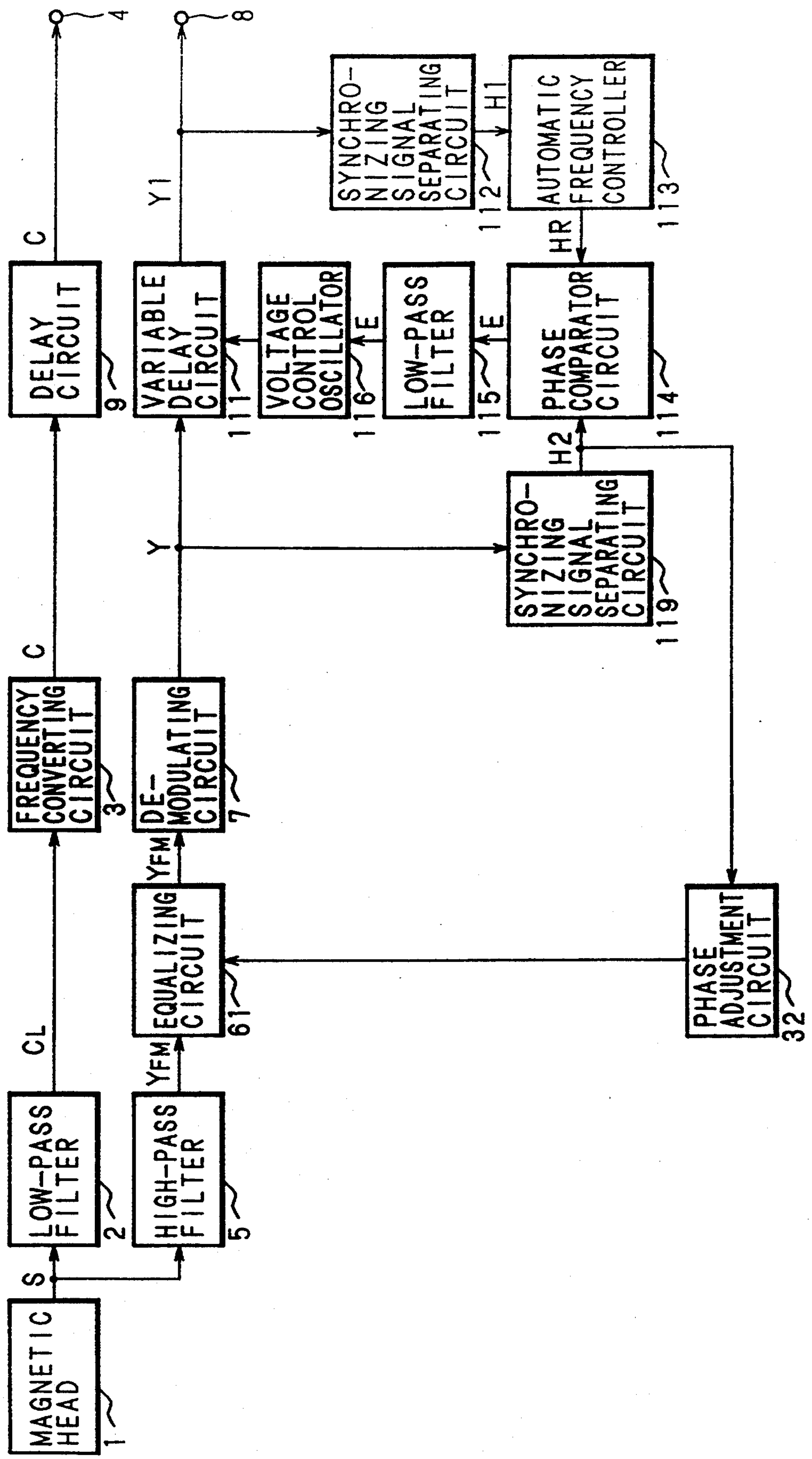

FIG. 17 is a block diagram showing a video signal of further another embodiment according to the invention. In FIG. 17, indicated at 32 is a phase adjustment circuit for adjusting the phase and a pulse duration of a horizontal synchronizing signal H2 outputted from a synchronizing separating circuit 119, and at 61 an equalizing circuit capable of switching an equalizer characteristic. Other elements identical to those shown in FIG. 3 are indicated by the same reference numerals.

Next, there will be described an operation of this video signal reproduction apparatus. It should be noted that description of portions which operate in the same manner as those shown in FIG. 3 is left out. A demodulating circuit 7 demodulates an FM luminance signal YFM to reproduce a luminance signal Y, and feeds the reproduced luminance signal Y to a variable delay circuit 111 and the synchronizing signal separating circuit 119 simultaneously. The synchronizing signal separating circuit 119 extracts only a horizontal synchronizing signal H2 from the luminance signal Y by removing a video signal portion therefrom, and feeds the extracted horizontal synchronizing signal H2 to a phase comparator circuit 114 and the phase adjustment circuit 32 simultaneously. The phase adjustment circuit 32 adjusts the phase and a pulse duration of a control signal on the basis of the horizontal synchronizing signal H2, and feeds the adjusted control signal to the equalizing circuit 61. The control signal is indicative of a command to switch an equalizer characteristic of the equalizing circuit 61 with demodulated portions of the synchronizing signal and the video signal of the FM luminance signal YFM inputted to the equalizing circuit 61. It is possible to adopt a construction, for example, as shown in FIG. 8 as a phase adjustment circuit 32. Accordingly, pulses including a portion corresponding to the horizontal synchronizing signal as shown in FIG. 9(*d*) are inputted to the equalizing circuit 61 as described above. The equalizing circuit 61, for example, has a construction as shown in FIG. 10 or 12. When the construction shown in FIG. 12 is adopted, a construction shown in FIG. 14 or 15 can be adopted as a first and a second equalizing circuits 616, 617. Accordingly, as described above, the equalizing circuit 61 is allowed to have an equalizer characteristic which raises a frequency band corresponding to a synchronizing signal from a sync chip to a pedestal level of the FM luminance signal when the control signal outputted from the phase adjustment circuit 32 is in the H-level.

The demodulating circuit 7 demodulates the FM luminance signal YFM whose frequency band corresponding to the synchronizing signal from the sync chip to the pedestal level is raised to reproduce the luminance signal Y. Accordingly, the demodulating circuit 7 feeds the luminance signal Y whose synchronizing signal portion has a good S/N to the synchronizing signal separating circuit 119. The synchronizing signal separating circuit 119 extracts the horizontal synchronizing signal H2 having a good S/N, and feeds the extracted horizontal synchronizing signal H2 to the phase comparator circuit 114. The phase comparator circuit 114 compares the phase of the horizontal synchronizing signal H2 having a good S/N outputted from the synchronizing signal separating circuit 119 and that of the reference horizontal synchronizing signal HR outputted from the AFC 113. Accordingly, a time base error included in the horizontal synchronizing signal H2 can be accurately detected, and the accurate time base error signal E is fed to an LPF 115. The LPF 115 feeds the time base error signal E having its noise component removed therefrom to a VCO 116. The VCO 116 oscillates at a frequency according to the level of the accurate time base error signal E, and its oscillating frequency serves to accurately compensate for the time base variation included in the luminance signal Y inputted to the variable delay circuit 111.

In the foregoing embodiment, the invention is embodied in a time base correcting device in which the horizontal synchronizing signal H1 whose time base is corrected is inputted to the AFC 113 to obtain the reference horizontal synchronizing signal HR. However, the invention can be embodied in any time base correcting device, provided that a time base error included in luminance signal is extracted by comparing the horizontal synchronizing signal and the reference horizontal synchronizing signal in the time base correcting device. A process for obtaining the reference horizontal synchronizing signal HR is not limited in the time base correcting device in which the invention is embodied.

Figure 18:
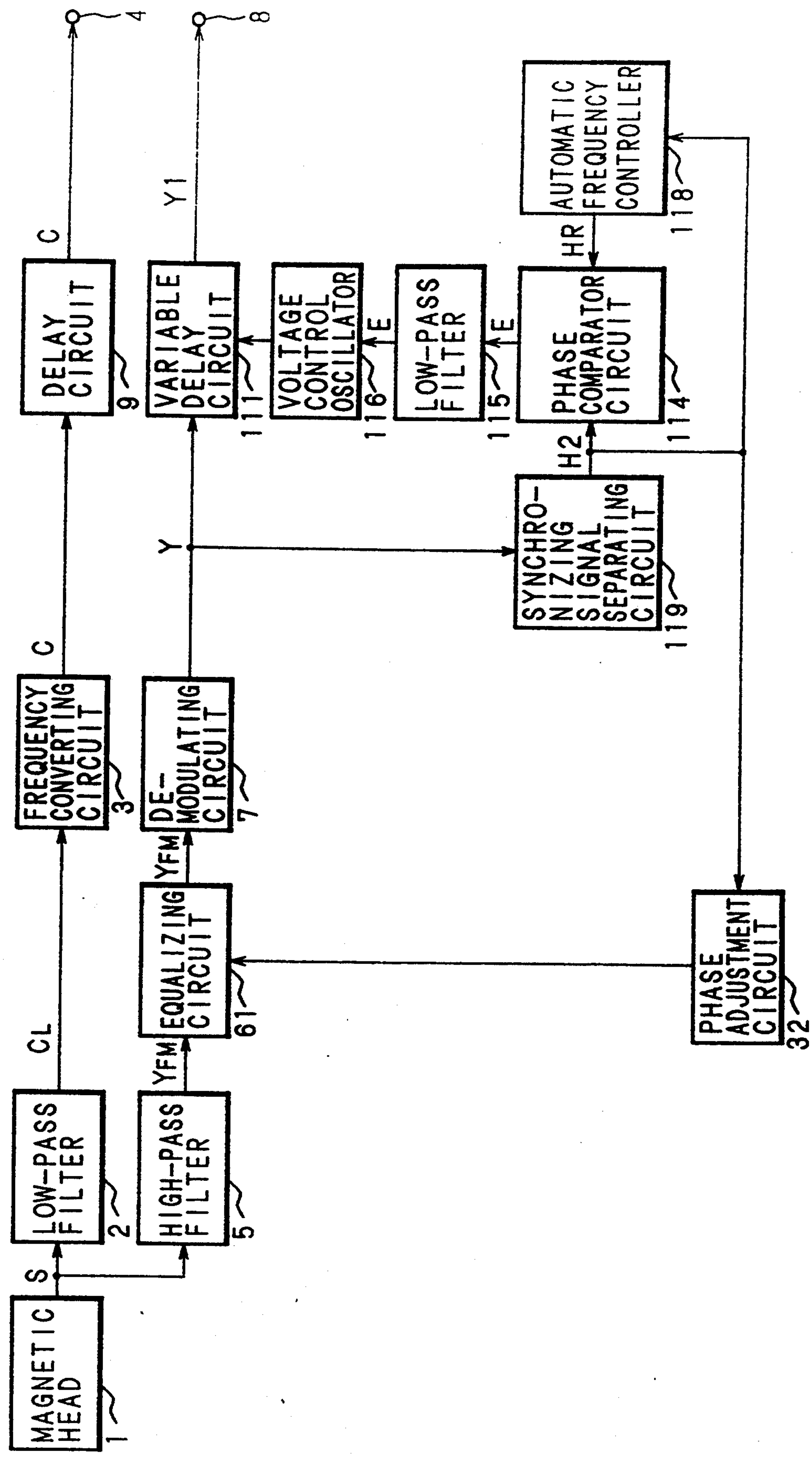

FIG. 18 is a block diagram showing a video signal reproduction apparatus provided with a time base correcting device having another construction. As opposed to the embodiment shown in FIG. 17 including the time base correcting device wherein the horizontal synchronizing signal H1 whose time base is corrected is inputted to the AFC 113 to obtain the reference horizontal synchronizing signal HR, and feeds the obtained reference horizontal synchronizing signal HR to the phase comparator circuit 114, the embodiment shown in FIG. 18 includes the time base correcting device having a following construction. A horizontal synchronizing signal H2 is inputted to an AFC 118 before a time base thereof is corrected. In the AFC 118 is obtained a reference horizontal synchronizing signal HR. The obtained reference horizontal synchronizing signal HR is fed to a phase comparator circuit 114. This embodiment operates similarly to the embodiment shown in FIG. 17, and demonstrates the same effects.

Figure 19:
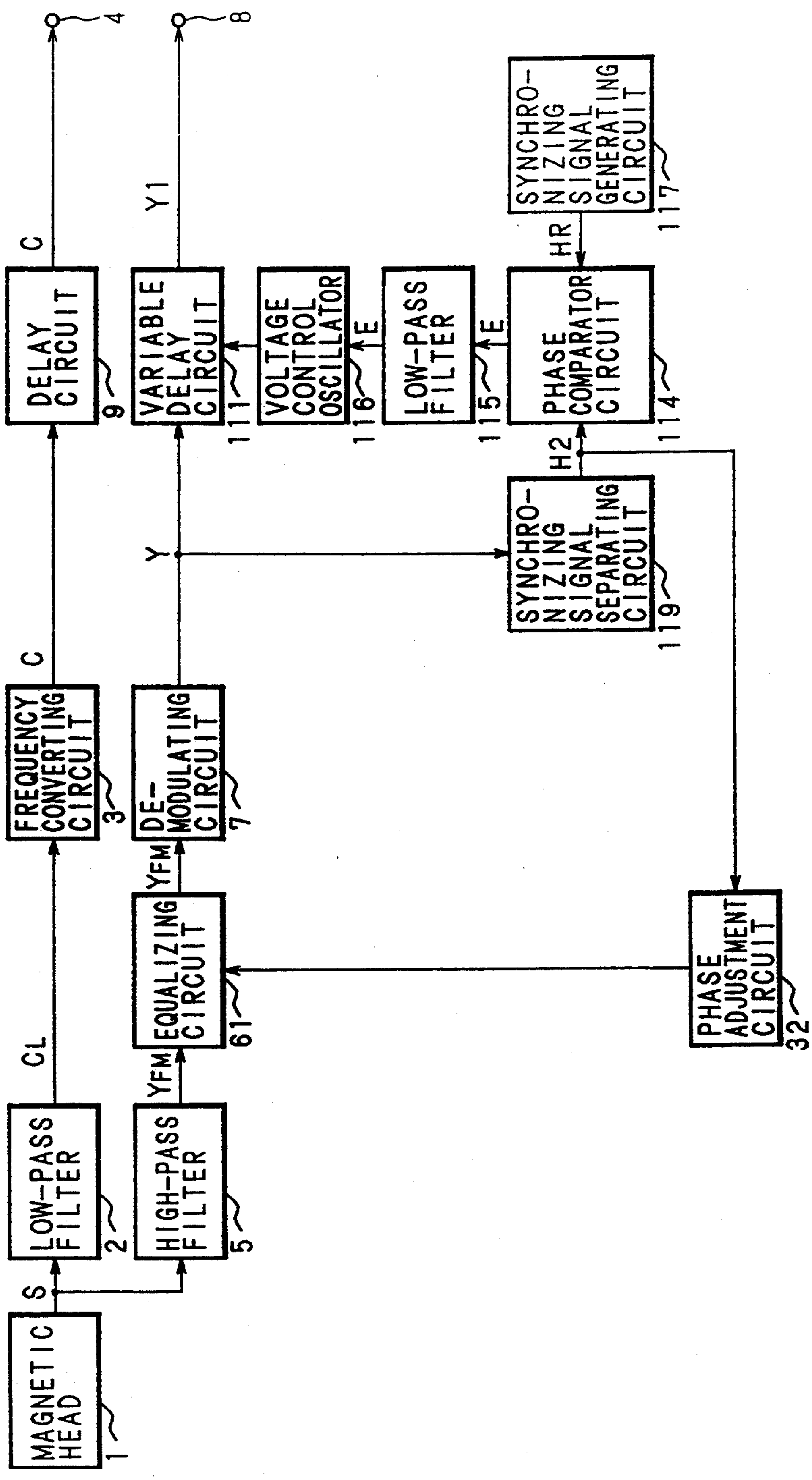

FIG. 19 is a block diagram showing a video signal reproduction apparatus provided with a time base correcting device having still another construction. In this embodiment is included the time base correcting device in which a reference horizontal synchronizing signal HR is obtained in a synchronizing signal generating circuit 117 for dividing an oscillating frequency created by a crystal oscillator and generating a synchronizing signal. This embodiment operates similarly to the embodiment shown in FIG. 17, and demonstrates the same effects.

In the embodiment shown in FIG. 17 or 19, the horizontal synchronizing signal H2 is fed to the phase comparator circuit 114 and the phase adjustment circuit 32 simultaneously, whereby a control signal is generated which switches the equalizer characteristic of the equalizing circuit 61. However, a control signal can be generated from any signal as long as it can specify a demodulated portion of the synchronizing signal of the FM luminance signal.

Figure 20:
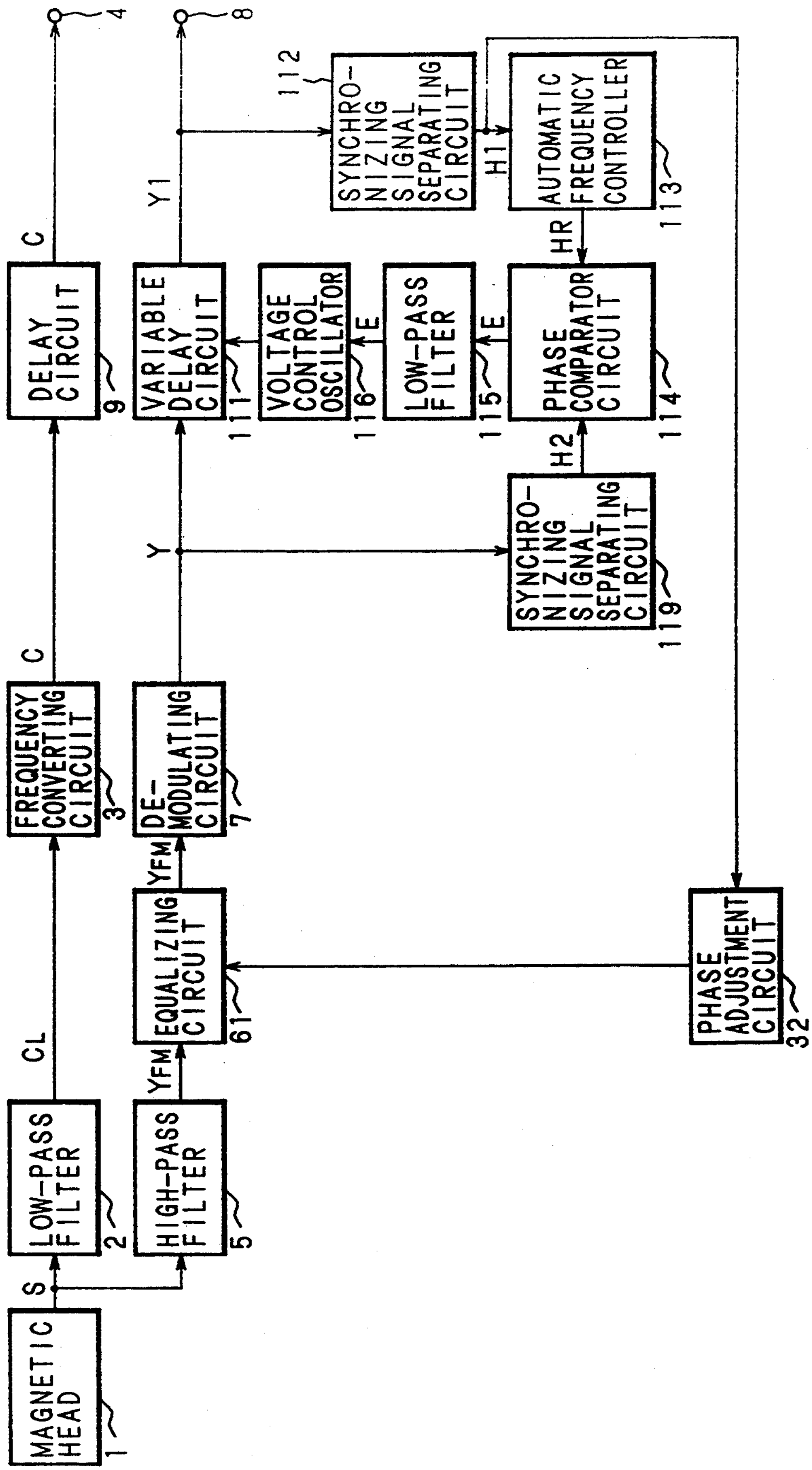

An embodiment shown in FIG. 20 includes a time base correcting device in which a horizontal synchronizing signal H1 whose time base is corrected is fed to a phase adjustment circuit 32 as opposed to the embodiment shown in FIG. 17 including the time base correcting device wherein the horizontal synchronizing signal H2 is fed to the phase comparator circuit 32 before the time base thereof is corrected. This embodiment operates similarly to the embodiment shown in FIG. 17, and demonstrates the same effects.

Figure 21:
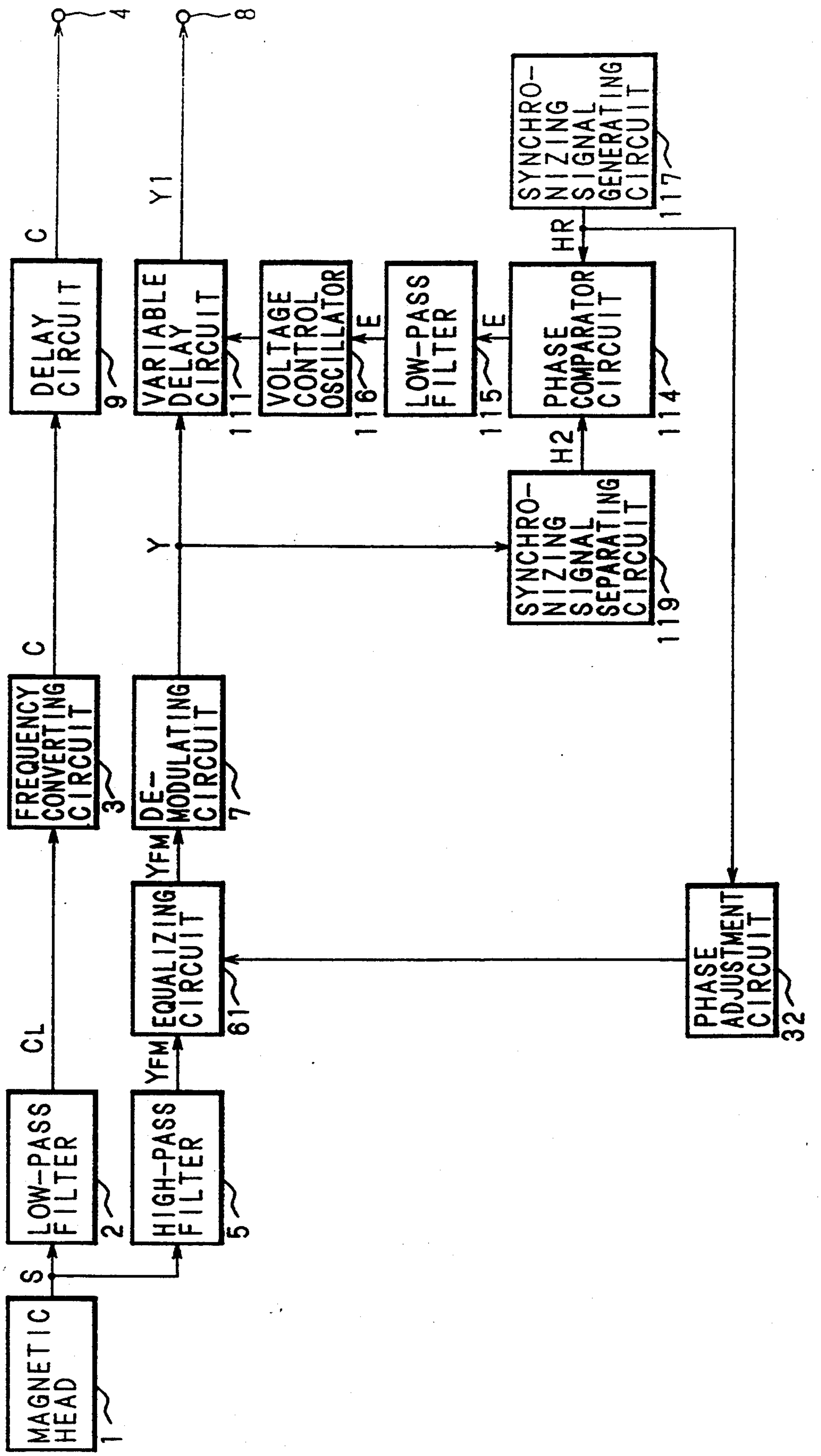

An embodiment shown in FIG. 21 includes a time base correcting device in which a reference horizontal synchronizing signal HR is obtained in a synchronizing signal generating circuit 117 for dividing an oscillating frequency created by a crystal oscillator to generate a synchronizing signal as opposed to the embodiment shown in FIG. 19 including the time base correcting device in which the horizontal synchronizing signal H2 outputted from the synchronizing signal separating circuit 119 is fed to the phase comparator circuit 32. This embodiment operates similarly to the embodiment shown in FIG. 17, and demonstrates the same effects.

In the foregoing embodiment, the invention is applied to the time base correcting device in which a time base error information is extracted from a luminance signal before the luminance signal is fed to a variable delay circuit 111. However, it may also be appropriate that the invention be applied to a time base correcting device in which the time base error information is extracted from the luminance signal having passed through the variable delay circuit 111. The invention may be embodied in any video signal reproduction apparatus provided with a time base correcting device of ally type, provided that the time base error included in the luminance signal is removed therefrom by controlling the delay period of the variable delay circuit 111 in accordance with the time base error information extracted from the horizontal synchronizing signal separated from the luminance signal in the time base correcting device.

Figure 22:
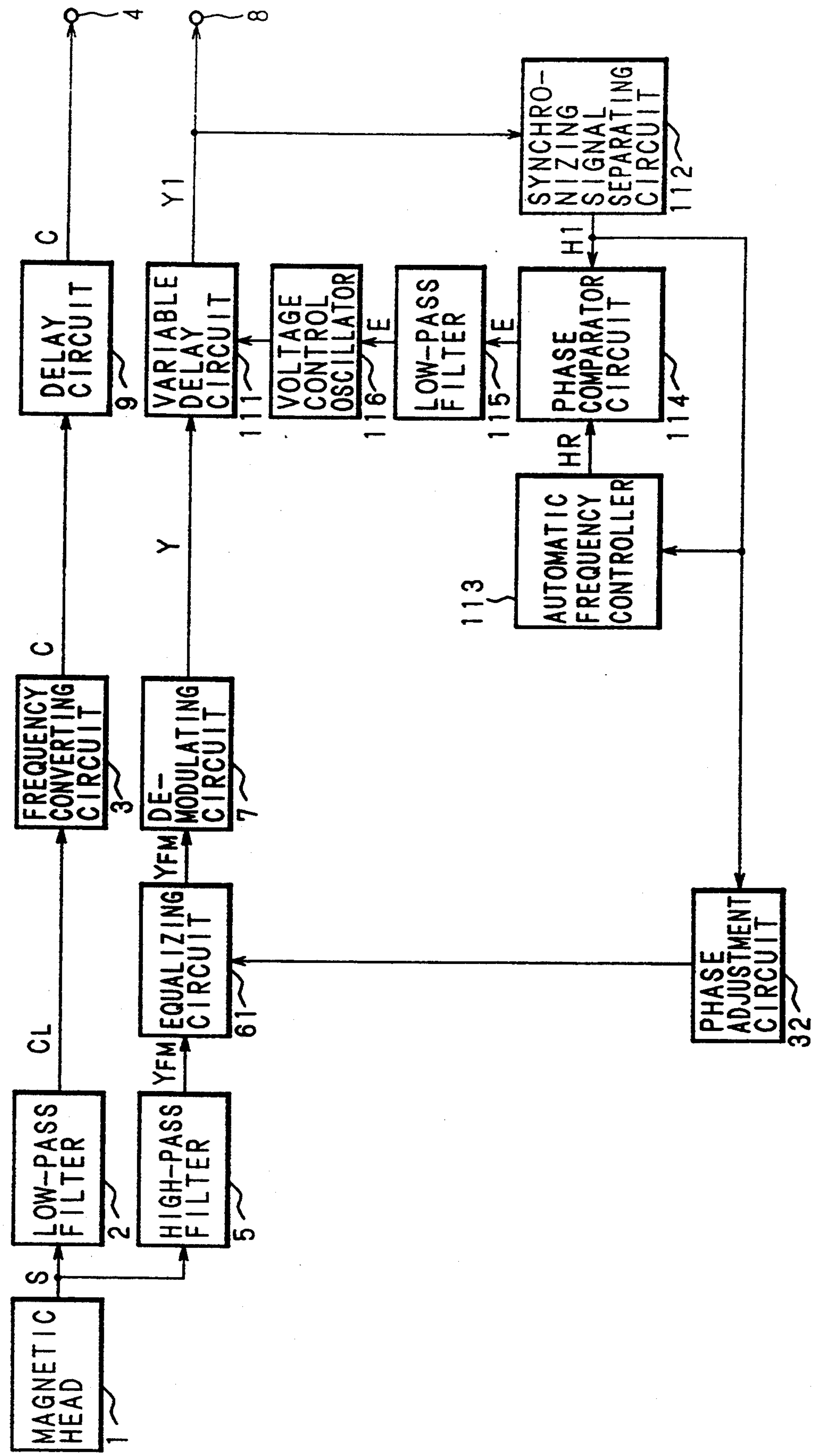
Figure 23:
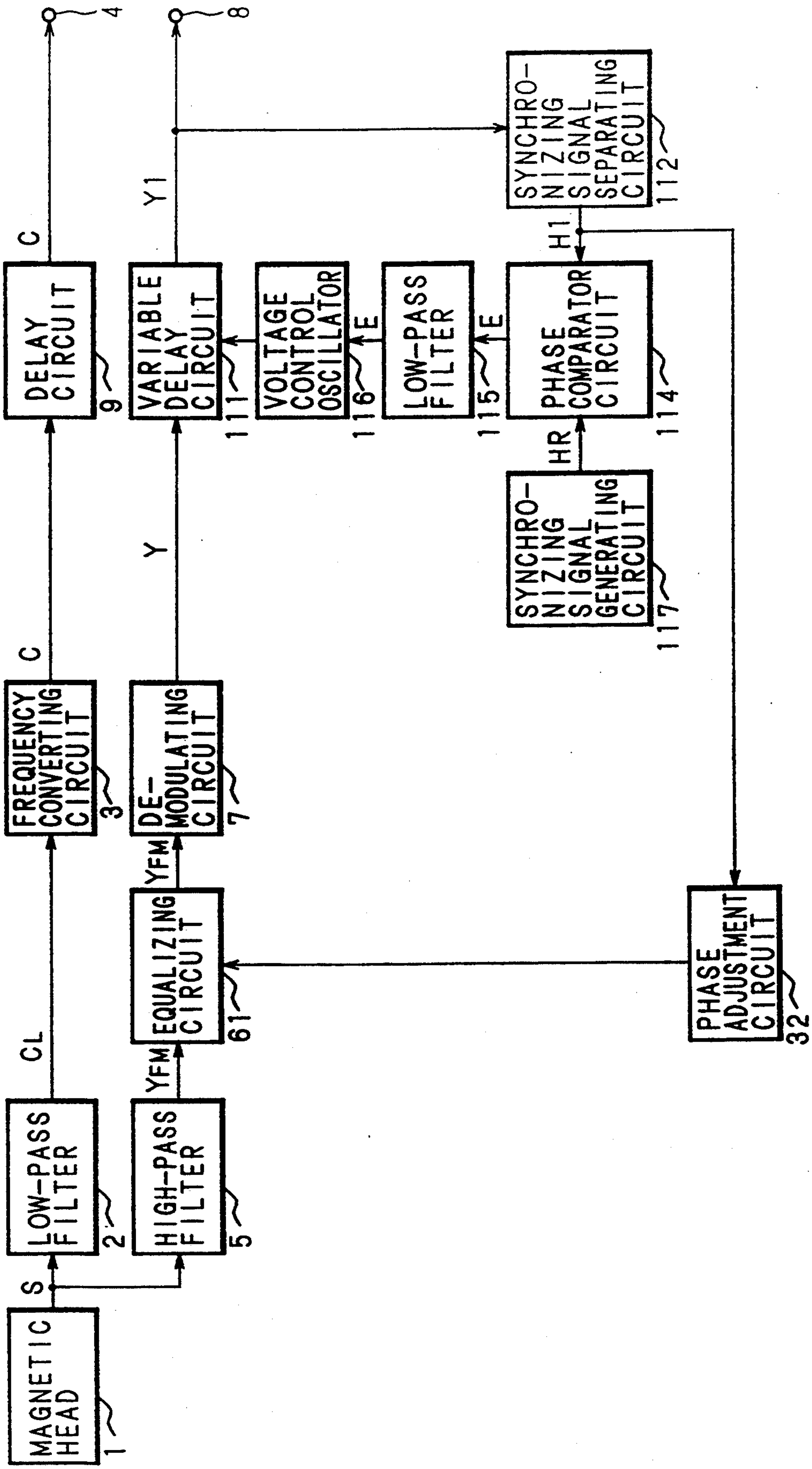
Figure 26:
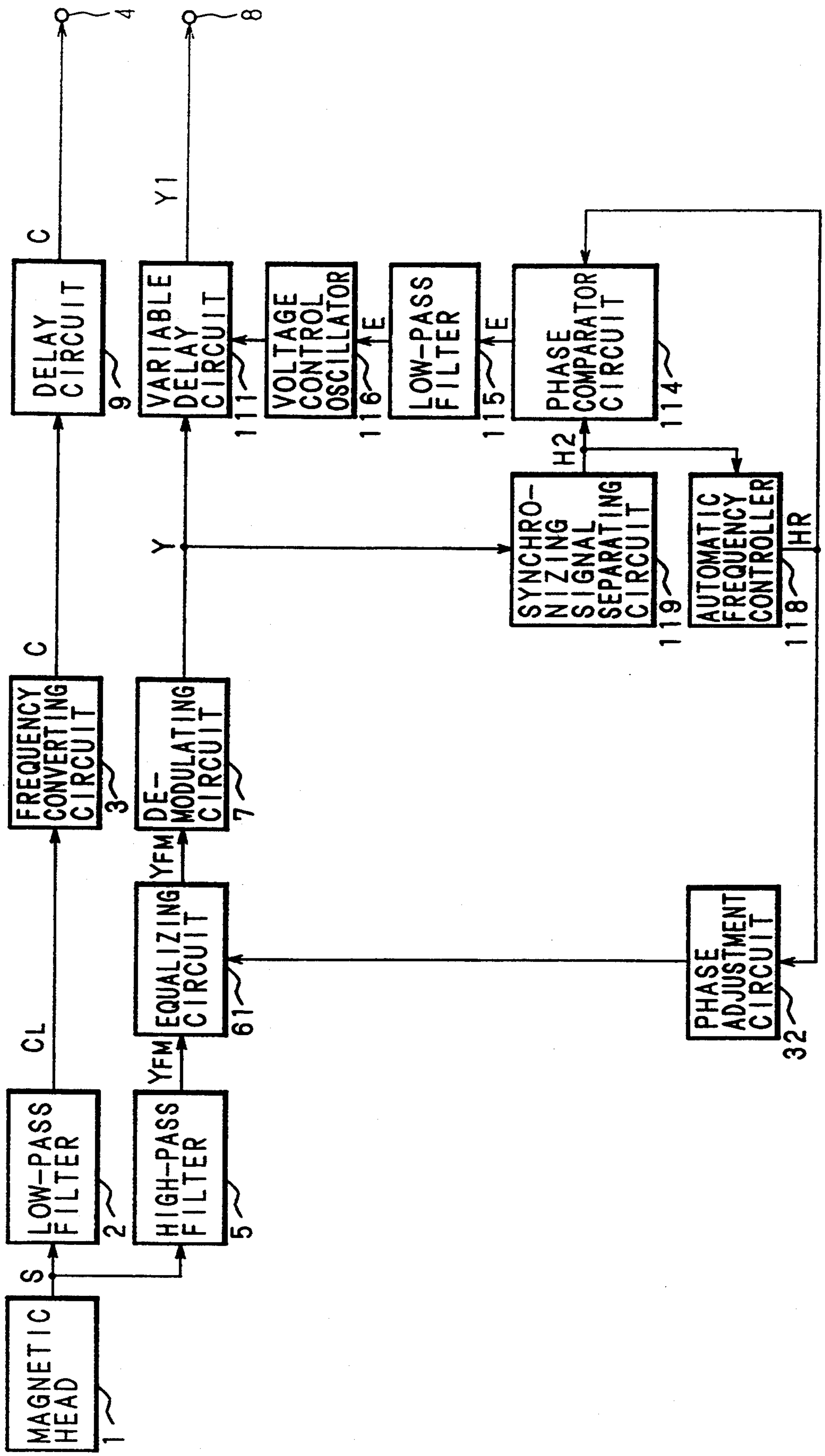
Figure 27:
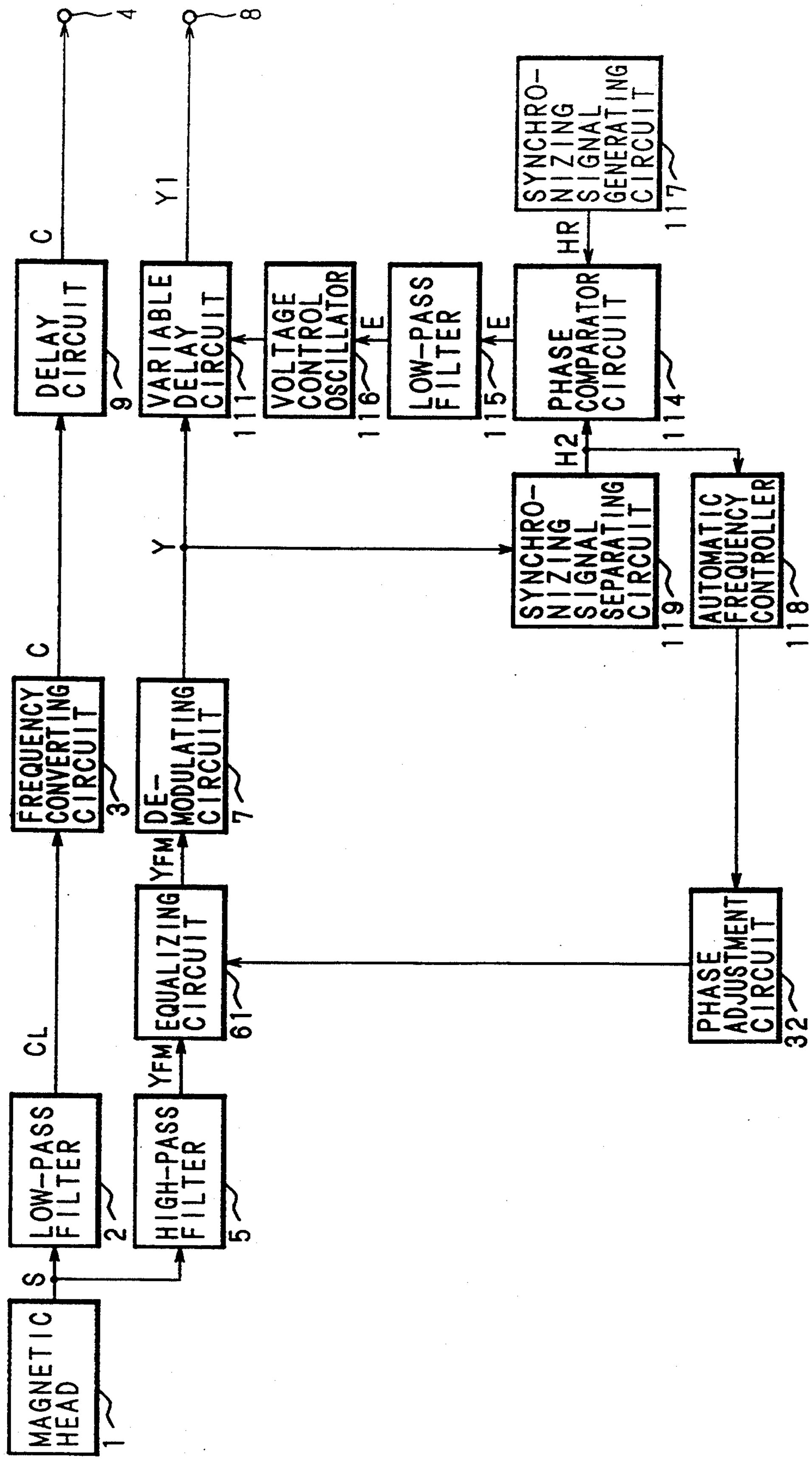
Figure 28:
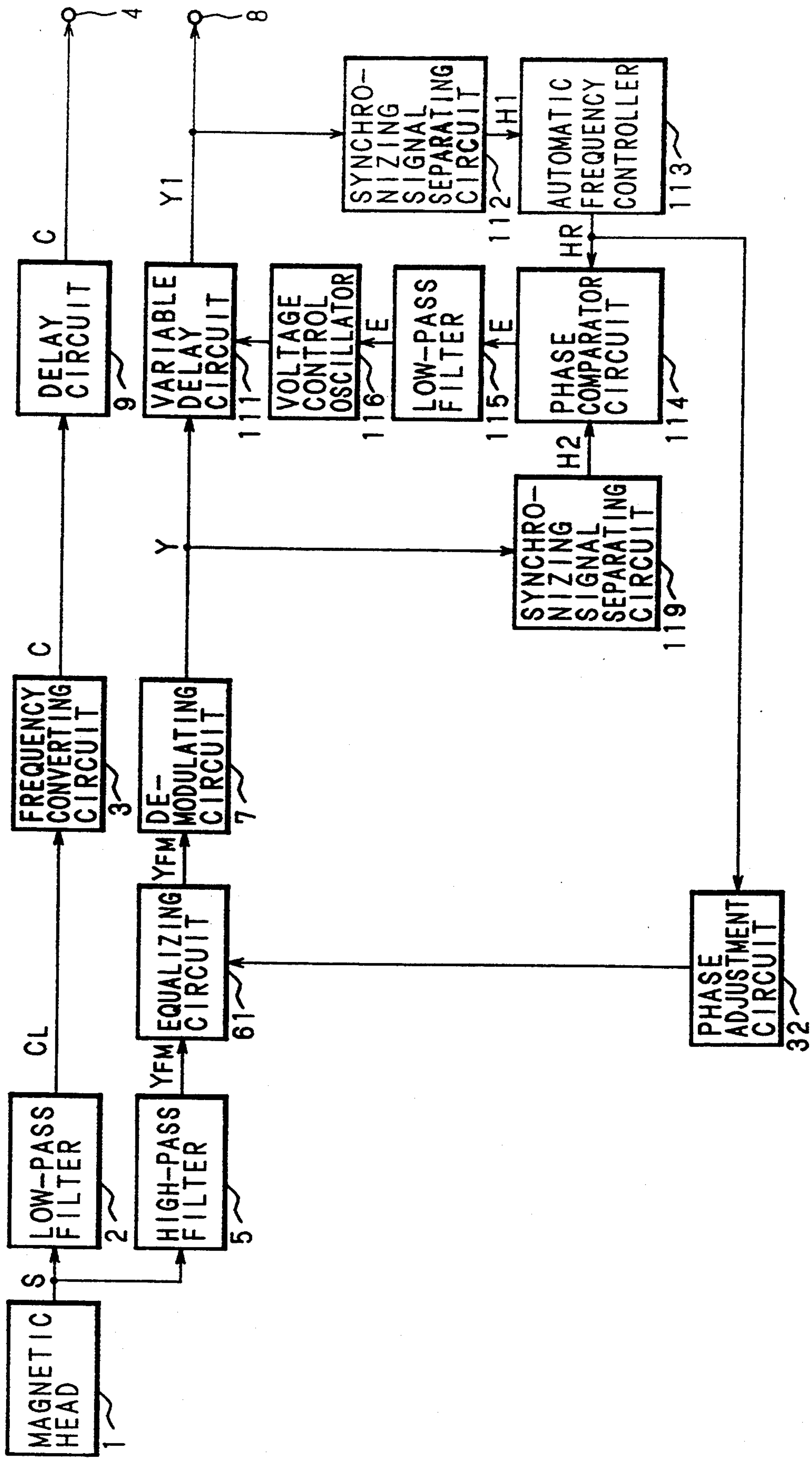
Figure 29:
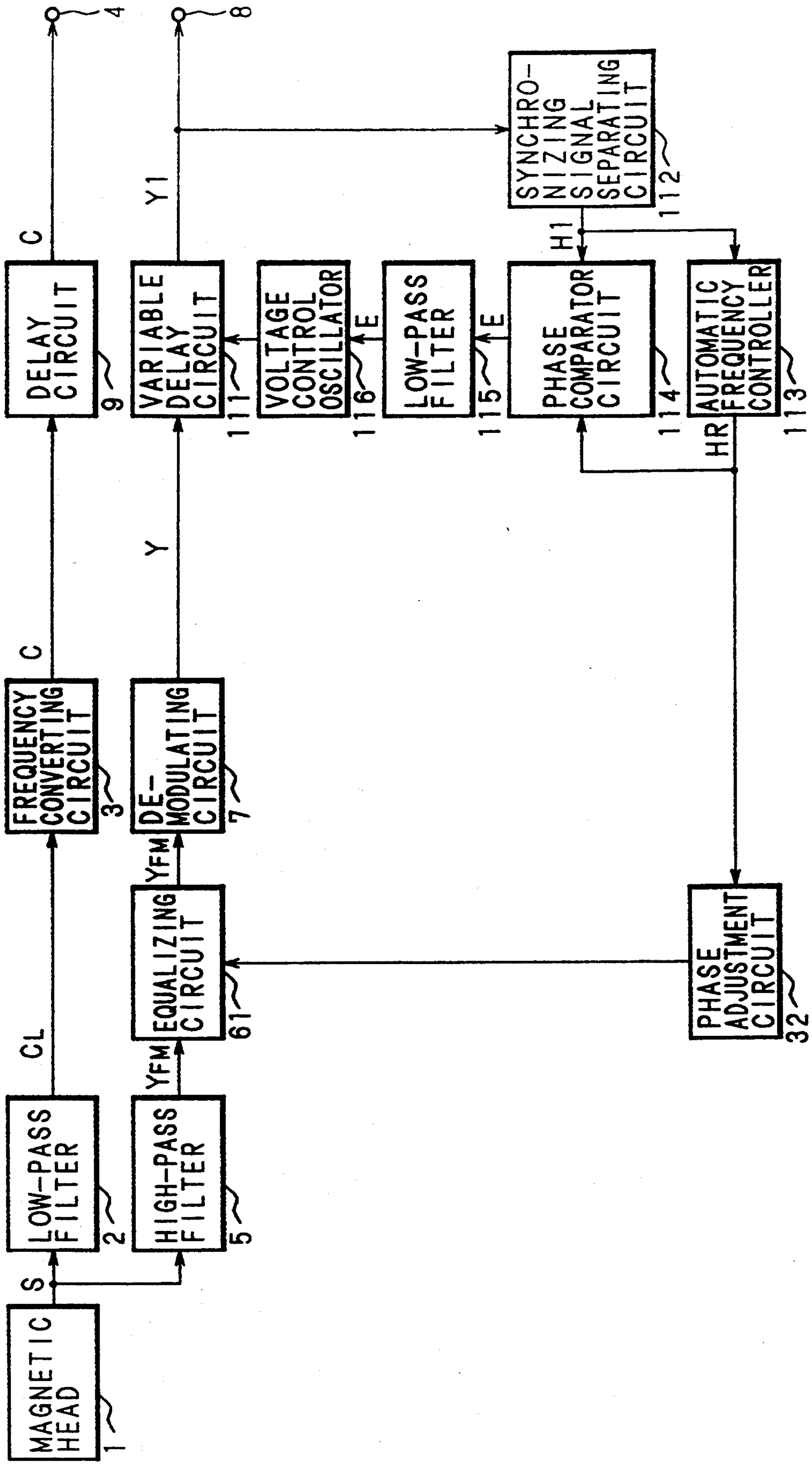

FIGS. 22 to 24 are block diagrams respectively showing video signal reproduction apparatus provided with time base correcting devices having other construction. Embodiments shown in FIGS. 22 to 24 include time base correcting devices in which a luminance signal Y1 having passed through a variable delay circuit 111 is inputted to a synchronizing signal separating circuit 112 as opposed to the embodiment shown in FIG. 18, 19, or 21 including the time base correcting device in which the luminance signal is inputted to the synchronizing signal separating circuit 119 before fed to the variable delay circuit 111. The video signal reproduction apparatus thus constructed demonstrates the effects same as the embodiment shown in FIG. 17.

In the embodiment shown in FIG. 17, 18, 19, 20, 22, or 23, the horizontal synchronizing signal outputted from the synchronizing signal separating circuit 112 or the synchronizing signal separating circuit 119 is directly inputted to the phase comparator circuit 32. However, it may be also appropriate that the horizontal synchronizing signal outputted from the synchronizing signal separating circuit 112 or the synchronizing signal separating circuit 119 be fed to the AFC whereby to be controlled so as to have a substantially fixed frequency, and then the stable horizontal synchronizing signal be inputted to the phase comparator circuit 32.

For example, in embodiments shown in FIGS. 25 to 30, a horizontal synchronizing signal is inputted to a phase comparator circuit 32 through AFCs 113, 118 as opposed to the embodiment shown in FIG. 17, 18, 19, 20, 22, or 23 wherein the horizontal synchronizing signal outputted from the synchronizing signal separating circuit. 112 or the synchronizing signal separating circuit 119 is directly inputted to the phase comparator circuit 32. The video signal reproduction apparatus thus constructed demonstrates the effects similarly to the embodiment shown in FIG. 17.

Figure 4:
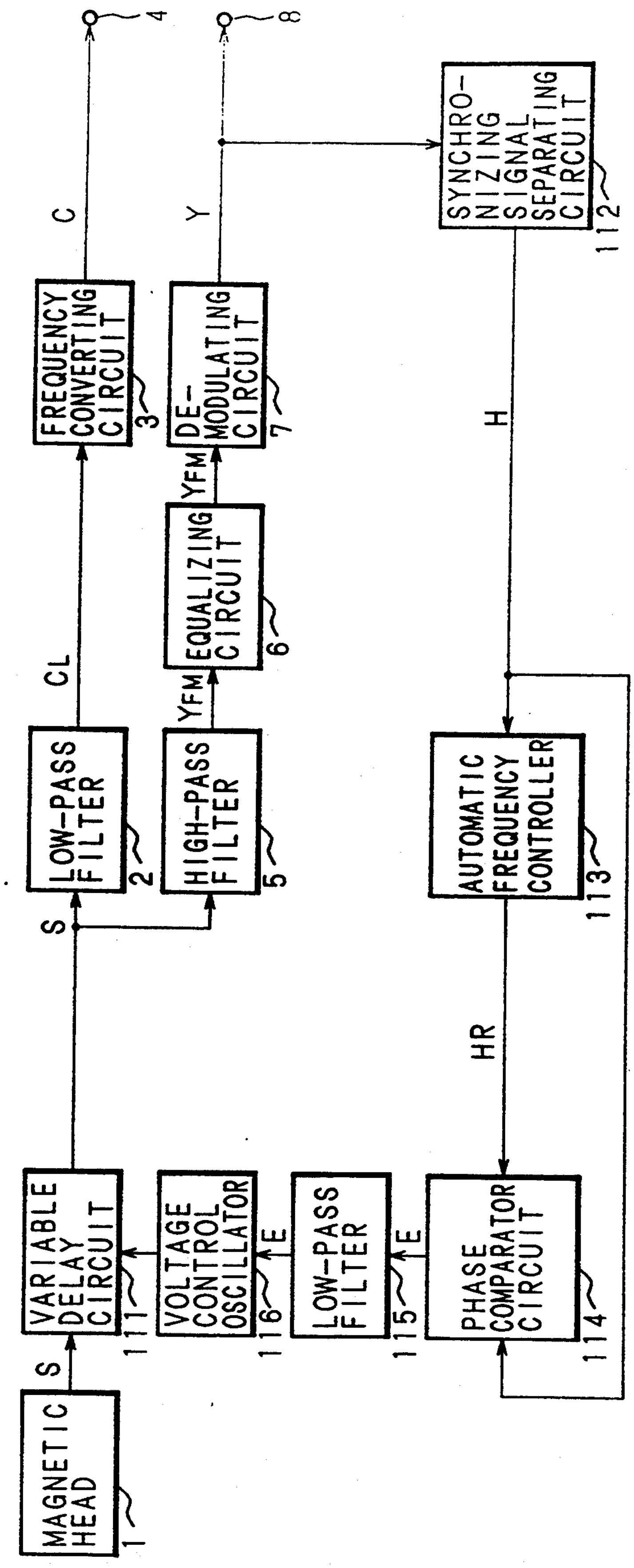
Figure 31:
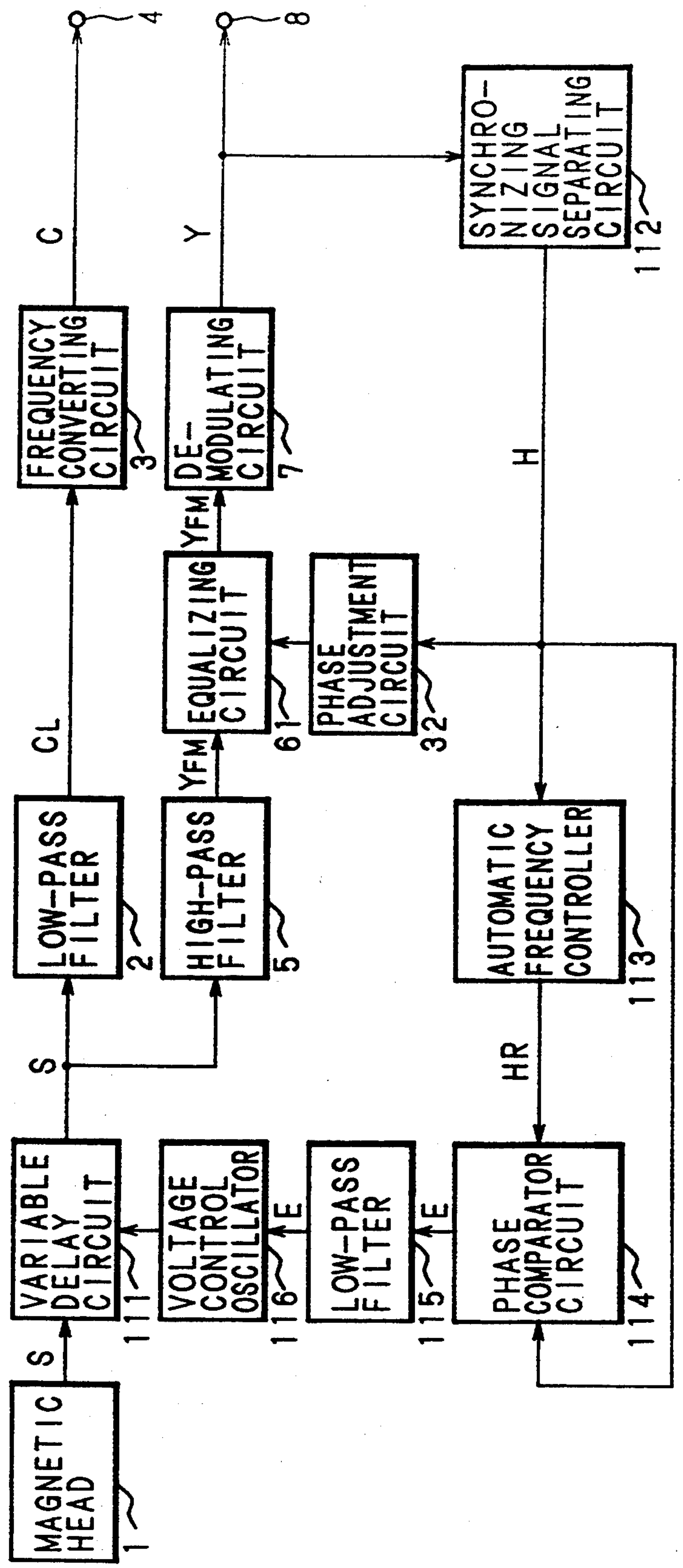

FIG. 31 is a block diagram showing a video signal reproduction apparatus of a further embodiment according to the invention. In FIG. 31, indicated at 32 is a phase adjustment circuit for adjusting the phase and a pulse duration of a horizontal synchronizing signal outputted from a synchronizing signal separating circuit 112, and at 61 an equalizing circuit for switching an equalizer characteristic. Other elements identical to those shown in FIG. 4 are indicated by the same reference numerals.

Next, there will be described an operation of the video signal reproduction apparatus shown in FIG. 31. It should be noted that description of portions which operate in the same manner as those shown in FIG. 4 is left out. A demodulating circuit 7 demodulates an FM luminance signal YFM to reproduce a luminance signal Y, and feeds the reproduced luminance signal Y to a synchronizing signal separating circuit 112. The synchronizing signal separating circuit 112 extracts only a horizontal synchronizing signal H from the luminance signal Y by removing a video signal portion therefrom, and feeds the extracted horizontal synchronizing signal H to an AFC 113, a phase comparator circuit 114, and the phase adjustment circuit 32. The phase adjustment circuit 32 adjusts the phase and a pulse duration of a control signal on the basis of the horizontal synchronizing signal H, and feeds the adjusted control signal to the equalizing circuit 61. The control signal is indicative of a command to switch an equalizer characteristic of the equalizing circuit 61 with demodulated portions of the synchronizing signal and the video signal of the FM luminance signal YFM inputted to the equalizing circuit 61. The phase adjustment circuit 32, for example, has a construction as shown in FIG. 8. Accordingly, pulses including a portion corresponding to the horizontal synchronizing signal as shown in FIG. 9(*d*) are fed to the equalizing circuit 61 as described above. The equalizing circuit 61 has such a construction as described in FIG. 10 or 12. In the case where the equalizing circuit 61 is constructed as shown in FIG. 12, the first and the second equalizing circuits 616, 617 may be constructed as shown in FIG. 14 or 15. Accordingly, as described above, the equalizing circuit 61 is allowed to have an equalizer characteristic which raises a frequency band corresponding to a synchronizing signal from a sync chip to a pedestal level of the FM luminance signal when the control signal outputted from the phase adjustment circuit 32 is in the H-level.

The demodulating circuit 7 demodulates the FM luminance signal YFM whose frequency band corresponding to the synchronizing signal from the sync chip to the pedestal level is raised to reproduce the luminance signal Y. Accordingly, the demodulating circuit 7 feeds the luminance signal Y whose synchronizing signal portion has a good S/N to the synchronizing signal separating circuit 112. The synchronizing signal separating circuit 112 extracts the horizontal synchronizing signal H having a good S/N, and feeds the extracted horizontal synchronizing signal H to the phase comparator circuit 114. The phase comparator circuit 114 compares the phase of the horizontal synchronizing signal H having a good S/N outputted from the synchronizing signal separating circuit 112 and that of the reference horizontal synchronizing signal HR outputted from the AFC 113. Accordingly, a time base error included in the horizontal synchronizing signal H can be accurately detected, and an accurate time base error signal E is fed to the LPF 115. The LPF 115 feeds the time base error signal E having its noise component removed therefrom to a VCO 116. The VCO 116 oscillates at a frequency according to the level of the accurate time base error signal E, and its oscillating frequency serves to accurately compensate for the time base variation included in the frequency multiplexed signal S inputted to the variable delay circuit 111. As a result, the time base error of the luminance signal can be corrected.

The invention is applied to the video signal reproduction apparatus including the time base correcting device in which the horizontal synchronizing signal H whose time base is corrected is inputted to the AFC 113 to obtain the reference horizontal synchronizing signal HR in the foregoing embodiment. However, the invention may be embodied in any video signal reproduction apparatus provided with a time base correcting device of any type, provided that the time base error included in the frequency multiplexed signal is extracted by comparing the horizontal synchronizing signal and the reference horizontal synchronizing signal in the time base correcting device. A process for obtaining the reference horizontal synchronizing signal is not limited in the invention.

Figure 32:
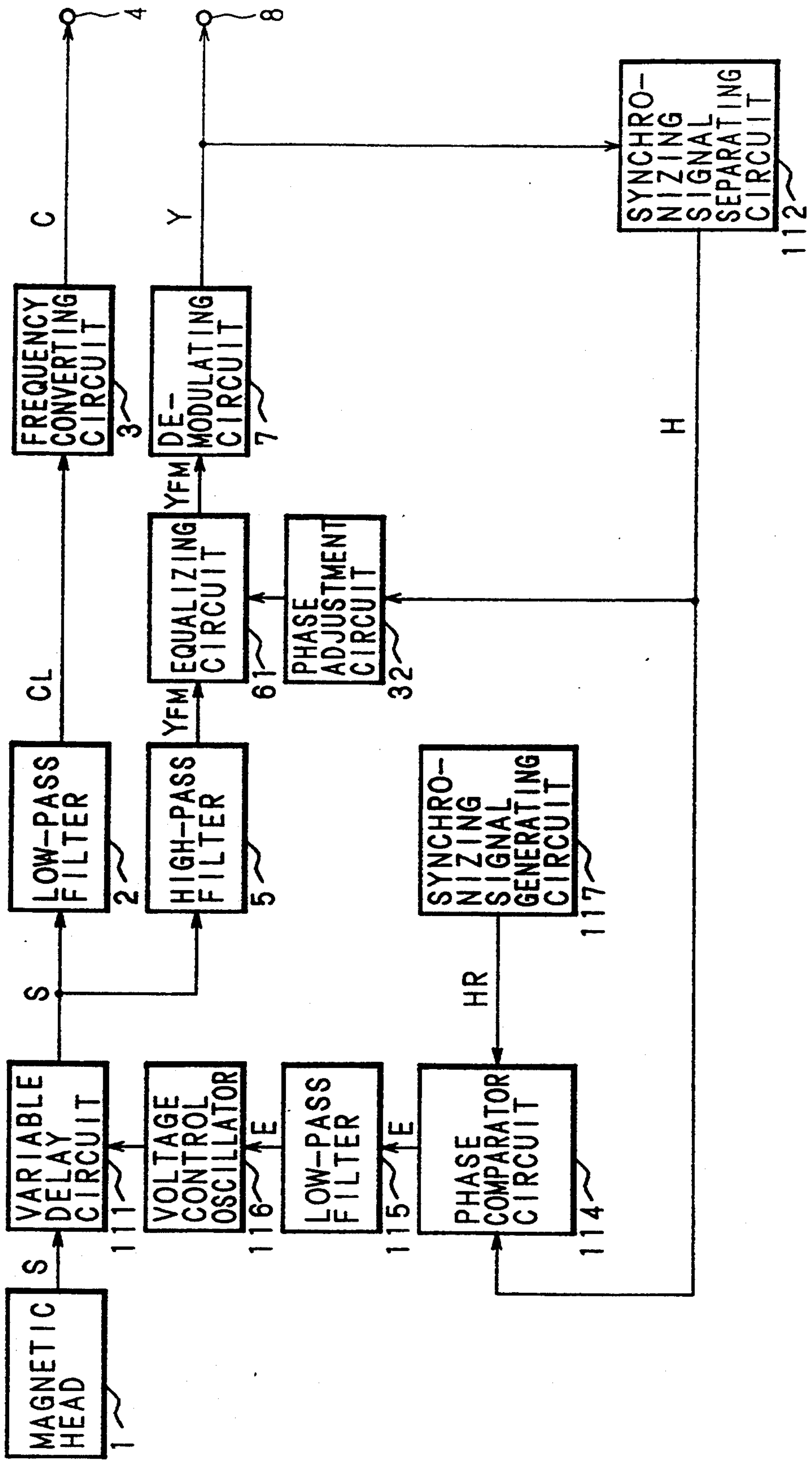

FIG. 32 is a block diagram showing a video signal reproduction apparatus provided with a time base correcting device having another construction. As opposed to the embodiment shown in FIG. 31 including the time base correcting device wherein the horizontal synchronizing signal H whose time base is corrected is inputted to the AFC 113 to obtain the reference horizontal synchronizing signal HR, and feeds the obtained reference horizontal synchronizing signal HR to the phase comparator circuit 114, the embodiment shown in FIG. 32 includes the time base correcting device having a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase comparator circuit 114. This embodiment operates similarly to the embodiment shown in FIG. 31, and demonstrates the same effects.

In the embodiment shown in FIG. 32, the horizontal synchronizing signal H is fed to the phase comparator circuit 114 and the phase adjustment circuit 32 simultaneously, whereby the control signal is generated which switches the equalizer characteristic of the equalizing circuit 61. However, a control signal may generated from any signal, provided that it can specify the demodulated portion of the synchronizing signal of the FM luminance signal.

Figure 33:
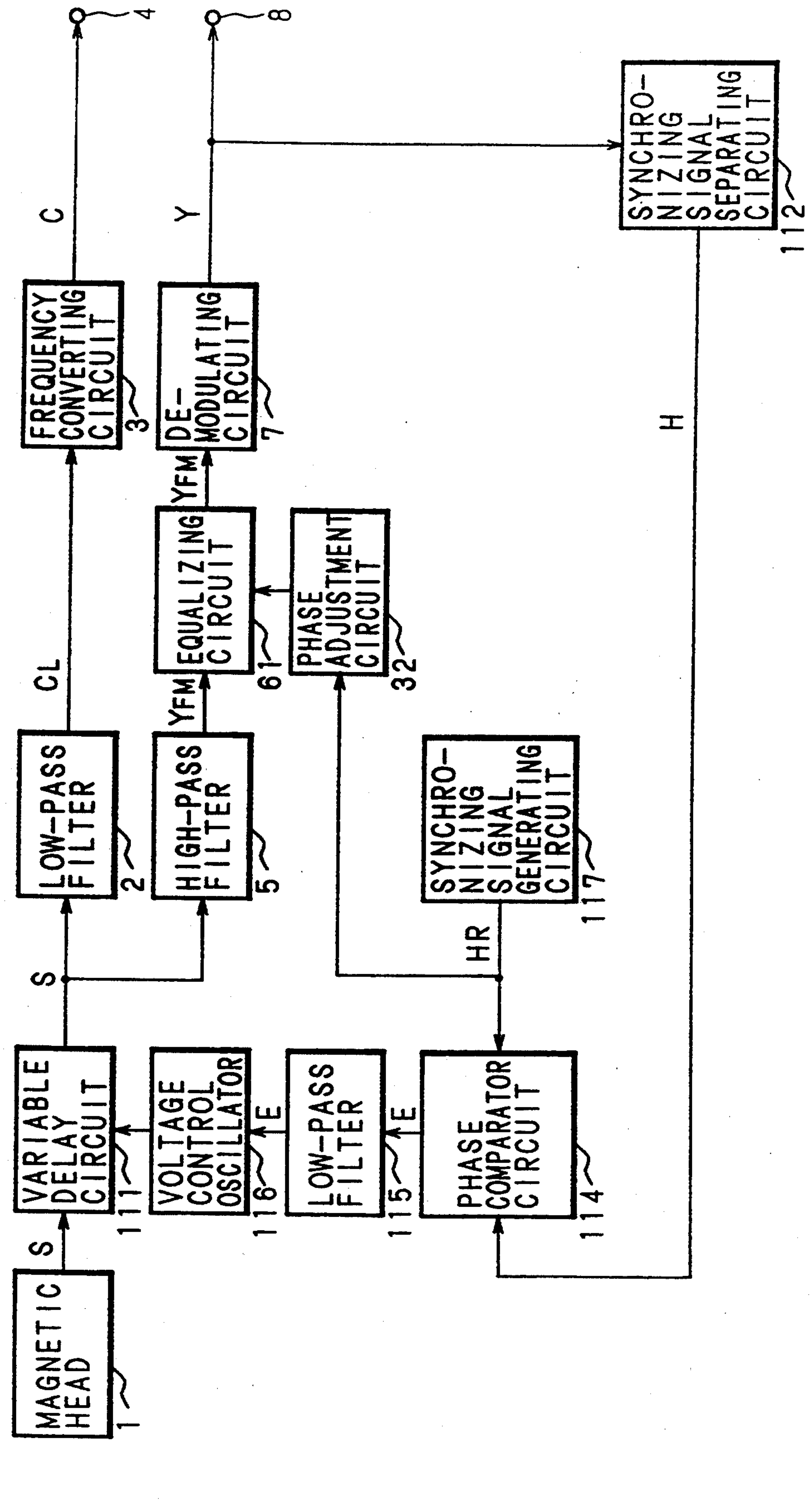

For example, in an embodiment shown in FIG. 33, the invention is applied to a video signal reproduction apparatus provided with a time base correcting device in which a reference horizontal synchronizing signal HR is obtained in a synchronizing signal generating circuit 117 for dividing an oscillating frequency created by a crystal oscillator to generate a synchronizing signal. This embodiment operates similarly to the embodiment shown in FIG. 31, and demonstrates the same effects.

Figure 34:
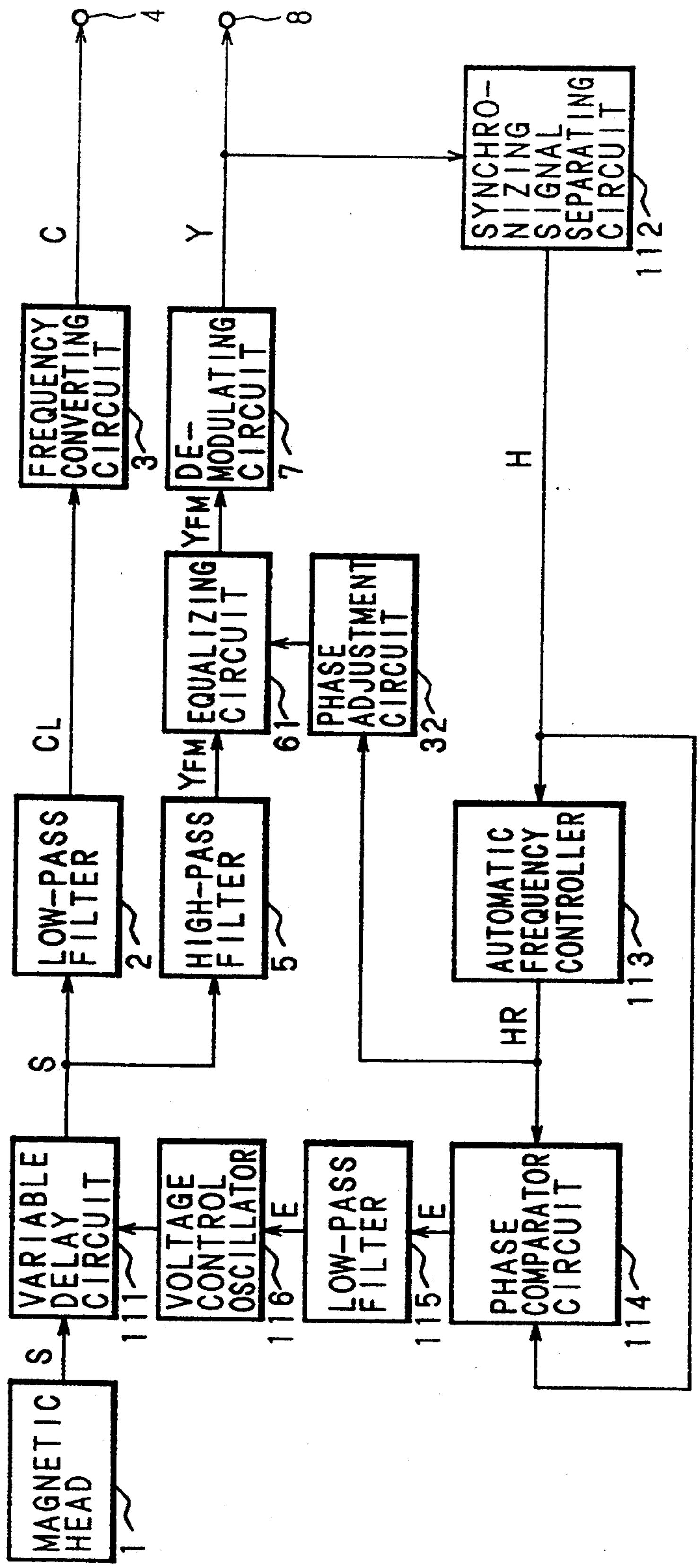
Figure 35:
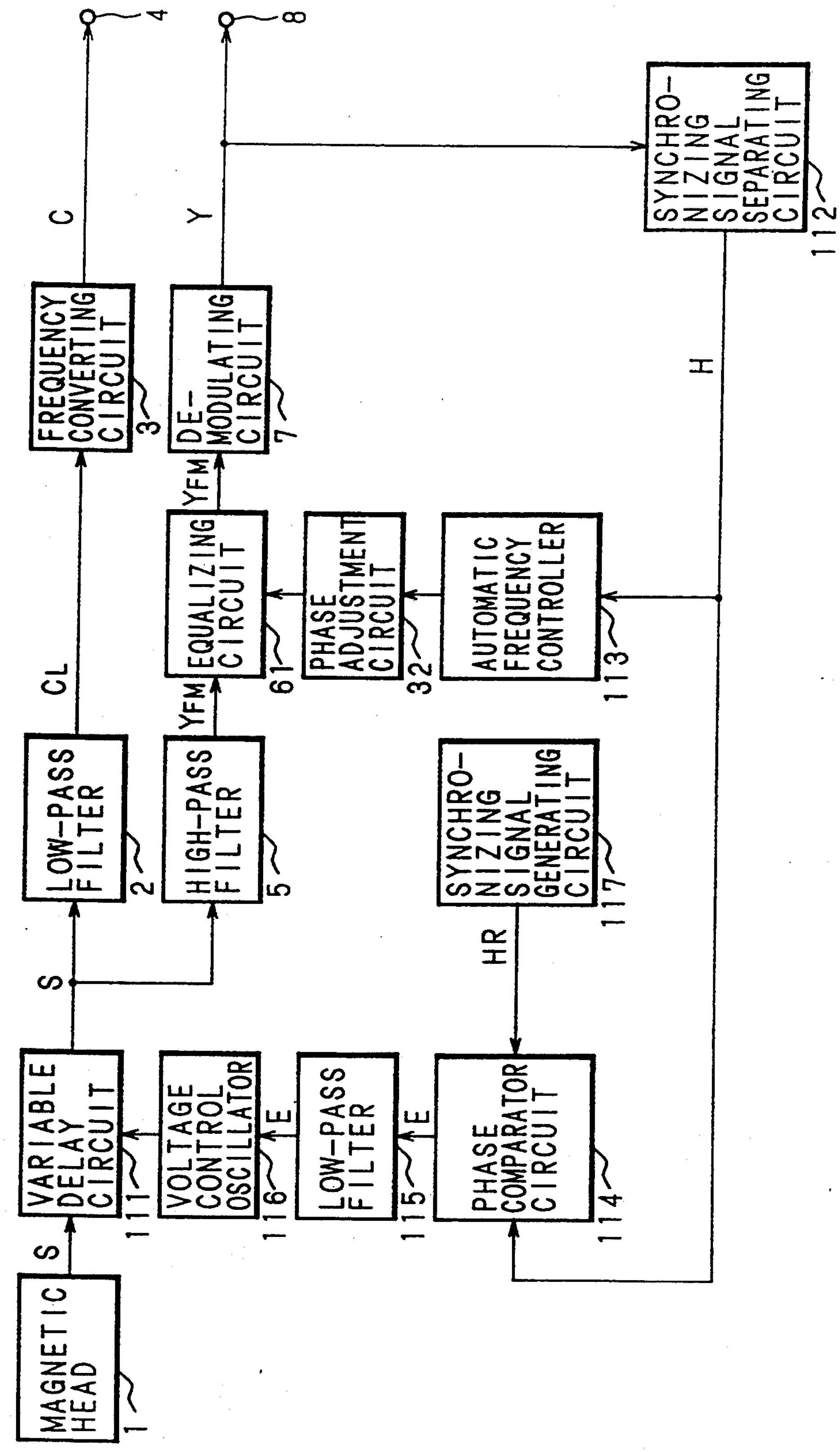

In the embodiment shown in FIG. 31, 32, the horizontal synchronizing signal H outputted from the synchronizing signal separating circuit 112 is directly inputted to the phase comparator circuit 32. However, it may be also appropriate that the horizontal synchronizing signal H outputted from the synchronizing signal separating circuit 112 be fed to the AFC whereby to be controlled to have a substantially fixed frequency, and then a stable horizontal synchronizing signal be inputted to the phase comparator circuit 32. For example, in embodiments shown in FIGS. 34, 35, a horizontal synchronizing signal H outputted from a synchronizing signal separating circuit 112 is inputted to a phase adjustment circuit 32 through an AFC 113 as opposed to the embodiments shown in FIGS. 31, 32 in which the horizontal synchronizing signal H outputted to the synchronizing signal separating circuit 112 is directly inputted to the phase adjustment circuit 32. The video signal reproduction apparatus thus constructed demonstrates the effects same as the embodiment shown in FIG. 31.

Figure 5:
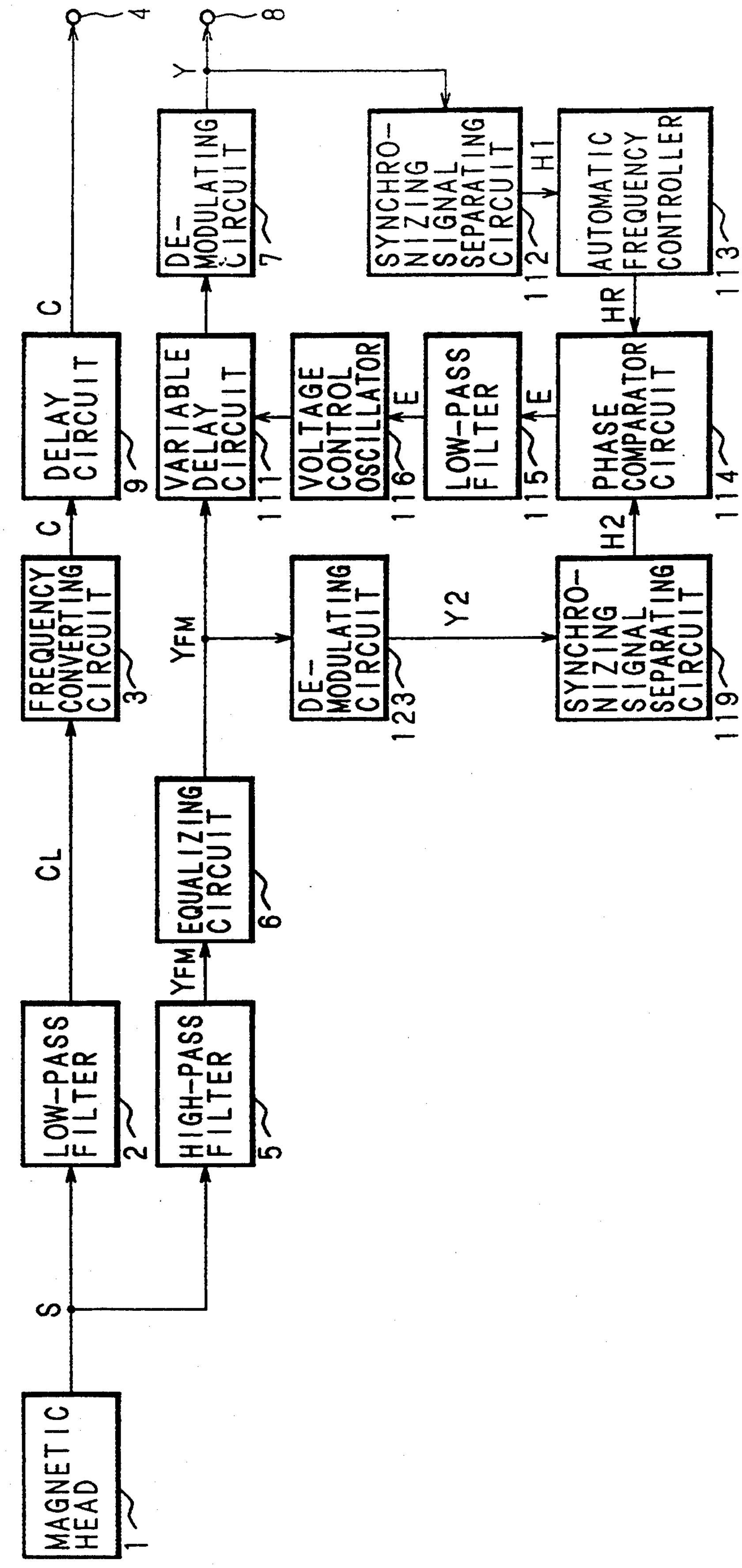
Figure 36:
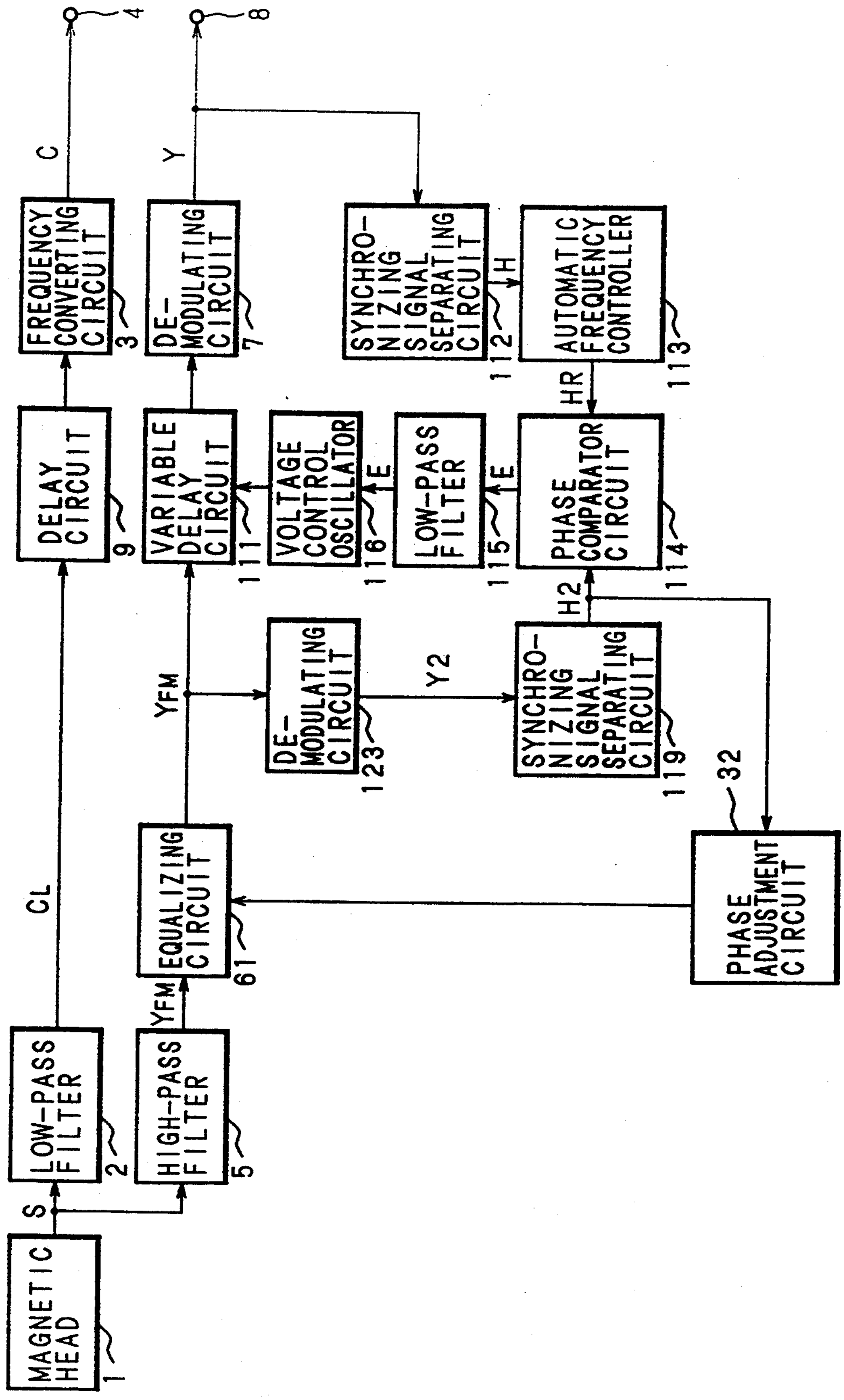

FIG. 36 is a block diagram showing a video signal reproduction apparatus of still another embodiment according to the invention. In FIG. 36, indicated at 32 a phase adjustment circuit for adjusting the phase and a pulse duration of a horizontal synchronizing signal H2 outputted from a synchronizing signal separating circuit 119, and at 61 an equalizing circuit for switching an equalizer characteristic. Other elements identical to those shown in FIG. 5 are indicated by the same reference numerals.

Next, there will be described an operation of the video signal reproduction apparatus shown in FIG. 36. It should be noted that description of portions which operate in the same manner as those shown in FIG. 5 is left out. A demodulating circuit 123 demodulates an FM luminance signal YFM to reproduce a luminance signal Y2, and feeds the reproduced luminance signal Y2 to a synchronizing signal separating circuit 119. The synchronizing signal separating circuit 119 extracts only a horizontal synchronizing signal H2 from the luminance signal Y2 by removing a video signal portion therefrom, and feeds the extracted horizontal synchronizing signal H2 to a phase comparator circuit 114 and the phase adjustment circuit 32 simultaneously. The phase adjustment circuit 32 adjusts the phase and a pulse duration of a control signal on the basis of the horizontal synchronizing signal H2, and feeds the adjusted control signal to the equalizing circuit 61. The control signal is indicative of a command to switch an equalizer characteristic of the equalizing circuit 61 with demodulated portions of the synchronizing signal and the video signal of the FM luminance signal YFM fed to the equalizing circuit 61. It is possible to adopt a construction, for example, as shown in FIG. 8 as a phase adjustment circuit 32. Accordingly, pulses including a portion corresponding to the horizontal synchronizing signal shown in FIG. 9(*d*) are inputted to the equalizing circuit 61 as described above. The equal izing circuit 61, for example, has a construction as shown in FIG. 10 or 12. When the construction shown in FIG. 12 is adopted, a first and a second equalizing circuits 616, 617 may be constructed as shown in FIG. 14 or 15. Accordingly, the equalizing circuit 61 is allowed to have an equalizer characteristic which raises a frequency band corresponding to a synchronizing signal from a sync chip to a pedestal level of the FM luminance signal when the control signal outputted from the phase adjustment circuit 32 is in the H-level.

The demodulating circuit 123 demodulates the FM luminance signal YFM whose frequency band corresponding to the synchronizing signal from the sync chip to the pedestal level is raised to reproduce the luminance signal Y2. Accordingly, the demodulating circuit 123 feeds the reproduced luminance signal Y whose synchronizing signal portion has a good S/N to the synchronizing signal separating circuit 119. The synchronizing signal separating circuit 119 extracts the horizontal synchronizing signal H2 having a good S/N, and feeds the extracted horizontal synchronizing signal H2 to the phase comparator circuit. 114. The phase comparator circuit 114 compares the phase of the horizontal synchronizing signal H2 having a good S/N outputted from the synchronizing signal separating circuit 119 and that of the reference horizontal synchronizing signal HR outputted from the AFC 113. Accordingly, a time base error included in the horizontal synchronizing signal H2 can be accurately detected, and an accurate time base error signal E is fed to an LPF 115. The LPF 115 feeds the time base error signal E having its noise component removed therefrom to a VCO 116. The VCO 116 oscillates at a frequency according to the level of the accurate time base error signal E, and its oscillating frequency serves to accurately compensate for the time base variation included in the FM luminance signal YFM inputted to the variable delay circuit 111.

The invention is applied to the video signal reproduction apparatus including the time base correcting device in which the horizontal synchronizing signal H whose time base is corrected is inputted to the AFC 113 to obtain the reference horizontal synchronizing signal HR in the foregoing embodiment. However, the invention may be embodied in any video signal reproduction apparatus provided with a time base correcting device of any type, provided that the time base error included in the FM luminance signal is extracted by comparing the horizontal synchronizing signal and the reference horizontal synchronizing signal in the time base correcting device. A process for obtaining the reference horizontal synchronizing signal is not limited in the invention.

Figure 37:
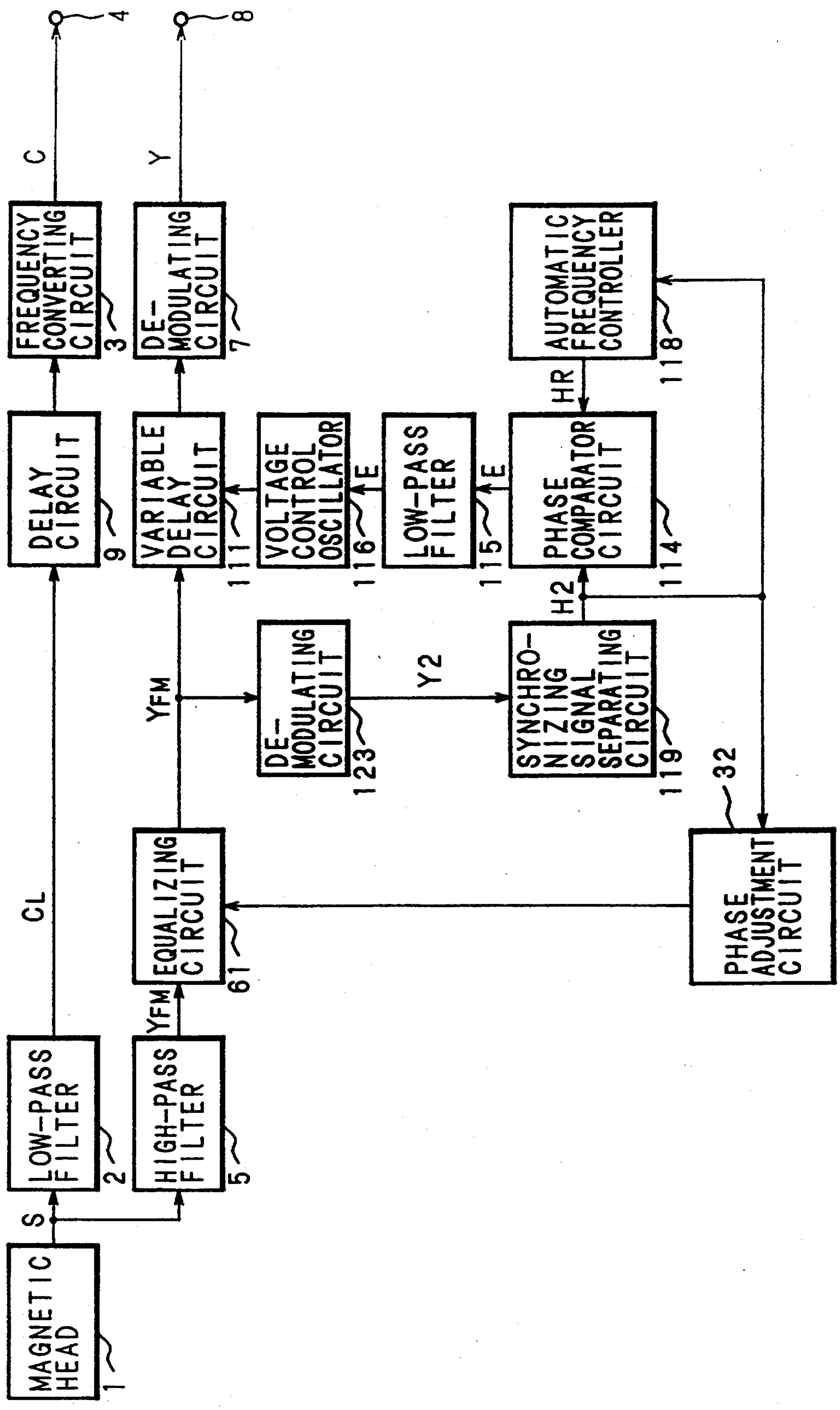

FIG. 37 is a block diagram showing a video signal reproduction apparatus provided with a time base correcting device having further another construction. As opposed to the embodiment shown in FIG. 36 including the time base correcting device wherein the horizontal synchronizing signal H whose time base is corrected is inputted to the AFC 113 to obtain the reference horizontal synchronizing signal HR, and the obtained reference horizontal synchronizing signal HR is fed to the phase comparator circuit 114, the embodiment shown in FIG. 37 includes the time base correcting device having a following construction. A horizontal synchronizing signal H2 is inputted to an AFC 118 before a time base thereof is corrected. In the AFC 118 is obtained a reference horizontal synchronizing signal HR, which is fed to the phase comparator circuit 114. This video signal reproduction apparatus operates similarly to the embodiment shown in FIG. 36, and demonstrates the same effects.

Figure 38:
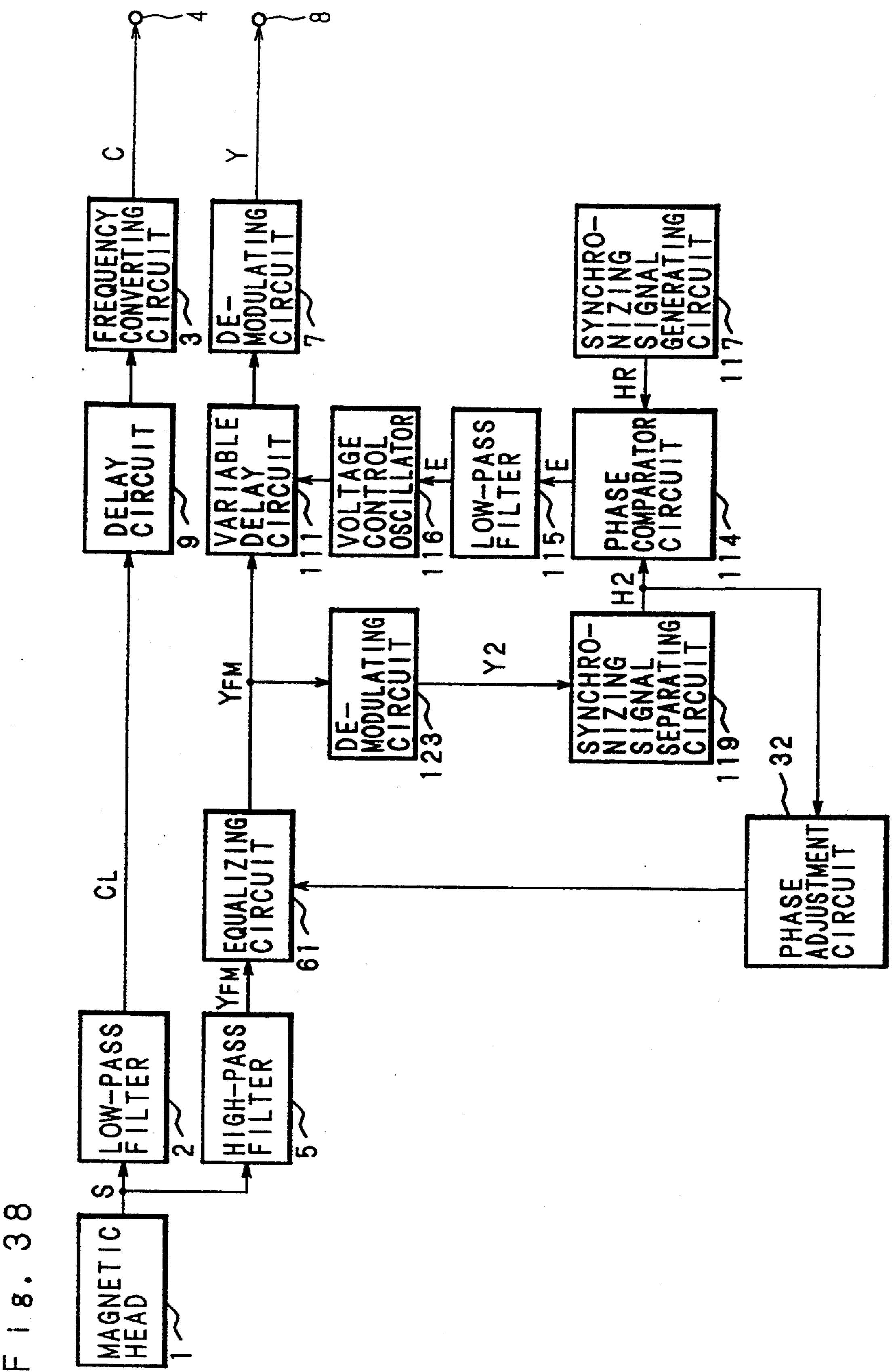

FIG. 38 is a block diagram showing a video signal reproduction apparatus provided with a time base correcting device having another construction. As opposed to the embodiment shown in FIG. 36 including the time base correcting device wherein the horizontal synchronizing signal H whose time base is corrected is inputted to the AFC 113 to obtain the reference horizontal synchronizing signal HR, and the obtained reference horizontal synchronizing signal HR is fed to the phase comparator circuit 114, the embodiment shown in FIG. 38 includes the time base correcting device having a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase comparator circuit 114. This embodiment operates similarly to the embodiment shown in FIG. 36, and demonstrates the same effects.

In the embodiment shown in FIG. 36 or 38, the horizontal synchronizing signal H2 is fed to the phase comparator circuit. 114 and the phase adjustment circuit 32 simultaneously, whereby the control signal is generated which switches the equalizer characteristic of the equalizing circuit 61. However, a control signal may be generated from any signal, provided that it can specify the demodulated portion of the synchronizing signal of the FM luminance signal.

Figure 39:
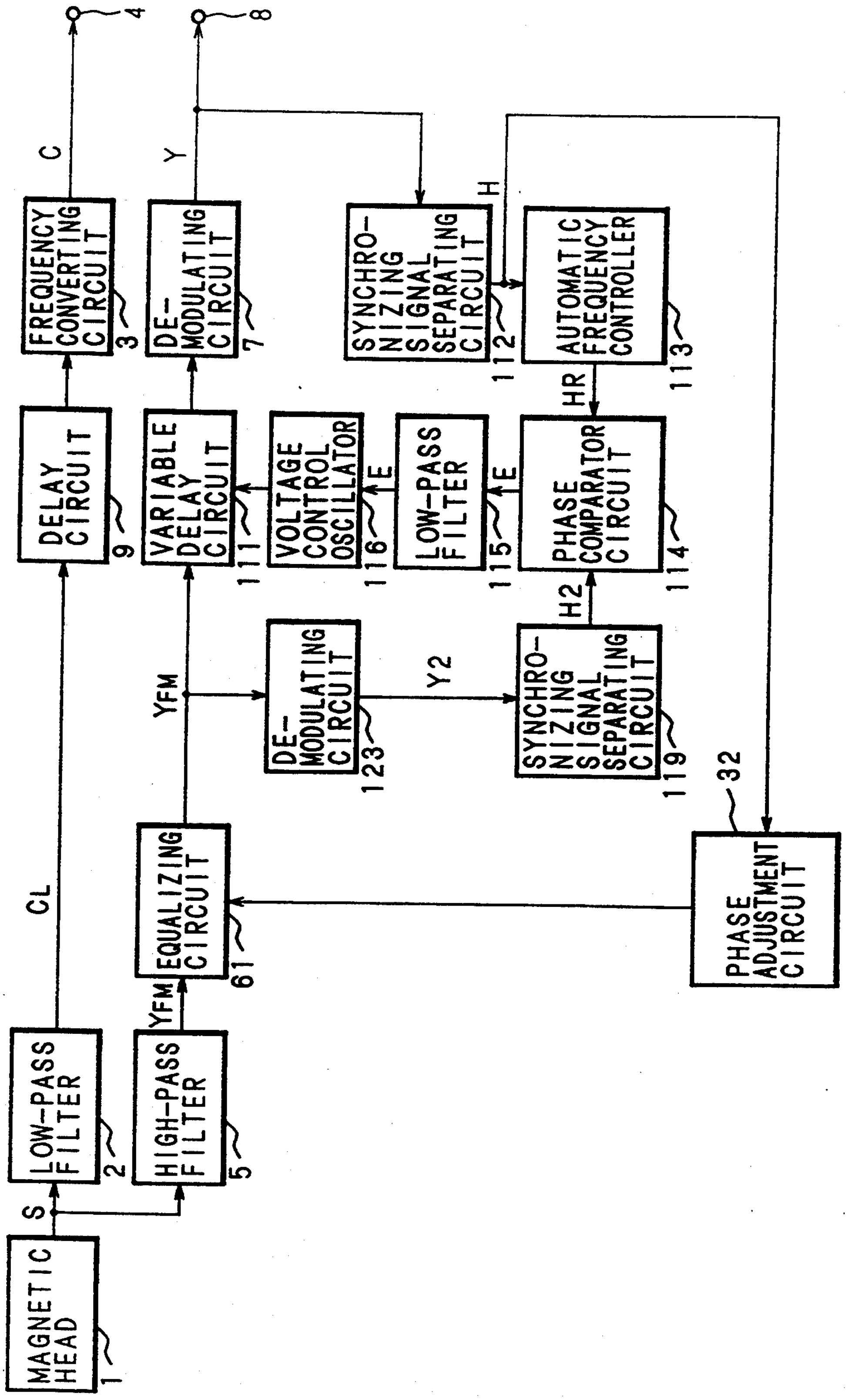

For example, in an embodiment shown in FIG. 39, the invention is applied to a video signal reproduction apparatus provided with a time base correcting device in which a horizontal synchronizing signal H whose time base is corrected is fed to a phase adjustment circuit 32, as opposed to the embodiment shown in FIG. 36 including the time base correcting device in which the horizontal synchronizing signal H2 is fed to the phase adjustment circuit 32 before the time base thereof is corrected. This embodiment operates similarly to the embodiment shown in FIG. 36, and demonstrates the same effects.

Figure 40:
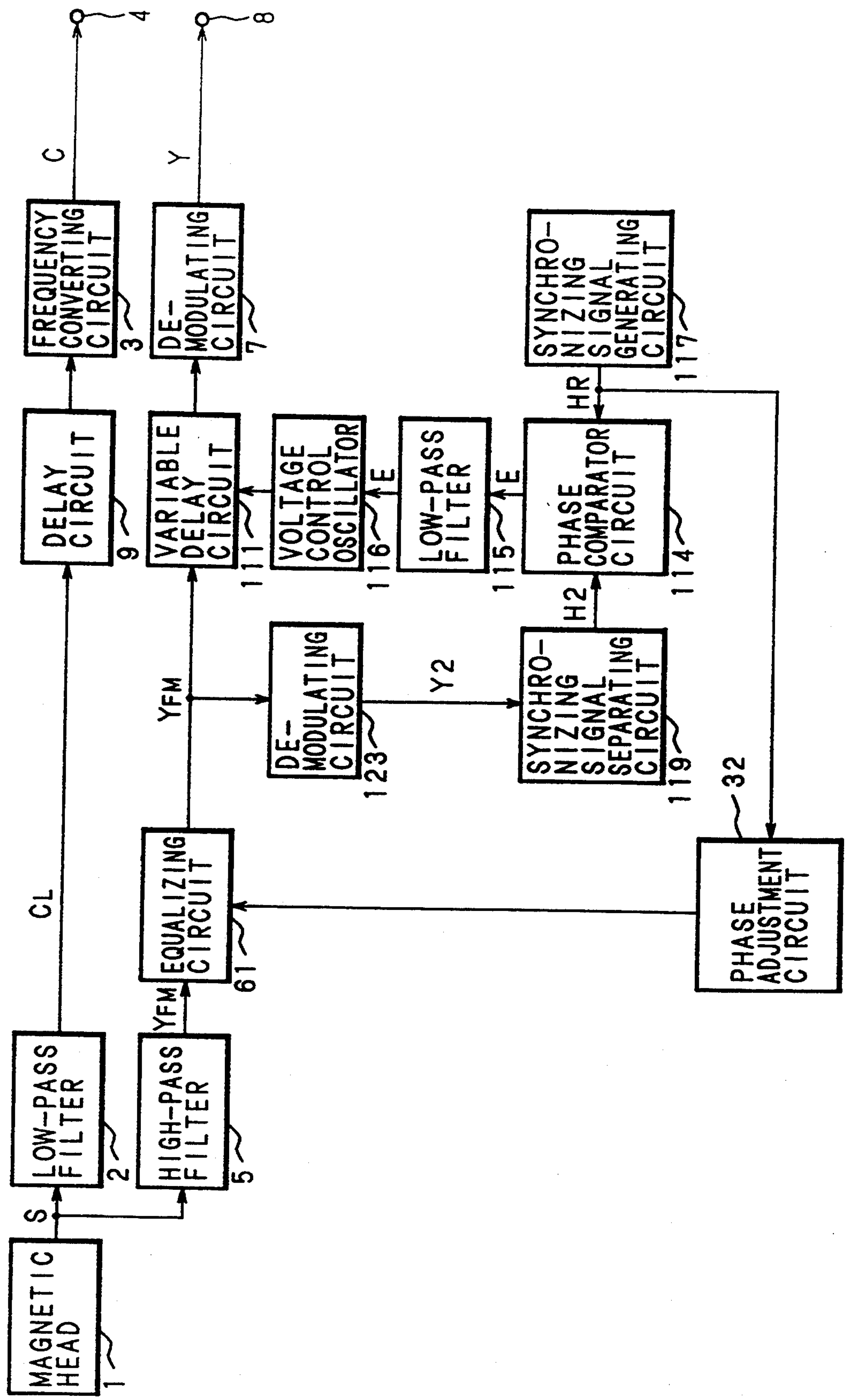
Figure 41:
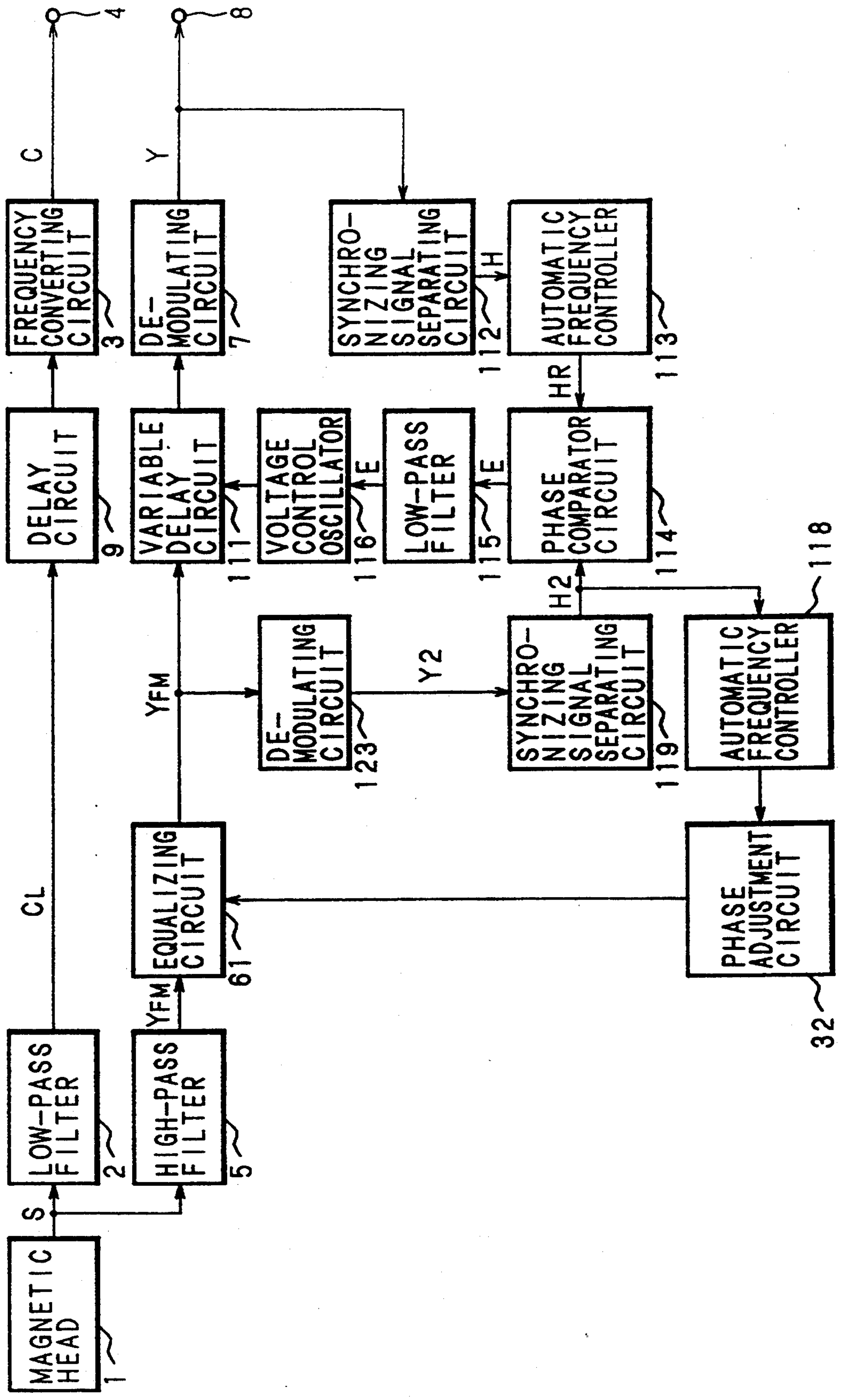
Figure 42:
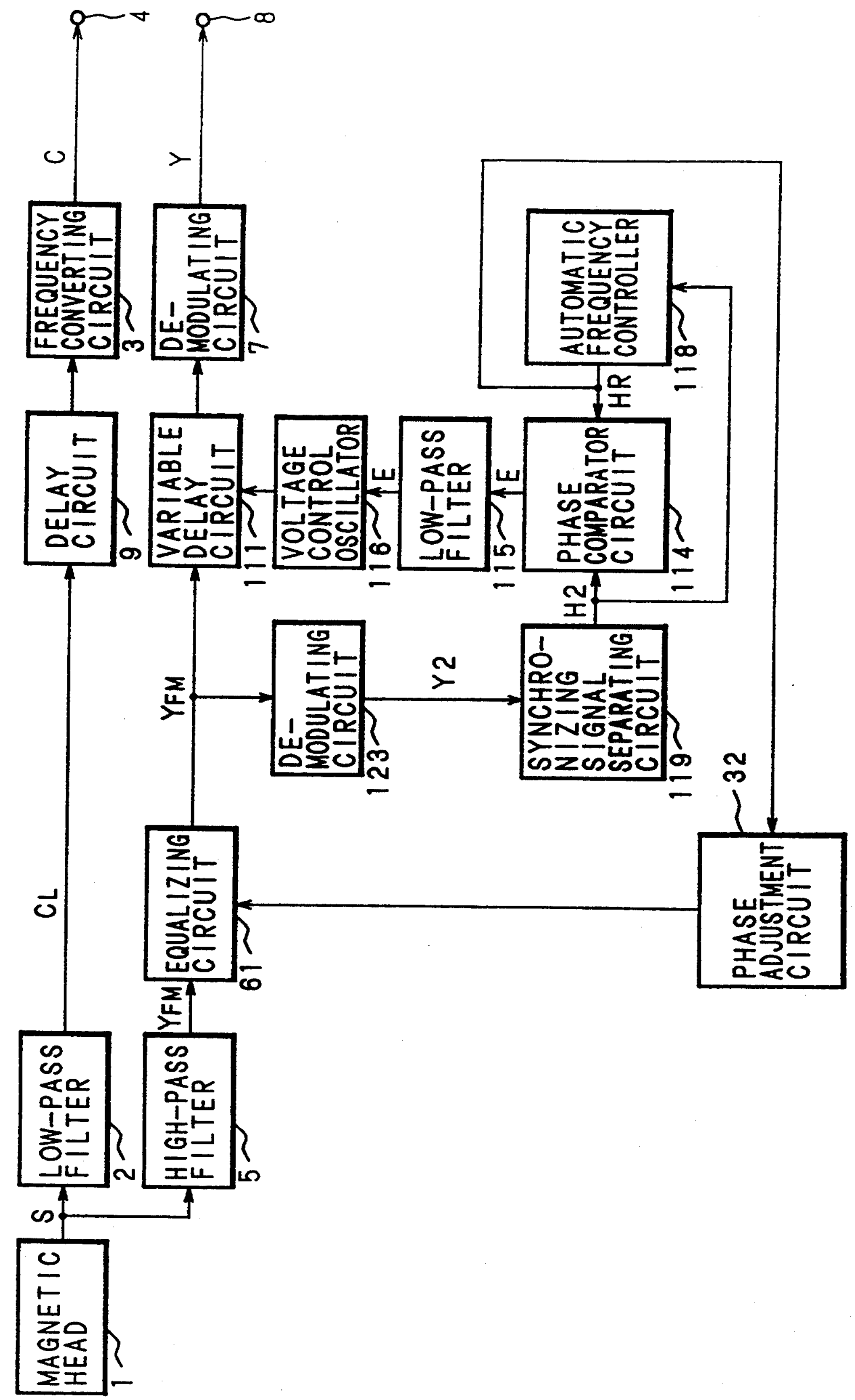
Figure 43:
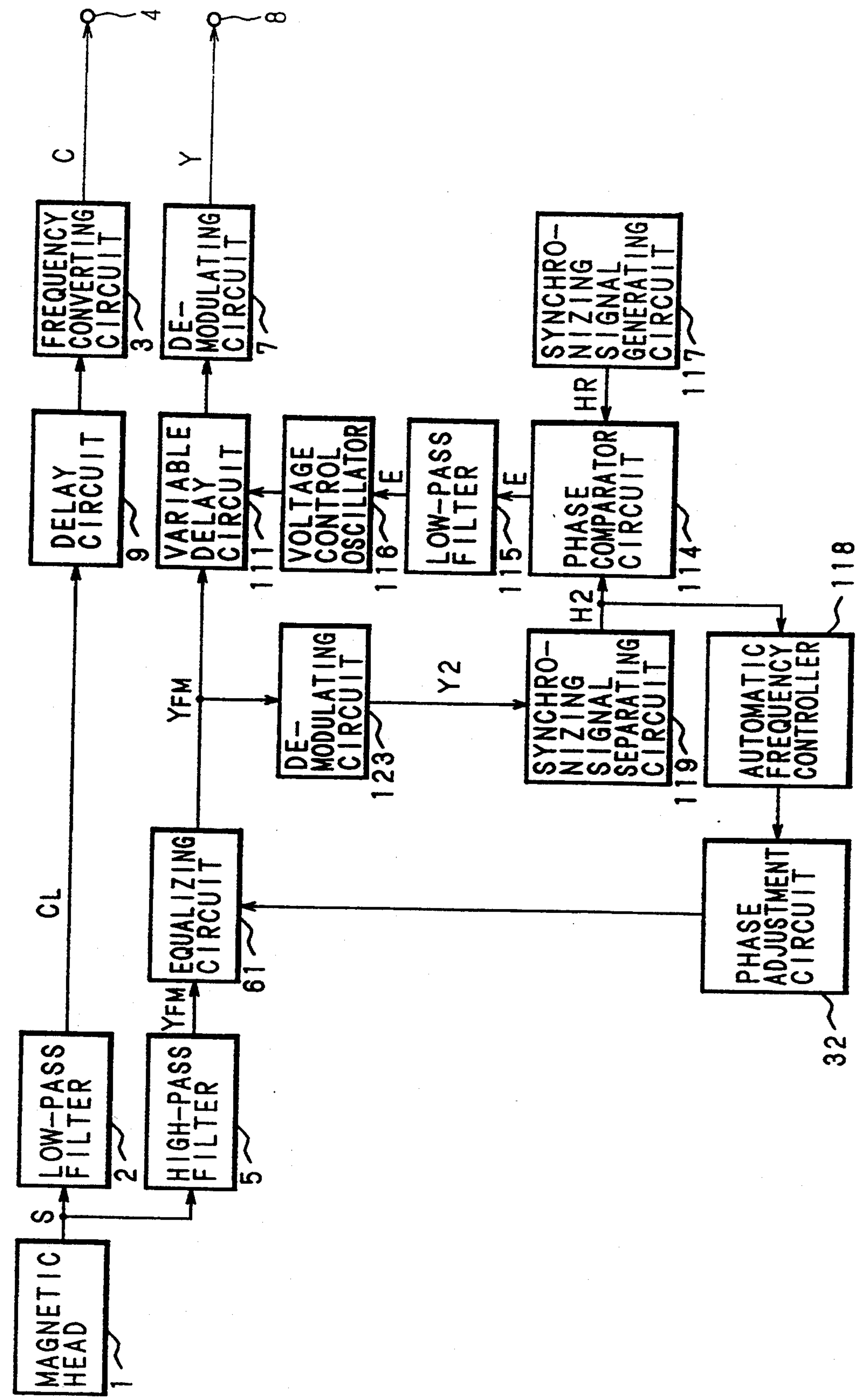
Figure 47:
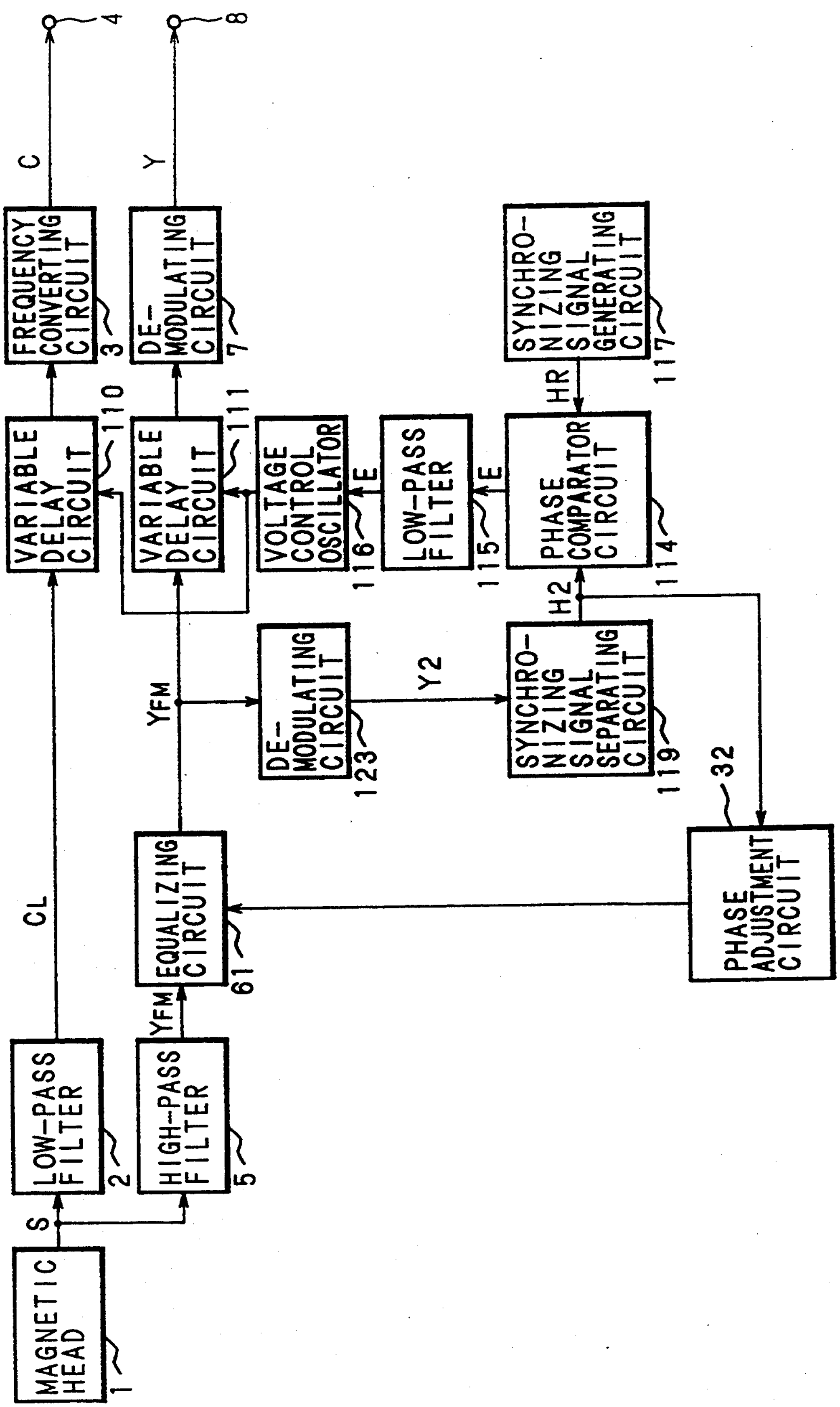
Figure 48:
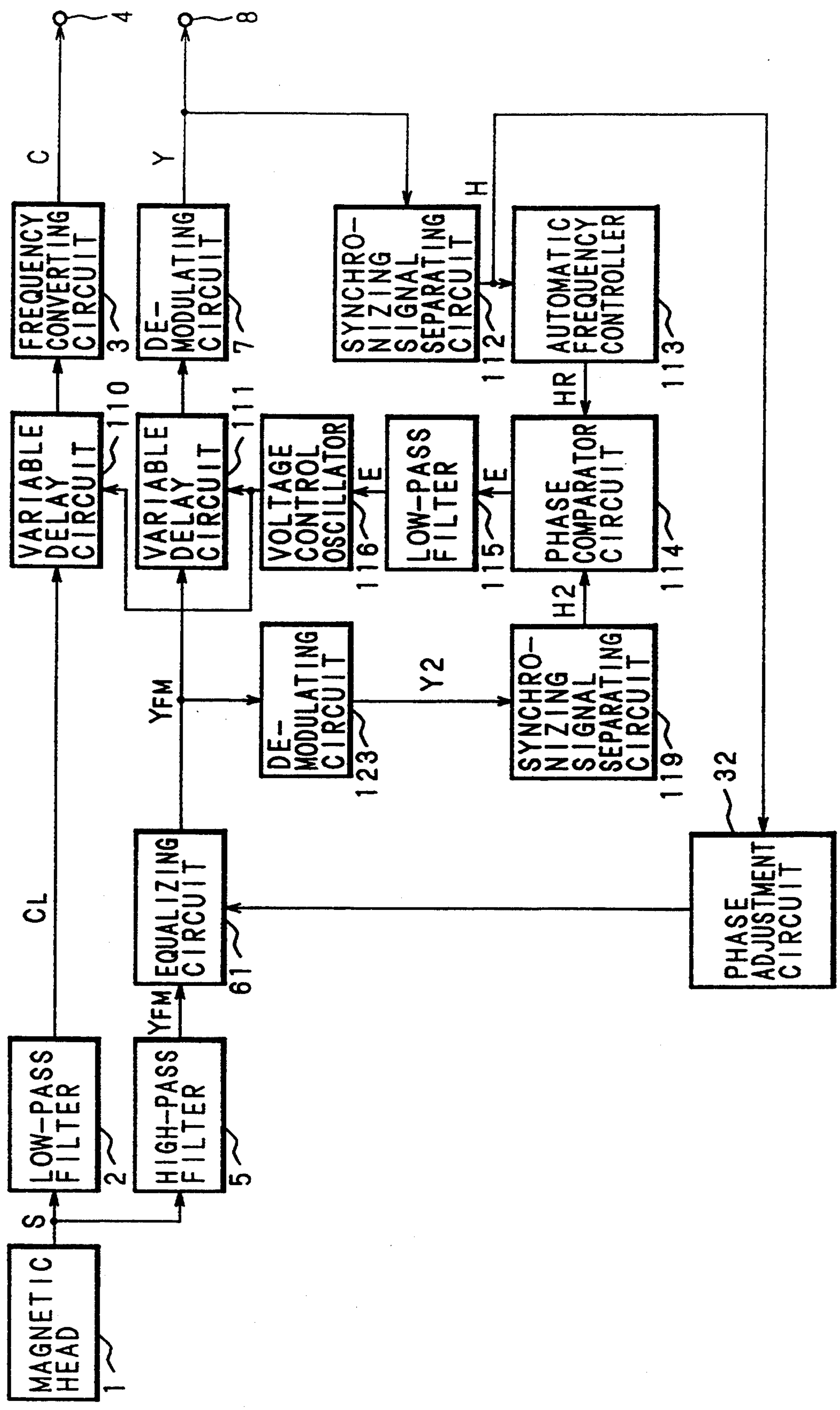
Figure 49:
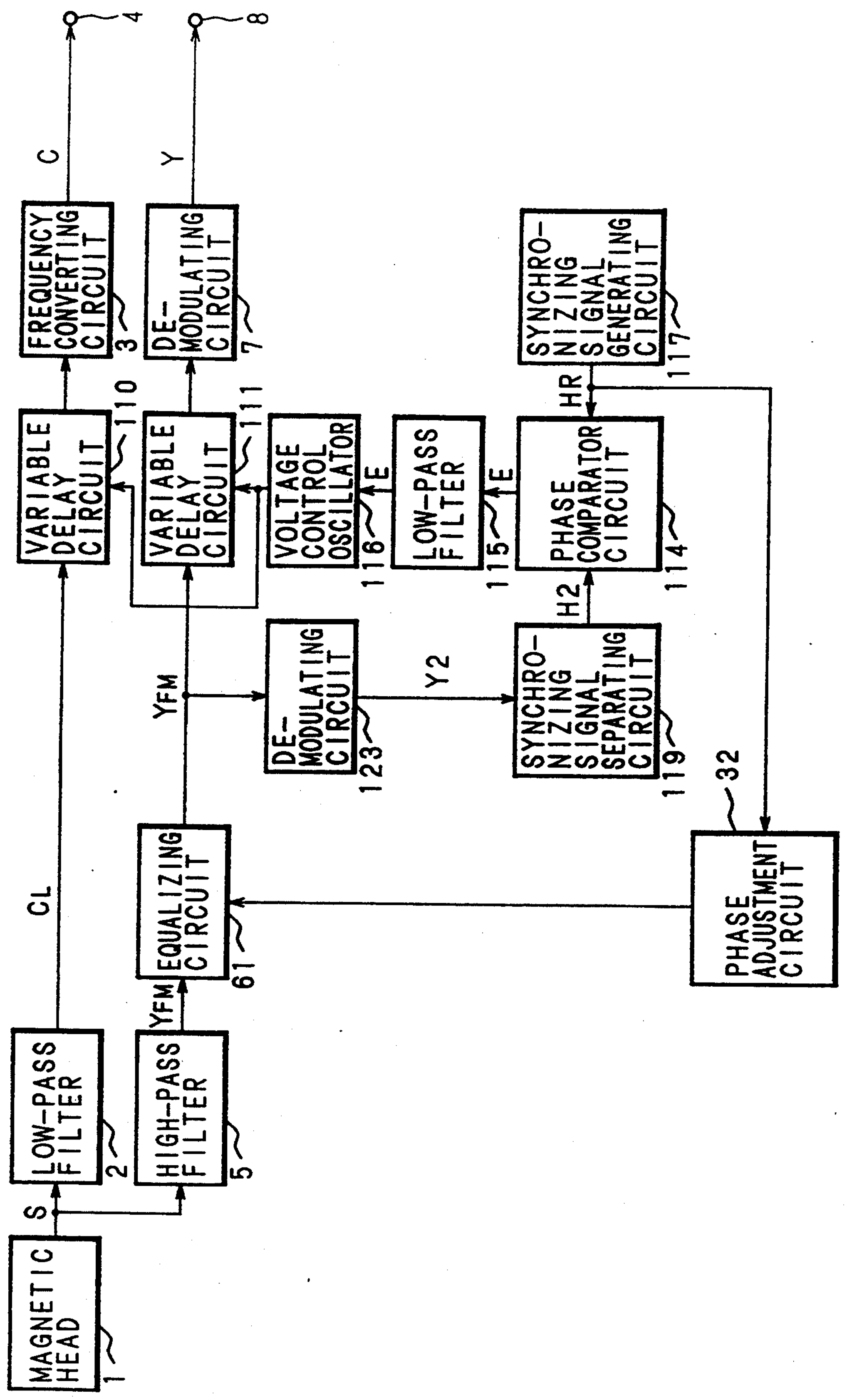
Figure 50:
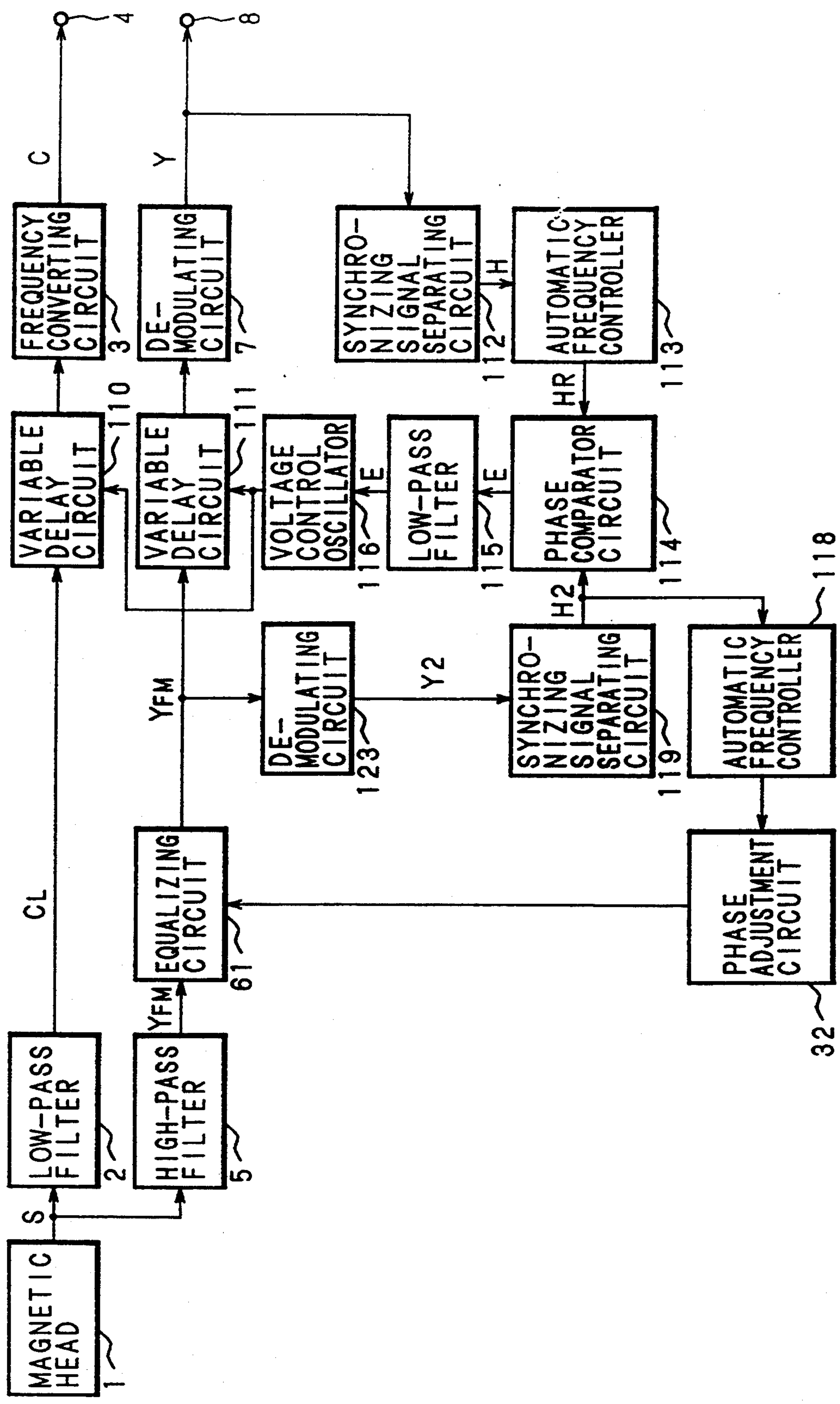
Figure 51:
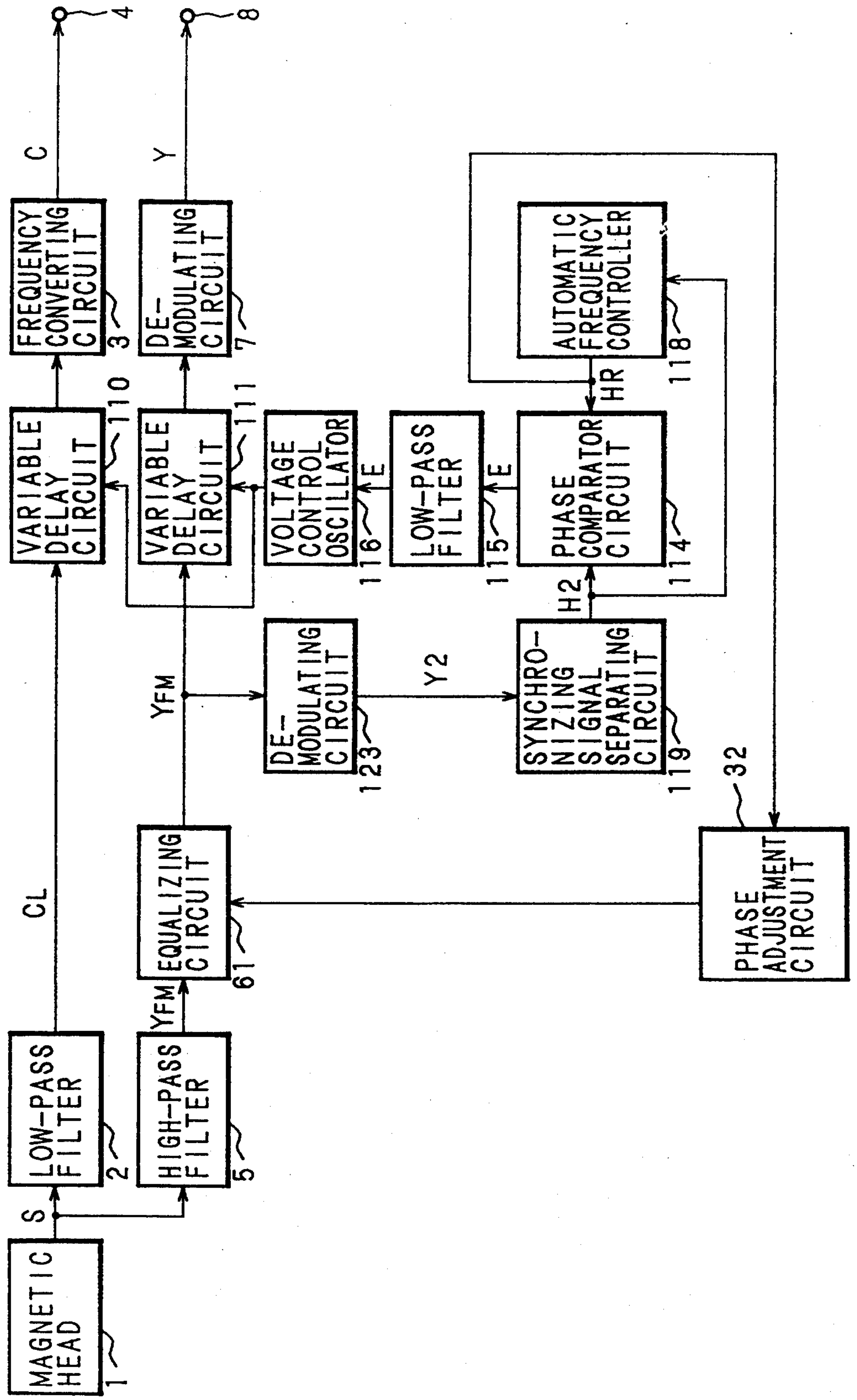
Figure 52:
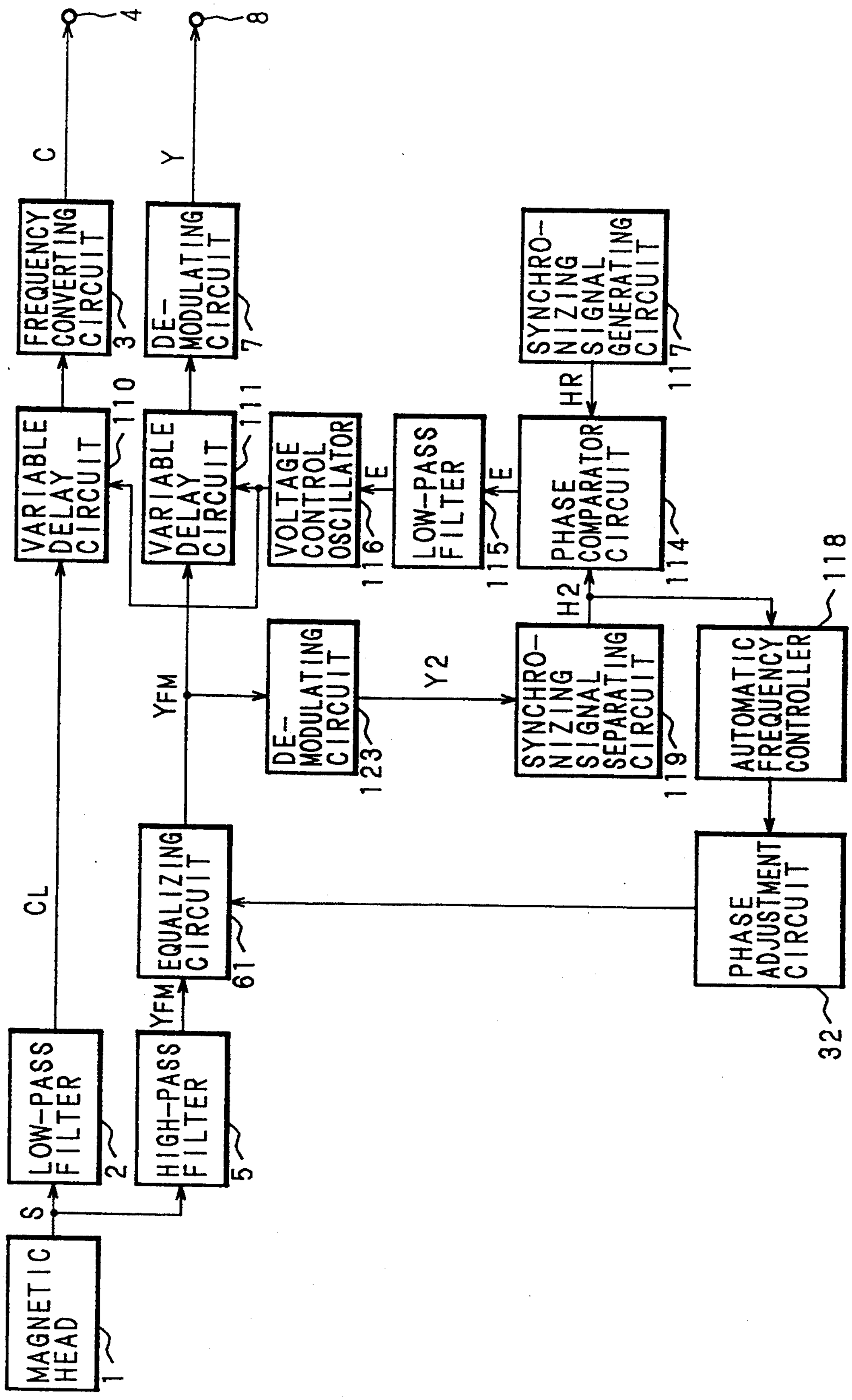
Figure 53:
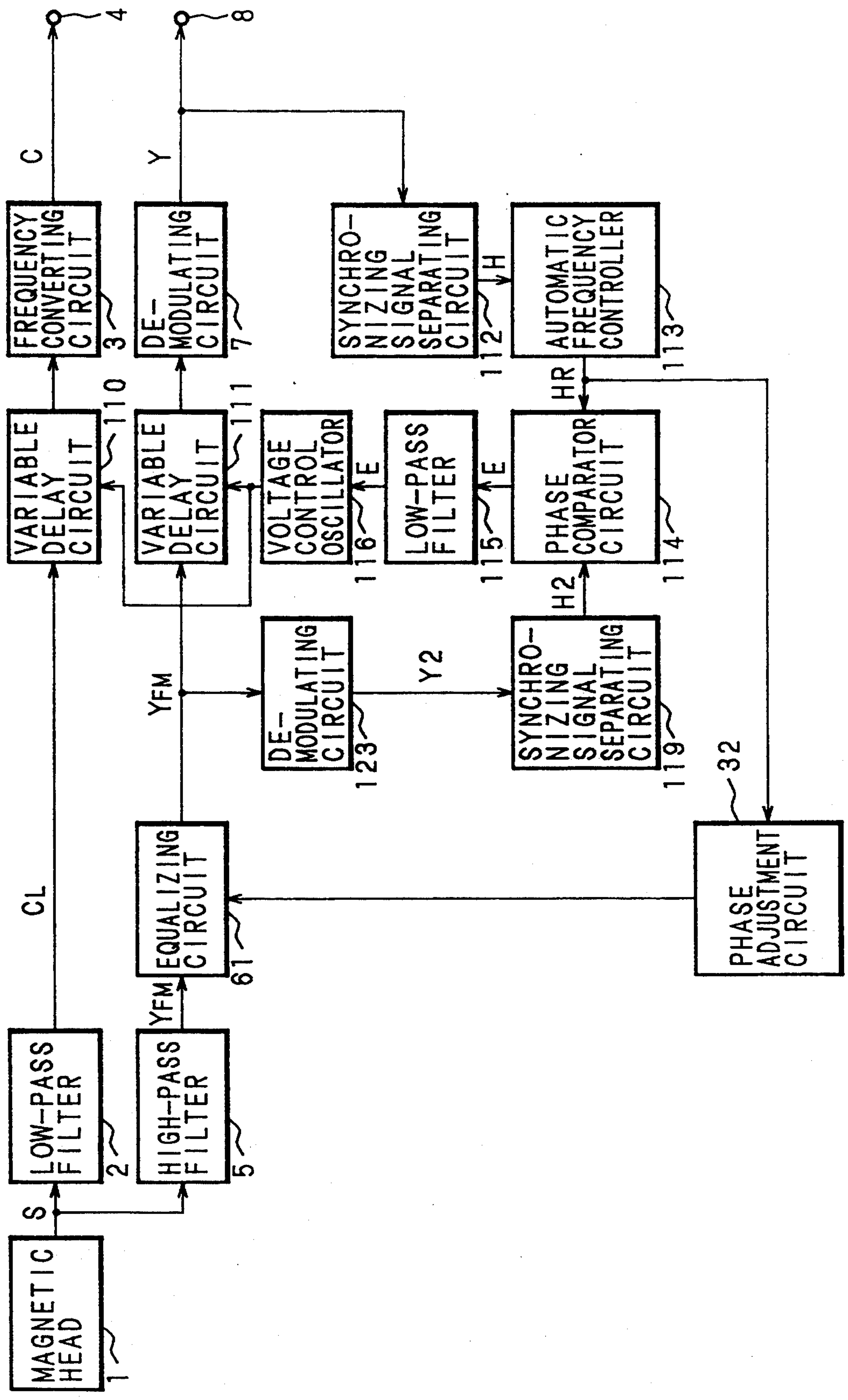

An embodiment shown in FIG. 40 includes a time base correcting device having a following construction as opposed to the time base correcting device included in the embodiment shown in FIG. 38 in which the horizontal synchronizing signal H2 outputted from the synchronizing signal separating circuit 119 is fed to the phase comparator circuit 32. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase adjustment circuit 32. This embodiment operates similarly to the embodiment shown in FIG. 36, and demonstrates the same effects.

In the embodiments shown in FIGS. 36 to 39, the horizontal synchronizing signal outputted from the synchronizing signal separating circuit 112 or the synchronizing signal separating circuit 119 is directly inputted to the phase adjustment circuit 32. However, it may be appropriate that the horizontal synchronizing signal outputted from the synchronizing signal separating circuit 112 or the synchronizing signal separating circuit 119 be fed to an AFC, whereby to be controlled to have a substantially fixed frequency, and the stable horizontal synchronizing signal be inputted to the phase adjustment circuit 32.

For example, in embodiments shown in FIGS. 41 to 44, a horizontal synchronizing signal outputted from a synchronizing signal separating circuit 112 or a synchronizing signal separating circuit 119 is inputted to a phase adjustment circuit 32 through AFCs 113, 118, as opposed to the embodiments shown in FIGS. 36 to 39 in which the horizontal synchronizing signal outputted from the synchronizing signal separating circuit 11.2 or the synchronizing signal separating circuit 119 is directly inputted to the phase adjustment circuit 32. The video signal reproduction apparatus thus constructed demonstrates the same effects as the embodiment shown in FIG. 36.

Further, in the embodiments shown in FIGS. 36 to 44, the invention is applied to the video signal reproduction apparatus provided with the time base correcting device in which only the time base variation of the FM luminance signal YFM is suppressed. However, the invention may be also applied to a video signal reproduction apparatus in which the time base variation not only of an FM luminance signal YFM, but also of a low band converted carrier chrominance signal CL is suppressed.

For example, embodiments shown in FIGS. 45 to 53 has a following construction as opposed to the embodiments shown in FIGS. 36 to 44 in which the variable delay circuit 111 is controlled with the signal outputted from the VCO 116, so that the time base variation of the FM luminance signal YFM can be suppressed. A variable delay circuit 110 to which a low band converted carrier chrominance signal CL is inputted is controlled with an output signal of a VCO 116, so that the time base variation not only of an FM luminance signal YFM, but also of a low band converted carrier chrominance signal CL is suppressed.

Figure 6:
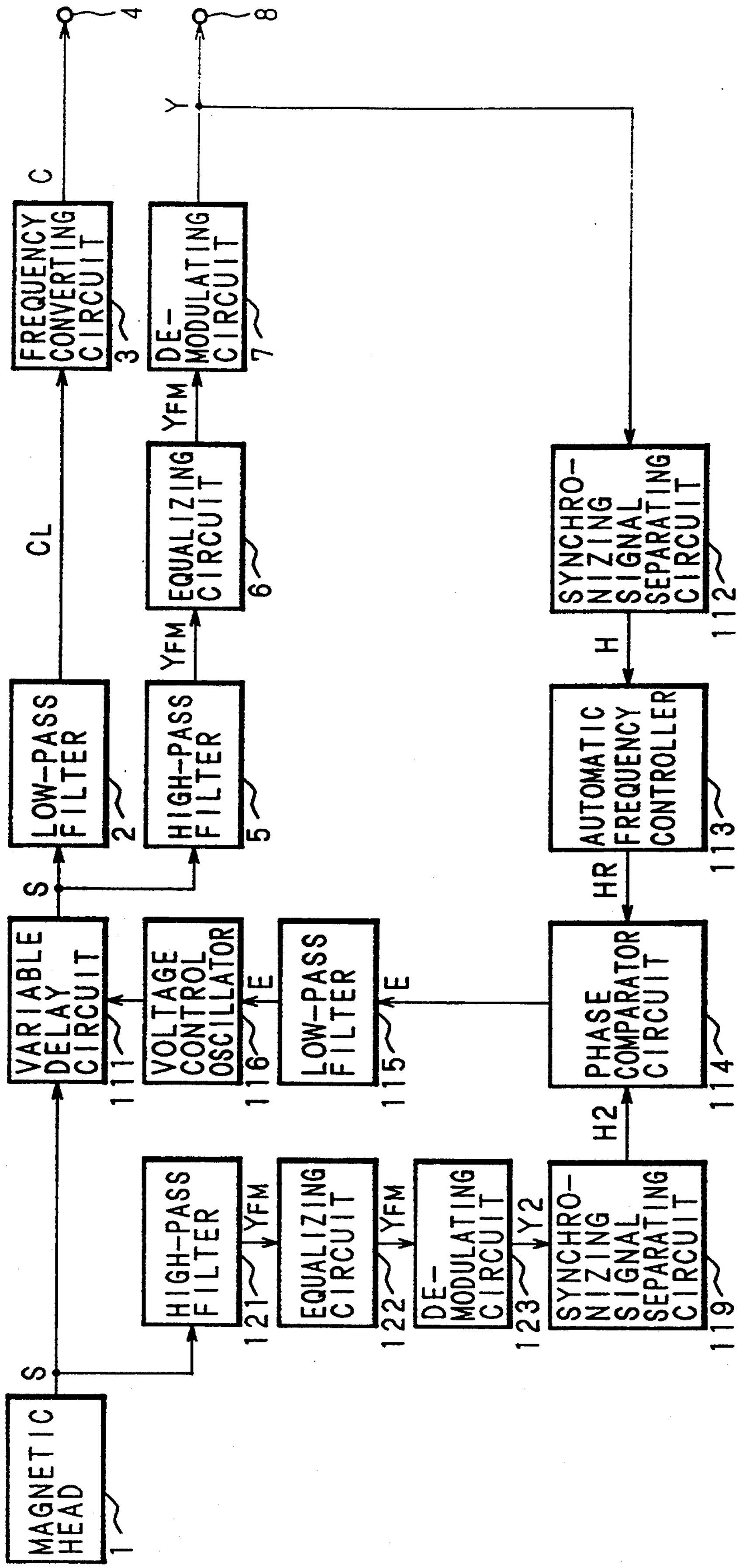
Figure 54:
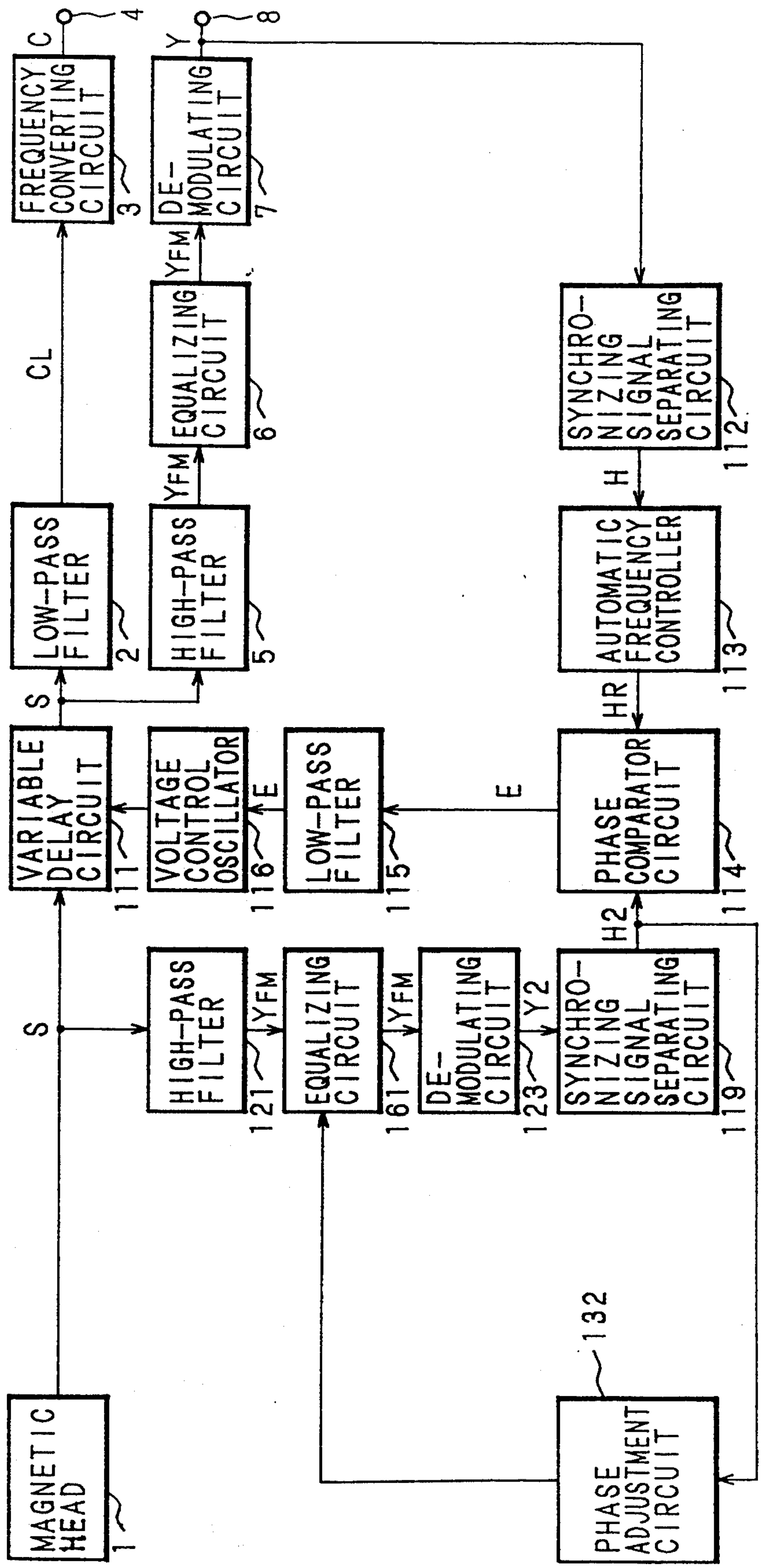
FIG. 54 is a block diagram showing a time base correcting device of an embodiment according to the invention, together with a video signal reproduction apparatus into which the time base correcting device is incorporated.

FIG. 54 is a block diagram showing a time base correlating device of an embodiment according to the invention together with a video signal reproduction apparatus into which the time base correcting device is incorporated. In FIG. 54, indicated at 132 is a phase adjustment circuit constructed similarly to the phase adjustment circuit 32 shown in FIG. 7, and at 161 an equalizing circuit constructed similarly to the equalizing circuit 61 shown in FIG. 7. Other elements identical to those shown in FIG. 6 are indicated by the same reference numerals.

Next, there will be described an operation of the time base correcting device shown in FIG. 54. It should be noted that description of portions which operate in the same manner as those shown in FIG. 6 is left out. A demodulating circuit 123 demodulates an FM luminance signal YFM to reproduce a luminance signal Y2, and feeds the luminance signal Y2 to a synchronizing signal separating circuit 119. The synchronizing signal separating circuit 119 extracts only a horizontal synchronizing signal H2 from the luminance signal Y2 by removing a video signal portion therefrom, and feeds the horizontal synchronizing signal H2 to a phase comparator circuit 114 and a phase adjustment circuit 132 simultaneously. The phase adjustment circuit 132 adjusts the phase and a pulse duration of a control signal on the basis of the horizontal synchronizing signal H2, and feeds the adjusted control signal to the equalizing circuit 161. The control signal is indicative of a command to switch an equalizer characteristic of the equalizing circuit 161 with demodulated portions of the synchronizing signal and the video signal of the FM luminance signal YFM inputted to the equalizing circuit 161. It is possible to adopt a construction, for example, as shown in FIG. 8 as a phase adjustment circuit 132. Accordingly, pulses including a portion corresponding to the horizontal synchronizing signal shown in FIG. 9(*d*) are inputted to the equalizing circuit 161 as described above. The equalizing circuit 161, for example, has a construction as shown in FIG. 10 or 12. When the construction shown in FIG. 12 is adopted, a first and a second equalizing circuits 616, 617 may be constructed as shown in FIG. 14 or 15. Accordingly, the equalizing circuit 161 is allowed to have an equalizer characteristic which raises a frequency band corresponding to a synchronizing signal from a sync chip to a pedestal level of the FM luminance signal when the control signal outputted from the phase adjustment circuit 132 is in the H-level.

The demodulating circuit 123 demodulates the FM luminance signal YFM whose frequency band corresponding to the synchronizing signal from the sync chip to the pedestal level is raised to reproduce the luminance signal Y2. Accordingly, the demodulating circuit 123 feeds the luminance signal Y2 whose synchronizing signal portion has a good S/N to the synchronizing signal separating circuit 119. The synchronizing signal separating circuit 119 extracts the horizontal synchronizing signal H2 having a good S/N, and feeds the extracted horizontal synchronizing signal H2 to the phase comparator circuit 114. The phase comparator circuit 114 compares the horizontal synchronizing signal H2 having a good S/N outputted from the synchronizing signal separating circuit 119 and the reference horizontal synchronizing signal HR outputted from an AFC 113. Accordingly, a time base error included in the horizontal synchronizing signal H2 can be accurately detected, and an accurate time base error signal E can be fed to an LPF 115. The LPF 115 feeds the time base error signal E having its noise component removed therefrom to a VCO 116. The VCO 116 oscillates at a frequency according to the level of the accurate time base error signal E, and its oscillating frequency serves to accurately compensate for the time base variation included in a frequency multiplexed signal S inputted to the variable delay circuit 111.

Further, in the foregoing embodiment., the invention is embodied in the time base correcting device in which the horizontal synchronizing signal H whose time base is corrected is inputted to the AFC 113 to obtain the reference horizontal synchronizing signal HR. However, the invention can be embodied in any time base correcting device, provided that a time base error included in a frequency multiplexed signal S is extracted by comparing a horizontal synchronizing signal and a reference horizontal synchronizing signal in the time base correcting device. A process for obtaining the reference horizontal synchronizing signal HR is not limited in the time base correcting device in which the invention is embodied.

FIG. 55 is a block diagram showing a video signal reproduction apparatus provided with a time base correcting device having further another construction. As opposed to the embodiment shown in FIG. 54 including the time base correcting device wherein the horizontal synchronizing signal H whose time base is corrected is inputted to the AFC 113 to obtain the reference horizontal synchronizing signal HR, and the obtained reference horizontal synchronizing signal HR is fed to the phase comparator circuit 114, the embodiment shown in FIG. 55 includes the time base correcting device having a following construction. A horizontal synchronizing signal H2 is inputted to an AFC 118 before a time base thereof is corrected. In the AFC 118 is obtained a horizontal synchronizing signal H2, which is fed to the phase comparator circuit 114. This video signal reproduction apparatus operates similarly to the embodiment shown in FIG. 54, and demonstrates the same effects.

FIG. 56 is a block diagram showing a video signal reproduction apparatus provided with a time base correcting device having still further another construction. As opposed to the embodiment shown in FIG. 54 including the time base correcting device wherein the horizontal synchronizing signal H whose time base is corrected is inputted to the AFC 113 to obtain the reference horizontal synchronizing signal HR, and the obtained reference horizontal synchronizing signal HR is fed to the phase comparator circuit 114, the embodiment shown in FIG. 56 includes the time base correcting device having a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase comparator 114. This embodiment operates similarly to the embodiment shown in FIG. 54, and demonstrates the same effects.

In the embodiment shown in FIG. 54 or 56, the horizontal synchronizing signal H2 is fed to the phase comparator circuit 114 and the phase adjustment circuit 132 simultaneously, whereby the control signal is generated which switches the equalizer characteristic of the equalizing circuit 161. However, a control signal may be generated from any signal, provided that it can specify the demodulated portion of the synchronizing signal of the FM luminance signal.

Figure 57:
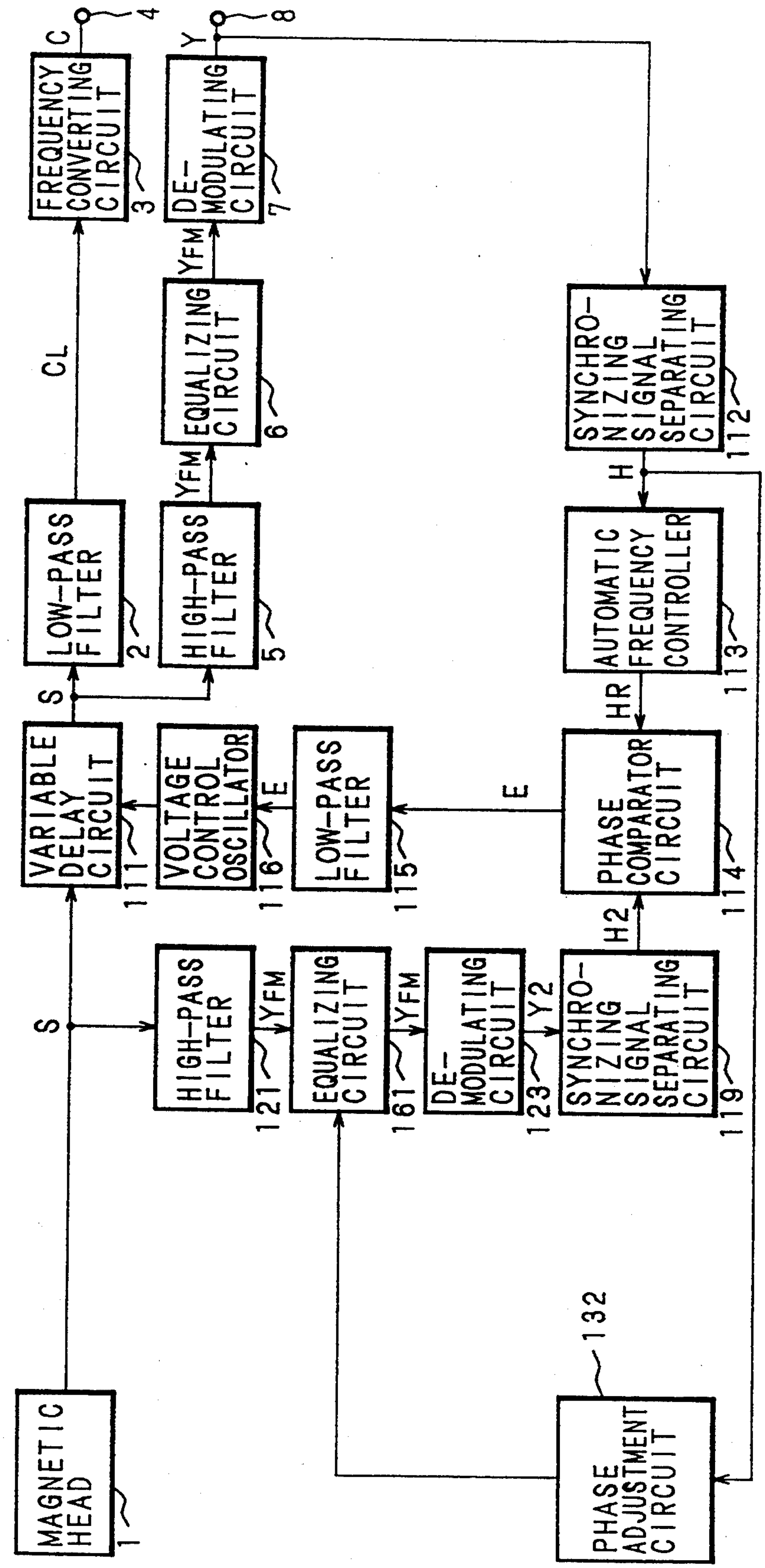

For example, in an embodiment shown in FIG. 57, the invention is applied to a video signal reproduction apparatus provided with a time base correcting device in which a horizontal synchronizing signal H whose time base is corrected is fed to a phase adjustment circuit 132, as opposed to the embodiment shown in FIG. 54 including the time base correcting device in which the horizontal synchronizing signal H2 is fed to the phase adjustment circuit 132 before the time base thereof is corrected. This embodiment operates similarly to that shown in FIG. 54, and demonstrates the same effects.

Figure 58:
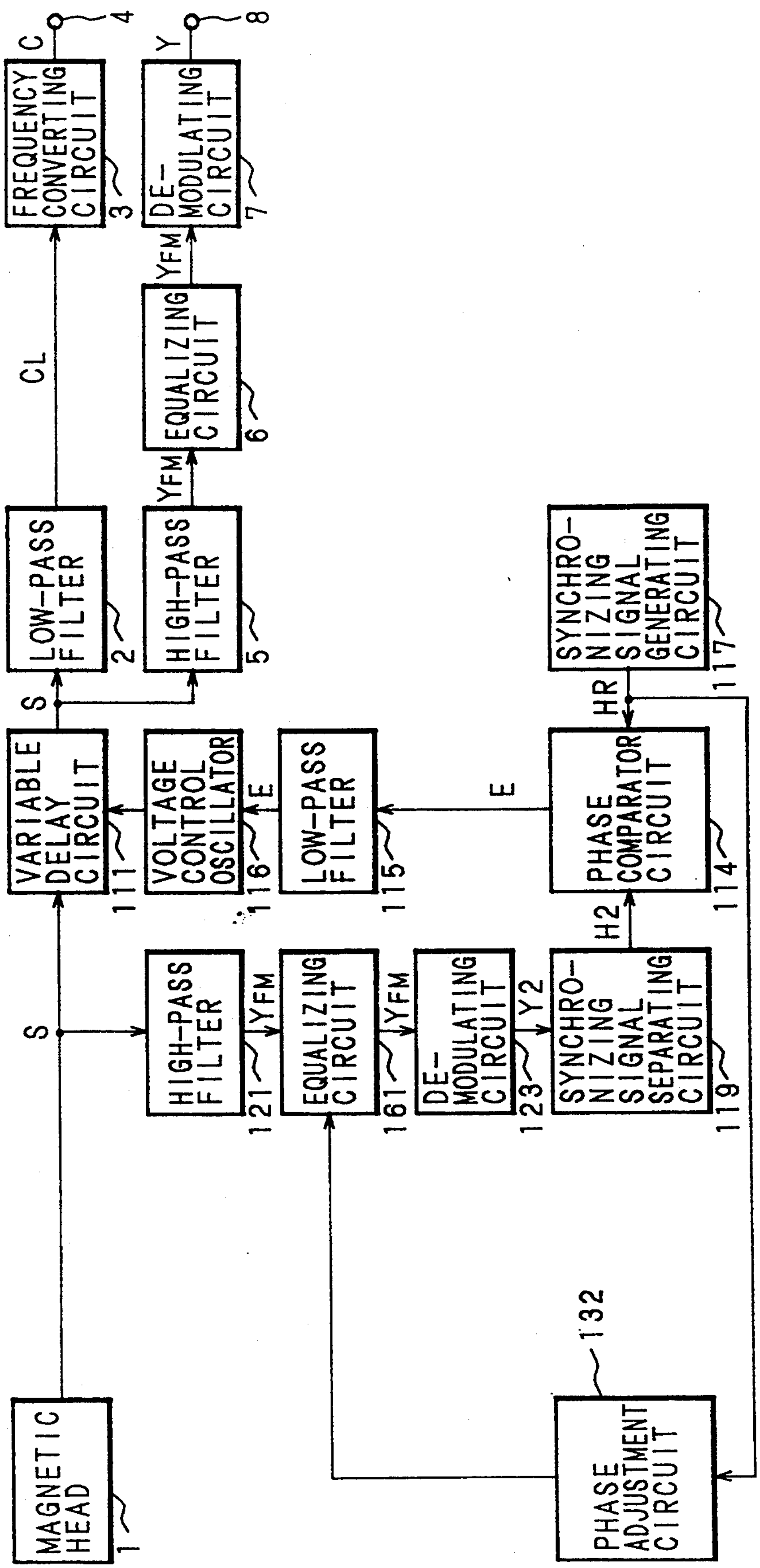
Figure 59:
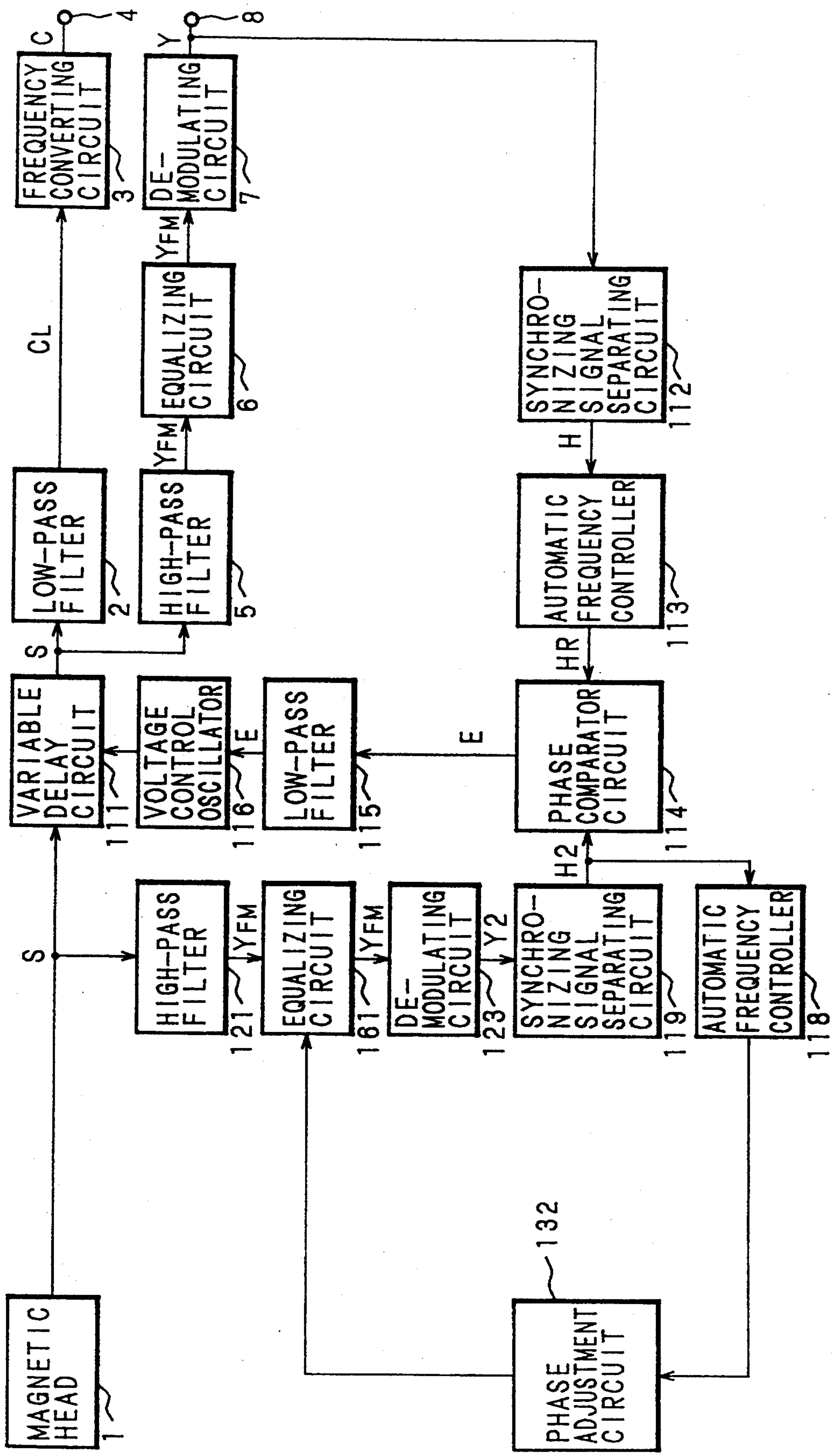
Figure 60:
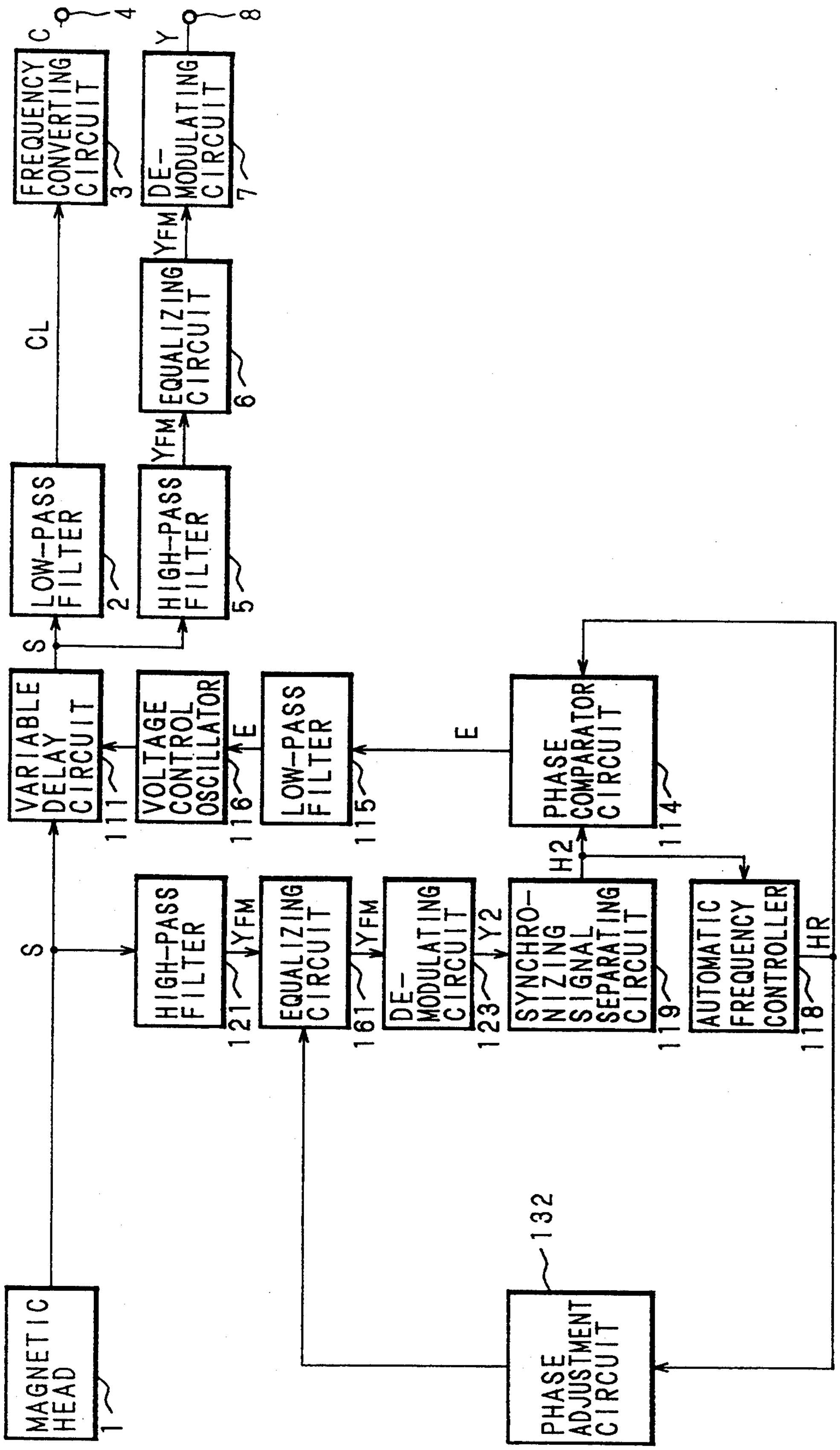
Figure 61:
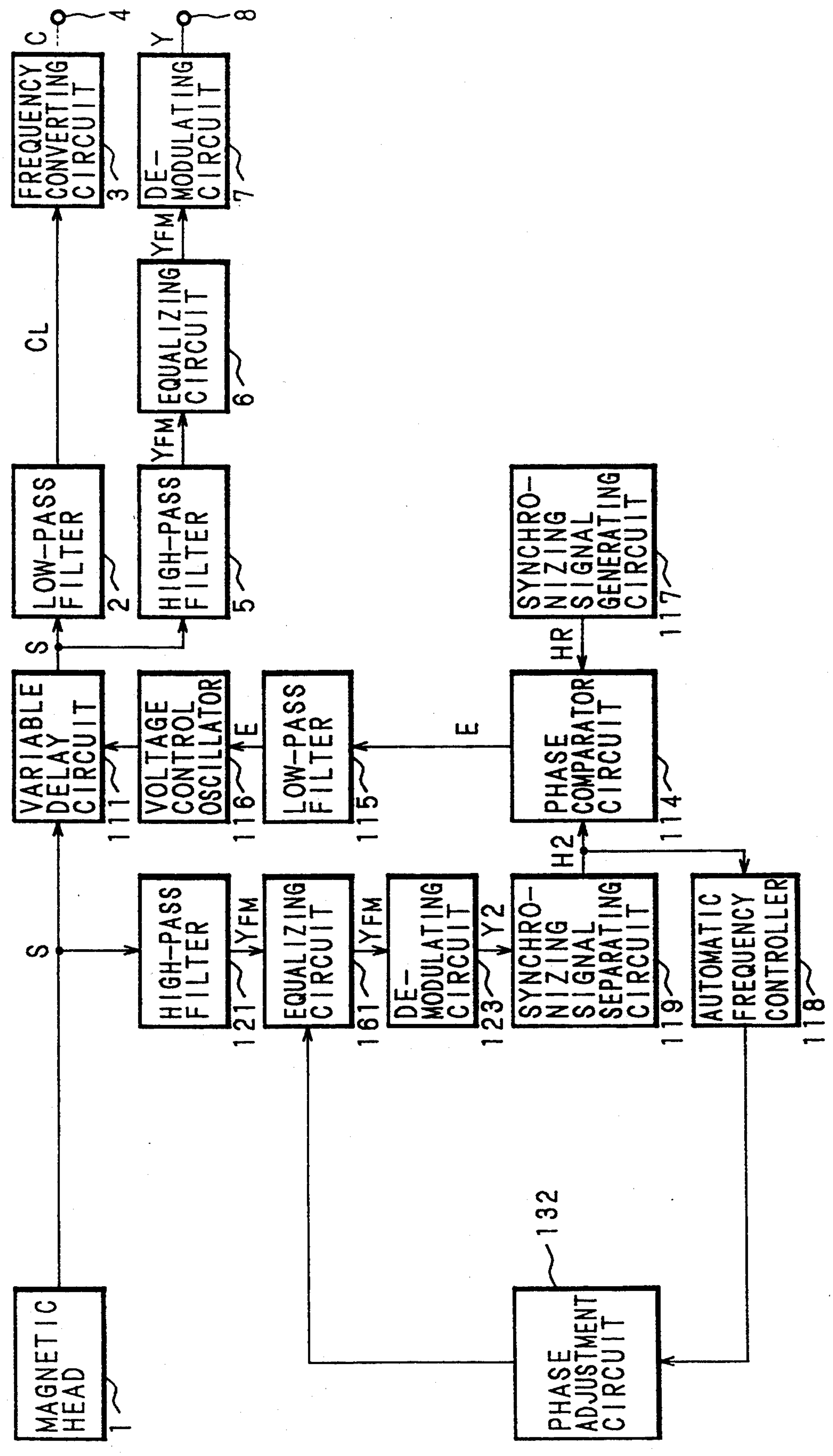
Figure 62:
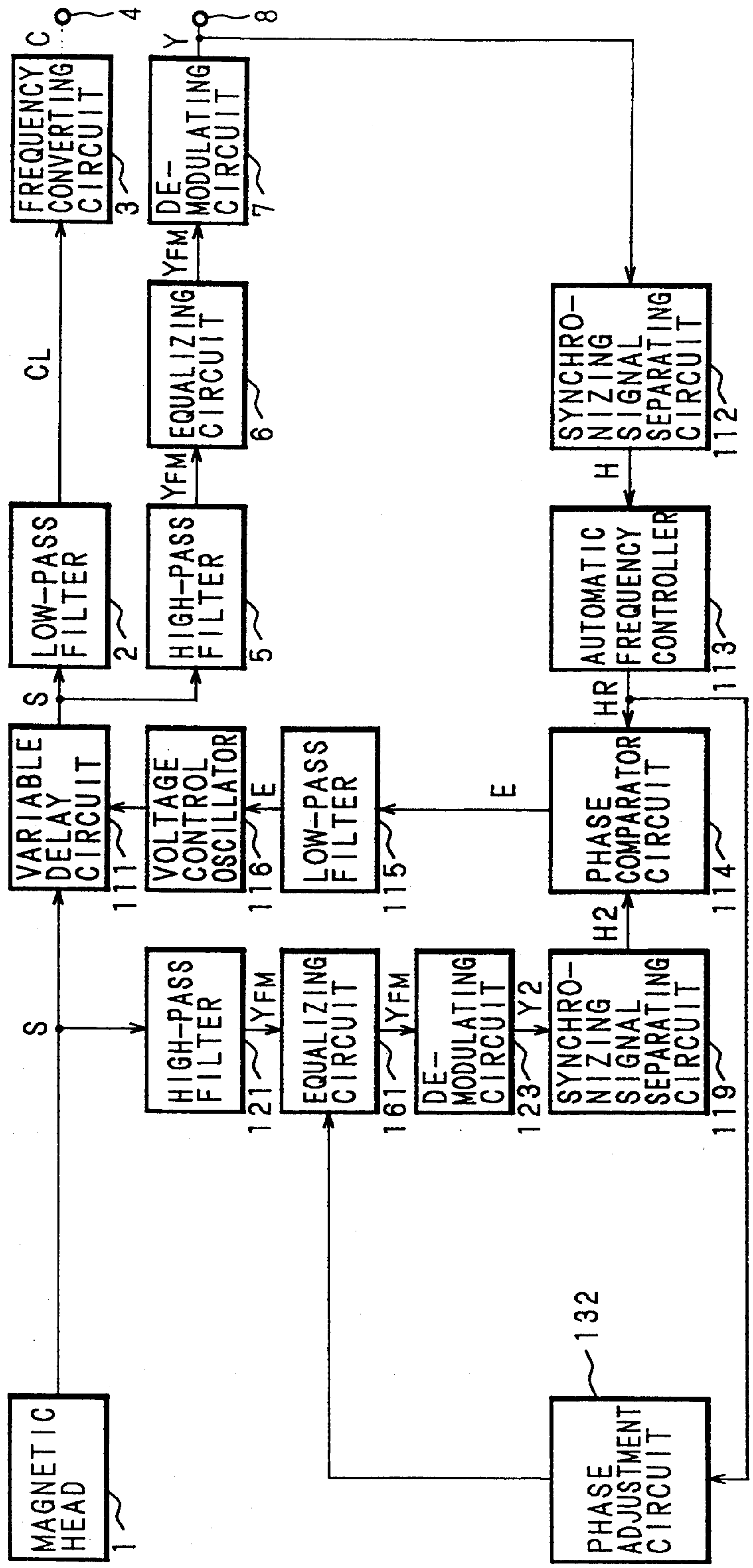

Further, an embodiment shown in FIG. 58 includes a time base correcting device in which a reference horizontal synchronizing signal HR is obtained in a synchronizing signal generating circuit 117 for dividing an oscillating frequency created by a crystal oscillator to generate a synchronizing signal as opposed to the embodiment shown in FIG. 56 including the time base correcting device in which the horizontal synchronizing signal H2 outputted from the synchronizing signal separating circuit 119 is fed to the phase comparator circuit 132. This embodiment operates similarly to the embodiment shown in FIG. 54, and demonstrates the same effects.

In the embodiments shown in FIGS. 54 to 57, the horizontal synchronizing signal outputted from the synchronizing signal separating circuit 112 or the synchronizing signal separating circuit 119 is directly inputted to the phase adjustment circuit 132. However, it may be appropriate that a horizontal synchronizing signal outputted from a synchronizing signal separating circuit 112 or a synchronizing signal separating circuit 119 be fed to an AFC, whereby to be controlled to have a substantially fixed frequency, and the stable horizontal synchronizing signal be inputted to the phase adjustment circuit 132.

For example, in embodiments shown in FIGS. 59 to 62, a horizontal synchronizing signal outputted from a synchronizing signal separating circuit. 112 or a synchronizing signal separating circuit 119 is inputted to a phase adjustment circuit 132 through AFCs 113, 118, as opposed to the embodiments shown in FIGS. 54 to 57 in which the horizontal synchronizing signal outputted from the synchronizing signal separating circuit 112 or the synchronizing signal separating circuit 119 is directly inputted to the phase adjustment circuit 132. The video signal reproduction apparatus thus constructed demonstrates the same effects as the embodiment shown in FIG. 54.

Figure 63:
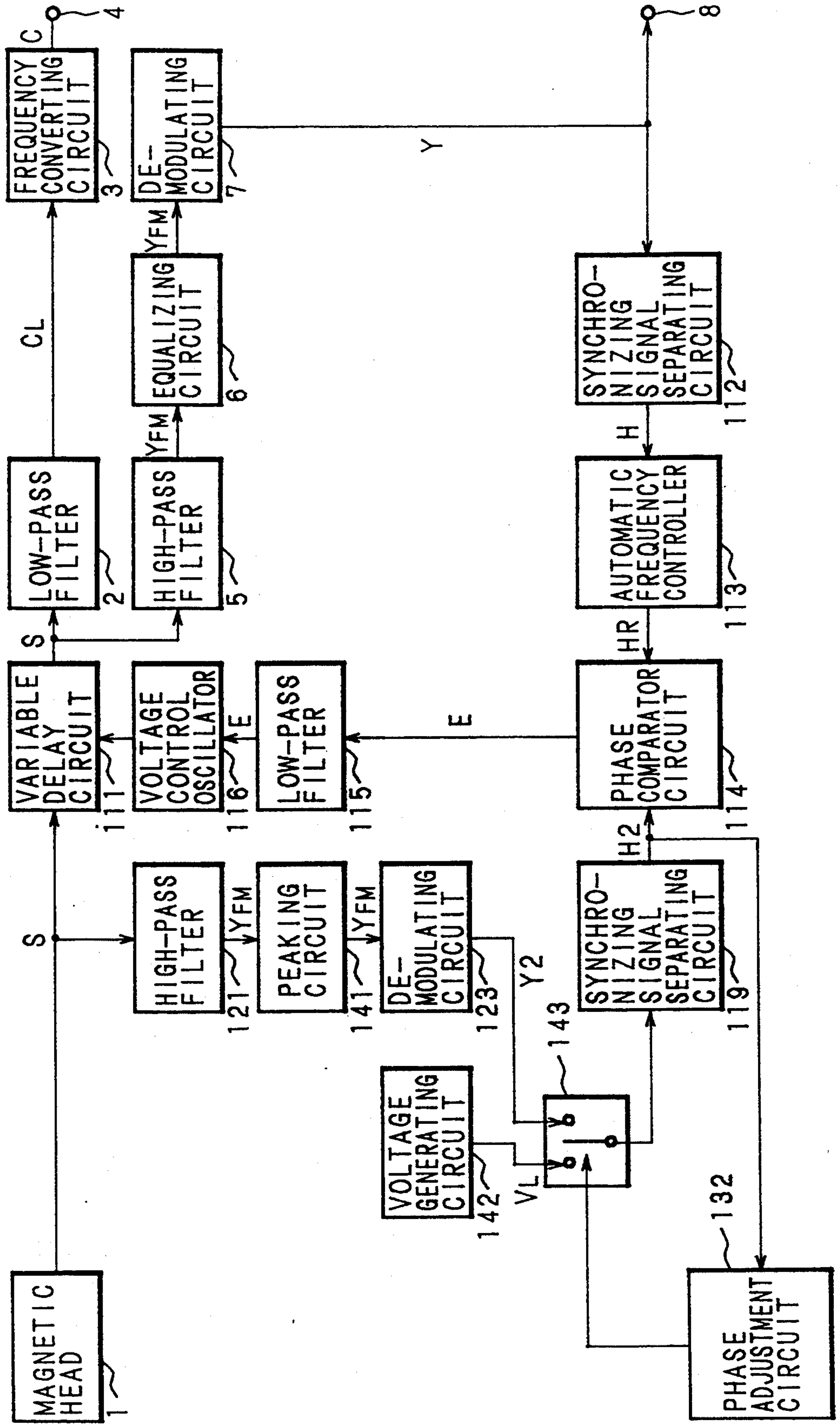

FIG. 63 is a block diagram showing a time base correcting device of another embodiment according to the invention, together with a video signal reproduction apparatus into which the time base correcting device is incorporated. In FIG. 63, indicated at 141 is a peaking circuit, at 142 a voltage generating circuit, at 143 a switching circuit, and at 132 a phase adjustment circuit. The peaking circuit 141 has a characteristic which raises a frequency band corresponding to a synchronizing signal from a sync chip to a pedestal level of an FM luminance signal YFM outputted from a HPF 121. The voltage generating circuit 142 is adapted for generating a voltage between a pedestal level and a white peak. The switching circuit 143 is adapted for switchingly outputting a luminance signal Y2 outputted from a demodulating circuit 123 and a voltage outputted from the voltage generating circuit 142 in accordance with a control signal. The phase adjustment circuit 132 is adapted for adjusting the phase of a pulse duration of a horizontal synchronizing signal H2 outputted from a synchronizing signal separating circuit 119. Other elements identical to those shown in FIG. 6 are indicated by the same reference numerals.

Next, there will be described an operation of the time base correcting device shown in FIG. 63. It should be noted that description of portions which operate in the same manner as those shown in FIG. 6 is left out. The HPF 121 extracts the FM luminance signal YFM from a frequency multiplexed signal S outputted from a magnetic head 1, and feeds the extracted FM luminance signal YFM to the peaking circuit 141. The peaking circuit 141 has such a characteristic that raises a frequency band corresponding to a synchronizing signal from a sync chip to a pedestal level of the FM luminance signal (For example, a frequency band shown in FIG. 11 in the S-VHS system), and feeds the resultant FM luminance signal YFM to the demodulating circuit 123. The FM luminance signal outputted from the peaking circuit 141 comes to have the larger amplitude in the synchronizing signal portion while having the smaller amplitude in a part of the video signal portions where a demodulated carrier frequency is high. Accordingly, there are cases where carrier losses occur.

The demodulating circuit 123 demodulates the FM luminance signal YFM to reproduce a luminance signal Y2, and feed the reproduced luminance signal Y2 to one of input terminals provided in the switching circuit 143. The synchronizing signal portion of the luminance signal Y2 outputted from the demodulating circuit 123 has a better S/N than before. However, there are cases where an inversion occurs in the video signal portion. The voltage generating circuit 142 generates a desired voltage VL between the pedestal level and the white peak, and feeds the generated voltage to the other input terminal provided in the switching circuit 143. The synchronizing signal separating circuit 119 feeds the horizontal synchronizing signal H2 to the phase comparator circuit 114 and the phase adjustment circuit 132. The phase adjustment circuit 132 adjusts the phase and a pulse duration of a control signal on the basis of the horizontal synchronizing signal H2, and feeds the adjusted control signal to the switching circuit 143. The control signal is indicative of a command to switch connection of the switching circuit 143 with the synchronizing signal portion and the video signal portion of the luminance signal Y2 fed to the switching circuit 143. The construction shown in FIG. 8 may be adopted as a phase adjustment circuit 132. Accordingly, as described above, the phase adjustment, circuit 132 outputs the control signal to cause the portion including the horizontal synchronizing signal as shown in FIG. 9(*d*) to be in the H-level.

The switching circuit 143 switchingly controls the signals inputted from the demodulating circuit 123 and the voltage generating circuit 142 in accordance with the control signal fed from the phase adjustment circuit 132, and the output signal of the switching circuit 143 is fed to the synchronizing signal separating circuit 119. When the signal corresponding to the video signal portion of the luminance signal Y2 is being outputted from the phase adjustment circuit 132, i.e., when the signal shown in FIG. 9(*d*) is in the L-level, the switching circuit 143 selects a voltage VL fed from the voltage generating circuit 142, and outputs the same. On the other hand, when the signal corresponding to the portion centering the horizontal synchronizing signal of the luminance signal Y2 is being outputted from the phase adjustment circuit 132, i.e., when the signal shown in FIG. 9(*d*) is in the H-level, the switching circuit 143 selects the luminance signal Y2 fed from the demodulating circuit 123, and outputs the same. In the output signal of the switching circuit 143, the video signal portion where the inversion is liable to occur is replaced by the desired voltage VL between the pedestal level and the white peak. The synchronizing signal separating circuit 119 is not to erroneously operate on the signal whose level is below the pedestal level due to the inversion. Accordingly, the synchronizing signal separating circuit 119 is capable of accurately extracting the horizontal synchronizing signal H2 whose S/N is good, and feeds the extracted horizontal synchronizing signal H2 to the phase comparator circuit 114. The phase comparator circuit 114 compares the horizontal synchronizing signal H2 whose S/N is good with a reference horizontal synchronizing signal HR outputted from an AFC. Accordingly, a time base error included in the horizontal synchronizing signal H2 can be accurately detected, and therefore an accurate time base error signal E is fed to an LPF 115. The LPF 115 removes a noise component from the time base error signal E, and feeds the resultant time base error signal E to a VCO 116. The VCO 116 oscillates at a frequency according to the level of the accurate time base error signal E whose noise component is removed therefrom. As a consequence, an oscillating frequency of the VCO 116 serves to accurately compensate for the time base variation included in a frequency multiplexed signal S inputted to a variable delay circuit 111.

In the foregoing embodiment, the invention is applied to the time base correcting device in which the horizontal synchronizing signal H whose time base is corrected is inputted to the AFC 113 to obtain the reference horizontal synchronizing signal HR. However, the invention can be applied to any time base correcting device, provided that the time base variation included in a frequency multiplexed signal S is extracted by comparing a horizontal synchronizing signal and a reference horizontal synchronizing signal in the time base correcting device. A process for obtaining the reference horizontal synchronizing signal is not limited in the time base correcting device in which the invention is embodied.

Figure 64:
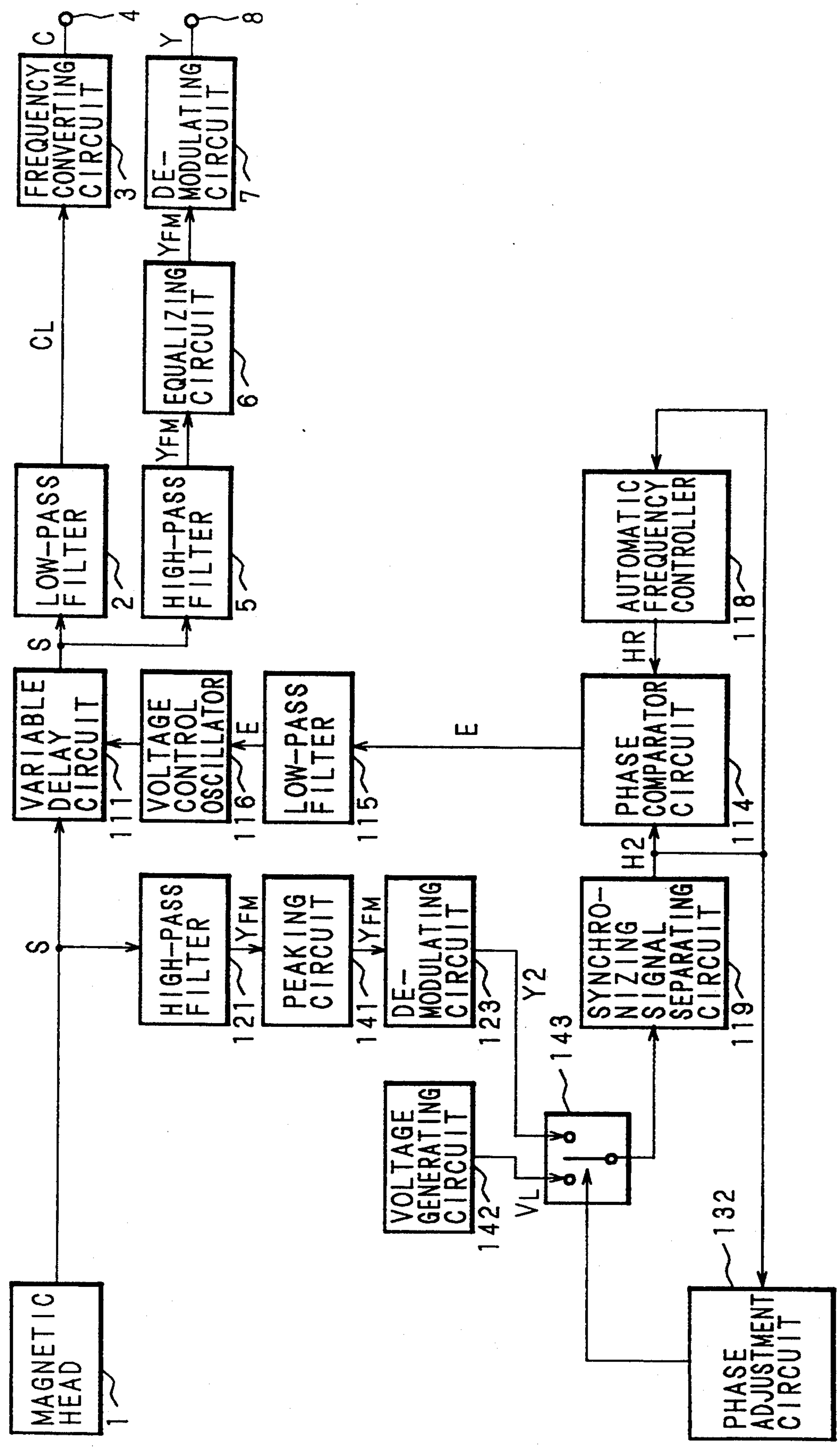

FIG. 64 is a block diagram showing a video signal reproduction apparatus provided with a time base correcting device of further another embodiment according to the invention. As opposed to the embodiment shown in FIG. 63 in which the horizontal synchronizing signal H whose time base is corrected is inputted to the AFC 113 to obtain the reference horizontal synchronizing signal HR, which is then fed to the phase comparator circuit 114, an embodiment shown in FIG. 64 has a following construction. A horizontal synchronizing signal H2 is inputted to an AFC 118 before a time base thereof is corrected. In the AFC 118 is obtained a reference horizontal synchronizing signal HR, which is then fed to the phase comparator circuit 114. This embodiment operates similarly to the embodiment shown in FIG. 63, and demonstrates the same effects.

Figure 65:
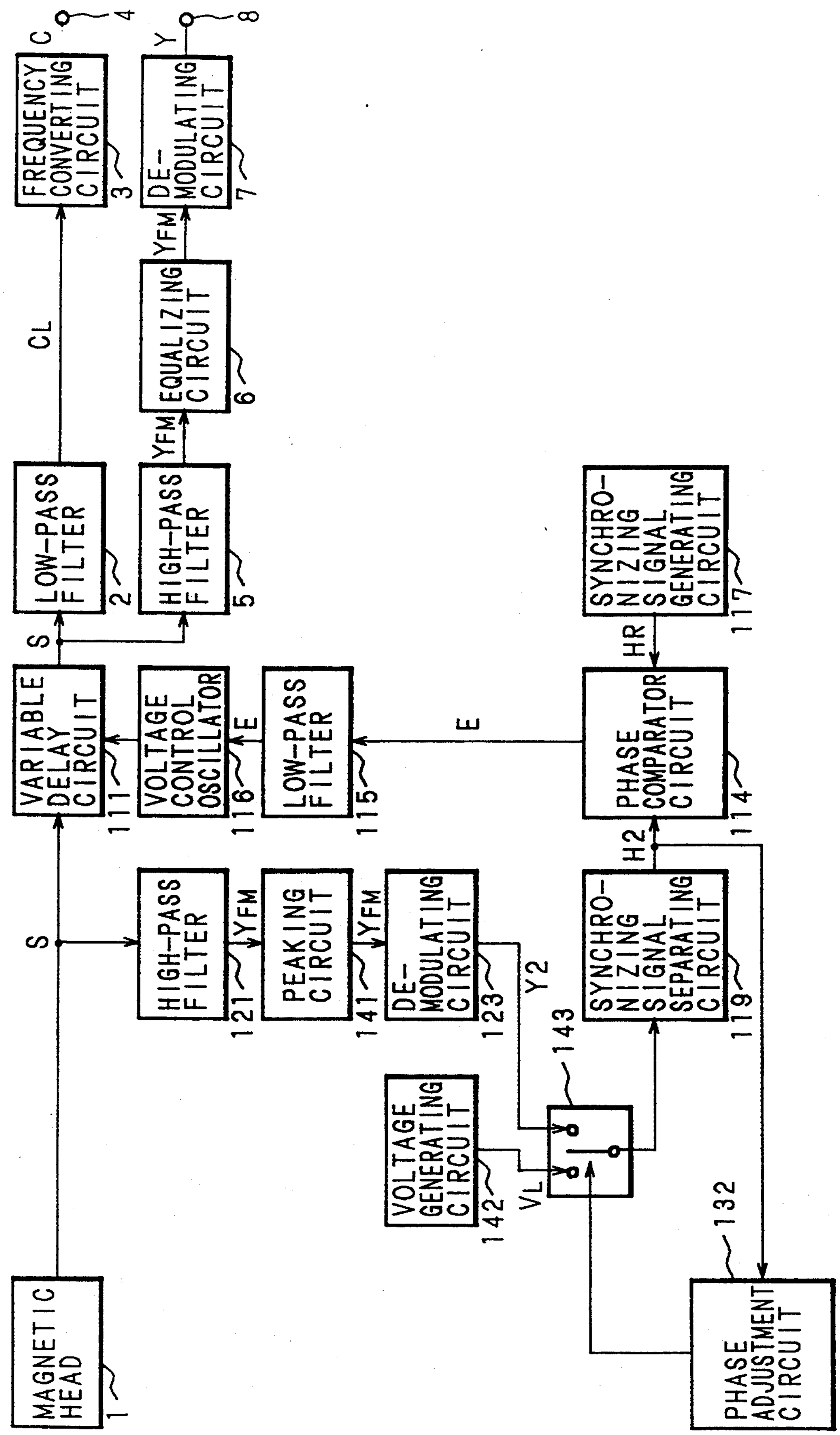
Figure 68:
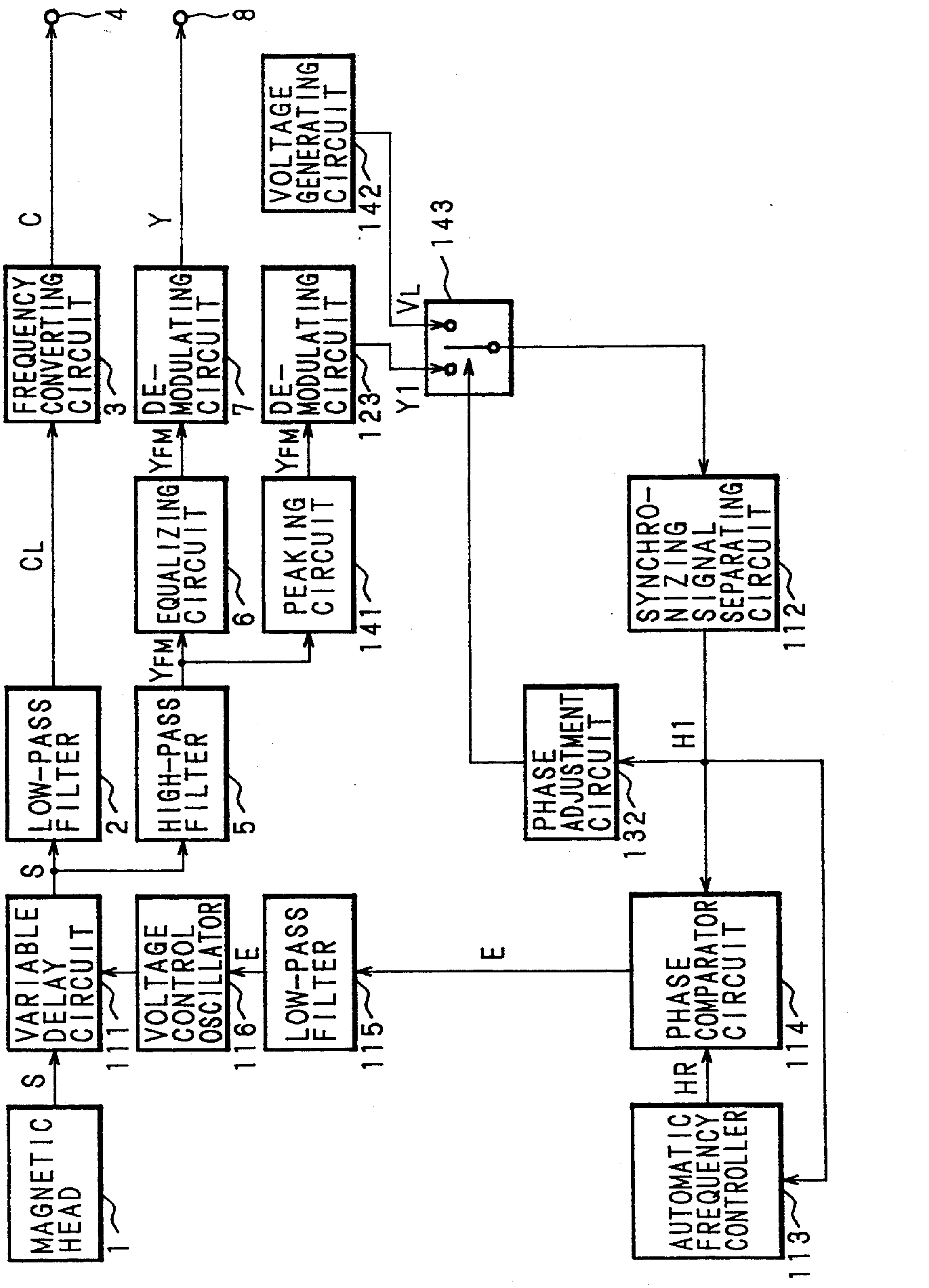
Figure 68:
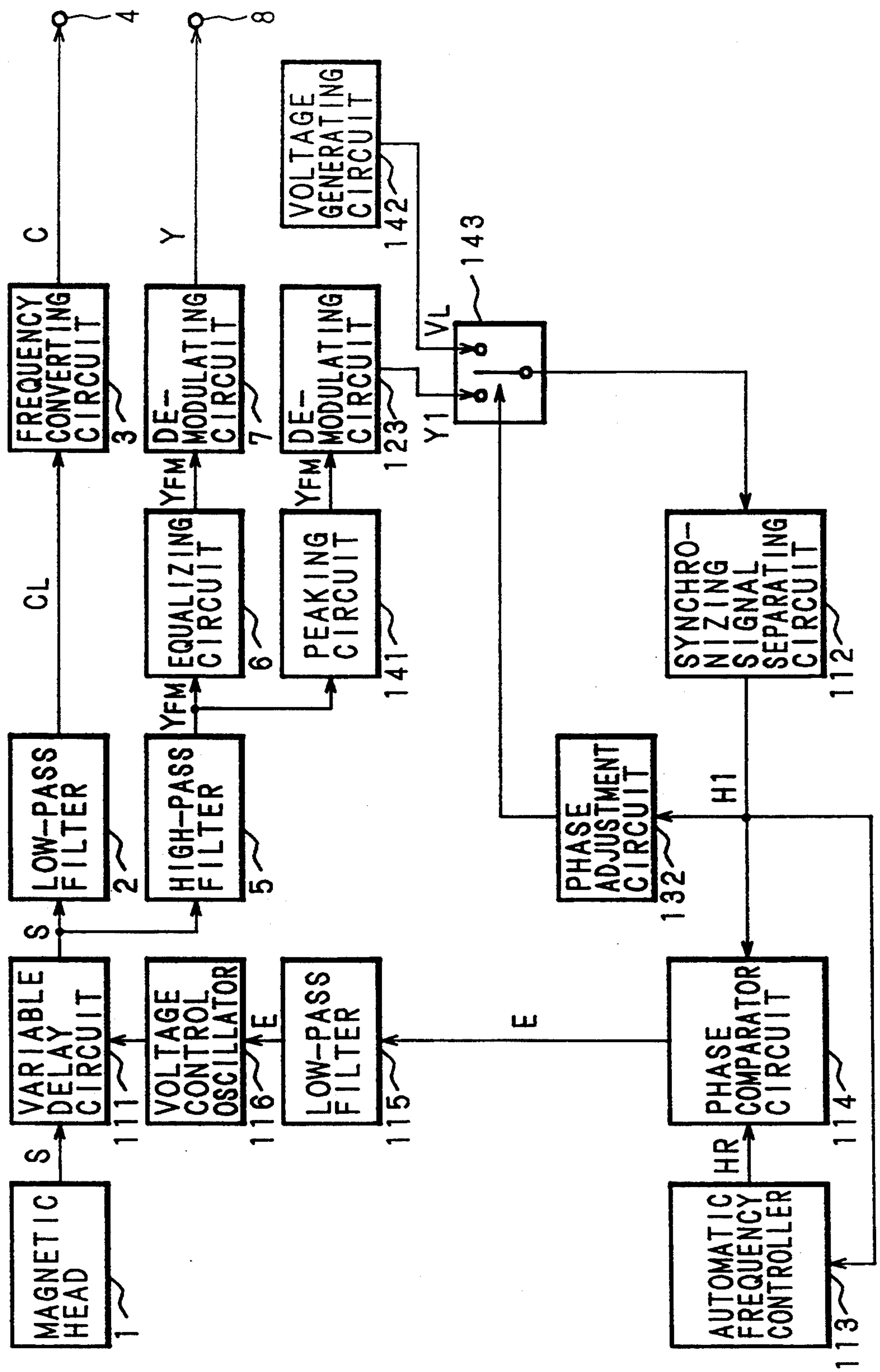
Figure 69:
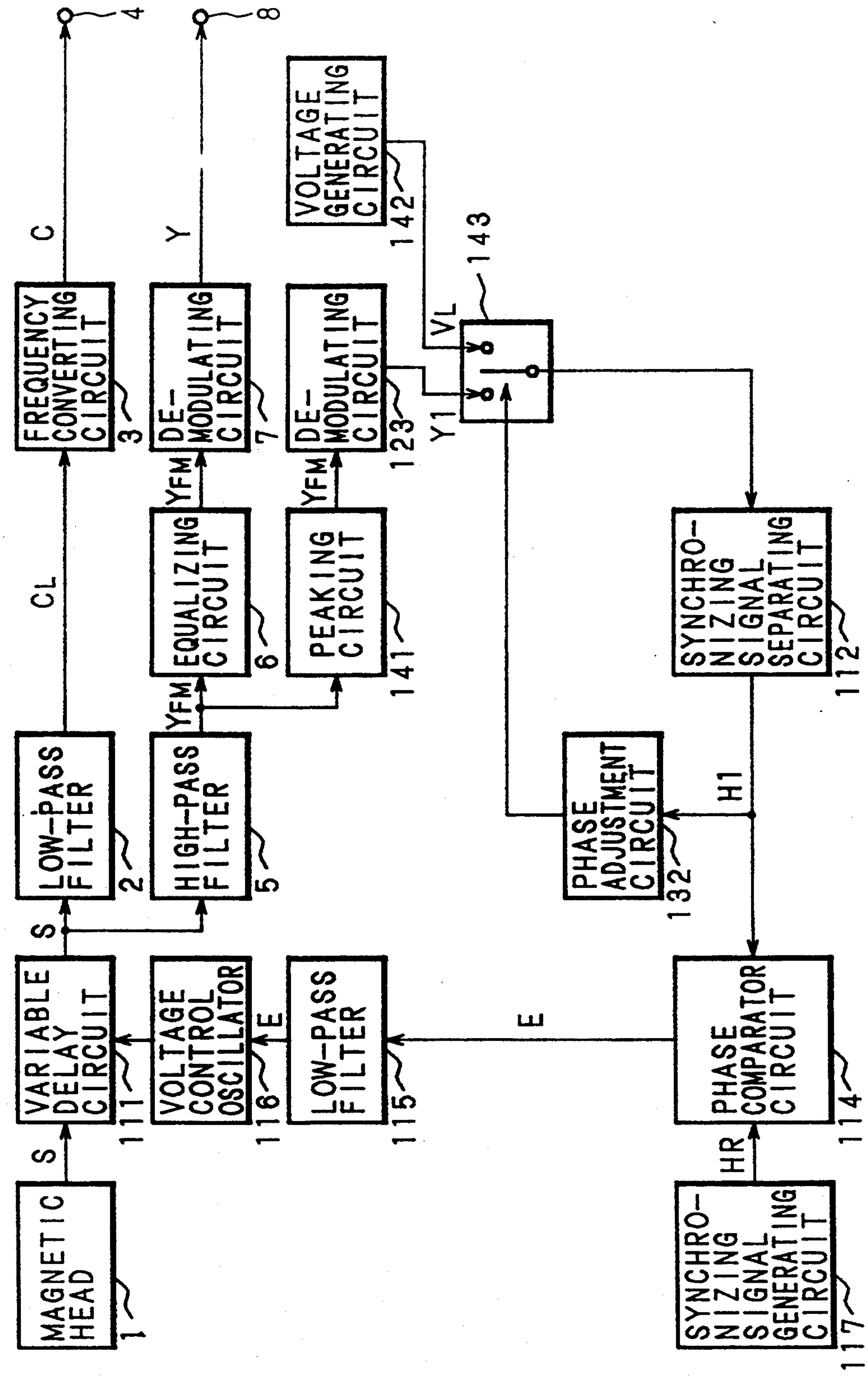
Figure 70:
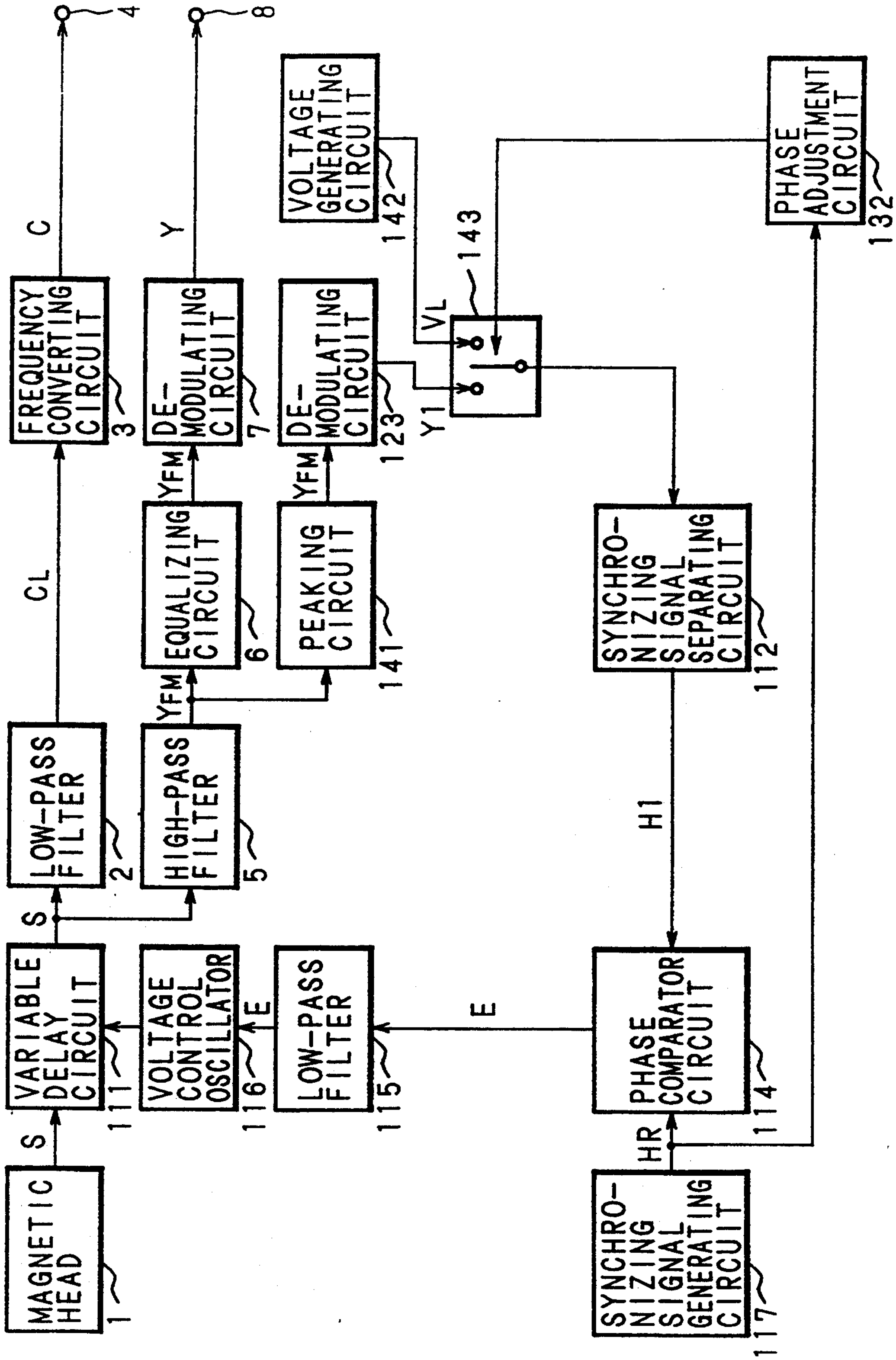
Figure 71:
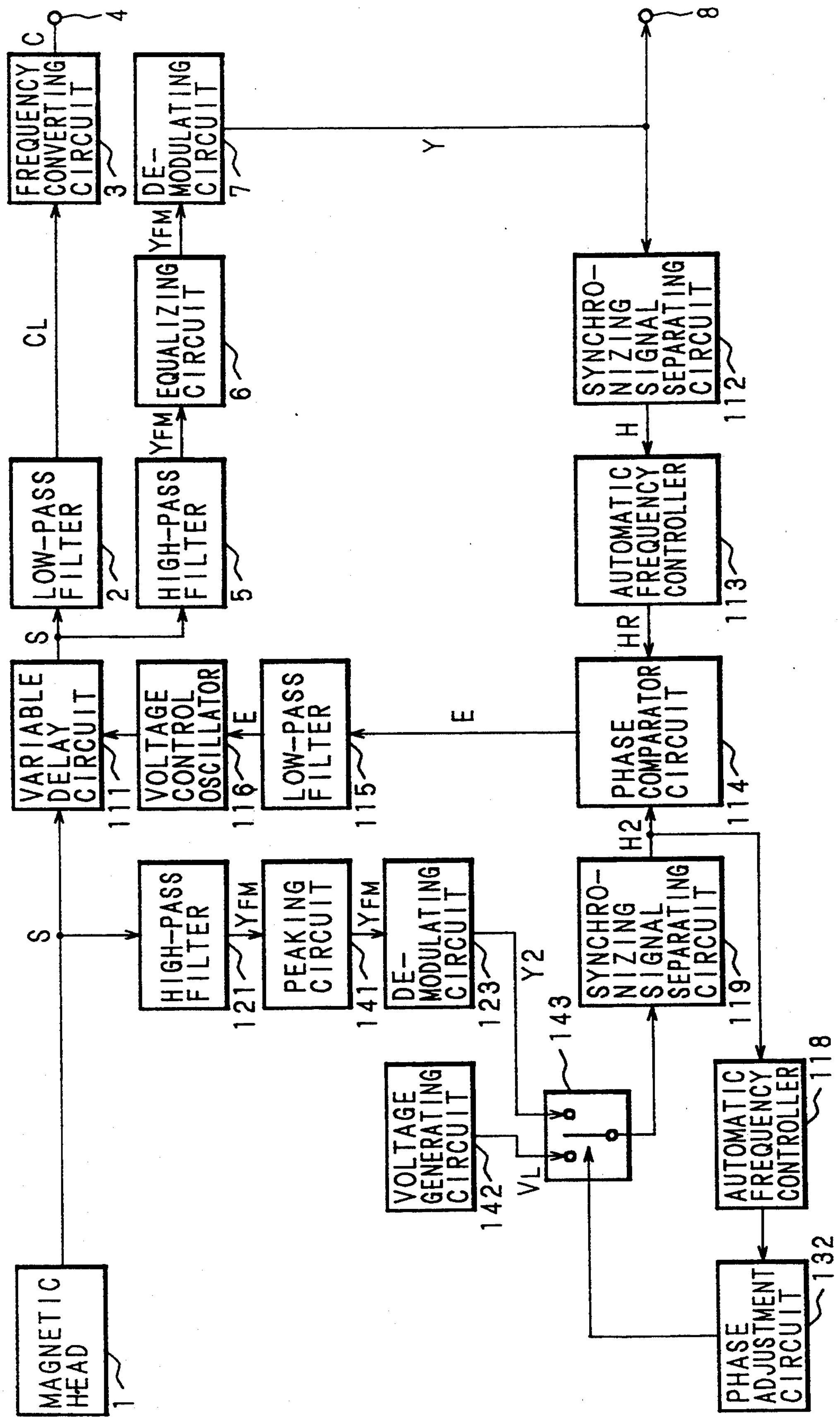
Figure 72:
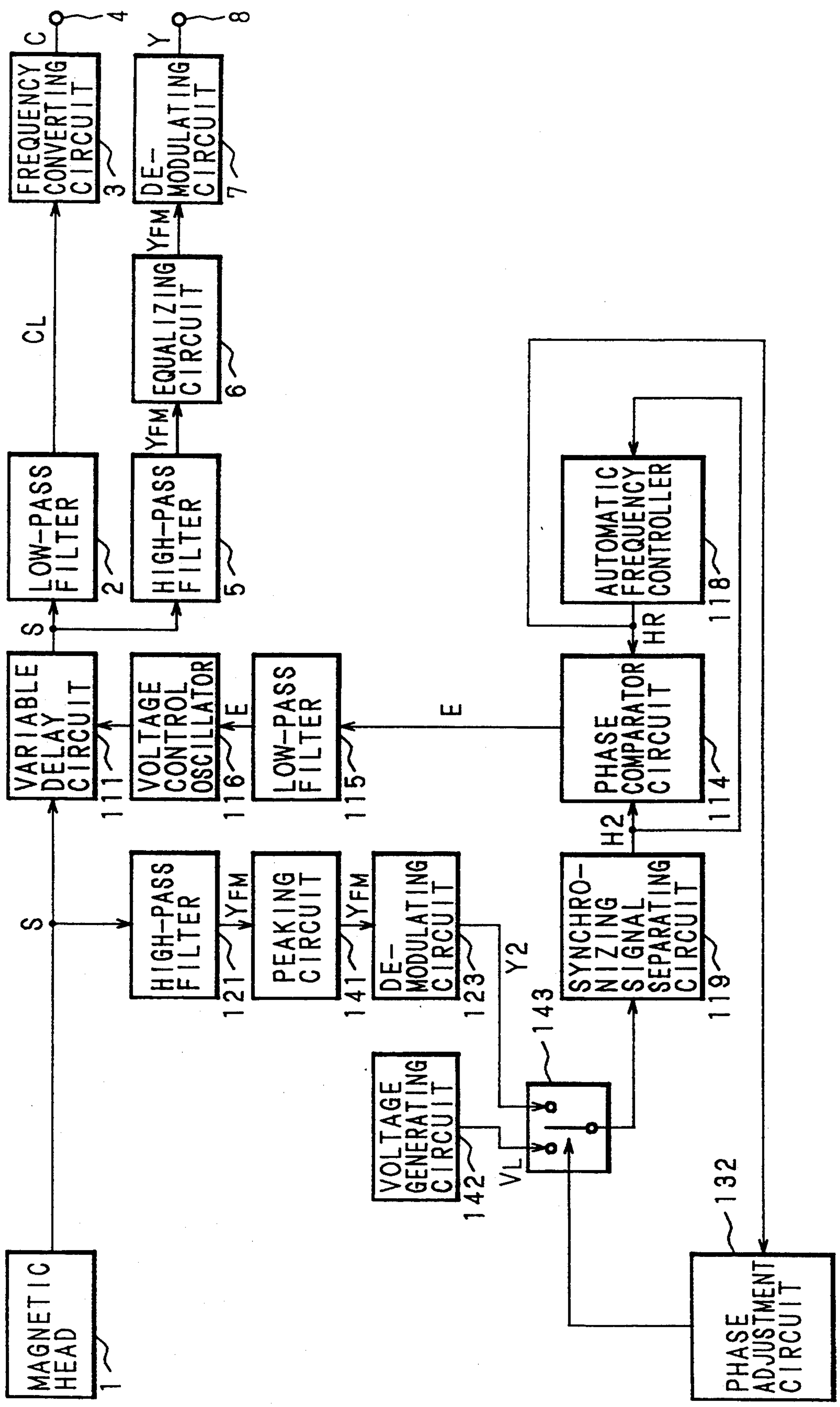
Figure 73:
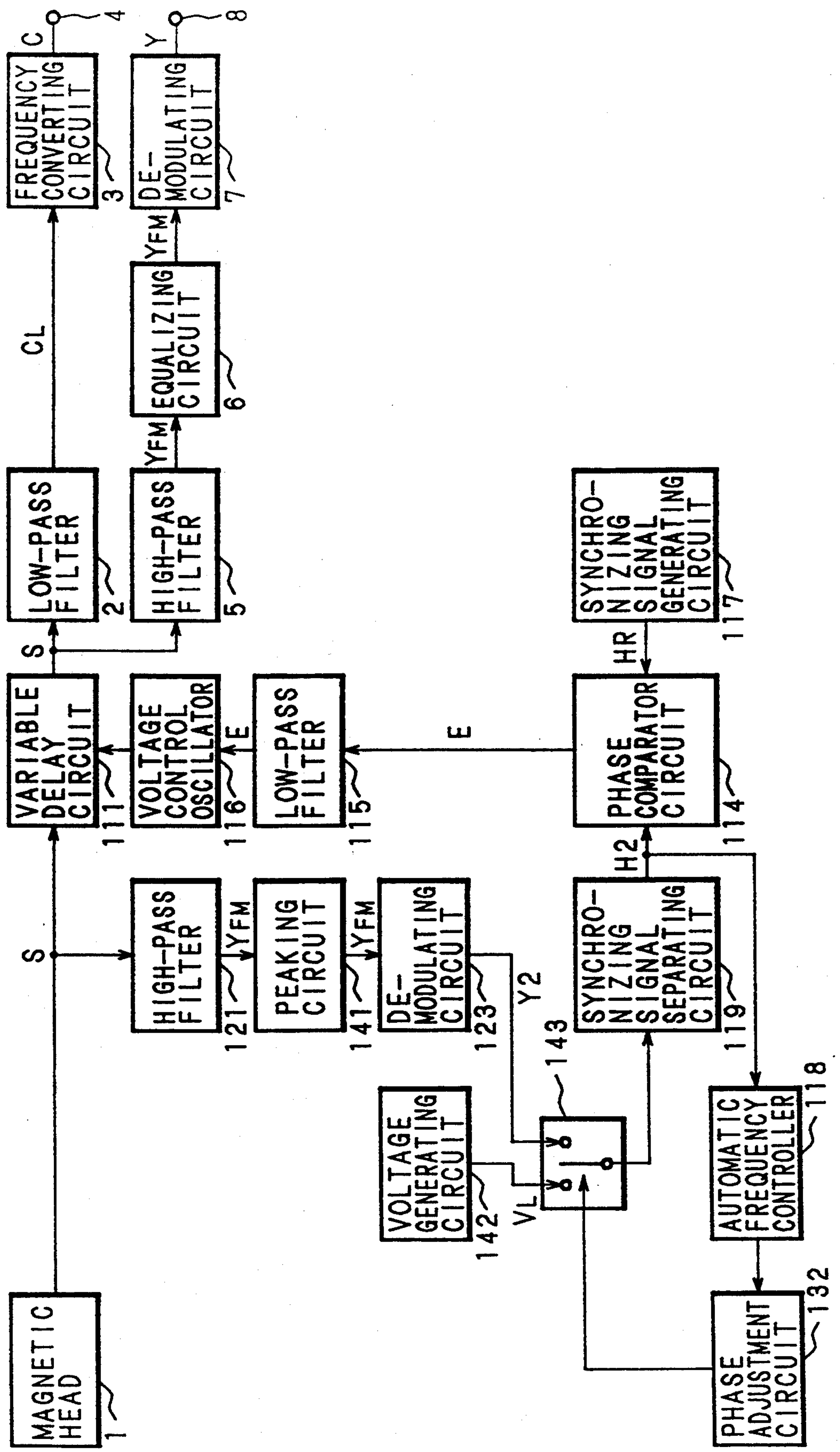
Figure 74:
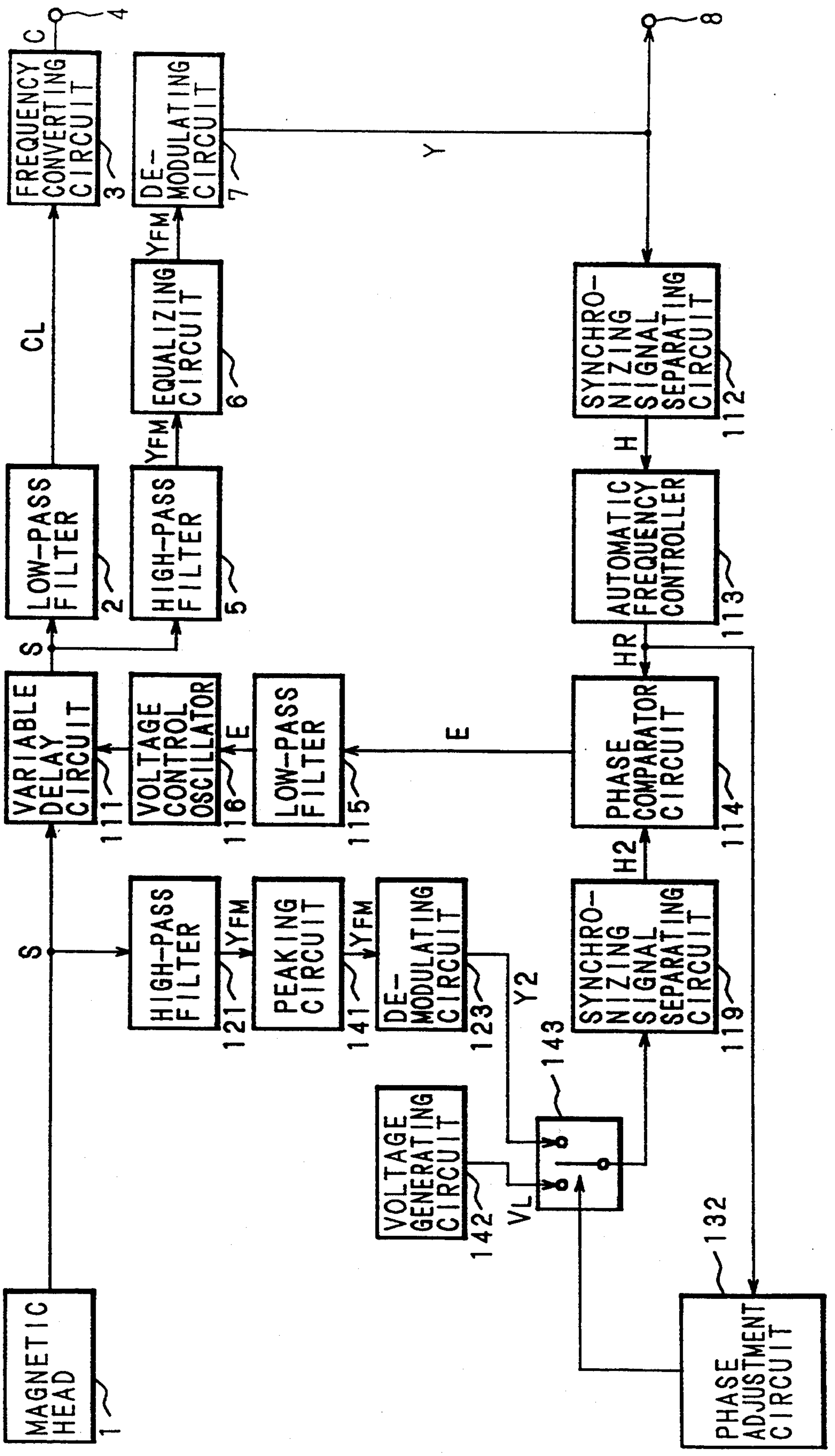
Figure 75:
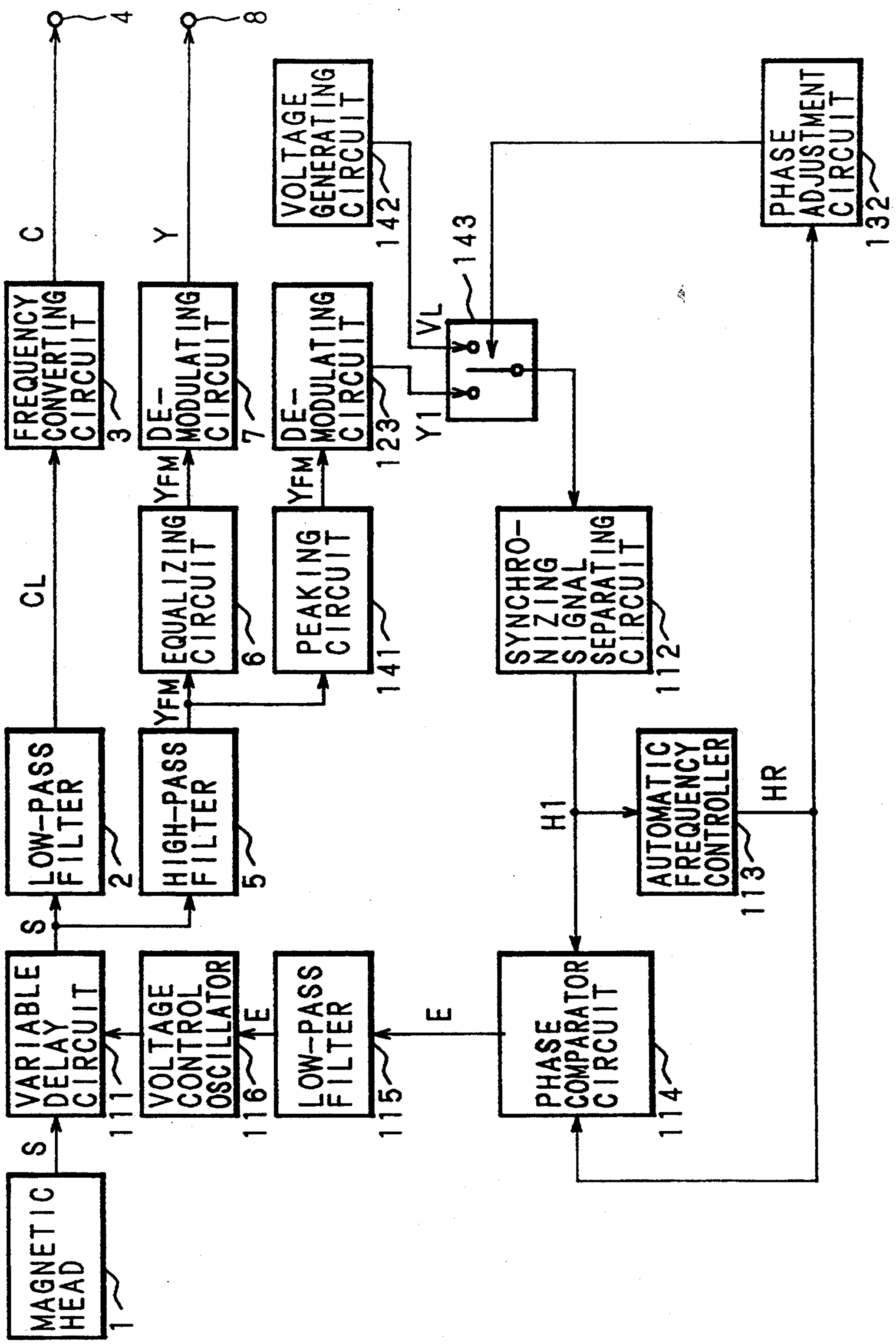
Figure 76:
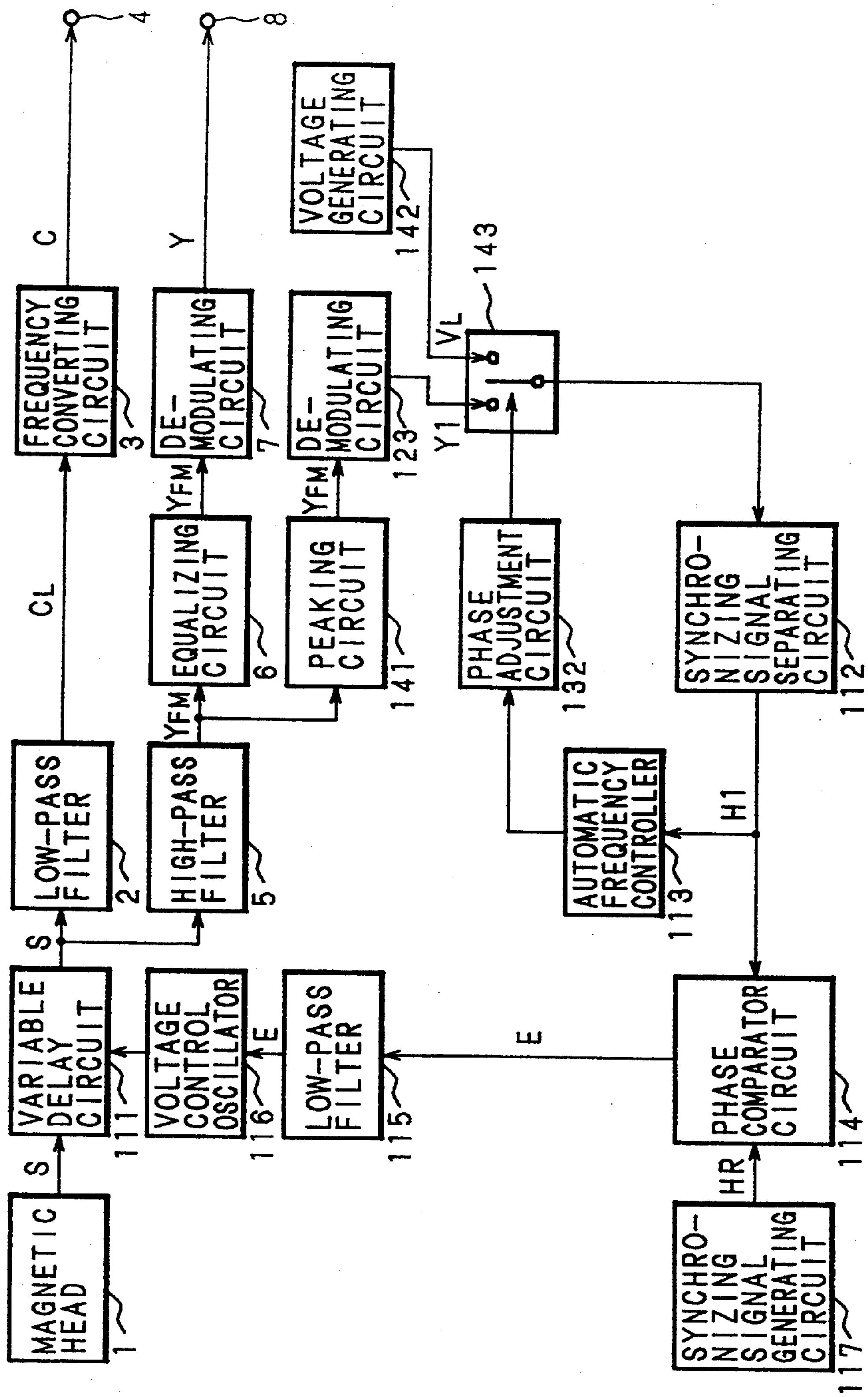

Further, FIG. 65 is a block diagram showing a video signal reproduction apparatus provided with a time base correcting device of another embodiment according to the invention. As opposed to the embodiment shown in FIG. 63 in which the horizontal synchronizing signal H whose time base is corrected is inputted to the AFC 113 to obtain the reference horizontal synchronizing signal HR, which is then fed to the phase comparator circuit 114, an embodiment, shown in FIG. 65 has a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase comparator circuit 114. This embodiment operates similarly to the embodiment shown in FIG. 63, and demonstrates the same effects.

In the embodiment shown in FIG. 63 or 65, the horizontal synchronizing signal H2 is fed to the phase comparator circuit 114 and the phase adjustment circuit 132 simultaneously, whereby the control signal is generated which switches the connection of the switching circuit 143. However, a control signal may be generated from any signal, provided that it can designate a range of a synchronizing signal.

In an embodiment shown in FIG. 66, a horizontal synchronizing signal H whose time base is corrected is fed to a phase adjustment circuit 132 as opposed to the embodiment shown in FIG. 63 in which the horizontal synchronizing signal H2 is fed to the phase adjustment circuit 132 before the time base thereof is corrected. This embodiment operates similarly to the embodiment shown in FIG. 63, and demonstrates the same effects.

Further, as opposed to the embodiment shown in FIG. 65 in which the horizontal synchronizing signal H2 outputted from the synchronizing signal separating circuit 119 is fed to the phase adjustment circuit 132, an embodiment shown in FIG. 67 has a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase adjustment circuit 132. This embodiment operates similarly to the embodiment shown in FIG. 63, and demonstrates the same effects.

In the foregoing embodiment, the invention is applied to the time base correcting device in which time base error information is extracted from the frequency multiplexed signal S before the signal S passes through the variable delay circuit 111. However, the invention may be applied to a time base correcting device in which time base error information is extracted from a frequency multiplexed signal S having passed through a variable delay circuit 111. The invention can be applied to a time base correcting device of any type, provided that a time base error included in a frequency multiplexed signal is removed by controlling a delay period of a variable delay circuit 111 in accordance with time base error information extracted from a horizontal synchronizing signal in the time base correcting device.

FIGS. 68 to 72 are block diagrams respectively showing video signal reproduction apparatus provided with a time base correcting device of further other embodiments according to the invention. As opposed to the embodiments shown in FIGS. 64, 65, and 67 in which the luminance signal Y2 is inputted to the synchronizing signal separating circuit 119 before the signal Y2 passes through the variable delay circuit 111, embodiments shown in FIGS. 68 to 72 has a following construction. A luminance signal Y1 having passed through a variable delay circuit 111 is inputted to a synchronizing signal separating circuit 112. The time base correcting device thus constructed demonstrates the same effects as the embodiment shown in FIG. 63.

Moreover, in the embodiments shown in FIGS. 63 to 66, 68, and 69, the horizontal synchronizing signal outputted from the synchronizing signal separating circuit 112 or the synchronizing signal separating circuit 119 is directly inputted to the phase adjustment circuit 132. However, it may be also appropriate that a horizontal synchronizing signal outputted from a synchronizing signal separating circuit 112 or a synchronizing signal separating circuit 119 be inputted to an AFC, whereby to be controlled to have a substantially fixed frequency, and the stable horizontal synchronizing signal is inputted to a phase adjustment circuit 132.

For example, in embodiments shown in FIGS. 71 to 76, a horizontal synchronizing signal outputted from the synchronizing signal separating circuit 112 or a synchronizing signal separating circuit 119 is inputted to a phase adjustment circuit 132 through AFCs 113, 118, as opposed to the embodiments shown in FIGS. 63 to 66, 68, and 69, the horizontal synchronizing signal outputted from the synchronizing signal separating circuit 112 or the synchronizing signal separating circuit 119 is directed inputted to the phase adjustment circuit 132.

Figure 77:
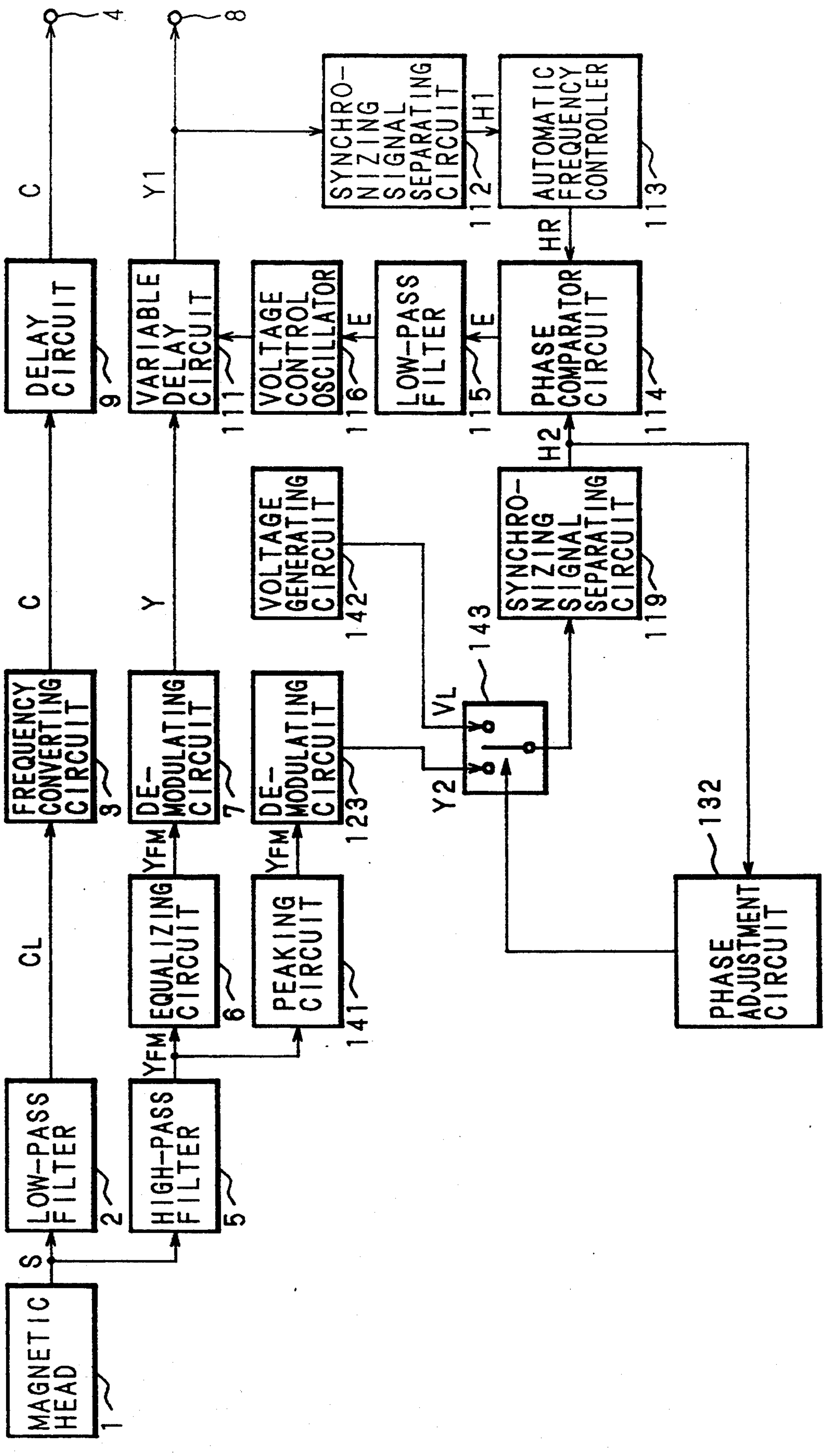

FIG. 77 is a block diagram showing a time base correcting device of still another embodiment according to the invention, together with a video signal reproduction apparatus into which the time base correcting device is incorporated. In FIG. 77, indicated at 141 is a peaking circuit, at 123 a demodulating circuit, at 142 a voltage generating circuit, at 143 a switching circuit, and at 132 a phase adjustment circuit. The peaking circuit 141 has a characteristic which raises a frequency band corresponding to a synchronizing signal from a sync chip to a pedestal level of an FM luminance signal YFM outputted from a second HPF 121. The demodulating circuit 123 is adapted for demodulating the FM luminance signal YFM outputted from the peaking circuit 141 to reproduce a luminance signal Y2 and outputting the reproduced luminance signal Y2. The voltage generating circuit 142 is adapted for generating a voltage between a pedestal level and a white peak. The switching circuit 143 is adapted for switchingly outputting the luminance signal Y2 outputted from the demodulating circuit 123 and a voltage outputted from the voltage generating circuit 142 in accordance with a control signal. The phase adjustment circuit 132 is adapted for adjusting the phase of a pulse duration of a horizontal synchronizing signal H2 outputted from a synchronizing signal separating circuit 119. Other elements identical to those shown in FIG. 3 are indicated by the same reference numerals.

Next, there will be described an operation of the video signal reproduction apparatus shown in FIG. 77. It should be noted that description of portions which operate in the same manner as those shown in FIG. 3 is left out.

An HPF 5 extracts the FM luminance signal YFM from a frequency multiplexed signal S outputted from a magnetic head 1, and feeds the extracted FM luminance signal YFM to an equalizing circuit 6 and the peaking circuit 141 simultaneously. The peaking circuit 141 raises a frequency band corresponding to a synchronizing signal from a sync chip to a pedestal level of the FM luminance signal (For example, a frequency band shown in FIG. 11 in the S-VHS system), and feeds the resultant FM luminance signal YFM to the demodulating circuit. 123. The FM luminance signal YFM outputted from the peaking circuit 141 comes to have the larger amplitude in the synchronizing signal portion while having the smaller amplitude in the video signal portion where a demodulated carrier frequency is high. Accordingly, there are cases where carrier losses occur. The demodulating circuit 123 demodulates the FM luminance signal YFM to reproduce a luminance signal Y2, and feed the reproduced luminance signal Y2 to one of input terminals provided in the switching circuit 143. The synchronizing signal portion of the luminance signal Y2 outputted from the demodulating circuit 123 has a better S/N than before. However, there are cases where an inversion occurs in the video signal portion of the luminance signal Y2. The voltage generating circuit 142 generates a desired voltage VL between the pedestal level and the white peak, and feeds the generated voltage to the other input terminal provided in the switching circuit 143. The synchronizing signal separating circuit 119 feeds the horizontal synchronizing signal H2 to the phase comparator circuit 114 and the phase adjustment circuit 132 simultaneously. The phase adjustment circuit 132 adjusts the phase and a pulse duration of a control signal on the basis of the horizontal synchronizing signal H2, and feeds the adjusted control signal to the switching circuit 143. The control signal is indicative of a command to switch connection of the switching circuit 143 with the synchronizing signal portion and the video signal portion of the luminance signal Y2 fed to the switching circuit 143. The construction, for example, shown in FIG. 8 may be adopted as a switching circuit 143. Accordingly, as described above, the phase adjustment circuit 132 outputs the control signal to cause the portion including the horizontal synchronizing signal as shown in FIG. 9(*d*) to be in the H-level.

The switching circuit 143 switchingly controls the signals from the demodulating circuit 123 and the voltage generating circuit 142 in accordance with the control signal fed from the phase adjustment circuit 132, and its output signal is fed to the synchronizing signal separating circuit 119. When the signal corresponding to the video signal portion of the luminance signal Y2 is being outputted from the phase adjustment circuit 132, i.e., when the signal shown in FIG. 9(*d*) is in the L-level, the switching circuit 143 selects a voltage VIA fed from the voltage generating circuit 142, and outputs the same. On the other hand, when the signal corresponding to the portion centering the horizontal synchronizing signal of the luminance signal Y2 is being outputted from the phase adjustment circuit 132, i.e., when the signal shown in FIG. 9(*d*) is in the H-level, the switching circuit 143 selects the luminance signal. Y2 fed from the demodulating circuit 123, and outputs the same. In the output signal of the switching circuit 143, the video signal portion where the inversion is liable to occur is replaced by the desired voltage VL between the pedestal level and the white peak. The synchronizing signal separating circuit 119 is not to erroneously operate on the signal whose level is below the pedestal level due to the inversion. Accordingly, the synchronizing signal separating circuit 119 is capable of accurately extracting the horizontal synchronizing signal H2 whose S/N is good, and feeds the extracted horizontal synchronizing signal H2 to the phase comparator circuit 114. The phase comparator circuit 114 compares the horizontal synchronizing signal H2 whose S/N is good with a reference horizontal synchronizing signal HR outputted from an AFC 113. Accordingly, a time base error included in the horizontal synchronizing signal H2 can be accurately detected, and therefore an accurate time base error signal E is fed to an LPF 115. The LPF 115 removes a noise component from the time base error signal E, and feeds the resultant time base error signal E to a VCO 116. The VCO 116 oscillates at a frequency according to the level of the accurate time base error signal whose noise component is removed therefrom. As a consequence, an oscillating frequency of the VCO 116 serves to accurately compensate for the time base variation included in the luminance signal Y inputted to a variable delay circuit 111.

In the foregoing embodiment, the invention is applied to the time base correcting device in which the horizontal synchronizing signal H1 whose time base is corrected is inputted to the AFC 113 to obtain the reference horizontal synchronizing signal HR. However, the invention can be applied to any time base correcting device, provided that the time base variation included in a luminance signal is extracted by comparing a horizontal synchronizing signal and a reference horizontal synchronizing signal in the time base correcting device. A process for obtaining the reference horizontal synchronizing signal is not limited in the time base correcting device in which the invention is embodied.

Figure 78:
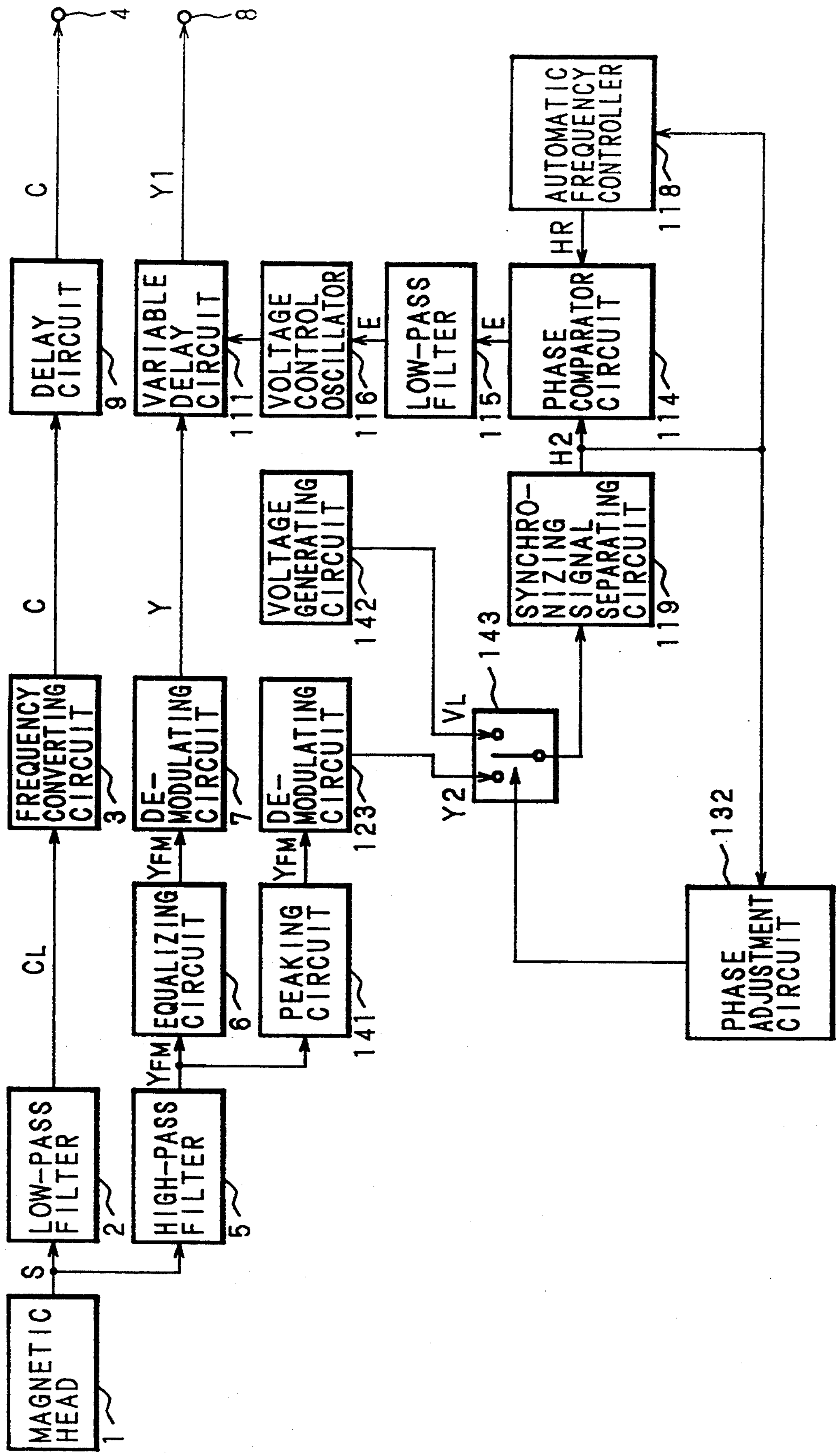

FIG. 78 is a block diagram showing a video signal reproduction apparatus provided with a time base correcting device of further another embodiment according to the invention. As opposed to the embodiment shown in FIG. 77 in which the horizontal synchronizing signal H1 whose time base is corrected is inputted to the AFC 113 to obtain the reference horizontal synchronizing signal HR, and the obtained reference horizontal synchronizing signal HR is fed to the phase comparator 114, an embodiment shown in FIG. 78 has a following construction. A horizontal synchronizing signal H2 is inputted to an AFC 113 before a time base thereof is corrected. In the AFC 118 is obtained a reference horizontal synchronizing signal HR, which is then fed to the phase comparator circuit 114. This embodiment operates similarly to the embodiment shown in FIG. 77, and demonstrates the same effects.

FIG. 79 is a block diagram showing a video signal reproduction apparatus provided with a time base correcting device of another embodiment according to the invention. As opposed to the embodiment shown in FIG. 77 in which the horizontal synchronizing signal H1 whose time base is corrected is inputted to the AFC 113 to obtain the reference horizontal synchronizing signal HR, and the obtained reference signal HR is fed to the phase comparator circuit 114, an embodiment shown in FIG. 79 has a following construction. A reference horizontal synchronizing signal HR is obtained in a synchronizing signal generating circuit 117 for dividing an oscillating frequency created by a crystal oscillator to generate a synchronizing signal, and the obtained reference horizontal synchronizing signal HR is fed to a phase comparator circuit 114. This embodiment operates similarly to the embodiment shown in FIG. 77, and demonstrates the same effects.

In the embodiment shown in FIG. 77 or 79, the horizontal synchronizing signal H2 is fed to the phase comparator circuit 114 and the phase adjustment circuit 132 simultaneously, whereby the control signal is generated which switches the connection of the switching circuit 143. However, a control signal may be generated from any signal, provided that it can designate a range of a synchronizing signal.

Figure 80:
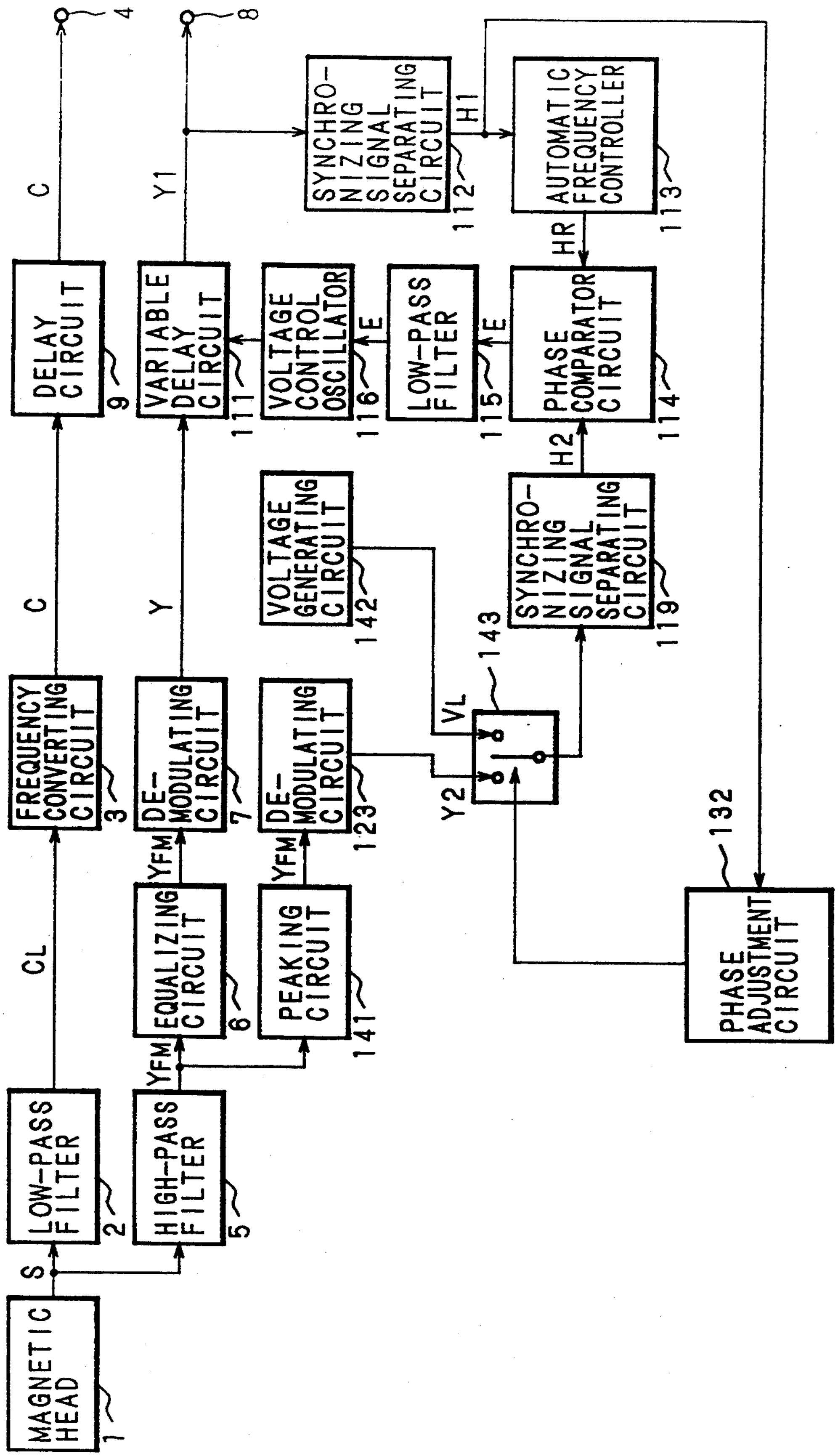

For example, in an embodiment shown in FIG. 80, the invention is applied to a video signal reproduction apparatus provided with a time base correcting device in which a horizontal synchronizing signal H1 is fed to a phase adjustment circuit 132 before the time base thereof is corrected, as opposed to the embodiment shown in FIG. 77 including the time base correcting device in which the horizontal synchronizing signal H2 whose time base is corrected is fed to the phase adjustment circuit 132. This embodiment operates similarly to that shown in FIG. 77, and demonstrates the same effects.

Figure 81:
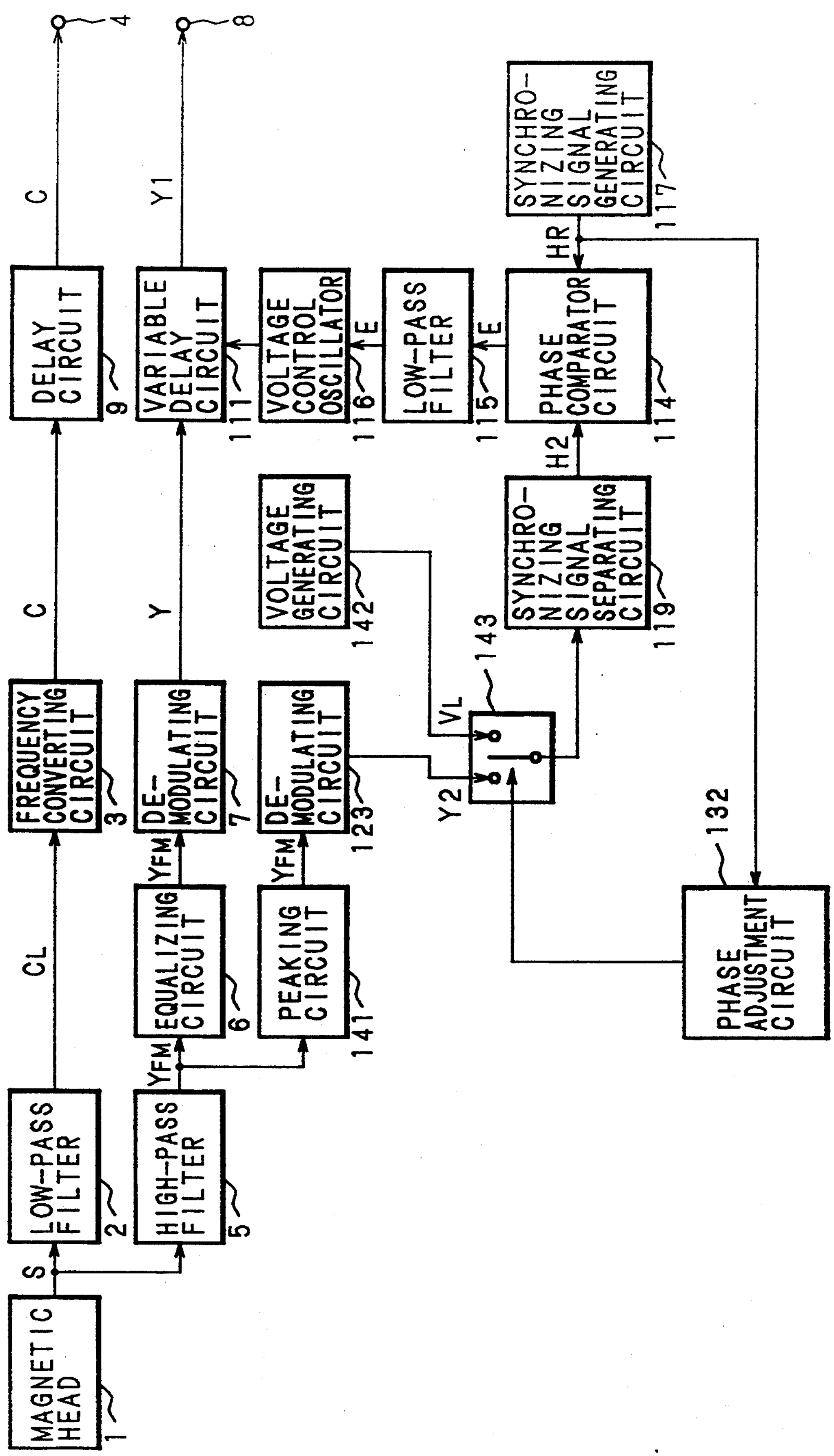
Figure 82:
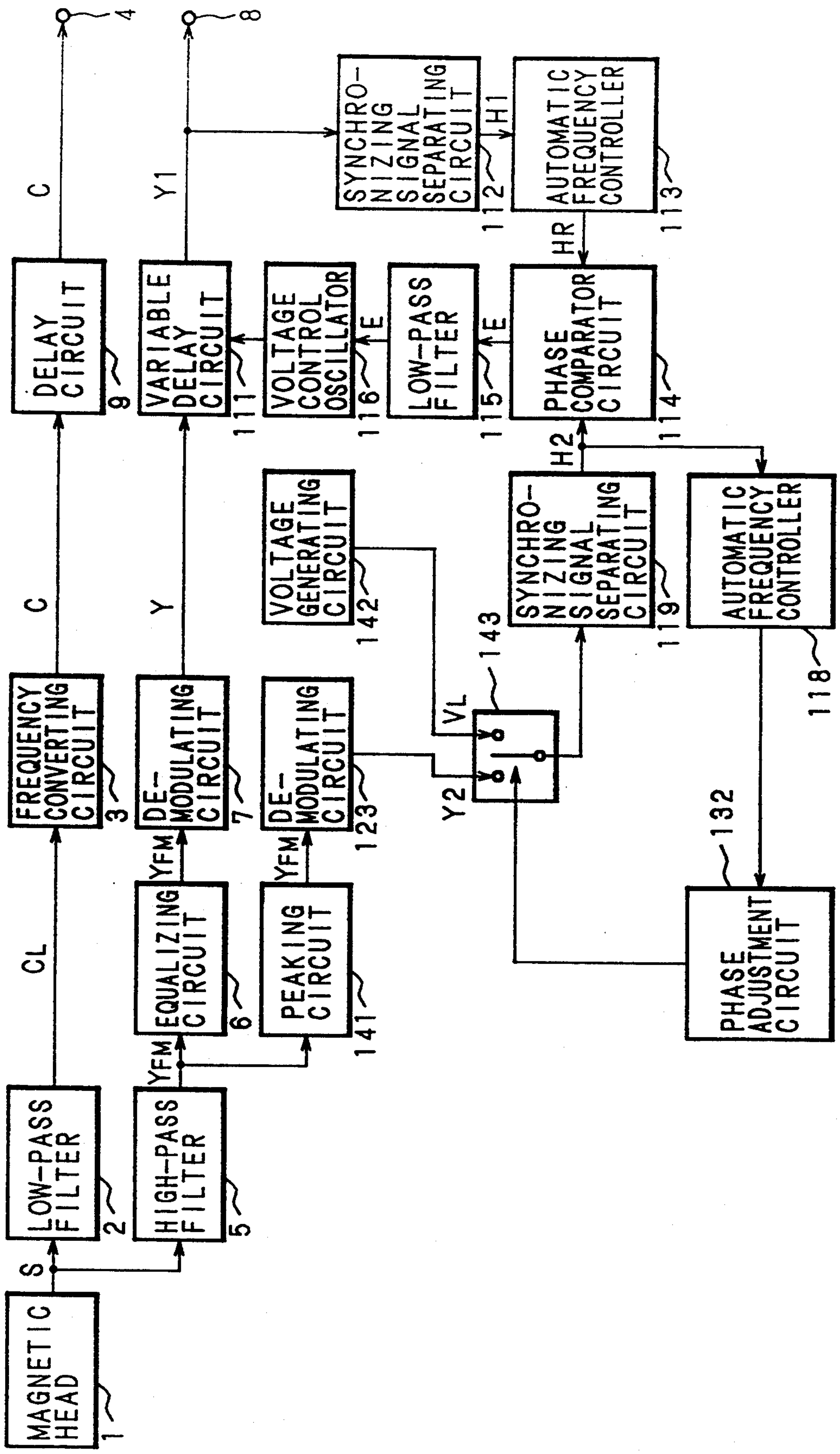
Figure 83:
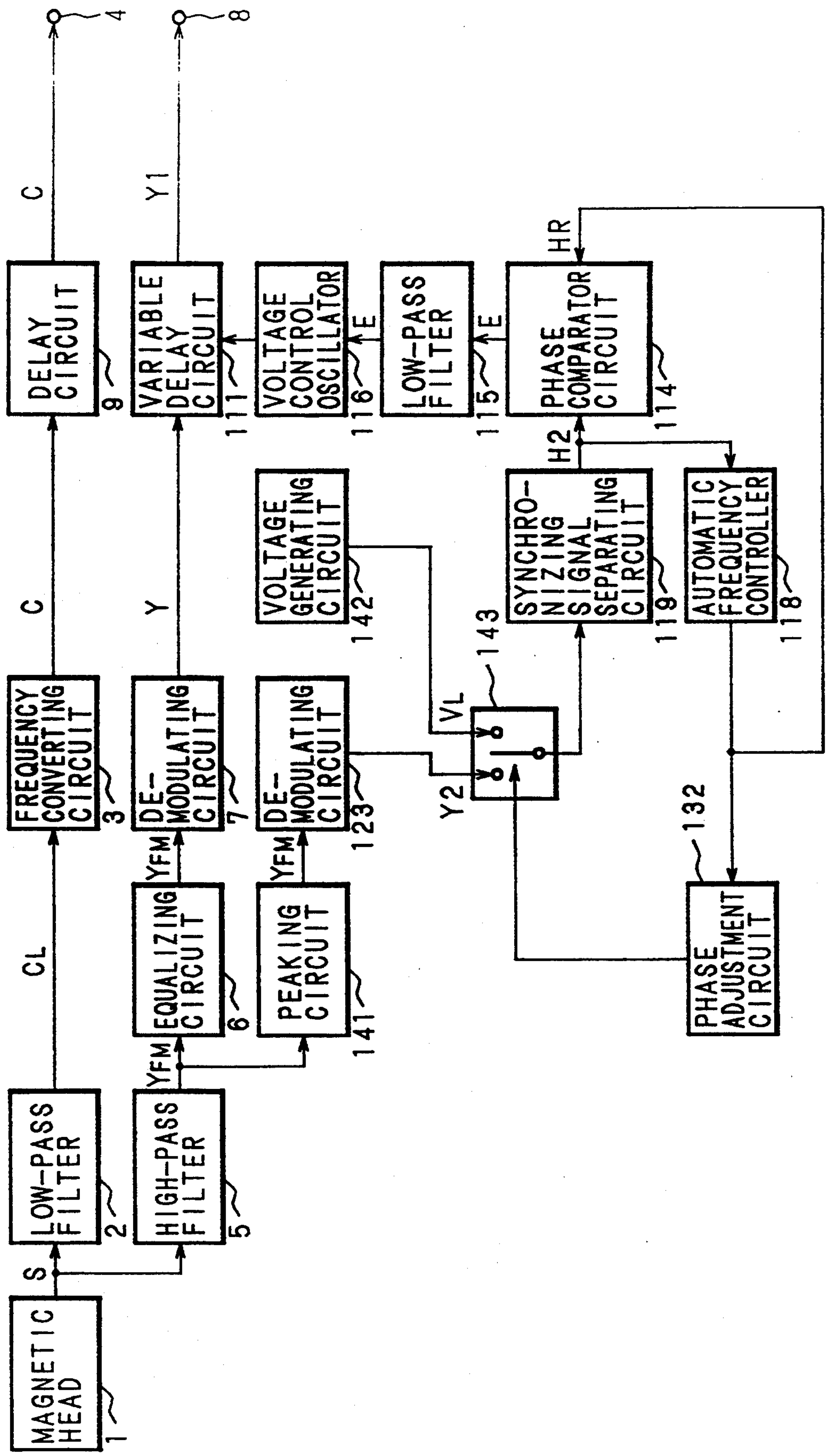
Figure 85:
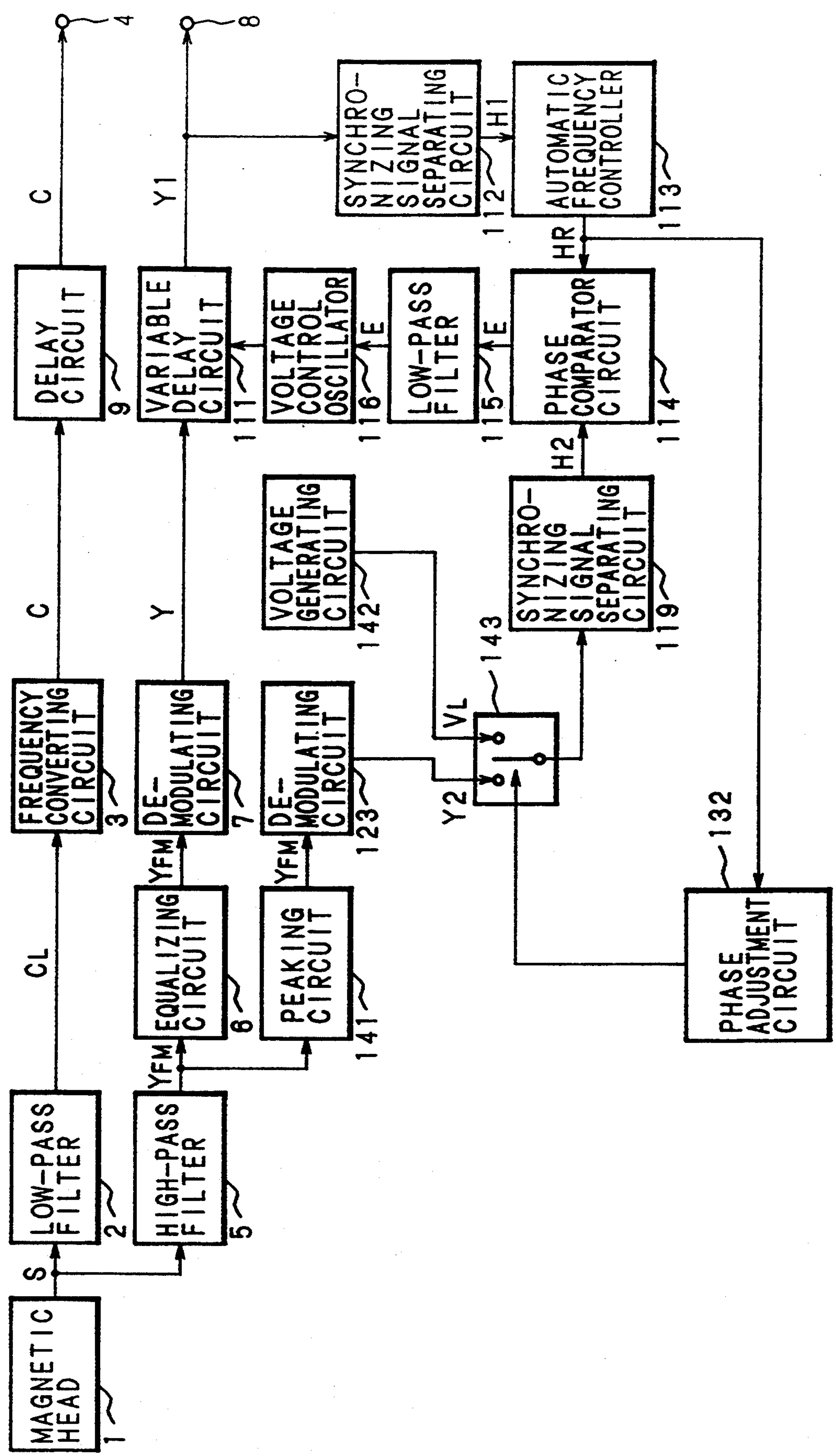

An embodiment shown in FIG. 81 includes a time base correcting device in which a reference horizontal synchronizing signal HR is obtained in a synchronizing signal generating circuit 117 for dividing an oscillating frequency created by a crystal oscillator to generate a synchronizing signal as opposed to the embodiment shown in FIG. 79 including the time base correcting device in which the horizontal synchronizing signal H2 outputted from the synchronizing signal separating circuit 119 is fed to the phase adjustment circuit 132. This embodiment operates similarly to the embodiment shown in FIG. 77, and demonstrates the same effects.

In the embodiments shown in FIGS. 77 to 80, the horizontal synchronizing signal outputted from the synchronizing signal separating circuit 112 or the synchronizing signal separating circuit 119 is directly inputted to the phase adjustment circuit 132. However, it may be appropriate that a horizontal synchronizing signal outputted from a synchronizing signal separating circuit 112 or a synchronizing signal separating circuit 119 be fed to an AFC, whereby to be controlled to have a substantially fixed frequency, and the stable horizontal synchronizing signal be inputted to the phase adjustment circuit 132.

For example, in embodiments shown in FIGS. 82 to 85, a horizontal synchronizing signal outputted from a synchronizing signal separating circuit 112 or a synchronizing signal separating circuit 119 is inputted to a phase adjustment circuit 132 through AFCs 113, 118, as opposed to the embodiments shown in FIGS. 77 to 80 in which the horizontal synchronizing signal outputted from the synchronizing signal separating circuit 112 or the synchronizing signal separating circuit 119 is directly inputted to the phase adjustment circuit 132. The video signal reproduction apparatus thus constructed demonstrates the same effects as the embodiment shown in FIG. 77.

Figure 86:
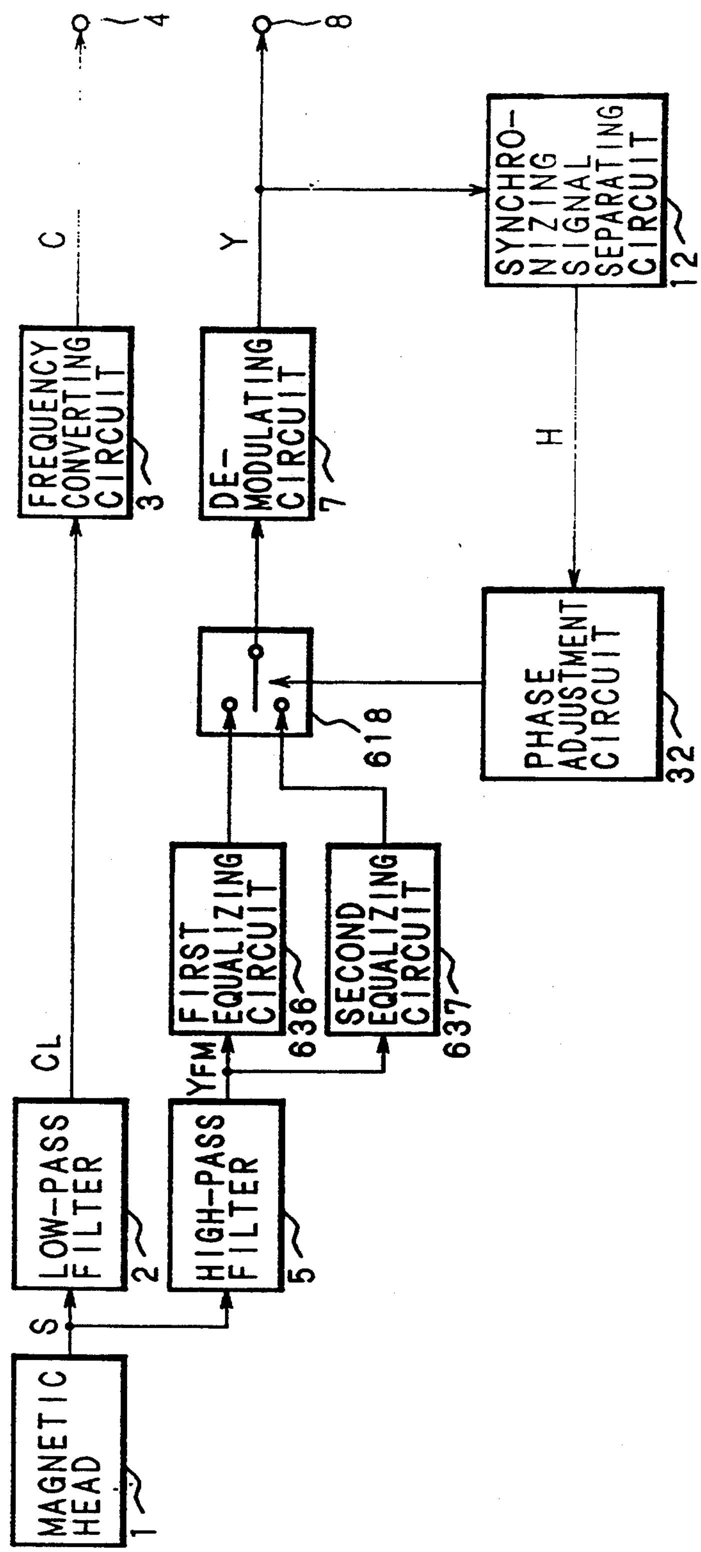
FIGS. 86 to 88 are block diagrams respectively showing video signal reproduction apparatus of still other embodiments according to the invention.

FIG. 86 is a block diagram showing a video signal reproduction apparatus of still another embodiment according to the invention. In FIG. 86, indicated at 12 is a synchronizing signal separating circuit, at 32 a phase adjustment circuit, at 636 a first equalizing circuit, at 637 a second equalizing circuit, and at 618 a switching circuit. The synchronizing signal separating circuit 12 is adapted for separating a horizontal synchronizing signal H from a luminance signal Y outputted from a demodulating circuit 7. The phase adjustment circuit 32 is adapted for adjusting the phase and a pulse duration of the horizontal synchronizing signal H outputted from the synchronizing signal separating circuit 12. The first equalizing circuit 636 is adapted for applying the peaking similar to the conventional equalizing circuit 6. The second equalizing circuit 637 is adapted for raising the level of a lower sideband of the FM luminance signal YFM. The switching circuit 618 is adapted for controllably switching a signal outputted from the first equalizing circuit 626 and that outputted from the second equalizing circuit 627 in accordance with a signal outputted from the phase adjustment circuit 32. Other elements identical to those shown in FIG. 1 are indicated by the same reference numerals.

Next, there will be described an operation of the video signal reproduction apparatus shown in FIG. 86. An operation of reproducing a carrier chrominance signal C and a luminance signal Y from a frequency multiplexed signal S is same as the operation of the conventional apparatus shown in FIG. 1. Accordingly, description of this operation is left out here.

The demodulating circuit 7 demodulates an FM luminance signal YFM to reproduce a luminance signal Y, and feeds the reproduced luminance signal Y to a luminance signal output terminal 8. Simultaneously, the demodulating circuit 7 feeds the luminance signal Y to the synchronizing signal separating circuit 12. The synchronizing signal separating circuit 12 extracts only a horizontal synchronizing signal H from the luminance signal Y by removing a video signal portion therefrom, and feeds the extracted horizontal synchronizing signal H to the phase adjustment circuit 32. The phase adjustment circuit 32 adjusts the phase and a pulse duration of a control signal on the basis of the horizontal synchronizing signal H, and feeds the adjusted control signal to the switching circuit 618. The control signal is indicative of a command to switch a signal to be selected with demodulated portions of the synchronizing signal and the video signal of the FM luminance signal YFM fed to the switching circuit 618. The phase adjustment circuit 32 may be constructed, for example, as shown in FIG. 8. The FM luminance signal YFM outputted from an HPF 5 is fed to the First and the second equalizing circuits 636, 637. The first equalizing circuit, 636 applies the peaking similarly to the conventional equalizing circuit 6 shown in FIG. 2(*b*), and feeds the resultant signal to one of input terminals provided in the switching circuit 618. The second equalizing circuit 637 raises the level of the lower sideband of the FM luminance signal YFM, and feeds the resultant signal to the other input terminal provided in the switching circuit 618. The switching circuit 618 switchingly select either of the signal outputted from the first equalizing circuit 636 or from the second equalizing circuit 637 with the control signal outputted from the phase adjustment circuit 32, and feeds the selected signal to the demodulating circuit 7. When the signal corresponding to the video signal portion is being outputted from the phase adjustment circuit 32, i.e., when the signal shown in FIG. 9(*d*) is in the L-level, the switching circuit 618 selects the signal outputted from the first equalizing circuit 636 and feeds the selected signal to the demodulating circuit 7. In this way, the conventional peaking having an characteristic shown in FIG. 2(*c*) is applied in the portion corresponding to the video signal of the FM luminance signal. When the signal corresponding to the portions centering the horizontal synchronizing signal of the FM luminance signal is being outputted from the phase adjustment circuit 32, i.e., when the signal shown in FIG. 9(*d*) is in the H-level, the switching circuit 618 selects the signal outputted from the second equalizing circuit 637 and feeds the selected signal to the demodulating circuit 7. Accordingly, the level of the lower sideband of the FM luminance signal YFM is raised in the portion corresponding to the synchronizing signal of the FM luminance signal YFM. The demodulating circuit 7 demodulates the FM lnminance signal YFM whose lower sideband is raised in the synchronizing signal portion to reproduce a luminance signal Y whose synchronizing signal portion has a good S/N. The reproduced luminance signal Y is fed to the synchronizing signal separating circuit 12 and is outputted through the luminance signal output terminal 8.

The conventional equalizing circuit has an equalizer characteristic which emphasizes the upper wave components in order to prevent an occurrence of inversion. However, this characteristic has inversely affected an S/N of a demodulated signal. In view of this, in this invention, a video signal portion liable to invert is processed in an equalizing circuit having the conventional equalizer characteristic, and only a synchronizing signal portion not liable to invert is processed in an equalizing circuit having an equalizer characteristic which emphasizes the lower wave components having a good S/N. Accordingly, the demodulated signal has a good S/N. As a result, jitter components in the high frequency band can be reduced, and edge noises can be reduced on a picture screen of a VTR where a reproduced video image is displayed. The above and other effects have been experimentally confirmed.

In the foregoing embodiment, the equalizer characteristic is switched in the equalizing circuit constituted by the first equalizing circuit 636, the second equalizing circuit 637, and the switching circuit 618. However, any equalizing circuit may be appropriate, provided that an equalizer characteristic thereof can be controllably switched with demodulated portions of the video signal portion and the synchronizing signal portion of the FM luminance signal. For example, an equalizing circuit may have a construction as shown in FIG. 10.

The first equalizing circuit 636 and the second equalizing circuit 637 which are elements constituting the embodiment shown in FIG. 86 may comprise an emitter-peaking circuit or a collector-peaking circuit such as equalizing circuit 612 shown in FIG. 10. However, any equalizing circuit may be appropriate, provided that it is allowed to have a peaking characteristic as shown in the foregoing embodiment, such as a cosign equalizing circuit which is a filter of the linear phase type. For example, an equalizing circuit may be the circuits described with reference to FIGS. 14 and 15.

Further, delay periods of the first and the second equalizing circuits 636, 637 are set equal to each other. In the case where the delay periods of the two equalizing circuits differ from each other, the difference is compensated in the delay circuit.

Figure 87:
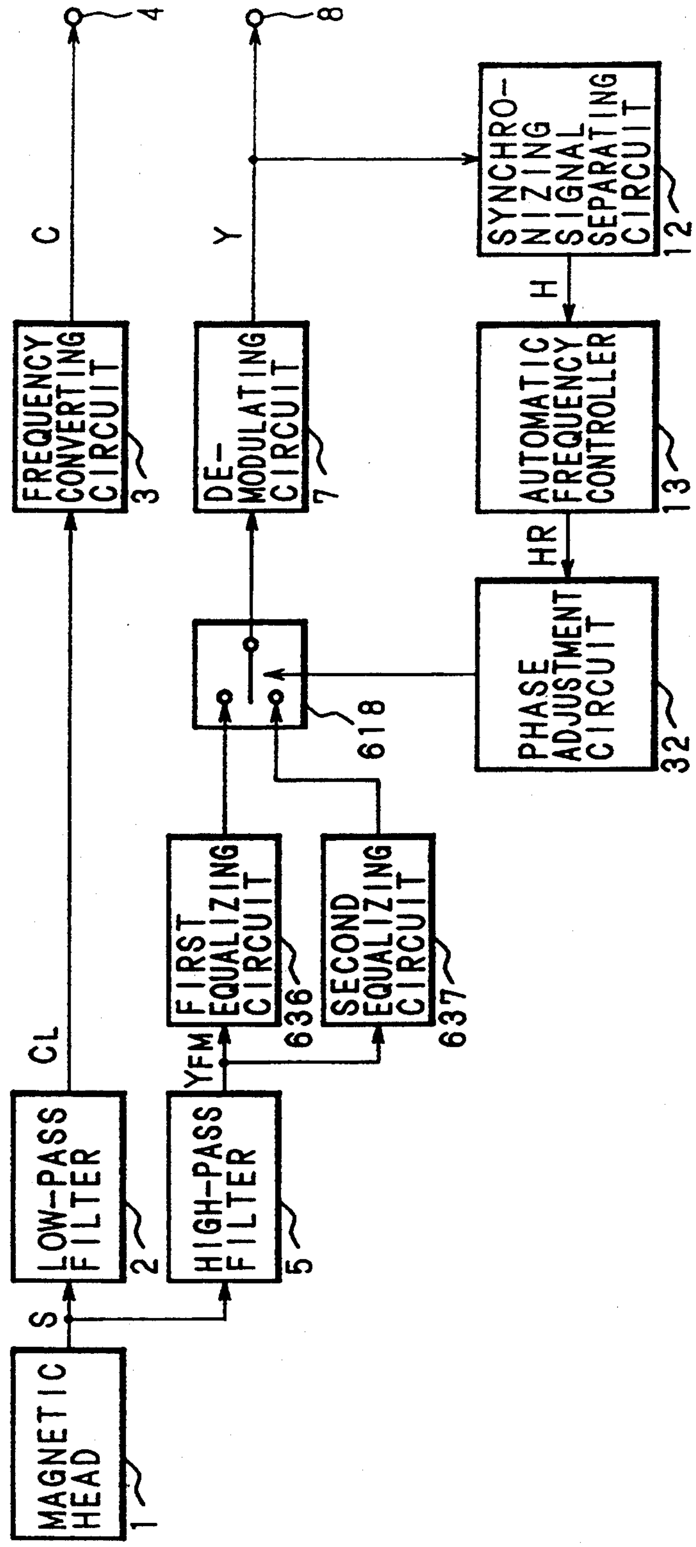

FIG. 87 is a block diagram showing a video signal reproduction apparatus of further another embodiment according to the invention. In FIG. 87, indicated at 13 is an AFC for stabilizing a frequency of a signal inputted thereto. Other elements identical to those shown in FIG. 86 are indicated by the same reference numerals.

Next, there will be described an operation of the AFC 13. In this case, a horizontal synchronizing signal H outputted from a synchronizing signal separating circuit 12 is inputted to the AFC 13. The AFC 13 controls the horizontal synchronizing signal H so as to have a substantially fixed frequency, and feeds the stable horizontal synchronizing signal to a phase adjustment circuit 32. Accordingly, in the case where the reproduced video signal is dropped out or skewed, or the phase of the horizontal synchronizing signal varies drastically, a control signal which specifies the demodulated portion of the horizontal synchronizing signal of the frequency-modulated luminance signal operates so as not to deviate from the actual demodulated portion of the horizontal synchronizing signal. This prevents the inconvenience that switching of the equalizer characteristic becomes recognizable on an image receiver such as a television, or the video signal portion is processed with an equalizer characteristic which emphasizes the lower wave components, whereby the video signal is inverted.

Figure 88:
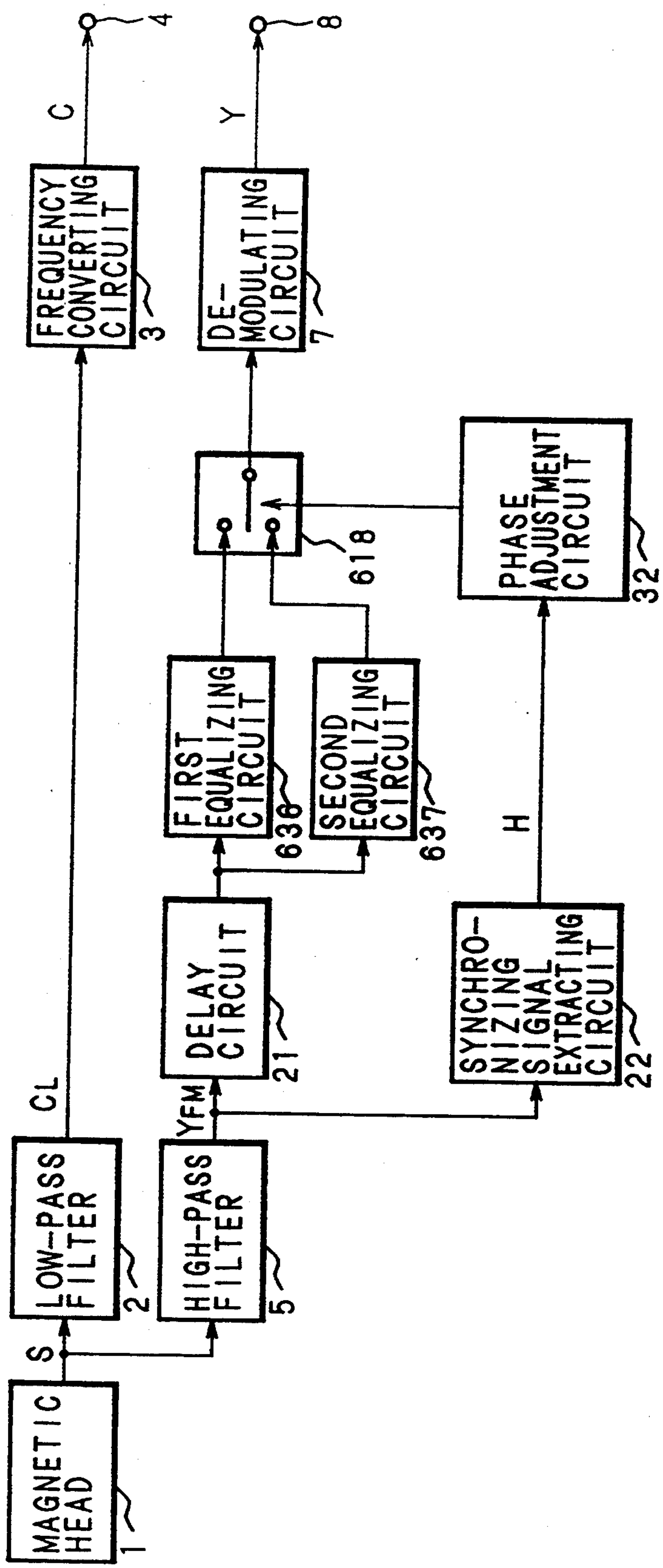

FIG. 88 is a block diagram shown a video signal reproduction apparatus of still another embodiment according to the invention. In FIG. 88, indicated at 22 is a synchronizing signal extracting circuit for extracting a synchronizing signal directly from an FM luminance signal YFM, and at 21 a delay circuit for delaying the FM luminance signal YFM by a period corresponding to a process time of the synchronizing signal extracting circuit 22 and a phase adjustment circuit 32. Other elements identical to those shown in FIG. 86 are indicated by the same reference numerals.

Next, there will be described operations of the delay circuit 21 and the synchronizing signal extracting circuit 22. In this case, the FM luminance signal YFM outputted from an HPF 5 is fed to the delay circuit 21 and the synchronizing signal extracting circuit, 22 simultaneously.

Figure 89:
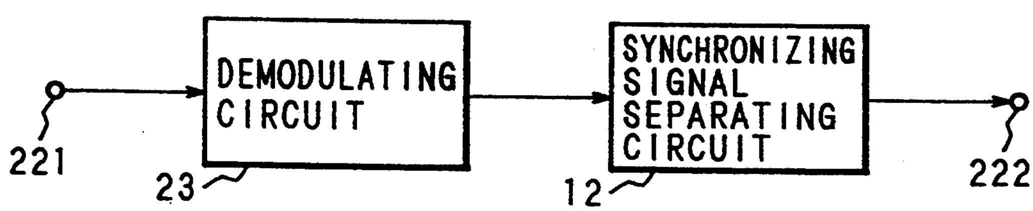
FIG. 89 is a block diagram showing an exemplary construction of a synchronizing signal extracting circuit.
Figure 90:
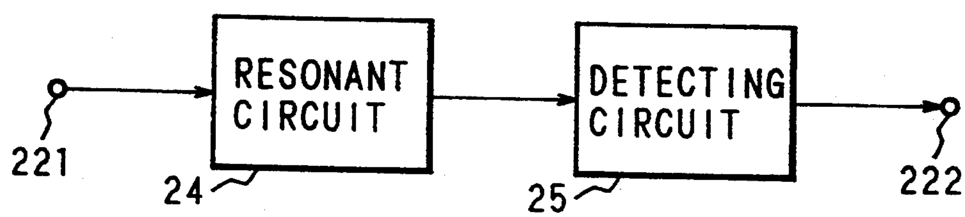
FIG. 90 is a block diagram showing another construction of the synchronizing signal extracting circuit.

The synchronizing signal extracting circuit 22, for example, has a construction as shown in FIGS. 89, 90. In FIG. 89, indicated at 221 is an input terminal to which the FM luminance signal YFM outputted from the HPF 5 is inputted, at 23 a demodulating circuit for demodulating the FM luminance signal YFM, and at 222 an output terminal through which the synchronizing signal is outputted to the phase adjustment circuit 32. The demodulating circuit 23 demodulates the FM luminance signal YFM inputted from the HPF 5 through the input terminal 221 to reproduce a luminance signal Y, and feeds the reproduced luminance signal Y to the synchronizing signal separating circuit 12. The synchronizing signal separating circuit 12 extracts only a horizontal synchronizing signal H from the luminance signal Y by removing a video signal portion therefrom, and feeds the extracted horizontal synchronizing signal H to the phase adjustment circuit 32 through the output terminal 222.

In FIG. 90, indicated at 24 is a resonant circuit for selecting such a resonance frequency (Q factor) at which a frequency band from a frequency corresponding to a sync chip of the FM luminance signal YFM to a frequency corresponding to a pedestal level thereof resonates. The Q factor is set to be substantially large. Indicated at 25 is a detecting circuit for detecting the signal outputted from the resonant circuit and extracting only the components of a predetermined duration and a predetermined cycle from the detected signal. The resonant circuit 24 causes the frequency band from a frequency corresponding to a sync chip of the FM luminance signal YFM inputted through the input terminal from the HPF 5 to a frequency corresponding to a pedestal level thereof to resonate at the substantially large Q factor, and feeds the result, ant signal to the detecting circuit 25. The detecting circuit 25 detects the signal outputted from the resonant circuit 24, and generates pulses in the portion not lower than a specified level, whereby the pulses narrower than the duration of the horizontal synchronizing signal are removed. In this way, only the signal portion having duration wider that, that of the horizontal synchronizing signal are gated, whereby only the signal corresponding to the horizontal synchronizing signal are extracted. Consequently, the extracted signal is outputted to the phase adjustment circuit 32 through the output terminal 222.

The delay circuit 21 delays the FM luminance signal inputted from the HPF 5 by a period which is the process time of the synchronizing signal extracting circuit 22 and the phase adjustment circuit 32 minus the process time of the first and the second equalizing circuit 626, 627 in response to the horizontal synchronizing signal indicated by the control signal inputted from the phase adjustment circuit 32 in the switching cite, nit 618, so that the signals outputted from the first and the second equalizing circuits 636, 637 correspond to the horizontal synchronizing signal. The delayed FM luminance signal is fed to the first and the second equalizing circuits 636, 637. Thereby, the demodulated horizontal synchronizing signal of the FM luminance signal is specified with the use of the horizontal synchronizing signal being dealt with, not with the use of the horizontal synchronizing signal before one horizontal scanning cycle. Accordingly, even in the case where the reproduced video signal is dropped out of skewed, or the phase of the horizontal synchronizing signal varies drastically, a control signal which specifies the demodulated portion of the horizontal synchronizing signal of the frequency-modulated luminance signal operates so as not to deviate from the actual demodulated portion of the horizontal synchronizing signal. This prevents the inconvenience that switching of the equalizer characteristic becomes recognizable on an image receiver such as a television, or the video signal portion is processed with an equalizer characteristic which emphasizes the lower wave components, whereby the video signal is inverted.

Figure 91:
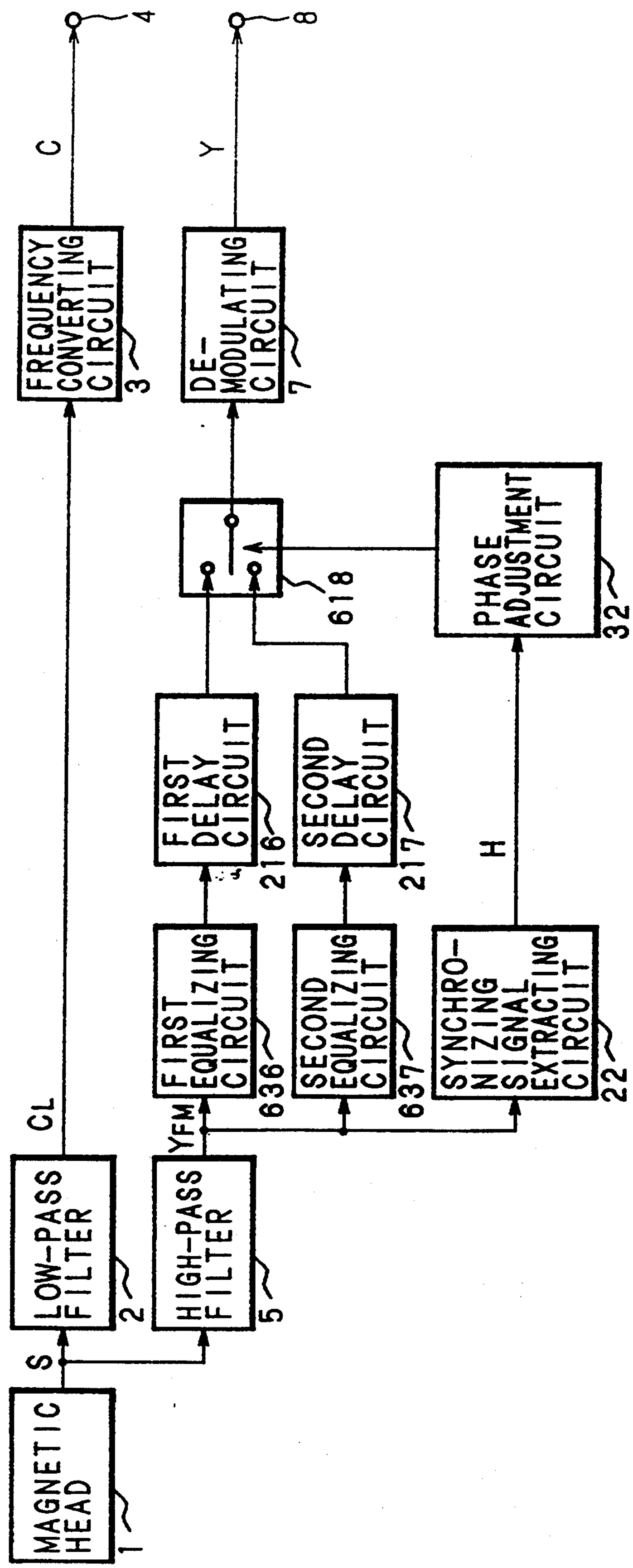

In the foregoing embodiment, the delay circuit 21 is provided before the equalizing circuit. However, the delay circuit 21 may be provided after the equalizing circuit. For example, FIG. 91 shows an embodiment in which a delay circuit is provided after an equalizing circuit. In FIG. 91, delay periods of a first delay circuit 216 and a second delay circuit 217 are set equal to each other.

Figure 92:
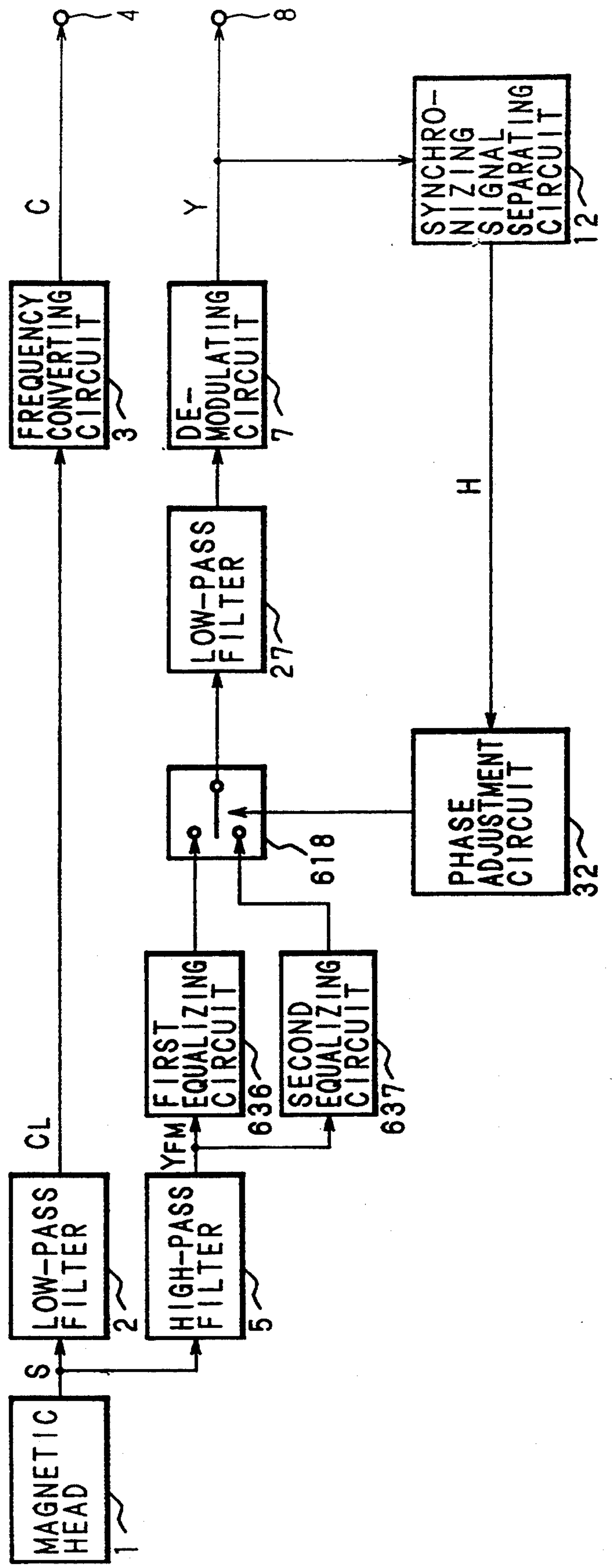

FIG. 92 is a block diagram showing a video signal reproduction apparatus of another embodiment according to the invention. In FIG. 92, indicated at 27 is a low-pass filter for passing a frequency band of an FM luminance signal. Other elements identical to those shown in FIG. 86 are indicated by the same reference numerals.

Next, there will be described an operation of the low-pass filter circuit 27. A switching noise is superimposed in a signal switched portion of the FM luminance signal YFM outputted from a switching circuit 618 by an switching operation. In the case where the switching noise zero-crosses when the FM luminance signal YFM in which the switching noise is superimposed is demodulated in a demodulating circuit 7, an impulsive whisker occurs on a white side of a luminance signal. Further, in the case where the switching noise is superimposed so as to avoid the zero-crossing, the impulsive whisker occurs on a black side of the luminance signal Y. This impulsive whisker causes inconvenience in processing a signal, such as malfunction of a synchronizing signal separating circuit in a television receiver, and sags. The low-pass filter 27 operates to pass the frequency band of the FM luminance signal YFM in which the switching noise is superimposed. The low-pass filter 27 removes a switching noise in the form of a burst superimposed in the switched portion of the FM luminance signal YFM, and feeds the resultant FM luminance signal YFM to the demodulating circuit 7. In this way, problems caused by the switching noise can be prevented from occurring.

FIG. 93 is a block diagram showing a video signal reproduction apparatus of another embodiment according to the invention. In FIG. 93, indicated at 28 is a mixing circuit for changing a mixing ratio of output signals of a first equalizing circuit 636 and a second equalizing circuit 637 in accordance with an output signal of a phase adjustment circuit 32. Other elements identical to those shown in FIG. 86 are indicated by the same reference numerals.

Next, there will be described an operation of the mixing circuit 28. When signals corresponding to a video signal are being outputted from the phase adjustment circuit 32, the mixing circuit 32 operates to mix the output signals of the first and the second equalizing circuits 626, 627 at a ratio of 1 to 0. On the other hand, when signals corresponding to a portion centering a horizontal synchronizing signal are being outputted from the phase adjustment circuit 32, the mixing circuit 32 operates to mix the output signals of the first and the second equalizing circuits 626, 627 at a ratio of 0 to 1. Further, when a control signal outputted from the phase adjustment circuit 32 is being changed from a control signal representative of the portion corresponding to the video signal to a control signal representative of the portion centering the horizontal synchronizing signal, the mixing circuit 28 gradually decreases a percentage of the output signals of the first equalizing circuit 638 while increasing a percentage of the output signals of the second equalizing circuit 637. On the other hand, when a control signal outputted from the phase adjustment circuit 32 is being changed from a control signal representative of the portion centering the horizontal synchronizing signal to a control signal representative of the portion corresponding to the video signal, the mixing circuit 28 gradually increases a percentage of the output signals of the first equalizing circuit 636 while decreasing a percentage of the output signals of the second equalizing circuit 637. The mixing circuit 28 switches the output signals of the first and the second equalizing circuits 636, 637 without generating the switching noises which occur when the FM luminance signals YFM are momentarily switched in the switching circuit.

Figure 94:
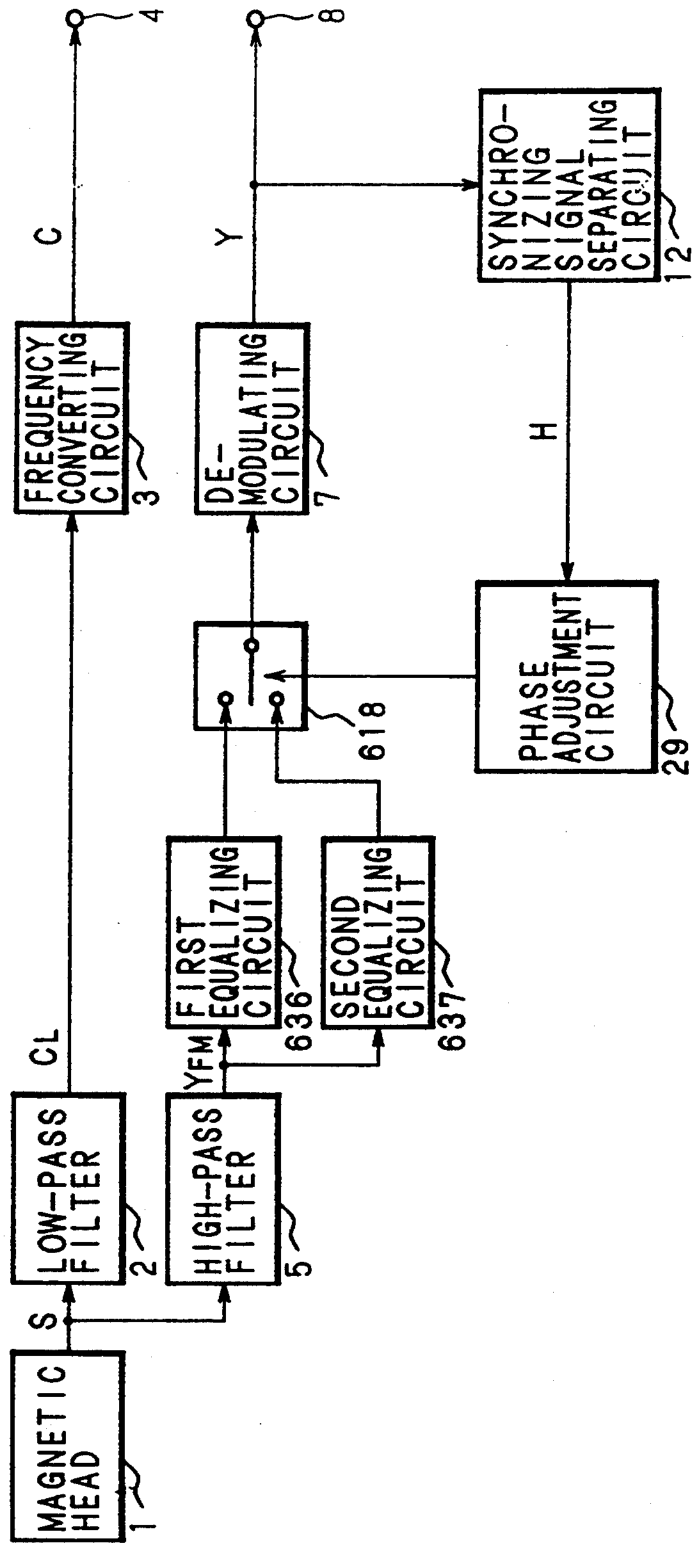

FIG. 94 is a block diagram showing a video signal reproduction apparatus of still another embodiment according to the invention. In FIG. 94, indicated at 29 is a phase adjustment circuit for adjusting the phase and a pulse duration of a horizontal synchronizing signal H to values different from those to which the foregoing phase adjustment circuit 32 adjusts the phase and the pulse duration of the horizontal synchronizing signal H. Other elements identical to those shown in FIG. 86 are indicated by the same reference numerals.

Figure 95:
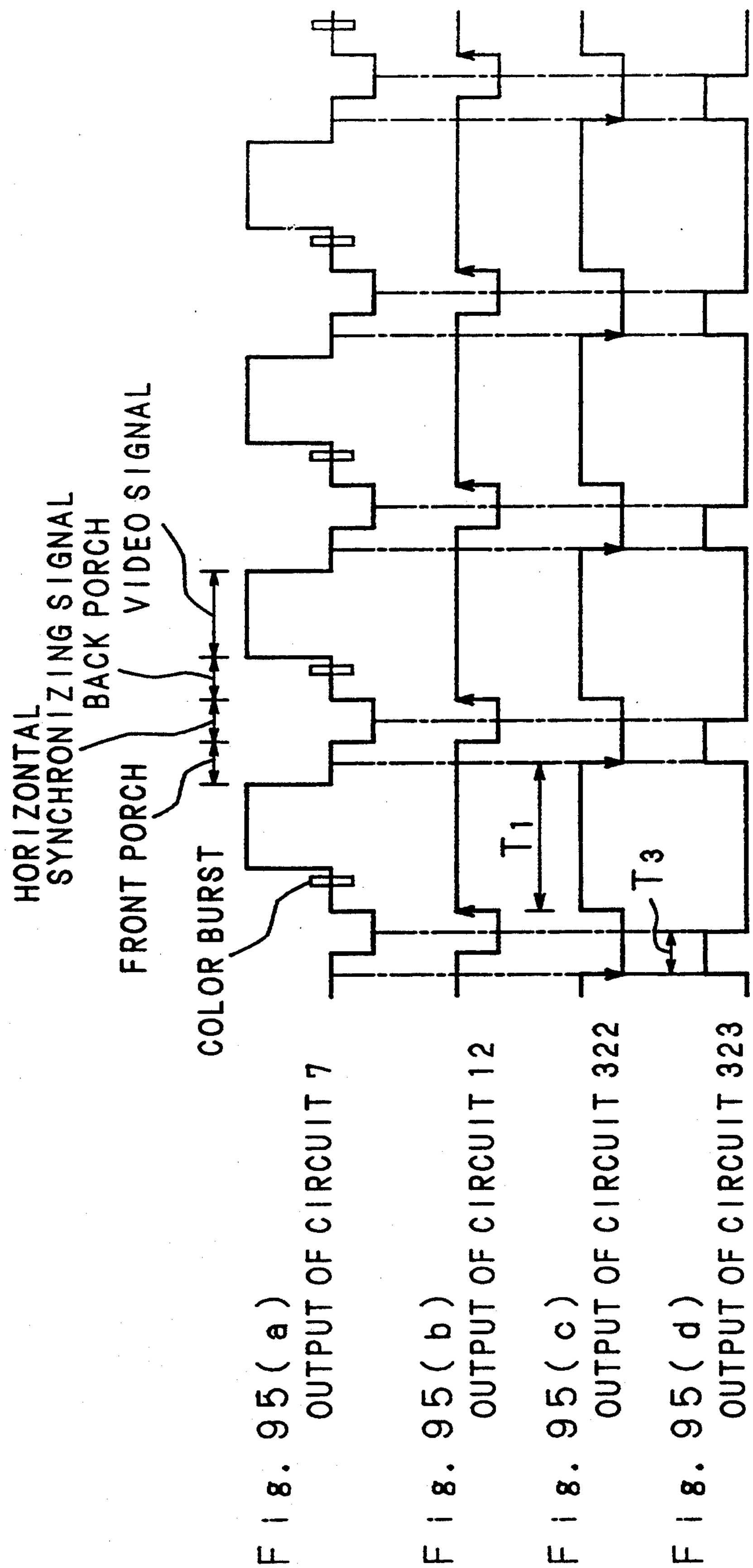
FIGS. 95(*a*) to 95(*d*) are timing charts showing waveforms in respective specified positions in a phase comparator circuit.

Next, there will be described an operation of the phase adjustment circuit 29. The phase adjustment circuit 29, for example, has a construction as shown in FIG. 8. The detailed operation of the phase adjustment circuit 29 will be described with reference to FIGS. 95(*a*) to 95(*d*). A horizontal synchronizing signal having a waveform shown in FIG. 95(*b*) is separated from a luminance signal Y having a waveform shown in FIG. 95(*a*) outputted from a demodulating circuit 7. The horizontal synchronizing signal H is inputted to an input terminal 321. A first pulse adjustment circuit 322 generates pulses having a pulse duration T1 from the leading edge as shown in FIG. 95(*b*), and feeds a signal having a waveform shown in FIG. 95(*c*) to a second pulse adjustment circuit 323. The second pulse adjustment circuit 323 generates pulses having a pulse duration T3 from the trailing edge of the pulses shown in FIG. 95(*c*), and feeds a signal having a waveform shown in FIG. 95(*d*) to the switching circuit 618 through an output terminal 324. Accordingly, a control signal fed to the switching circuit 618 is pulses including only a leading edge portion of the horizontal synchronizing signal, but not a trailing edge portion thereof as will be seen in FIG. 95(*d*). In this way, the control signal specifies only the demodulated leading edge portion of the horizontal synchronizing signal. Therefore, a color burst signal superimposed in a back porch portion is not subject to the influence of the control signal.

Figure 96:
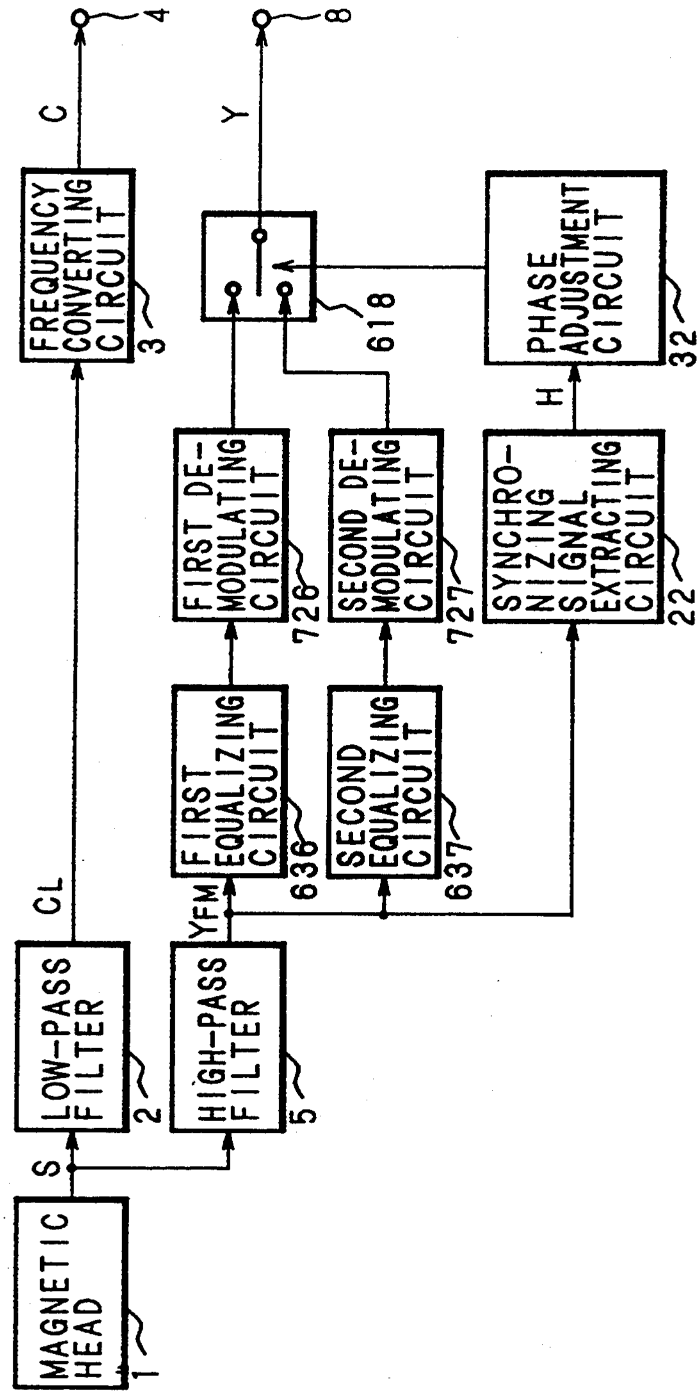
FIGS. 96 to 100 are block diagrams respectively showing video signal reproduction apparat, us of still other embodiments according to the invention.

FIG. 96 is a block diagram showing a video signal reproduction apparatus of further another embodiment according to the invention. In FIG. 96, indicated at 22 is a synchronizing signal extracting circuit, at 32 a phase adjustment circuit, at 636 a first equalizing circuit, at 637 a second equalizing circuit, at 726 a first demodulating circuit, at 727 a second demodulating circuit, and at 618 a switching circuit. The synchronizing signal extracting circuit is adapted for extracting a synchronizing signal directly from an FM luminance signal YFM. The phase adjustment circuit 32 is adapted for adjusting the phase and a pulse duration of the horizontal synchronizing signal H outputted from the synchronizing signal extracting circuit 12. The first equalizing circuit 636 is adapted for applying the peaking similarly to the conventional equalizing circuit 6. The second equalizing circuit 637 is adapted for raising the level of a lower sideband of a frequency-modulated luminance signal. The first demodulating circuit 726 is adapted for demodulating the FM luminance signal outputted from the first equalizing circuit 636. The second demodulating circuit 727 is adapted for demodulating FM luminance signal outputted from the second equalizing circuit 637. The switching circuit 618 is adapted for switching the output signals of the first and the second demodulating circuits 726, 727 in accordance with the output signal of the phase adjustment circuit 32. Other elements identical to those shown in FIG. 1 are indicated by the same reference numerals.

Next, there will be described an operation of the video signal reproduction apparatus shown in FIG. 96. An operation of reproducing a carrier chrominance signal C and a luminance signal Y from a frequency multiplexed signal S outputted from a magnetic head 1 is similar to the operation of the conventional video signal reproduction apparatus. Accordingly, description of this operation is left out here.

In this case, the FM luminance signal YFM outputted from an HPF 5 is fed to the first equalizing circuit 636, the second equalizing circuit 637, and the synchronizing signal extracting circuit 22. The synchronizing signal extracting circuit 22, for example, has a construction shown in FIGS. 89 or 90. The synchronizing signal extracting circuit 22 extracts only the horizontal synchronizing signal H, and feeds the extracted horizontal synchronizing signal H to the phase adjustment circuit 32. The phase adjustment circuit 32 adjusts the phase and a pulse duration of a control signal on the basis of the horizontal synchronizing signal H, and feeds the adjusted control signal to the switching circuit 618. The control signal is indicative of a command to switch a signal to be selected by the switching circuit 618 with the demodulated portions of the synchronizing signal and the video signal of the FM luminance signal YFM. The phase adjustment circuit 32, for example, has a construction shown in FIG. 8. The FM luminance signal YFM outputted from the HPF 5 is fed to the first and the second equalizing circuits 636, 637. The first equalizing circuit 636 applies the peaking similar to the conventional equalizing circuit 6 shown in FIG. 2(*b*), and feeds the resultant FM luminance signal YFM to the first demodulating circuit 726. The first demodulating circuit 726 demodulates the FM luminance signal YFM to reproduce a luminance signal Y, and feeds the reproduced luminance signal Y to one of input terminals provided in the switching circuit 618. The second equalizing circuit 637 raises the level of the lower sideband of the FM luminance signal YFM, and feeds the resultant signal to the second demodulating circuit 727. The second demodulating circuit. 727 demodulates the FM luminance signal YFM to reproduce a luminance signal Y, and the reproduced luminance signal Y to the other input terminal provided in the switching circuit 618. The switching circuit 618 switches signals inputted from the first and the second demodulating circuits 726, 727 in accordance with a control signal outputted from the phase adjustment circuit 32, and outputs the selected signal through a luminance signal output terminal 8. When the signal corresponding to the video signal is being outputted from the phase adjustment circuit 32, i.e., when the signal shown in FIG. 9(*d*) is in the L-level, the switching circuit 618 selects the signal outputted from the first demodulating circuit 726, and feeds the selected signal to the luminance signal output terminal 8. Thereby, in the portion corresponding to the video signal of the FM luminance signal, the luminance signal Y obtained by demodulating the FM luminance signal to which the peaking having a conventional characteristic shown in FIG. 2(*c*) is applied is outputted through the luminance signal output terminal 8. When the portion centering the horizontal synchronizing signal is being outputted from the phase adjustment circuit 32, i.e., the signal shown in FIG. 9(*d*) is in the H-level, the switching circuit 618 selects the signal outputted from the second demodulating circuit 727, and feeds the selected signal to the luminance signal output terminal 8. Thereby, in the portion corresponding to the horizontal synchronizing signal of the FM luminance signal, the luminance signal Y obtained by demodulating the FM luminance signal whose level of the lower sideband is raised is outputted through the luminance signal output terminal 8. Thus, the FM luminance signals passed two equalizing circuits are respectively demodulated, and switched with a baseband signal. Accordingly, the equalizer characteristic can be switched without disrupting a phase relationship of the FM luminance signal.

In the foregoing embodiment, the delay circuit for specifying the demodulated horizontal synchronizing signal of the FM luminance signal with the use of the horizontal synchronizing signal being dealt with, not with the use of the horizontal synchronizing signal before one horizontal scanning cycle may be provided before the equalizing circuit. For example, FIG. 97 shows an embodiment in which a delay circuit 21 is provided before an equalizing circuit.

Further, in the foregoing embodiment, an AFC for stabilizing a frequency of a horizontal synchronizing signal H outputted from a synchronizing signal extracting circuit 22 may be provided after the synchronizing signal extracting circuit 22. For example, FIG. 98 shows an embodiment in which an AFC 13 is provided after a synchronizing signal extracting circuit 22.

Figure 99:
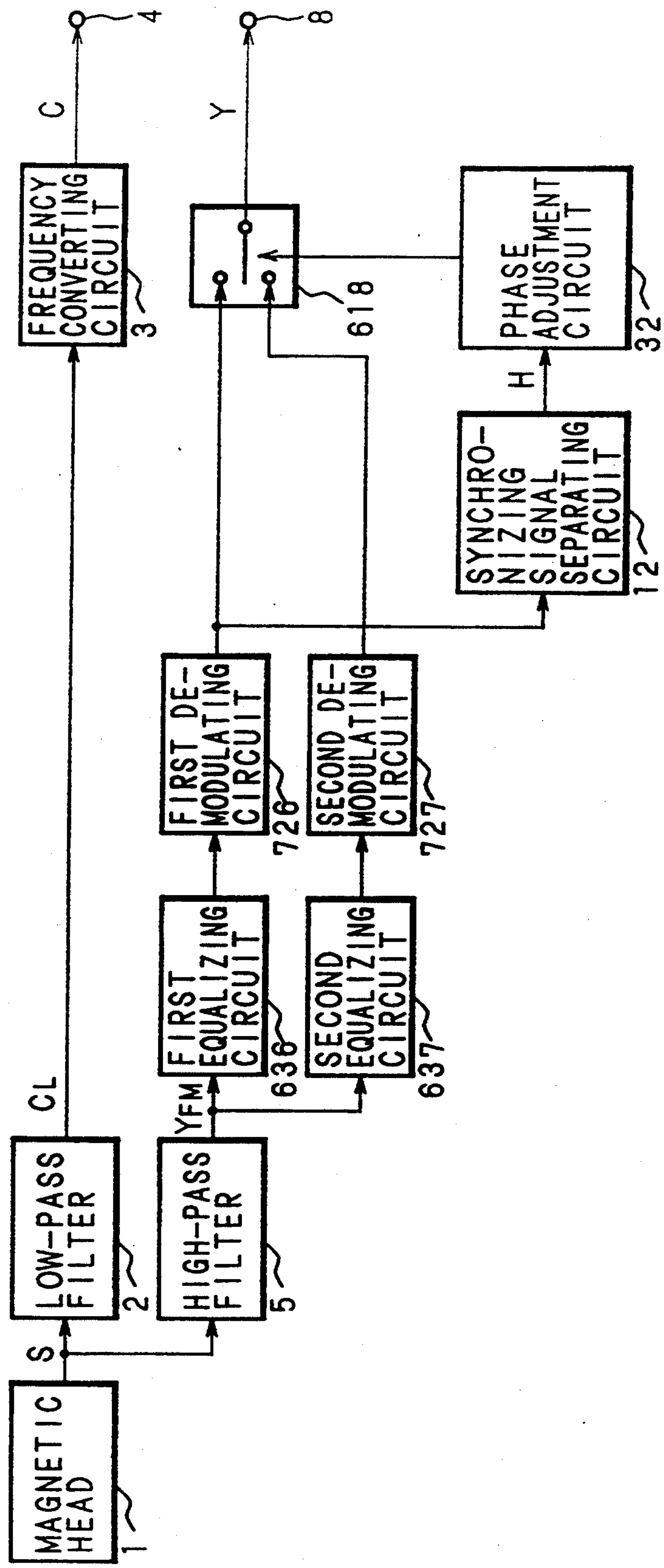
Figure 100:
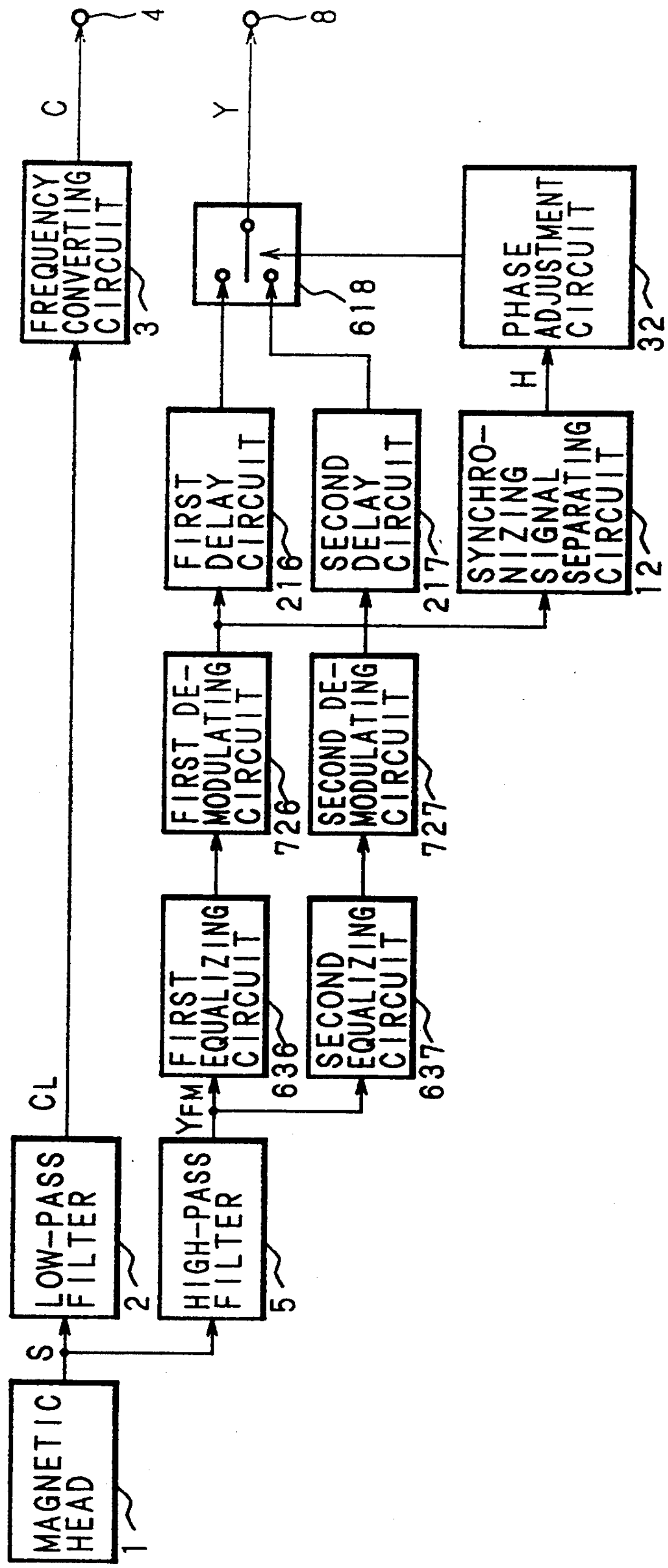

Moreover, in the foregoing embodiment, the horizontal synchronizing signal H may be extracted from the luminance signal Y outputted from the first demodulating circuit 726 or the second demodulating circuit 727. For example, FIG. 99 shows an embodiment in which a synchronizing signal separating circuit 12 is provided after a first demodulating circuit 726. Further, in the foregoing embodiment, the delay circuit for specifying the demodulated horizontal synchronizing signal of the FM luminance signal with the use of the horizontal synchronizing signal being dealt with, not with the use of the horizontal synchronizing signal before one horizontal scanning cycle may be provided before the switching circuit 618. For example, FIG. 100 shows an embodiment in which a first delay circuit 216 and a second delay circuit 217 are provided before a switching circuit 618. In the embodiments shown in FIGS. 99 and 100, the same effects as the embodiment shown in FIG. 86 can be obtained without providing the synchronizing signal extracting circuit 22.

Figure 97:
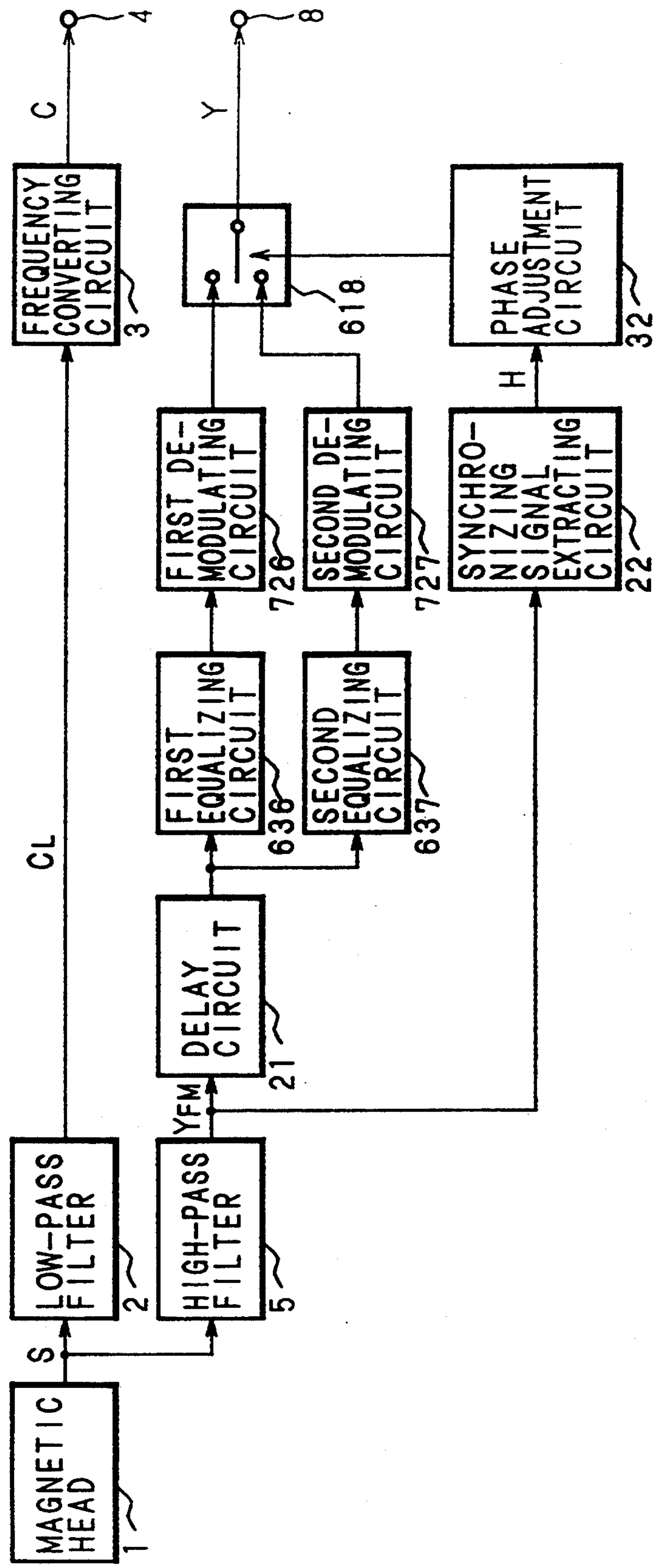
Figure 98:
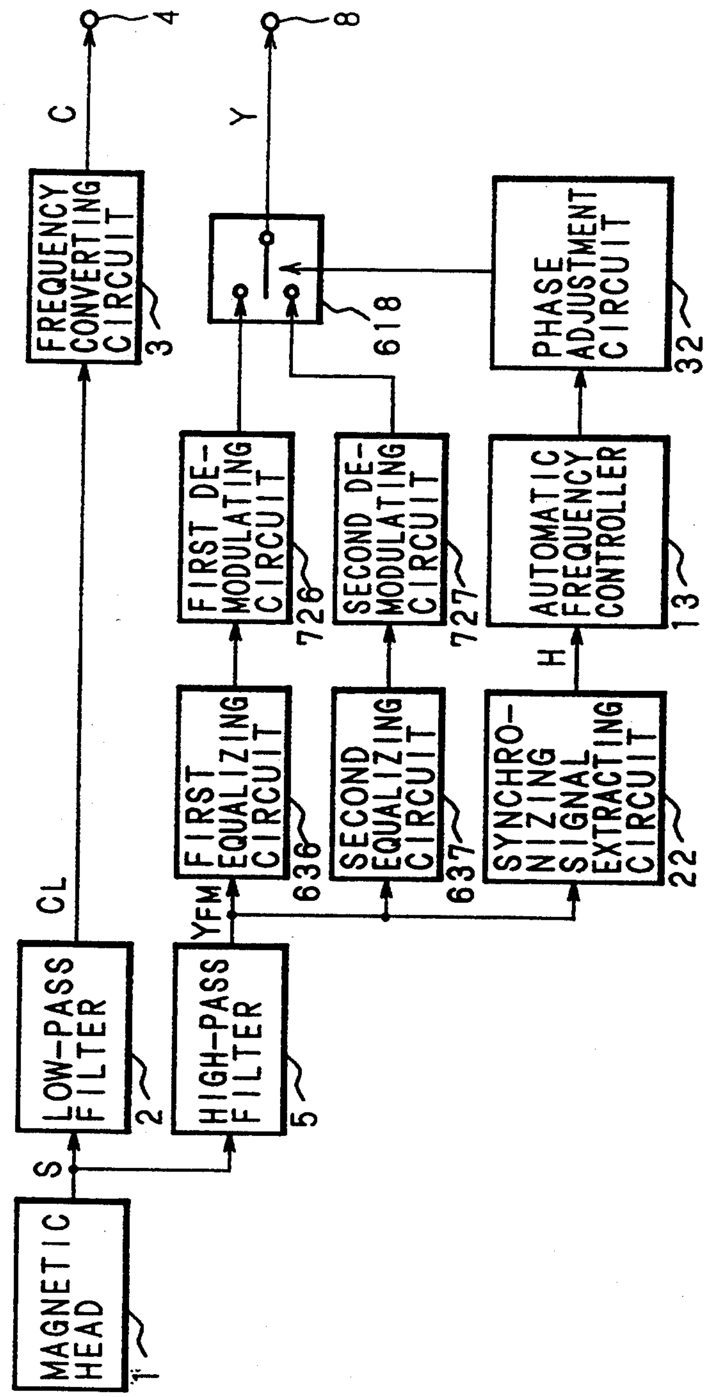

In the embodiments shown in FIGS. 97, 98, and 100, even in the case where the reproduced video signal is dropped out or skewed, or the phase of the horizontal synchronizing signal varies drastically, a control signal which specifies the demodulated portion of the horizontal synchronizing signal of the frequency-modulated luminance signal operates so as not to deviate from the actual demodulated portion of the horizontal synchronizing signal. This prevents the inconvenience that switching of the equalizer characteristic becomes recognizable on an image receiver such as a television, or the video signal portion is processed with an equalizer characteristic which emphasizes the lower wave components, whereby the video signal is inverted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A video signal reproduction apparatus for reproducing a video signal from a frequency multiplexed signal including a frequency-modulated luminance signal extending from an upper sideband range to a lower sideband range with a carrier wave at the center, the frequency modulated luminance signal being a signal obtained by time base multiplexing a luminance signal and a horizontal synchronizing signal for modulation, said apparatus comprising:

correcting means for correcting the level of the frequency-modulated luminance signal to equalize the frequency thereof;

demodulating means for demodulating the frequency-modulated luminance signal corrected by said correcting means and for outputting a signal;

separating means for separating a horizontal synchronizing signal from the signal outputted from said demodulating means; and generating means, responsive to said horizontal synchronizing signal, for generating a specific signal as a reference, said specific signal specifying the location in the frequency modulated luminance signal which includes, at least in portion, the horizontal synchronizing signal, and which does not include a portion wherein the luminance signal is modulated;

said correcting means switching between a first equalizer characteristic and a second equalizer characteristic, based upon said specific signal, the first equalizer characteristic for raising a level of the upper sideband range of the frequency-modulated luminance signal to equalize the frequency of said frequency-modulated luminance signal in a location including a portion wherein the luminance signal is modulated and which is not specified by the specific signal, the second equalizer characteristic for raising a level of the lower sideband range of the frequency-modulated luminance signal to enhance the horizontal synchronizing signal modulated in at least a portion of said frequency-modulated luminance signal in a location specified by said specific signal, not including the portion wherein the luminance signal is modulated.

2. A video signal reproduction apparatus according to claim 1, wherein said lower sideband range is a frequency band including the frequency of a sync chip and the frequency of a pedestal level of said frequency-modulated luminance signal.

3. A video signal reproduction apparatus according to claim 1, wherein said correcting means further includes selecting means for selecting the said first equalizer characteristic when said specific signal is absent and selecting said second equalizer characteristic when said specific signal is present, said selecting means supplying its output to said demodulating means.

4. A video signal reproduction apparatus for reproducing a video signal from a frequency multiplexed signal including a frequency-modulated luminance signal extending from an upper sideband range to a lower sideband range with a carrier wave at the center, the frequency modulated luminance signal being a signal obtained by time base multiplexing a luminance signal and a horizontal synchronizing signal for modulation, said apparatus comprising:

correcting means for correcting a level of the frequency-modulated luminance signal to equalize the frequency thereof;

demodulating means for demodulating the frequency-modulated luminance signal corrected by said correcting means and for outputting a signal;

separating means for separating a horizontal synchronizing signal from the signal outputted from said demodulating means;

stabilizing means for stabilizing the separated horizontal synchronizing signal to produce a stabilized horizontal synchronizing signal; and generating means, responsive to said stabilized horizontal synchronizing signal, for generating a specific signal as a reference, said specific signal indicating the location in the frequency modulated luminance signal which includes, at least in portion, the horizontal synchronizing signal, and which does not include a portion wherein the luminance signal is modulated;

said correcting means switching between a first equalizer characteristic and a second equalizer characteristic based upon said specific signal including, the first equalizer characteristic for raising a level of the upper sideband range of the frequency-modulated luminance signal to equalize the frequency of said frequency-modulated luminance signal in a location including a portion wherein the luminance signal is modulated and which is not specified by said specific signal;

the second equalizer characteristic for raising a level of the lower sideband range of the frequency-modulated luminance signal, to enhance the horizontal synchronization signal modulated in at least a portion of said frequency-modulated luminance signal in a location specified by said specific signal, not including the portion wherein the luminance signal is modulated.

5. A video signal reproduction apparatus for reproducing a video signal from a frequency-multiplexed signal including a frequency modulated luminance signal, the frequency modulated luminance signal being a signal obtained by time base multiplexing a luminance signal and a synchronization signal for modulation, said apparatus comprising:

an equalizing circuit adjusting the level of said frequency-modulated luminance signal with respect to the frequency thereof;

a synchronization signal portion identifying circuit producing a synchronization signal present signal only when said video signal includes a synchronization signal portion, said synchronization signal present signal identifying a location in the frequency modulated luminance signal which includes the synchronization signal, at least in portion, and which does not include a portion wherein the luminance signal is modulated;

said equalizing circuit, being responsive to said synchronization signal portion identifying circuit, and equalizing said frequency-modulated luminance signal in a location including a portion wherein the luminance signal is modulated, which is not identified by the synchronization signal present signal, with a first characteristic when no synchronization signal present signal is received and in a location identified by the synchronization signal present signal, not including a portion wherein the luminance signal is modulated, with a second characteristic for enhancing said synchronization signal modulated in at least a portion of said frequency modulated luminance signal when said synchronization signal present signal is received.

6. The video signal reproduction apparatus of claim 5 further comprising a demodulating circuit, receiving said frequency-modulated luminance signal from said equalizing circuit, and demodulating the equalized frequency modulated luminance signal to produce a demodulated luminance signal.

7. The video signal reproduction apparatus of claim 6 wherein said synchronization signal portion identifying circuit receives said demodulated luminance signal and includes, a synchronization signal separating circuit for separating said synchronization signal portions from said demodulated luminance signal, and a generating circuit for generating a synchronization signal present signal when a said synchronization signal portion is present.

8. The video signal reproduction apparatus of claim 7 wherein said generating circuit includes a phase adjustment circuit for adjusting the phase of each said synchronization signal portion to produce said synchronization signal present signal.

9. The video signal reproduction apparatus of claim 8 wherein said phase adjustment circuit includes a first pulse adjustment circuit for phase correcting of each of said synchronization signal portions and a second pulse adjustment circuit for adjusting the duration of each of said synchronization signal portions.

10. The video signal reproduction apparatus of claim 5 wherein said equalizing circuit includes, a first equalizing circuit for equalizing said frequency-modulated luminance signal with the first frequency characteristic, said first equalizing circuit equalizing the amplitude of said frequency-modulated luminance signal with respect to frequency to produced an equalized luminance signal, a second equalizing circuit, receiving and filtering said frequency-modulated luminance signal with a second frequency characteristic to enhance the signal within the frequency range of said synchronization signal portions, and a switch for selectively switching between said first and second equalizing circuits in response to receipt of said synchronization signal present signal.

11. The video signal reproduction apparatus of claim 10 wherein said synchronization signal portion identifying circuit receives said demodulated luminance signal and includes, a synchronization signal separating circuit for separating said synchronization signal portions from said demodulated luminance signal, and a generating circuit for generating a synchronization signal present signal when a said synchronization signal portion is present, said switch receiving said synchronization signal present signal from said generating circuit.

12. The video signal reproduction apparatus of claim 11 wherein at least one of said first and second equalizing circuits include a cosine equalizing circuit.

13. The video signal reproduction apparatus of claim 7 wherein said synchronization signal portion identifying circuit further includes an automatic frequency controller provided between said synchronization signal separating circuit and said generating circuit for stabilizing the frequency of occurrence of said synchronization signal portions.

14. A video signal reproduction method for reproducing a video signal from a frequency-multiplexed signal including a frequency modulated luminance signal, the frequency modulated luminance signal being obtained by time base multiplexing a luminance signal and a synchronization signal for modulation, said method comprising:

a) monitoring the frequency modulated luminance signal and producing a synchronization signal present signal only when said video signal includes a synchronization signal portion, said synchronization signal present signal identifying a location in the frequency modulated luminance signal which includes the synchronization signal, at least in portion, and which does not include a portion wherein the luminance signal is modulated;

b) equalizing said frequency-modulated luminance signal in a location including a portion wherein the luminance signal is modulated and which is not specified by the specific signal with a first characteristic when no synchronization signal present signal is received; and c) filtering said frequency-modulated luminance signal in a location identified by the synchronization signal present signal, not including a portion wherein the luminance signal is modulated, to enhance detection of said synchronization signal modulated in at least a portion of said frequency modulated luminance signal when said synchronization signal present signal is received.

15. The video signal reproduction method of claim 14 further comprising:

d) receiving said equalized frequency-modulated luminance signal of said step (b) and demodulating the equalized frequency modulated luminance signal to produce a demodulated luminance signal.

16. The video signal reproduction method of claim 15 wherein said step a) of monitoring includes, i) separating said portions of the frequency modulated luminance signal including said synchronization signal from said demodulated luminance signal, and ii) generating a synchronization signal present signal when a said synchronization signal portion is present.

17. The video signal reproduction method of claim 16 wherein said step ii) of generating further includes adjusting the phase of each said synchronization signal portion to produce said synchronization signal present signal.

18. The video signal reproduction method of claim 14 further comprising:

d) automatically stabilizing the frequency of occurrence of said synchronization signal portions.

19. The video signal reproduction method of claim 14 further comprising:

d) variably delaying said demodulated luminance signal.

20. The video signal reproduction method of claim 16 further comprising:

e) variably delaying said luminance signal.

* * * * *